(12) United States Patent
Kaul et al.

(10) Patent No.: US 12,528,773 B2
(45) Date of Patent: Jan. 20, 2026

(54) NON-LYSOSOMAL GLUCOSYLCERAMIDASE INHIBITORS AND USES THEREOF

(71) Applicant: ALECTOS THERAPEUTICS INC., Burnaby (CA)

(72) Inventors: Ramesh Kaul, Burnaby (CA); Ernest J. Mceachern, Burnaby (CA); Jianyu Sun, Burnaby (CA); David J. Vocadlo, Burnaby (CA); Yuanxi Zhou, Burnaby (CA); Yongbao Zhu, Burnaby (CA)

(73) Assignee: ALECTOS THERAPEUTICS INC. (CA)

( * ) Notice: Subject to any disclaimer, the term of this patent is extended or adjusted under 35 U.S.C. 154(b) by 586 days.

(21) Appl. No.: 17/923,878

(22) PCT Filed: May 6, 2021

(86) PCT No.: PCT/IB2021/053863
§ 371 (c)(1),
(2) Date: Nov. 7, 2022

(87) PCT Pub. No.: WO2021/224864
PCT Pub. Date: Nov. 11, 2021

(65) Prior Publication Data
US 2023/0348387 A1    Nov. 2, 2023

Related U.S. Application Data

(60) Provisional application No. 63/021,401, filed on May 7, 2020, provisional application No. 63/110,751, filed on Nov. 6, 2020.

(51) Int. Cl.
| | |
|---|---|
| *C07D 211/46* | (2006.01) |
| *A61K 31/445* | (2006.01) |
| *A61K 31/4525* | (2006.01) |
| *A61K 31/453* | (2006.01) |
| *A61K 31/4535* | (2006.01) |
| *A61K 31/454* | (2006.01) |
| *A61K 31/4545* | (2006.01) |
| *A61P 1/16* | (2006.01) |
| *A61P 3/00* | (2006.01) |
| *A61P 25/00* | (2006.01) |
| *C07D 401/10* | (2006.01) |
| *C07D 401/14* | (2006.01) |
| *C07D 405/06* | (2006.01) |
| *C07D 405/10* | (2006.01) |
| *C07D 409/06* | (2006.01) |
| *C07D 413/10* | (2006.01) |
| *C07D 413/14* | (2006.01) |
| *C07D 417/06* | (2006.01) |
| *C07D 417/14* | (2006.01) |

(52) U.S. Cl.
CPC ......... *C07D 211/46* (2013.01); *C07D 401/10* (2013.01); *C07D 401/14* (2013.01); *C07D 409/06* (2013.01); *C07D 417/14* (2013.01)

(58) Field of Classification Search
CPC .. C07D 211/46; C07D 401/10; C07D 401/14; C07D 405/06; C07D 405/10; C07D 409/06; C07D 413/10; C07D 413/14; C07D 417/06; A61K 31/445; A61K 31/4525; A61K 31/453; A61K 31/4535; A61K 31/454; A61K 31/4545; A61P 1/16; A61P 3/00; A61P 25/00
See application file for complete search history.

(56) References Cited

U.S. PATENT DOCUMENTS

| | | | |
|---|---|---|---|
| 4,533,668 | A | 8/1985 | Matsumura et al. |
| 2008/0269285 | A1 | 10/2008 | Martin et al. |

FOREIGN PATENT DOCUMENTS

| | | |
|---|---|---|
| CA | 2065446 | 3/1991 |
| CN | 1496351 A | 5/2004 |
| EP | 0 350 012 | 1/1990 |
| JP | S 55-47655 A | 4/1980 |
| JP | H 2-306962 A | 5/1989 |
| JP | H 2-131425 A | 5/1990 |
| JP | 02-306962 | 12/1990 |
| JP | 06-128229 A | 5/1994 |
| JP | 2001-522833 A | 11/2001 |
| JP | 2004-517869 | 6/2004 |
| WO | 1991/003242 | 3/1991 |
| WO | 99/24401 | 5/1999 |
| WO | 2002/055498 | 7/2002 |
| WO | 2004/007453 | 1/2004 |
| WO | 2004/007454 | 1/2004 |
| WO | 2004/111001 | 12/2004 |
| WO | 2004/111002 | 12/2004 |
| WO | 2006/125141 | 11/2006 |
| WO | 2006/136714 | 12/2006 |
| WO | 2014/032184 | 3/2014 |
| WO | 2005/068426 | 7/2015 |
| WO | 2015/147639 | 10/2015 |
| WO | 2017/185010 | 10/2017 |

(Continued)

OTHER PUBLICATIONS

Ashe, K.M. et al. PLoS One 2011, 6, e21758.

(Continued)

*Primary Examiner* — Bruck Kifle
(74) *Attorney, Agent, or Firm* — FROST BROWN TODD LLP

(57) ABSTRACT

The invention provides compounds for inhibiting glucosylceramidases, prodrugs of the compounds, and pharmaceutical compositions including the compounds or prodrugs of the compounds.

8 Claims, No Drawings

Specification includes a Sequence Listing.

(56) References Cited

FOREIGN PATENT DOCUMENTS

WO      2020/229968      11/2020

OTHER PUBLICATIONS

Boudewyn, L.C. et al. Neurobiol Dis 2017, 105, 257-270.
Di Pardo, A. et al. Front Neurosci 2017, 11, 698.
Dodge, J.C. et al. Proc Natl Acad Sci U S A 2015, 112, 8100-5.
Farfel-Becker, T. et al. Dis Model Mech 2011, 4, 746-752.
Ghisaidoobe, A.T. et al. J Med Chem 2014, 57, 9096-104.
Grabowski, G.A. Lancet 2008, 372, 1263-1271.
Gu et al., "Structure-Activity Studies of N-Butyl-1-deoxynojirimycin (NB-DNJ) Analogues: Discover of Potent and Selective Aminocyclopentitol Inhibitors of GBA1 and GBA2", ChemMedChem 2017, vol. 12, pp. 1977-1984.
Halmer, R. et al. Cell Physiol Biochem 2014, 34, 111-118.
Hayashi, Y. et al. J Biol Chem 2007, 282, 30889-30900.
Ilan, Y. Am J Physiol-Gast Liver Physiol 2016, 310, G1102-G1117.
Kim, S. et al. Proc Natl Acad Sci U S A 2018, 115, 798-803.
Lahiri, S. et al. Cell Mol Life Sci 2007, 64, 2270-2284.
Loberto, N. et al. PLoS One 2014, 9, e104763.
Margalit, M. et al. J Pharm Exp Ther 2006, 319, 105-110.
Margalit, M. et al. Am J Physiol-Gast Liver Physiol 2005, 289, G917-G925.
Marques, A.R. et al. PLoS One 2015, 10, e0135889.
Massimo, A. et al. Neurochem Res 2016, 41, 210-20.
Mistry, P.K. et al. Proc Natl Acad Sci U S A 2014, 111, 4934-9.
Mizrahi, M. et al. J Clin Trans Hepatol 2018, 6, 127-134.
Somogyi, A. et al. Int J Mol Sci 2018, 19, 625.
Van Den Burg et al., "Assessment of Partially Deoxygenated Deoxynojirimycin Derivatives as Glucosylceramide Synthase Inhibitors", Med. Chem. Lett., 2011, vol. 2(7), pp. 519-522.
Woeste, M.A. et al. Front Mol Neurosci 2017, 10, 386.
Zervas, M. et al. Curr Biol 2001, 11, 1283-7.
Zhang, W. et al. Clin & Exp Immunol 2009, 157, 359-364.
Zigmond, E. et al. Gut 2007, 56, 82-89.
Volpe in The AAPS Journal, 2010, 12(4), 670-678.
Kawasaki et al., "The effect of vinyl esters on the enantioselectivity of the lipase-catalysed transesterification of alcohols" Tetrahedron Asymmetry, 2001, 12, 4, 585-596.
Lahav et al., "A Fluorescence Polarization Activity-Based Protein Profiling Assay in the Discovery of Potent, Selective Inhibitors for Human Nonlysosomal Glucosylceramidase" J. Am. Chem. Soc. 2017, 139, 14192-14197.
International Search Report issued in related International Application No. PCT/IB2020/054355 dated Aug. 18, 2020.
International Preliminary Report on Patentability issued in related International Application No. PCT/IB2020/054355 dated Nov. 25, 2021.
Extended European Search Report issued in related European Paten Application No. P20805984 dated Jan. 5, 2023.
International Search Report issued in corresponding International Application No. PCT/IB2021/053863 dated Jul. 22, 2021.
International Preliminary Report on Patentability issued in corresponding International Application No. PCT/IB2021/053863 dated Nov. 17, 2022.
International Search Report issued in related International Application No. PCT/IB2021/053864 dated Aug. 9, 2021.
International Preliminary Report on Patentability issued in related International Application No. PCT/IB2021/053864 dated Nov. 17, 2022.
Mutoh, T. et al. CNS Neurol Disord Drug Targets 2006, 5, 375-380.
Nietupski, J.B. et al. Mol Genet Metab 2012, 105, 621-8.
Hunnius, Pharmazeutisches Wörterbuch, 6th edition, 1986, p. 847 (3 pages).
Kurzes Lehrbuch der Pharmakologie und Toxikologie, 12th edition, 1989, p. 29, left column lines 5 to 15 (3 pages).
Goodman & Gilman's The Pharmacological Basis of Therapeutics, 9th Ed., 1996, pp. 11 to 13 (5 pages).
First Substantive Report dated Jun. 9, 2023 issued in respect of related Saudi Arabia Patent Application No. 522441226 (English translation not available), 7 pages.
Office Action dated Oct. 5, 2023 issued in respect of related Eurasian Patent Application No. 202292912 (English translation not available), 2 pages.
Office Action dated Oct. 3, 2023 issued in respect of related Eurasian Patent Application No. 202292900 (English translation not available), 3 pages.
Office Action dated Mar. 26, 2023 issued in respect of related Algerian Patent Application No. 220980 (English translation not available), 1 page.
Examination Report dated Jan. 11, 2024, issued in related Indian Patent Application No. 202117055118.
First Office Action dated Jan. 13, 2024, issued in related Chinese Patent Application No. 202080048768.X.
Office Action dated Mar. 26, 2024, issued in related European Patent Application No. 20805984.0.
Second Office Action dated May 12, 2024, issued in related Chinese Patent Application No. 202080048768.X.
Office Action dated Jun. 13, 2024, issued in related Japanese Patent Application No. 2021-566468.
Extended European Search Report dated Feb. 4, 2024, issued in related European Patent Application No. 21799911.9.
Extended European Search Report dated May 23, 2024, issued in corresponding European Patent Application No. 21800654.2.
Yu et al., "Design, Synthesis, and Biological Evaluation of N-Alkylated Deoxynojirimycin (DNJ) Derivatives for the Treatment of Dengue Virus Infection", Journal of Medicinal Chemistry, vol. 55, No. 13, Jul. 12, 2012 (Jul. 12, 2012-07), pp. 6061-6075, XP055116892, ISSN: 0022-2623, DOI: 10.1021/jm30017lv.
Van Den Berg et al., "Synthesis and Evaluation of Hybrid Structures Composed of Two Glucosylceramide Synthase Inhibitors", Chemmedchem Communications, WILEY-VCH, DE, vol. 10, No. 12, Oct. 23, 2015 (Oct. 23, 2015), pp. 2042-2062.
Patani et al. Chem Rev 1996, 96, 3147-3716.
Office Action dated Oct. 2, 2024, issued in related Japanese Patent Application No. JP2022-567142.
EPO Communication under Rule 71(3) EPC dated Jan. 1, 2025, issued in Patent Application No. 20805984.0-1102.
Non-Final Office Action dated Dec. 27, 2024, issued in related U.S. Appl. No. 17/594,834.
Examiner's Report dated Jan. 9, 2025, issued in related Canadian Patent Application No. 3,182,338.
Examinatin Report No. 1 dated Nov. 13, 2024, issued in related Australian Patent Application No. 2020274430.
Examiner's Report dated Dec. 10, 2024, issued in corresponding Canadian Patent Application No. 3,182,334.
English translation of Office Action dated Jan. 11, 2025 issued in corresponding Chinese Patent Application No. 202180046373.0.
Office Action issued in Australia dated Nov. 12, 2024, issued in related Australian Patent Application No. 2021269232.
English translation of Office Action issued in China dated Nov. 30, 2024, issued in related Chinese Patent Application No. 202180046369.4.
Bernotas et al. Tetrahedron Letters, 1990, 31, 3393.
Hausler et al. Monatschefte fur Chemie 133, 555-560 (2002).
Shankar et al. Tetrahedron Letters, 1993, 34, 7171.
Requirement for Restriction Election dated Sep. 23, 2024, issued in related United States U.S. Appl. No. 17/594,834.
Examination Report No 1 dated Nov. 13, 2024, issued in corresponding Australian Patent Application No. 2021269231.
Office Action dated Apr. 16, 2025, issued in corresponding European Patent Application No. 21799911.9.
Office Action dated Jun. 4, 2025, issued in corresponding Japanese Patent Application No. JP2022-567143.
2nd Office Action dated May 23, 2025, issued in related Chinese Patent Application No. 202180046369.4.
Restriction Requirement for Election dated Aug. 13, 2025, issued in related U.S. Appl. No. 17/923,875.

NON-LYSOSOMAL GLUCOSYLCERAMIDASE INHIBITORS AND USES THEREOF

CROSS-REFERENCE TO RELATED APPLICATIONS

This application is a U.S. National Phase Patent Application of International Application Number PCT/IB2021/053863, filed on May 6, 2021, which claims benefit of U.S. Provisional Application No. 63/021,401, filed May 7, 2020, and U.S. Provisional Application No. 63/110,751, filed Nov. 6, 2020, the entire content of each of which is incorporated herein by reference.

SEQUENCE LISTING

The instant application contains a Sequence Listing in ASCII format and the entire content of the electronic submission of the sequence listing is incorporated by reference in its entirety for all purposes. The ASCII file is named "229408_Updated_Sequence_Listing.txt," and was last modified on Nov. 14, 2023, and is 8,644 bytes in size.

FIELD OF THE INVENTION

This application relates in part to compounds that inhibit glucosylceramidases and uses thereof.

BACKGROUND OF THE INVENTION

The glucosylceramidases are a group of enzymes that catalyze the hydrolytic cleavage of the beta-glucosidic linkage of the glycosphingolipid glucosylceramide (GlcCer, also known as glucocerebroside) to produce D-glucose and ceramide. In humans, there are three distinct enzymes that possess glucosylceramidase activity: the lysosomal beta-glucocerebrosidase (GCase or GBA1, EC 3.2.1.45), the non-lysosomal glucosylceramidase (GBA2, EC 3.2.1.45), and the cytosolic beta-glucosidase (GBA3, EC 3.2.1.21). GCase is a lysosomal enzyme encoded by the gene GBA; homozygous loss of function mutations in GBA cause the lysosomal storage disorder Gaucher disease, which is characterized by the pathological accumulation of glucosylceramide within lysosomes.[1] GBA2 is a membrane-associated protein located at the cytoplasmic side of the endoplasmic reticulum (ER) and Golgi membrane, and is expressed at high levels in the central nervous system (CNS).[2,3] ENREE 2 GBA3 is cytosolic enzyme predominantly expressed in the liver.[3,4] ENREF 3

The glucosylceramidases play an important role in regulating cellular levels of their substrate molecule, glucosylceramide, which is the simplest member and biosynthetic precursor of an extensive class of cellular membrane lipids, the glycosphingolipids (GSLs).[3,5] ENREF 2 Dysregulation of GSL metabolism and homeostasis is implicated in a broad range of diseases, including: the neurological disorders Alzheimer's disease (AD),[6] Parkinson's disease (PD),[7] multiple sclerosis (MS),[8] Huntington's disease (HD),[9] amyotrophic lateral sclerosis (ALS),[10] and neuronal ceroid lipofuscinosis (Batten disease);[11] the lysosomal storage diseases Niemann-Pick type C disease (NPC),[12] mucolipidosis type IV (MLIV),[13] and Sandhoff disease;[14] and the liver diseases non-alcoholic fatty liver disease (NAFLD)[15] and non-alcoholic steatohepatitis (NASH).[15] Small-molecule GBA2 inhibitors have been shown to extend lifespan and improve motor coordination in a rodent model of NPC.[16, 17] Similarly, evidence indicates that GBA2 inhibition improves lifespan and delays motor deficits in rodent models of MLIV[13] and Sandhoff disease.[14] In a murine model with synucleinopathy, small-molecule GBA2 inhibitors have been shown to reduce the accumulation of alpha-synuclein aggregates in the brain.[14] As well, treatment with a small-molecule GBA2 inhibitor reduces neuroinflammation and neurodegeneration in a murine model of neuronal ceroid lipofuscinosis (Batten disease).[18] Reduction of GBA2 activity has also been demonstrated to rescue the clinical phenotype in a rodent model of Gaucher disease.[19] In addition, studies have shown that GBA2 is involved in regulating the inflammatory response,[2] and that reduction of GBA2 activity reduces inflammation in a cell model of cystic fibrosis (CF).[20] Increased levels of glucosylceramide have also demonstrated beneficial effects in rodent models of liver disease, including non-alcoholic steatohepatitis (NASH),[21] hepatitis,[22] hepatocellular carcinoma (HCC),[23] autoimmune cholangitis,[24] and drug-induced liver injury (DILI).[25]

The enzymatic activity of GBA2 can be pharmacologically blocked by the iminosugars (2R,3R,4R,5S)-1-butyl-2-(hydroxymethyl)piperidine-3,4,5-triol (NB-DNJ, miglustat) and (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648); however, these compounds are not selective for GBA2 as they also exhibit inhibitory activity toward other enzymes, including GCase, glucosylceramide synthase (GCS, EC 2.4.1.80), and intestinal alpha-glucosidases.[26]

International patent applications PCT/GB2003/003099, filed 17 Jul. 2003, published under No. WO 2004/007453 on 22 Jan. 2004; PCT/GB2004/002450, filed 9 Jun. 2004, published under No. WO 2004/111001 on 23 Dec. 2004; PCT/GB2004/002451, filed 9 Jun. 2004, published under No. WO 2004/111002 on 23 Dec. 2004; PCT/GB2005/000071, filed 11 Jan. 2005, published under No. WO 2005/068426 on 28 Jul. 2005; PCT/NL2015/050188, filed 23 Mar. 2015, published under No. WO 2015/147639 on 1 Oct. 2015; and PCT/IB2020/054355, filed 7 May 2020, published under WO 2020/229968 on 19 Nov. 2020, are directed to small-molecule inhibitors of GBA2.

SUMMARY OF THE INVENTION

The invention provides, in part, compounds for inhibiting a non-lysosomal glucosylceramidase (GBA2), prodrugs of the compounds, uses of the compounds and the prodrugs, pharmaceutical compositions including the compounds or prodrugs of the compounds, and methods of treating diseases and disorders modulated by levels of GBA2 activity, and/or levels of glucosylceramide, and/or dysregulation of glycosphingolipid metabolism or homeostasis. In some embodiments, the invention provides compositions and methods to prevent and/or treat a neurological disease, including Alzheimer's disease, Parkinson's disease, multiple sclerosis, Huntington's disease, and amyotrophic lateral sclerosis (ALS), or a lysosomal storage disease, including Gaucher disease, Niemann-Pick type C disease, mucolipidosis type IV, and Sandhoff disease, or a liver disease, including non-alcoholic steatohepatitis (NASH), by administering to a patient in need thereof an effective amount of one or more of the compounds or prodrugs of the compounds described herein.

In one aspect, the invention provides a compound of Formula (I) or a pharmaceutically acceptable salt thereof:

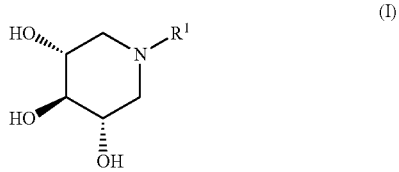

(I)

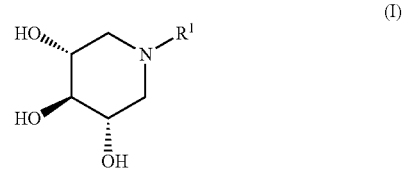

(I)

where R¹ may be $(CH_2)_nR^2$, wherein n may be 1, 2, or 3, and R² may be cyclohexyl, phenyl, thiophen-2-yl, thiophen-3-yl, pyridine-2-yl, adamantyl, 2,3-dihydro-1H-inden-2-yl, 1,2,3,4-tetrahydronaphthalen-2-yl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, (benzo[d][1,3]dioxol-5-yl)methyl, (2,3-dihydrobenzo[b][1,4]dioxin-6-yl)methyl, 1-cyclohexylazetidin-3-yl,

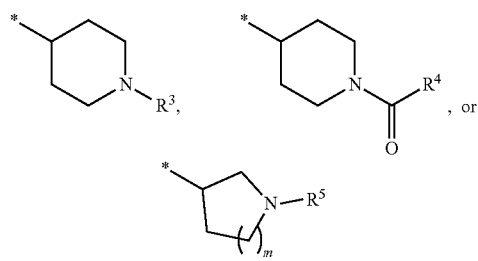

each optionally substituted from one up to the maximum number of substituents with one or more of F, Cl, $C_{1-6}$ alkyl, $C_{2-6}$ alkenyl, cyclopropyl, difluoromethyl, 1,1-difluoroethyl-1-yl, 2-fluoropropan-2-yl, methoxymethyl, $OCF_3$, $CF_3$, phenyl, pyrrolidin-1-yl, piperidin-1-yl, 4-morpholino, $C_{1-6}$ alkoxy, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, and/or 3,5-dimethyl-1H-pyrazol-4-yl;

where R³ may be $C_{1-6}$ alkyl, phenyl, pyridine-2-yl, pyridin-3-yl, benzo[d]thiazol-2-yl, cyclohexylcarbamothioyl, or cyclohexylcarbamoyl, each optionally substituted from one up to the maximum number of substituents with one or more of F, Cl, $C_{1-6}$ alkyl, $C_{2-6}$ alkenyl, cyclopropyl, $C_{1-6}$ alkoxy, $OCF_3$, and/or $CF_3$; and where R⁴ may be $C_{1-6}$ alkyl, $C_{3-7}$ cycloalkyl, phenyl, thiophen-3-yl, phenylmethyl, or cyclopentylmethyl, each optionally substituted from one up to the maximum number of substituents with one or more of F, $C_{1-6}$ alkyl, $OCH_3$, and/or $CF_3$; and where m may be 1 or 2; and where R⁵ may be phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, or benzo[d]thiazol-2-yl, each optionally substituted from one up to the maximum number of substituents with one or more of F, Cl, $C_{1-6}$ alkyl, $C_{1-6}$ alkoxyl, $OCF_3$, and/or $CF_3$, with the proviso that R¹ is not benzyl or 3-phenylpropyl.

In alternative embodiments, the invention provides a compound of Formula (I) or a pharmaceutically acceptable salt thereof:

where R¹ may be $(CH_2)_nR^2$, wherein n may be 1 or 2, and R² may be cyclohexyl, cyclohexylmethyl, phenylethyl, 4-phenylcyclohexyl, 4-(trifluoromethoxy)cyclohexyl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, 1,2,3,4-tetrahydronaphthalen-2-yl, 2,3-dihydro-1H-inden-2-yl, (adamantyl)methyl, (pyridine-2-yl)methyl, (benzo[d][1,3]dioxol-5-yl)methyl, (2,3-dihydrobenzo[b][1,4]dioxin-6-yl)methyl, ([1,1'-biphenyl]-4-yl)methyl, 1-(2,2,2-trifluoroethyl)piperidin-4-yl, 1-(pyridin-3-yl)piperidin-4-yl, 1-(pyridin-2-yl)piperidin-4-yl, 1-(benzo[d]thiazol-2-yl)piperidin-4-yl, 1-(cyclohexylcarbamoyl)piperidin-4-yl, 1-(cyclohexylcarbamothioyl)piperidin-4-yl, 1-phenylpiperidin-4-yl, 1-cyclohexylazetidin-3-yl, thiophen-2-yl, 2-(thiophen-2-yl)methyl, or 2-(thiophen-3-yl)methyl, each optionally substituted from one up to the maximum number of substituents with one or more of F, Cl, $C_{1-6}$ alkyl, cyclopropyl, vinyl, difluoromethyl, 1,1-difluoroethyl-1-yl, 2-fluoropropan-2-yl, methoxymethyl, $C_{1-6}$ alkoxy, and/or $CF_3$; or R¹ may be benzyl, substituted from one up to the maximum number of substituents with one or more of F, Cl, $C_{1-6}$ alkyl, phenyl, pyrrolidin-1-yl, piperidin-1-yl, $C_{1-6}$ alkoxy, cyclopropylmethoxy, phenoxy, and/or $CF_3$; or R¹ may be phenylethyl, optionally substituted from one up to the maximum number of substituents with one or more of pyrrolidin-1-yl, piperidin-1-yl, 4-morpholino, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, 3,5-dimethyl-1H-pyrazol-4-yl, F, Cl, $C_{1-6}$ alkyl, cyclopropyl, propen-2-yl, $OCH_3$, and/or $CF_3$; or R¹ may be (1-formylpiperidin-4-yl)methyl, substituted on the formyl group with one of: $C_{1-6}$ alkyl, $C_{3-7}$ cycloalkyl, phenyl, thiophen-3-yl, phenylmethyl, or cyclopentylmethyl, each optionally substituted from one up to the maximum number of substituents with one or more of F, $C_{1-6}$ alkyl, $OCH_3$, and/or $CF_3$; or R¹ may be

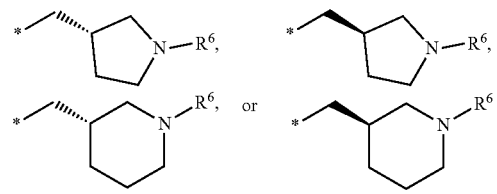

where R⁶ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, and benzo[d]thiazol-2-yl, each optionally substituted from one up to the maximum number of substituents with one or more of F, Cl, $C_{1-6}$ alkyl, $C_{1-6}$ alkoxyl, $OCF_3$, and/or $CF_3$, with the proviso that $R^1$ is not benzyl or 3-phenylpropyl.

In alternative embodiments, the invention provides a compound of Formula (Ia) or a pharmaceutically acceptable salt thereof:

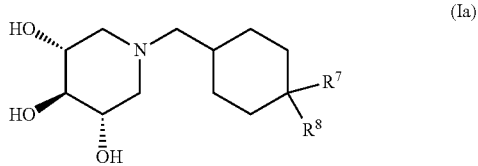

(Ia)

where $R^7$ and $R^8$ may be independently selected from the group consisting of: H, F, Cl, $C_{1-6}$ alkyl, $OCH_3$, phenyl, cyclopropyl, vinyl, methoxymethyl, difluoromethyl, 1,1-difluoroethyl-1-yl, 2-fluoropropan-2-yl, and/or $CF_3$. In some embodiments, $R^7$ may be H, and $R^8$ may be $CF_3$, difluoromethyl, 1,1-difluoroethyl-1-yl, 2-fluoropropan-2-yl, isopropyl, or tert-butyl. In some embodiments, $R^7$ may be $CF_3$, difluoromethyl, 1,1-difluoroethyl-1-yl, 2-fluoropropan-2-yl, isopropyl, or tert-butyl, and $R^8$ may be H.

In alternative embodiments, the invention provides a compound of Formula (Ib) or a pharmaceutically acceptable salt thereof:

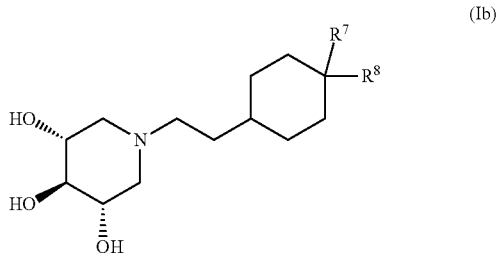

(Ib)

where $R^7$ and $R^8$ may be independently selected from the group consisting of: H, F, Cl, $C_{1-6}$ alkyl, $OCH_3$, phenyl, cyclopropyl, vinyl, methoxymethyl, difluoromethyl, 1,1-difluoroethyl-1-yl, 2-fluoropropan-2-yl, and/or $CF_3$.

In alternative embodiments, the invention provides a compound of Formula (Ic) or a pharmaceutically acceptable salt thereof:

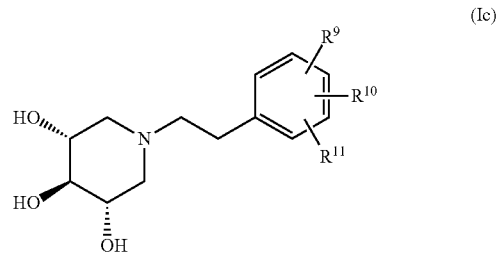

(Ic)

where $R^9$, $R^{10}$ and $R^{11}$ may be independently selected from the group consisting of: pyrrolidin-1-yl, piperidin-1-yl, 4-morpholino, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, 3,5-dimethyl-1H-pyrazol-4-yl, H, F, Cl, $C_{1-6}$ alkyl, cyclopropyl, propen-2-yl, $OCH_3$, and/or $CF_3$. In some embodiments, $R^9$, $R^{10}$ and $R^{11}$ may be independently selected from the group consisting of: H, F, Cl, tetrahydro-2H-pyran-4-yl, 4-morpholino, pyrrolidin-1-yl, and piperidin-1-yl.

In alternative embodiments, the invention provides a compound of Formula (Id) or a pharmaceutically acceptable salt thereof:

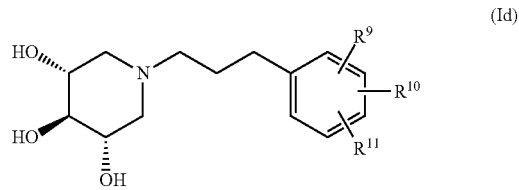

(Id)

where $R^9$, $R^{10}$ and $R^{11}$ may be independently selected from the group consisting of: H, F, Cl, $C_{1-6}$ alkyl, cyclopropyl, vinyl, 2-fluoropropan-2-yl, methoxymethyl, $C_{1-6}$ alkoxy, and/or $CF_3$, with the proviso that at least one of $R^9$, $R^{10}$ and $R^{11}$ is other than H.

In alternative embodiments, the invention provides a compound of Formula (Ie) or a pharmaceutically acceptable salt thereof:

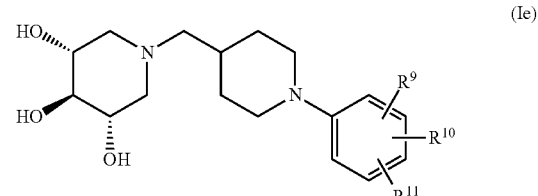

(Ie)

where $R^9$, $R^{10}$ and $R^{11}$ may be independently selected from the group consisting of: H, F, Cl, $C_{1-6}$ alkyl, cyclopropyl, vinyl, 2-fluoropropan-2-yl, methoxymethyl, $C_{1-6}$ alkoxy, and/or $CF_3$. In some embodiments, $R^9$, $R^{10}$ and $R^{11}$ may be independently selected from the group consisting of: H, F, and $CF_3$.

In alternative embodiments, the invention provides a compound of Formula (If) or a pharmaceutically acceptable salt thereof:

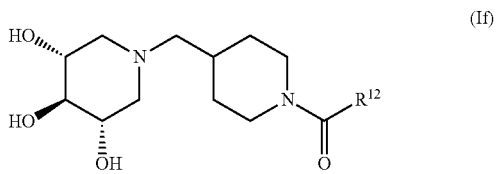

(If)

where $R^{12}$ may be selected from the group consisting of: $C_{1-6}$ alkyl, $C_{3-7}$ cycloalkyl, phenyl, thiophen-3-yl, phenylmethyl, or cyclopentylmethyl, each optionally substituted from one up to the maximum number of substituents with one or more of F, $C_{1-6}$ alkyl, $OCH_3$, and/or $CF_3$.

In alternative embodiments, the invention provides a compound of Formula (Ig) or a pharmaceutically acceptable salt thereof:

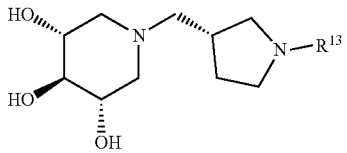

(Ig)

where $R^{13}$ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, or phenylcarbonyl, each optionally substituted from one up to the maximum number of substituents with one or more of F, Cl, $C_{1-6}$ alkyl, $C_{1-6}$ alkoxyl, $OCF_3$, and/or $CF_3$. In some embodiments, $R^{13}$ may be selected from the group consisting of: 2-(trifluoromethyl)phenyl, 2-(trifluoromethyl)pyridin-3-yl, 3-(trifluoromethyl)pyridin-2-yl, 4-(trifluoromethyl)pyridin-2-yl, 5-(trifluoromethyl)pyridin-3-yl, 6-(trifluoromethyl)pyridin-2-yl, 4-(trifluoromethyl)pyrimidin-5-yl, and 4-(trifluoromethyl)thiazol-2-yl.

In alternative embodiments, the invention provides a compound of Formula (Ih) or a pharmaceutically acceptable salt thereof:

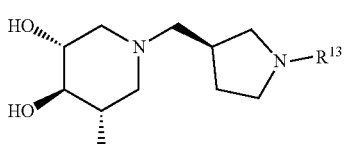

(Ih)

where $R^{13}$ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, or phenylcarbonyl, each optionally substituted from one up to the maximum number of substituents with one or more of F, Cl, $C_{1-6}$ alkyl, $C_{1-6}$ alkoxyl, $OCF_3$, and/or $CF_3$. In some embodiments, $R^{13}$ may be selected from the group consisting of: 2-(trifluoromethyl)phenyl, 2-(trifluoromethyl)pyridin-3-yl, 3-(trifluoromethyl)pyridin-2-yl, 4-(trifluoromethyl)pyridin-2-yl, 5-(trifluoromethyl)pyridin-3-yl, 6-(trifluoromethyl)pyridin-2-yl, 4-(trifluoromethyl)pyrimidin-5-yl, and 4-(trifluoromethyl)thiazol-2-yl.

In alternative embodiments, the invention provides a compound of Formula (Ii) or a pharmaceutically acceptable salt thereof:

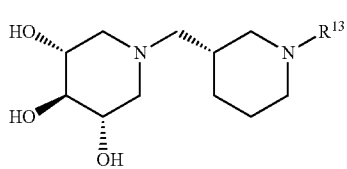

(Ii)

where $R^{13}$ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, or phenylcarbonyl, each optionally substituted from one up to the maximum number of substituents with one or more of F, Cl, $C_{1-6}$ alkyl, $C_{1-6}$ alkoxyl, $OCF_3$, and/or $CF_3$. In some embodiments, $R^{13}$ may be selected from the group consisting of: 2-(trifluoromethyl)phenyl, 2-(trifluoromethyl)pyridin-3-yl, 3-(trifluoromethyl)pyridin-2-yl, 4-(trifluoromethyl)pyridin-2-yl, 5-(trifluoromethyl)pyridin-3-yl, 6-(trifluoromethyl)pyridin-2-yl, 4-(trifluoromethyl)pyrimidin-5-yl, and 4-(trifluoromethyl)thiazol-2-yl.

In alternative embodiments, the invention provides a compound of Formula (Ij) or a pharmaceutically acceptable salt thereof:

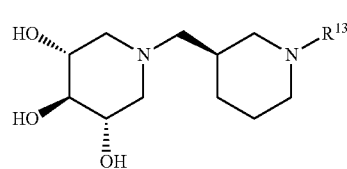

(Ij)

where $R^{13}$ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, or phenylcarbonyl, each optionally substituted from one up to the maximum number of substituents with one or more of F, Cl, $C_{1-6}$ alkyl, $C_{1-6}$ alkoxyl, $OCF_3$, and/or $CF_3$. In some embodiments, $R^{13}$ may be selected from the group consisting of: 2-(trifluoromethyl)phenyl, 2-(trifluoromethyl)pyridin-3-yl, 3-(trifluoromethyl)pyridin-2-yl, 4-(trifluoromethyl)pyridin-2-yl, 5-(trifluoromethyl)pyridin-3-yl, 6-(trifluoromethyl)pyridin-2-yl, 4-(trifluoromethyl)pyrimidin-5-yl, and 4-(trifluoromethyl)thiazol-2-yl.

In alternative embodiments, the invention provides a compound of Formula (Ik) or a pharmaceutically acceptable salt thereof:

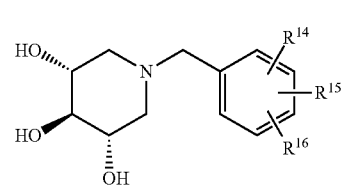

(Ik)

where $R^{14}$, $R^{15}$ and $R^{16}$ may be independently selected from the group consisting of: H, F, Cl, $C_{1-6}$ alkyl, phenyl, pyrrolidin-1-yl, piperidin-1-yl, $C_{1-6}$ alkoxy, cyclopropylmethoxy, phenoxy, and/or $CF_3$, with the proviso that at least one of $R^{14}$, $R^{15}$ and $R^{16}$ is other than H.

In alternative embodiments, the compound may be a prodrug; the compound may inhibit a non-lysosomal glucosylceramidase (GBA2); the compound may inhibit a GBA2 (e.g., a mammalian GBA2); the compound may inhibit a wild-type GBA2; or the compound may inhibit a mutant GBA2.

In alternative embodiments, a compound according to Formula (I), Formula (Ia), Formula (Ib), Formula (Ic), Formula (Id), Formula (Ie), Formula (If), Formula (Ig), Formula (Ih), Formula (Ii), Formula (Ij), or Formula (Ik) may exhibit enhanced selectivity and/or permeability.

In alternative embodiments, a compound according to Formula (Ia), Formula (Ib), Formula (Ic), Formula (Id), Formula (Ie), Formula (If), Formula (Ig), Formula (Ih), Formula (Ii), Formula (Ij), or Formula (Ik) may exhibit enhanced selectivity and/or permeability.

In alternative embodiments, a compound according to Formula (Ia), Formula (Ic), Formula (Ie), Formula (Ig), Formula (Ih), Formula (Ii), Formula (Ij), or Formula (Ik) may exhibit enhanced selectivity and/or permeability.

In alternative embodiments, a compound according to Formula (Ia), Formula (Ic), Formula (Ie), Formula (Ig), Formula (Ih), Formula (Ii), Formula (Ij), or Formula (Ik) may exhibit enhanced selectivity. In alternative embodiments, a compound according to Formula (Ia) may exhibit enhanced selectivity. In alternative embodiments, a compound according to Formula (Ic) may exhibit enhanced selectivity. In alternative embodiments, a compound according to Formula (Ie) may exhibit enhanced selectivity. In alternative embodiments, a compound according to Formula (Ig) or Formula (Ih) may exhibit enhanced selectivity. In alternative embodiments, a compound according to Formula (Ii) or Formula (Ij) may exhibit enhanced selectivity. In alternative embodiments, a compound according to Formula (Ik) may exhibit enhanced selectivity.

In alternative embodiments, a compound according to Formula (Ia), Formula (Ic), Formula (Ie), Formula (Ig), Formula (Ih), Formula (Ii), Formula (Ij), or Formula (Ik) may achieve higher brain concentrations when administered in vivo. In alternative embodiments, a compound according to Formula (Ia) may achieve higher brain concentrations when administered in vivo. In alternative embodiments, a compound according to Formula (Ic) may achieve higher brain concentrations when administered in vivo. In alternative embodiments, a compound according to Formula (Ie) may achieve higher brain concentrations when administered in vivo. In alternative embodiments, a compound according to Formula (Ig) or Formula (Ih) may achieve higher brain concentrations when administered in vivo. In alternative embodiments, a compound according to Formula (Ii) or Formula (Ij) may achieve higher brain concentrations when administered in vivo. In alternative embodiments, a compound according to Formula (Ik) may achieve higher brain concentrations when administered in vivo.

In alternative aspects, the invention provides a pharmaceutical composition including a compound according to the invention, or a pharmaceutically acceptable salt thereof, in combination with a pharmaceutically acceptable carrier.

In alternative aspects, the invention provides methods of inhibiting a GBA2 in a subject in need thereof, or of treating a neurological disease, or a lysosomal storage disease, or a liver disease, in a subject in need thereof, by administering to the subject an effective amount of a compound of Formula (I), including any one or more of Formula (Ia)-(Ik), or a pharmaceutically acceptable salt thereof, as described herein. The neurological disease may be, without limitation, Alzheimer's disease, Parkinson's disease, multiple sclerosis, Huntington's disease, amyotrophic lateral sclerosis (ALS), amyotrophic lateral sclerosis with cognitive impairment (ALSci), addiction, anxiety, argyrophilic grain dementia, ataxia-telangiectasia (A-T), attention deficit/hyperactivity disorder (ADHD), autism spectrum disorder (ASD), Becker muscular dystrophy (BMD), bipolar disorder (BD), Bluit disease, cerebellar ataxia, Charcot-Marie-Tooth disease (CMT), chronic fatigue syndrome, corticobasal degeneration (CBD), dementia pugilistica, dementia with Lewy bodies (DLB), Dejerine-Sottas disease, diffuse neurofibrillary tangles with calcification, Down's syndrome, Duchenne muscular dystrophy (DMD), epilepsy, essential tremor (ET), familial British dementia, familial Danish dementia, fibromyalgia, frontotemporal dementia with parkinsonism linked to chromosome 17 (FTDP-17), Friedreich's ataxia, Gerstmann-Straussler-Scheinker disease, glaucoma, Guadeloupean parkinsonism, Guillain-Barre syndrome, Hallevorden-Spatz disease (neurodegeneration with brain iron accumulation type 1), insomnia, Lambert-Eaton myasthenic syndrome (LEMS), major depressive disorder (MDD), migraine, mild cognitive impairment (MCI), multi-infarct dementia, multiple system atrophy (MSA), myasthenia gravis, myotonic dystrophy (including types DM1 and DM2), neuronal ceroid lipofuscinosis (including types 1, 2, 3, 4, 5, 6, 7, 8, 9, and 10), neuropathy (including peripheral neuropathy, autonomic neuropathy, neuritis, and diabetic neuropathy), oculopharyngeal muscular dystrophy, pain, pallido-ponto-nigral degeneration, parkinsonism-dementia complex of Guam, Pick's disease (PiD), post-encephalitic parkinsonism (PEP), primary lateral sclerosis (PLS), prion diseases (including Creutzfeldt-Jakob Disease (CJD), variant Creutzfeldt-Jakob Disease (vCJD), fatal familial insomnia, and kuru), progressive supercortical gliosis, progressive supranuclear palsy (PSP), Richardson's syndrome, schizophrenia, seizures, spinal cord injury, spinal muscular atrophy (SMA), spinocerebellar ataxia (including types 1, 2, 3, 4, 5, 6, 7, 8, 10, 11, 12, 13, 14, 16, 17, 18, 19, 20, 21, 22, 23, 25, 26, 27, 28, and 29), stroke, subacute sclerosing panencephalitis, tangle-only dementia, tardive dyskinesia, Tourette syndrome (TS), vascular dementia, or Wilson's disease.

The lysosomal storage disease may be, without limitation, Gaucher disease (including types I, II, and III), Niemann-Pick disease (including types A, B, and C), mucolipidosis (including types I, II, III, IV, VI, and VII), cerebrotendineous xanthomatosis, Fabry disease, Farber disease, GM1 gangliosidosis, Krabbe disease, metachromatic leukodystrophy (MLD), multiple sulfatase deficiency, Pompe disease, Sandhoff disease, or Tay-Sach's disease.

The liver disease may be, without limitation, non-alcoholic fatty liver disease (NAFLD), non-alcoholic steatohepatitis (NASH), Alagille syndrome, alcohol-related liver disease, alpha-1 antitrypsin deficiency, autoimmune hepatitis, autoimmune cholangitis, benign liver tumors, biliary atresia, cirrhosis, Crigler-Najjar syndrome, drug-induced liver injury (DILI), galactosemia, Gilbert syndrome, hemochromatosis, hepatic encephalopathy, hepatocellular carcinoma (HCC), intrahepatic cholestasis of pregnancy (ICP), lysosomal acid lipase deficiency (LAL-D), liver cysts, liver cancer, newborn jaundice, primary biliary cholangitis (PBC), primary sclerosing cholangitis (PSC), Reye syndrome, type I glycogen storage disease, or viral hepatitis (including types A, B, C, D, and E).

In alternative embodiments, the invention provides methods of treating a neurological disease in a subject in need thereof by administering to the subject an effective amount of a compound of any one or more of Formula (Ia), Formula (Ic), Formula (Ie), Formula (Ig), Formula (Ih), Formula (Ii), Formula (Ij), or Formula (Ik), or a pharmaceutically acceptable salt thereof, as described herein. In alternative embodiments, the invention provides methods of treating a neurological disease in a subject in need thereof by administering to the subject an effective amount of a compound of Formula (Ia), or a pharmaceutically acceptable salt thereof, as described herein. In alternative embodiments, the invention provides methods of treating a neurological disease in a subject in need thereof by administering to the subject an effective amount of a compound of Formula (Ic), or a pharmaceutically acceptable salt thereof, as described herein. In alternative embodiments, the invention provides methods of treating a neurological disease in a subject in need thereof by administering to the subject an effective amount of a compound of Formula (Ig), or a pharmaceutically acceptable salt thereof, as described herein. In alternative embodiments, the invention provides methods of treating a neurological disease in a subject in need thereof by administering to the subject an effective amount of a compound of Formula (Ih), or a pharmaceutically acceptable salt thereof, as described herein. In alternative embodiments, the invention provides methods of treating a neurological disease in a subject in need thereof by administering to the subject an effective amount of a compound of Formula (Ii), or a pharmaceutically acceptable salt thereof, as described herein. In alternative embodiments, the invention provides methods of treating a neurological disease in a subject in need thereof by administering to the subject an effective amount of a compound of Formula (Ij), or a pharmaceutically acceptable salt thereof, as described herein. In alternative embodiments, the invention provides methods of treating a neurological disease in a subject in need thereof by administering to the subject an effective amount of a compound of Formula (Ik), or a pharmaceutically acceptable salt thereof, as described herein.

In alternative embodiments, the administering may reduce the enzymatic activity level of GBA2 in a subject. In alternative embodiments, the administering may modulate the levels of glucosylceramide and/or glycosphingolipids in a subject. In alternative embodiments, the administering may elevate the levels of glucosylceramide in a subject. In alternative embodiments, the administering may elevate the levels of the ganglioside GM1 in a subject. In alternative embodiments, the administering may modulate the levels of ceramide and/or sphingosine and/or sphingosine-1-phosphate (S1P) in a subject. The subject may be a human.

In alternative aspects, the invention provides use of a compound of an effective amount of a compound of Formula (I), including any one or more of Formula (Ia)-(Ik), or a pharmaceutically acceptable salt thereof, as described herein, in the preparation of a medicament. The medicament may be for inhibiting a GBA2, for treating a condition modulated by a GBA2, or for treating a neurological disease or a lysosomal storage disease or a liver disease.

This summary of the invention does not necessarily describe all features of the invention.

DETAILED DESCRIPTION

The invention provides, in part, compounds for inhibiting a non-lysosomal glucosylceramidase (GBA2) and uses thereof.

By a "non-lysosomal glucosylceramidase" or "GBA2" is meant a non-lysosomal membrane-associated enzyme located at the cytoplasmic side of the ER and Golgi membrane with glucosylceramidase activity (EC 3.2.1.45) that catalyzes the hydrolytic cleavage of the beta-glucosidic linkage of the glycolipid glucosylceramide. Alternative names for a GBA2 include: NLGase, glucosylceramidase beta 2, beta-glucocerebrosidase 2, beta-glucosidase 2, glucosylceramidase 2, bile acid beta-glucosidase, "glucosidase, beta (bile acid) 2", KIAA1605, DKFZp762K054, SPG46, and AD035. In some embodiments, the GBA2 may be a mammalian GBA2, such as a rat, mouse, or human GBA2. The GBA2 may be a wild-type GBA2 or a mutant GBA2. In some embodiments, the GBA2 may be a wild-type mammalian GBA2, such as a rat, mouse, or human wild-type GBA2. In some embodiments, the GBA2 may be a mutant mammalian GBA2, such as a rat, mouse, or human mutant GBA2. In some embodiments, the GBA2 may have a sequence as set forth in any one of the following Accession numbers: Q9HCG7, Q69ZF3, D3DRP2, Q5TCV6, Q96A51, Q96LY1, Q96SJ2, Q9H2L8, Q5M868, or 016581. In alternative embodiments, the GBA2 may have an alternative splice isoform sequence as set forth in any one of the following Accession numbers: Q9HCG7-1, Q9HCG7-2, Q9HCG7-3. In alternative embodiments, the GBA2 may be encoded by a sequence as set forth in any one of the following Accession numbers: NP_065995.1, NP_001317589.1, NP_766280.2, NP_001013109.2, NM_020944, NM_172692, NM_001330660, XM_011517973, XP_005251583.1, XP_006716872.1, XP_011516275.1, XP_016870426.1, XP_016870427.1, XP_016870428.1, XP_016870429.1, XP_016870430.1, XP_016870431.1, XP_016870432.1, XP_016870433.1, XP_016870434.1, or XP_016870435.1. In alternative embodiments, the human GBA2 may have the sequence set forth below:

```
                                                       (SEQ ID NO: 1)
          10         20         30         40         50         60
   MGTQDPGNMG TGVPASEQIS CAKEDPQVYC PEETGGTKDV QVTDCKSPED SRPPKETDCC 70         80         90        100        110        120
   NPEDSGQLMV SYEGKAMGYQ VPPFGWRICL AHEFTEKRKP FQANNVSLSN MIKHIGMGLR 130        140        150        160        170        180
   YLQWWYRKTH VEKKTPFIDM INSVPLRQIY GCPLGGIGGG TITRGWRGQF CRWQLNPGMY 190        200        210        220        230        240
   QHRTVIADQF TVCLRREGQT VYQQVLSLER PSVLRSWNWG LCGYFAFYHA LYPRAWTVYQ 250        260        270        280        290        300
   LPGQNVTLTC RQITPILPHD YQDSSLPVGV FVWDVENEGD EALDVSIMFS MRNGLGGGDD 310        320        330        340        350        360
   APGGLWNEPF CLERSGETVR GLLLHHPTLP NPYTMAVAAR VTAATTVTHI TAFDPDSTGQ 370        380        390        400        410        420
   QVWQDLLQDG QLDSPTGQST PTQKGVGIAG AVCVSSKLRP RGQCRLEFSL AWDMPRIMFG 430        440        450        460        470        480
   AKGQVHYRRY TRFFGQDGDA APALSHYALC RYAEWEERIS AWQSPVLDDR SLPAWYKSAL
```

```
                -continued
        490        500        510        520        530        540
   FNELYFLADG GTVWLEVLED SLPEELGRNM CHLRPTLRDY GRFGYLEGQE YRMYNTYDVH 550        560        570        580        590        600
   FYASFALIML WPKLELSLQY DMALATLRED LTRRRYLMSG VMAPVKRRNV IPHDIGDPDD 610        620        630        640        650        660
   EPWLRVNAYL IHDTADWKDL NLKFVLQVYR DYYLTGDQNF LKDMWPVCLA VMESEMKFDK 670        680        690        700        710        720
   DHDGLIENGG YADQTYDGWV TTGPSAYCGG LWLAAVAVMV QMAALCGAQD IQDKFSSILS 730        740        750        760        770        780
   RGQEAYERLL WNGRYYNYDS SSRPQSRSVM SDQCAGQWFL KACGLGEGDT EVFPTQHVVR 790        800        810        820        830        840
   ALQTIFELNV QAFAGGAMGA VNGMQPHGVP DKSSVQSDEV WVGVVYGLAA TMIQEGLTWE 850        860        870        880        890        900
   GFQTAEGCYR TVWERLGLAF QTPEAYCQQR VFRSLAYMRP LSIWAMQLAL QQQQHKKASW 910        920
   PKVKQGTGLR TGPMFGPKEA MANLSPE
```

In alternative embodiments, the human GBA2 may have the nucleic acid sequence of a nucleic acid molecule encoding the sequence set forth in SEQ ID NO: 1.

In some embodiments, one or more of the compounds according to the invention may inhibit the activity of a GBA2, for example, the ability to inhibit the cleavage of glucose from glucosylceramide or the ability to inhibit the cleavage of glucose from a suitable substrate molecule such as, for example, 4-methylumbelliferone-B-D glucopyranoside. By "inhibit," "inhibition" or "inhibiting" means a decrease in the activity of a GBA2 by any value between about 10% and about 90%, or of any value between about 30% and about 60%, or over about 100%, or a decrease by about 1-fold, 2-fold, 5-fold, 10-fold or more, in comparison to a reference sample or compound, or in comparison to a wild-type GBA2. It is to be understood that the inhibiting does not require full inhibition. In some embodiments, the inhibition may be transient, for example, for a period of 5 min-60 min, 1 h-5 h, 1 h-12 h, 1 h-24 h, 24 h-48 h, 1 day-2 days, 1 day-5 days, 1 day-7 days, 1 day-14 days, 1 day-28 days, or any specific time within any of these ranges, such as 5 min, 10 min, 15 min, 20 min, 25 min, 30 min, 60 min, 1.5 h, 2 h, 2.5 h, 3 h, 4 h, 5 h, 6 h, 7 h, 8 h, 9 h, 10 h, 11 h, 12 h, 13 h, 14 h, 15 h, 16 h, 17 h, 18 h, 19 h, 20 h, 21 h, 22 h, 23 h, 24 h, 1.5 days, 2 days, 2.5 days, 3 days, 3.5 days, 4 days, 4.5 days, 5 days, 6 days, 7 days, 8 days, 9 days, 10 days, 11 days, 12 days, 13 days, or 14 days. In some embodiments, the inhibition may be localized. For example, one or more of the compounds according to the invention may inhibit a GBA2 within a specific cellular compartment, such as the endoplasmic reticulum (ER) or Golgi apparatus (Golgi); or one or more of the compounds according to the invention may inhibit a GBA2 within a specific tissue type, such as brain or liver.

In some embodiments, one or more of the compounds according to the invention may specifically bind a GBA2. In alternative embodiments, one or more of the compounds according to the invention may specifically bind the active site of a GBA2. In some embodiments, one or more of the compounds according to the invention that specifically bind the active site of a GBA2 may also inhibit the activity of a GBA2. In alternative embodiments, one or more of the compounds according to the invention may specifically bind the human non-lysosomal glucosylceramidase (GBA2) over the human lysosomal glucosylceramidase (GCase) and/or the human cytosolic glucosylceramidase (GBA3). In alternative embodiments, one or more of the compounds according to the invention may specifically bind the human non-lysosomal glucosylceramidase (GBA2) over the human glucosylceramide synthase (GCS). In alternative embodiments, one or more of the compounds according to the invention may specifically bind the human non-lysosomal glucosylceramidase (GBA2) over an intestinal alpha-glucosidase, where the intestinal alpha-glucosidase may be a sucrase-isomaltase or a maltase-glucoamylase. By "specifically binds" is meant a compound that binds a GBA2 but does not substantially bind other molecules in a sample, such as a lactase, a sucrase, a maltase, an isomaltase, a sucrase-isomaltase, a glucoamylase, a maltase-glucoamylase, a glucosylceramide synthase, an alpha-glucosidase II, an ER alpha-glucosidase, an intestinal alpha-glucosidase, a glycogen phosphorylase, an acid alpha-glucosidase, a beta-hexosaminidase, an O-GlcNAcase, a GCase, or a GBA3. By "not substantially bind" is meant a binding specificity in the range of about 5-fold to about 100,000-fold, or about 10-fold to about 100,000-fold, or in the range of about 100-fold to about 100,000-fold, or in the range of about 1000-fold to about 100,000-fold, or at least about 5-fold, 10-fold, 20-fold, 50-fold, 100-fold, 200-fold, 500-fold, 1000-fold, 1500-fold, 2000-fold, 2500-fold, 3000-fold, 3500-fold, 4000-fold, 4500-fold, 5000-fold, 6000-fold, 7000-fold, 10,000-fold, 25,000-fold, 50,000-fold, 75,000-fold, or any value within or about the described range, where "binding specificity" means the ratio of the respective binding constants, that is, $Ki_{(other\ molecule)}/Ki_{(GBA2)}$, or the ratio of the respective $IC_{50}$ values, that is $IC_{50(other\ molecule)}/IC_{50(GBA2)}$. Examples of compounds that exhibit enhanced binding specificity include, without limitation, the compounds of Examples 1, 2, 3, 7, 9, 10, 11, 12, 13, 14, 15, 18, 20, 21, 29, 30, 31, 33, 34, 35, 36, or 38. In some embodiments, one or more compounds according to the invention may exhibit enhanced binding specificity or enhanced selectivity compared to a suitable reference compound such as, for example, (2R,3R,4R,5S)-1-butyl-2-(hydroxymethyl)piperidine-3,4,5-triol (NB-DNJ, miglustat) or (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648). In some embodiments, "enhanced binding specificity" or "enhanced selectivity" means an increase in measured binding specificity (as defined above) by any value between about 10% and about 100%, or of any integer value between about 10% and about 100%, for example, about 10%, 20%, 30%, 40%, 50%, 60%, 70%, 80%, 90%, 100%, or over 100%, or an increase by about 1-fold to about 100,000-fold, or about 5-fold to about 100,000-fold, or about 10-fold to about 100,000-fold, or in the range of about 100-fold to about 100,000-fold, or in the range of about 1000-fold to about 100,000-fold, or at least about 1-fold, 2-fold, 3-fold, 4-fold, 5-fold, 10-fold, 20-fold, 30-fold, 40-fold, 50-fold, 100-fold, 150-fold, 200-fold, 250-fold, 300-fold, 350-fold, 400-fold, 450-fold, 500-fold, 1000-fold, 1500-fold, 2000-fold, 2500-fold, 3000-fold, 3500-fold, 4000-fold, 4500-fold, 5000-fold, 6000-fold, 7000-fold, 10,000-fold, 25,000-fold, 50,000-fold, 75,000-fold, 100,000-fold, or any value within or about the described range, or more, as compared to a suitable reference compound.

In alternative embodiments, one or more of the compounds according to the invention may specifically bind the human non-lysosomal glucosylceramidase (GBA2) over a rat intestinal alpha-glucosidase, where the rat intestinal alpha-glucosidase may be a sucrase-isomaltase or a maltase-glucoamylase. In some embodiments, one or more compounds according to the invention may not substantially inhibit a rat intestinal alpha-glucosidase, compared to a suitable reference compound such as, for example, (2R,3R, 4R,5S)-1-butyl-2-(hydroxymethyl)piperidine-3,4,5-triol (NB-DNJ, miglustat) or (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648). In some embodiments, "not substantially inhibit" means a percent inhibition of less than about 30% in the assay described below for inhibition of a rat intestinal glucosidase. In some embodiments, "not substantially inhibit" means a percent inhibition of less than about 20% in the assay described below for inhibition of a rat intestinal glucosidase. In some embodiments, "not substantially inhibit" means a percent inhibition of less than about 10% in the assay described below for inhibition of a rat intestinal glucosidase.

In some embodiments, one or more of the compounds of the present invention may inhibit the cleavage of glucose from glucosylceramide by a GBA2. In some embodiments, one or more of the compounds of the present invention may inhibit aggregation of an alpha-synuclein protein and/or inhibit formation of Lewy bodies. By "inhibit," "inhibition" or "inhibiting" means a decrease by any value between about 10% and about 90%, or of any value between about 30% and about 60%, or over about 100%, or a decrease by about 1-fold, 2-fold, 5-fold, 10-fold or more, in comparison to a reference sample or compound, or in comparison to a wild-type GBA2. It is to be understood that the inhibiting does not require full inhibition. In some embodiments, the inhibition may be transient.

In some embodiments, one or more of the compounds of the present invention may decrease inflammation in the CNS. In some embodiments, one or more of the compounds of the present invention may decrease alpha-synuclein aggregation and/or Lewy body formation. By "decreasing" or "decrease" is meant a decrease by any value between about 5% and about 90%, or of any value between about 30% and about 60%, or over about 100%, or a decrease by about 1-fold, 2-fold, 5-fold, 10-fold, 15-fold, 25-fold, 50-fold, 100-fold or more, in comparison to a reference sample or compound.

In some embodiments, one or more of the compounds of the present invention may elevate glucosylceramide levels. In some embodiments, one or more of the compounds of the present invention may elevate glycosphingolipid levels. In some embodiments, one or more of the compounds of the present invention may elevate GM1 ganglioside levels. By "elevating" or "enhancing" or "increasing" is meant an increase by any value between about 5% and about 90%, or of any value between about 30% and about 60%, or over about 100%, or an increase by about 1-fold, 2-fold, 5-fold, 10-fold, 15-fold, 25-fold, 50-fold, 100-fold, or more, in comparison to a reference sample. In some embodiments, one or more of the compounds according to the invention may elevate glucosylceramide levels and/or glycosphingolipid levels and/or GM1 ganglioside levels, in brain.

In some embodiments, one or more of the compounds of the present invention may elevate GCase activity levels, and/or GCase protein levels, in vivo and may be effective in treating conditions which require or respond to enhancement of GCase activity. In some embodiments, one or more of the compounds of the present invention may elevate GCase activity levels, and/or GCase protein levels, in vivo specifically via interaction with a GBA2, and may be effective in treating conditions which require or respond to enhancement of GCase activity. By "elevating" or "enhancing" or "increasing" is meant an increase by any value between about 5% and about 100%, for example, about 5%, 10%, 20%, 30%, 40%, 50%, 60%, 70%, 80%, 90%, 100%, or over 100%, or an increase by about 1-fold, 2-fold, 5-fold, 10-fold, 15-fold, 25-fold, 50-fold, 100-fold or more, in comparison to a reference sample or compound, or in comparison to a wild type or mutant GCase.

In some embodiments, one or more of the compounds according to the invention may exhibit enhanced permeability. Permeability can be assessed using a variety of standard experimental techniques, including without limitation in situ perfusion, ex vivo tissue diffusion, in vitro cell monolayers (e.g. Caco-2 cells, MDCK cells, LLC-PK1 cells), and artificial cell membranes (e.g. PAMPA assay); suitable techniques for measuring effective permeability ($P_{eff}$) or apparent permeability ($P_{app}$) are reviewed for example by Volpe in The AAPS Journal, 2010, 12 (4), 670-678. In some embodiments, one or more of the compounds according to the invention may show enhanced permeability when tested in one or more of these assays for determining $P_{eff}$ or $P_{app}$. In some embodiments, a compound that exhibits enhanced permeability may exhibit greater oral absorption. In some embodiments, a compound that exhibits enhanced permeability may exhibit greater brain penetrance when administered in vivo. In some embodiments, a compound that exhibits enhanced permeability may achieve higher brain concentrations when administered in vivo. In some embodiments, a compound that exhibits enhanced permeability may exhibit a higher brain/plasma concentration ratio when administered in vivo. In some embodiments, "enhanced permeability" means an increase in measured $P_{eff}$ or $P_{app}$ by any value between about 10% and about 100%, or of any integer value between about 10% and about 100%, for example, about 10%, 20%, 30%, 40%, 50%, 60%, 70%, 80%, 90%, 100%, or over 100%, or an increase by about 1-fold, 2-fold, or 3-fold, or more, as compared to a suitable reference compound such as, for example, (2R,3R,4R,5S)-1-butyl-2-(hydroxymethyl)piperidine-3,4,5-triol (NB-DNJ, miglustat) or (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648). In some embodiments, "enhanced permeability" means a measurable $P_{app}$ value (i.e. a value greater than zero) in a suitable assay to measure $P_{app}$ using in vitro cell monolayers. In some embodiments, "enhanced permeability" means a $P_{app}$ value greater than 2×10-6 cm/s in a suitable assay to measure $P_{app}$ using in vitro cell monolayers. In alternative embodiments, "enhanced permeability" means a $P_{app}$ value in the range 2×10-6 cm/s to 40×10-6 cm/s in a suitable assay to measure $P_{app}$ using in vitro cell monolayers. In some embodiments, "higher brain concentration" means an increase in measured brain concentration when the compound is administered in vivo by any value between about 10% and about 100%, or of any integer value between about 10% and about 100%, for example, about 10%, 20%, 30%, 40%, 50%, 60%, 70%, 80%, 90%, 100%, or over 100%, or an increase by about 1-fold, 2-fold, 3-fold, 4-fold, 5-fold, 10-fold, 20-fold, 30-fold, 40-fold, or 50-fold, or more, as compared to a suitable reference compound such as, for example, (2R,3R,4R,5S)-1-butyl-2-(hydroxymethyl)piperidine-3,4,5-triol (NB-DNJ, miglustat) or (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648).

A "reference compound" or "control" may be a carbohydrate mimetic iminosugar described in the literature that is a GBA2 inhibitor. Examples of reference compounds or controls that are GBA2 inhibitors include, without limitation, (2R,3R,4R,5S)-1-butyl-2-(hydroxymethyl)piperidine-3,4,5-triol (NB-DNJ, miglustat) and (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648).[26]

In some embodiments, the invention provides compounds described generally by Formula (I), including any one or more of Formula (Ia)-(Ik), and the salts, prodrugs, and enantiomeric forms thereof:

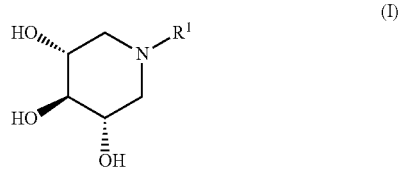
(I)

as set forth in Formula (I): $R^1$ may be $(CH_2)_nR^2$, wherein n may be 1, 2, or 3, and $R^2$ may be cyclohexyl, phenyl, thiophen-2-yl, thiophen-3-yl, pyridine-2-yl, adamantyl, 2,3-dihydro-1H-inden-2-yl, 1,2,3,4-tetrahydronaphthalen-2-yl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, (benzo[d][1,3]dioxol-5-yl)methyl, (2,3-dihydrobenzo[b][1,4]dioxin-6-yl)methyl, 1-cyclohexylazetidin-3-yl,

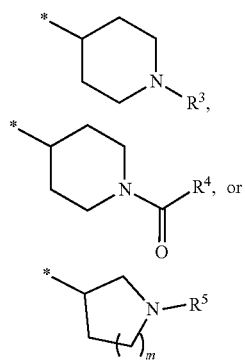

each optionally substituted from one up to the maximum number of substituents with one or more of F, Cl, $C_{1-6}$ alkyl, $C_{2-6}$ alkenyl, cyclopropyl, difluoromethyl, 1,1-difluoroethyl-1-yl, 2-fluoropropan-2-yl, methoxymethyl, $OCF_3$, $CF_3$, phenyl, pyrrolidin-1-yl, piperidin-1-yl, 4-morpholino, $C_{1-6}$ alkoxy, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, and/or 3,5-dimethyl-1H-pyrazol-4-yl;

where $R^3$ may be $C_{1-6}$ alkyl, phenyl, pyridine-2-yl, pyridin-3-yl, benzo[d]thiazol-2-yl, cyclohexylcarbamothioyl, or cyclohexylcarbamoyl, each optionally substituted from one up to the maximum number of substituents with one or more of F, Cl, $C_{1-6}$ alkyl, $C_{2-6}$ alkenyl, cyclopropyl, $C_{1-6}$ alkoxy, $OCF_3$, and/or $CF_3$; and where $R^4$ may be $C_{1-6}$ alkyl, $C_{3-7}$ cycloalkyl, phenyl, thiophen-3-yl, phenylmethyl, or cyclopentylmethyl, each optionally substituted from one up to the maximum number of substituents with one or more of F, $C_{1-6}$ alkyl, $OCH_3$, and/or $CF_3$; and where m may be 1 or 2; and where $R^5$ may be phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, or benzo[d]thiazol-2-yl, each optionally substituted from one up to the maximum number of substituents with one or more of F, Cl, $C_{1-6}$ alkyl, $C_{1-6}$ alkoxyl, $OCF_3$, and/or $CF_3$, with the proviso that $R^1$ is not benzyl or 3-phenylpropyl.

In some embodiments, $R^1$ as set forth in Formula (I) may be $(CH_2)_nR^2$, wherein n may be 1, 2, or 3, and $R^2$ may be cyclohexyl, phenyl, thiophen-2-yl, thiophen-3-yl, pyridine-2-yl, adamantyl, 2,3-dihydro-1H-inden-2-yl, 1,2,3,4-tetrahydronaphthalen-2-yl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, (benzo[d][1,3]dioxol-5-yl)methyl, (2,3-dihydrobenzo[b][1,4]dioxin-6-yl)methyl, 1-cyclohexylazetidin-3-yl,

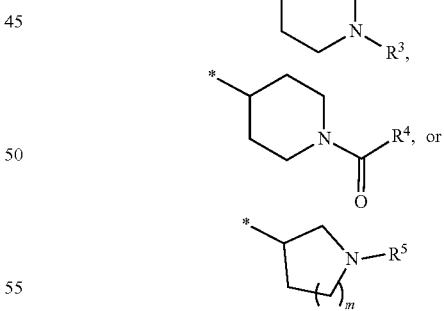

each optionally substituted from one up to the maximum number of substituents with one or more of F, Cl, $C_{1-6}$ alkyl, $C_{2-6}$ alkenyl, cyclopropyl, difluoromethyl, 1,1-difluoroethyl-1-yl, 2-fluoropropan-2-yl, methoxymethyl, $OCF_3$, $CF_3$, phenyl, pyrrolidin-1-yl, piperidin-1-yl, 4-morpholino, $C_{1-6}$ alkoxy, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, and/or 3,5-dimethyl-1H-pyrazol-4-yl; where $R^3$ may be $C_{1-6}$ alkyl, phenyl, pyridine-2-yl, pyridin-3-yl, benzo[d]thiazol-2-yl, cyclohexylcarbamothioyl, or cyclohexylcarbamoyl, each optionally substituted from one up to the maximum number of substituents with one or more of F, Cl, C$_{1-6}$ alkyl, C$_{2-6}$ alkenyl, cyclopropyl, C$_{1-6}$ alkoxy, OCF$_3$, and/or CF$_3$; and where R$^4$ may be C$_{1-6}$ alkyl, C$_{3-7}$ cycloalkyl, phenyl, thiophen-3-yl, phenylmethyl, or cyclopentylmethyl, each optionally substituted from one up to the maximum number of substituents with one or more of F, C$_{1-6}$ alkyl, OCH$_3$, and/or CF$_3$; and where m may be 1 or 2; and where R$^5$ may be phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, or benzo[d]thiazol-2-yl, each optionally substituted from one up to the maximum number of substituents with one or more of F, Cl, C$_{1-6}$ alkyl, C$_{1-6}$ alkoxyl, OCF$_3$, and/or CF$_3$, with the proviso that R$^1$ is not benzyl or 3-phenylpropyl.

In some embodiments, R$^1$ as set forth in Formula (I) may be (CH$_2$)$_n$R$^2$, wherein n may be 1 or 2, and R$^2$ may be cyclohexyl, cyclohexylmethyl, phenylethyl, 4-phenylcyclohexyl, 4-(trifluoromethoxy)cyclohexyl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, 1,2,3,4-tetrahydronaphthalen-2-yl, 2,3-dihydro-1H-inden-2-yl, (adamantyl)methyl, (pyridine-2-yl)methyl, (benzo[d][1,3]dioxol-5-yl)methyl, (2,3-dihydrobenzo[b][1,4]dioxin-6-yl)methyl, ([1,1'-biphenyl]-4-yl)methyl, 1-(2,2,2-trifluoroethyl)piperidin-4-yl, 1-(pyridin-3-yl)piperidin-4-yl, 1-(pyridin-2-yl)piperidin-4-yl, 1-(benzo[d]thiazol-2-yl)piperidin-4-yl, 1-(cyclohexylcarbamoyl)piperidin-4-yl, 1-(cyclohexylcarbamothioyl)piperidin-4-yl, 1-phenylpiperidin-4-yl, 1-cyclohexylazetidin-3-yl, thiophen-2-yl, 2-(thiophen-2-yl)methyl, or 2-(thiophen-3-yl)methyl, each optionally substituted from one up to the maximum number of substituents with one or more of F, Cl, C$_{1-6}$ alkyl, cyclopropyl, vinyl, difluoromethyl, 1,1-difluoroethyl-1-yl, 2-fluoropropan-2-yl, methoxymethyl, C$_{1-6}$ alkoxy, and/or CF$_3$, with the proviso that R$^1$ is not 3-phenylpropyl.

In some embodiments, R$^1$ may be benzyl, substituted from one up to the maximum number of substituents with one or more of F, Cl, C$_{1-6}$ alkyl, phenyl, pyrrolidin-1-yl, piperidin-1-yl, C$_{1-6}$ alkoxy, cyclopropylmethoxy, phenoxy, and/or CF$_3$, with the proviso that R$^1$ is not benzyl.

In some embodiments, R$^1$ may be phenylethyl, optionally substituted from one up to the maximum number of substituents with one or more of pyrrolidin-1-yl, piperidin-1-yl, 4-morpholino, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, 3,5-dimethyl-1H-pyrazol-4-yl, F, Cl, C$_{1-6}$ alkyl, cyclopropyl, propen-2-yl, OCH$_3$, and/or CF$_3$.

In some embodiments, R$^1$ may be (1-formylpiperidin-4-yl)methyl, substituted on the formyl group with one of: C$_{1-6}$ alkyl, C$_{3-7}$ cycloalkyl, phenyl, thiophen-3-yl, phenylmethyl, or cyclopentylmethyl, each optionally substituted from one up to the maximum number of substituents with one or more of F, C$_{1-6}$ alkyl, OCH$_3$, and/or CF$_3$.

In some embodiments, R$^1$ may be

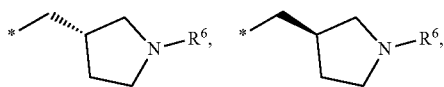

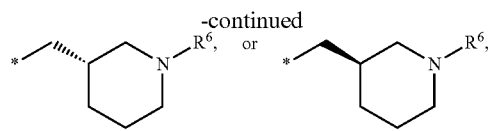

where R$^6$ may be selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, and benzo[d]thiazol-2-yl, each optionally substituted from one up to the maximum number of substituents with one or more of F, Cl, C$_{1-6}$ alkyl, C$_{1-6}$ alkoxyl, OCF$_3$, and/or CF$_3$.

In some embodiments, R$^1$ may be (CH$_2$)$_n$R$^2$, where n may be 1, and R$^2$ may be cyclohexyl or 1-phenylpiperidin-4-yl, each optionally substituted from one up to the maximum number of substituents with one or more of F, Cl, C$_{1-6}$ alkyl, cyclopropyl, vinyl, 2-fluoropropan-2-yl, methoxymethyl, C$_{1-6}$ alkoxy, and/or CF$_3$.

In some embodiments, R$^1$ may be cyclohexylmethyl, (4,4-dimethylcyclohexyl)methyl, (4,4-difluorocyclohexyl)methyl, (4,4-dichlorocyclohexyl)methyl, (4-ethylcyclohexyl)methyl, ((1s,4S)-4-vinylcyclohexyl)methyl, ((1s,4S)-4-isopropylcyclohexyl)methyl, ((1r,4R)-4-isopropylcyclohexyl)methyl, 4-(tert-butyl)cyclohexyl)methyl, ((1s,4S)-4-(tert-butyl)cyclohexyl)methyl, ((1r,4R)-4-(tert-butyl)cyclohexyl)methyl, ((1s,4S)-4-(trifluoromethyl)cyclohexyl)methyl, ((1r,4R)-4-(trifluoromethyl)cyclohexyl)methyl, ((1s,4S)-4-(2-fluoropropan-2-yl)cyclohexyl)methyl, ((1r,4R)-4-(2-fluoropropan-2-yl)cyclohexyl)methyl, ((1s,4S)-4-methoxycyclohexyl)methyl, ((1r,4R)-4-methoxycyclohexyl)methyl, (4-(methoxymethyl)cyclohexyl)methyl, ((1s,4S)-4-cyclopropylcyclohexyl)methyl, ((1r,4R)-4-cyclopropylcyclohexyl)methyl, (4-phenylcyclohexyl)methyl, (spiro[2.5]octan-6-yl)methyl, (spiro[3.5]nonan-7-yl)methyl, (spiro[4.5]decan-8-yl)methyl, 2-cyclohexylethyl, 2-(4,4-difluorocyclohexyl)ethyl, 2-((1s,4S)-4-(trifluoromethyl)cyclohexyl)ethyl, 2-((1r,4R)-4-(trifluoromethyl)cyclohexyl)ethyl, 2-(adamantan-1-yl)ethyl, 3-cyclohexylpropyl, phenethyl, 2-methylphenethyl, 2-methoxyphenethyl, 2-fluorophenethyl, 2-chlorophenethyl, 2,3-difluorophenethyl, 2,4-difluorophenethyl, 2,5-difluorophenethyl, 3,4-difluorophenethyl, 2-fluoro-4-methoxyphenethyl, 3-chloro-2-fluorophenethyl, 4-chloro-2-fluorophenethyl, 5-chloro-2-fluorophenethyl, 2,6-difluorophenethyl, 3-chloro-2,6-difluorophenethyl, 2,6-difluoro-4-(prop-1-en-2-yl) phenethyl, 2,6-difluoro-4-isopropylphenethyl, 2,6-difluoro-3-isopropylphenethyl, 4-cyclopropyl-2,6-difluorophenethyl, 2,6-difluoro-4-(trifluoromethyl) phenethyl, 2,6-difluoro-4-(pyrrolidin-1-yl) phenethyl, 2,6-difluoro-4-(piperidin-1-yl) phenethyl, 2,6-difluoro-4-morpholinophenethyl, 4-butoxy-2,6-difluorophenethyl, 4-(cyclopropylmethoxy)-2,6-difluorophenethyl, 4-((tetrahydrofuran-3-yl)oxy) phenethyl, 4-((tetrahydro-2H-pyran-3-yl)oxy) phenethyl, 4-((tetrahydro-2H-pyran-4-yl)oxy) phenethyl, 4-phenoxyphenethyl, 4-((tetrahydrofuran-3-yl) methoxy) phenethyl, (R)-2-phenylpropyl, (S)-2-phenylpropyl, 2-([1,1'-biphenyl]-4-yl)ethyl, 2-(3,5-difluoro-[1,1'-biphenyl]-4-yl)ethyl, 2-(benzo[d][1,3]dioxol-5-yl)ethyl, 2-(6-fluorobenzo[d][1,3]dioxol-5-yl)ethyl, 2-(2,2-difluorobenzo[d][1,3]dioxol-5-yl)ethyl, 2-(2,3-dihydrobenzo[b][1,4]dioxin-6-yl)ethyl, 2-(thiophen-2-yl)ethyl, 2-(thiophen-3-yl) ethyl, 2-(pyridine-2-yl)ethyl, 3-(2-fluorophenyl) propyl, 3-(4-fluorophenyl) propyl, 3-(thiophen-2-yl) propyl, 3-(thiophen-3-yl) propyl, (1-phenylpiperidin-4-yl)methyl, (1-(2- fluorophenyl)piperidin-4-yl)methyl, (1-(3-fluorophenyl)piperidin-4-yl)methyl, (1-(4-fluorophenyl)piperidin-4-yl)methyl, (1-(4-(trifluoromethyl)phenyl)piperidin-4-yl)methyl, (4-methyl-1-phenylpiperidin-4-yl)methyl, (4-fluoro-1-phenylpiperidin-4-yl)methyl, 2-(1-phenylpiperidin-4-yl)ethyl, (1-(2,2,2-trifluoroethyl)piperidin-4-yl)methyl, (1-isobutyrylpiperidin-4-yl)methyl, (1-pivaloylpiperidin-4-yl)methyl, (1-butyrylpiperidin-4-yl)methyl, (1-(3-methylbutanoyl)piperidin-4-yl)methyl, (1-(3,3-dimethylbutanoyl)piperidin-4-yl)methyl, (1-(2-cyclopentylacetyl)piperidin-4-yl)methyl, (1-(cyclopropanecarbonyl)piperidin-4-yl)methyl, (1-(cyclobutanecarbonyl)piperidin-4-yl)methyl, (1-(cyclopentanecarbonyl)piperidin-4-yl)methyl, (1-(cyclohexanecarbonyl)piperidin-4-yl)methyl, (1-((1s,4s)-4-(tert-butyl)cyclohexanecarbonyl)piperidin-4-yl)methyl, (1-((1r,4r)-4-(tert-butyl)cyclohexanecarbonyl)piperidin-4-yl)methyl, (1-(4-methoxycyclohexanecarbonyl)piperidin-4-yl)methyl, (1-(4-(trifluoromethyl)cyclohexanecarbonyl)piperidin-4-yl)methyl, (1-benzoylpiperidin-4-yl)methyl, (1-(3-(trifluoromethyl)benzoyl)piperidin-4-yl)methyl, (1-(2-phenylacetyl)piperidin-4-yl)methyl, (1-(thiophene-3-carbonyl)piperidin-4-yl)methyl, ((5S,8s)-3,3-dimethyl-2-oxaspiro[4.5]decan-8-yl)methyl, (1,2,3,4-tetrahydronaphthalen-2-yl)methyl, (2,3-dihydro-1H-inden-2-yl)methyl, 2,6-difluoro-4-(tetrahydro-2H-pyran-4-yl)phenethyl, (1-(pyridin-3-yl)piperidin-4-yl)methyl, (1-(cyclohexylcarbamoyl)piperidin-4-yl)methyl, (1-(cyclohexylcarbamothioyl)piperidin-4-yl)methyl, (1-((1S,2R)-2-(trifluoromethyl)cyclohexyl) azetidin-3-yl)methyl, ((R)-1-phenylpyrrolidin-3-yl)methyl, ((R)-1-(o-tolyl)pyrrolidin-3-yl)methyl, ((R)-1-(2-(trifluoromethyl)phenyl)pyrrolidin-3-yl)methyl, ((S)-1-(2-(trifluoromethyl)phenyl)pyrrolidin-3-yl)methyl, (R)-1-(2-fluorophenyl)pyrrolidin-3-yl)methyl, (R)-1-(3-fluorophenyl)pyrrolidin-3-yl)methyl, ((R)-1-(2-(trifluoromethoxy)phenyl)pyrrolidin-3-yl)methyl, ((R)-1-(6-(trifluoromethyl)pyridin-2-yl)pyrrolidin-3-yl)methyl, ((R)-1-(3-(trifluoromethyl)pyridin-2-yl)pyrrolidin-3-yl)methyl, ((R)-1-(4-(trifluoromethyl)pyridin-2-yl)pyrrolidin-3-yl)methyl, ((R)-1-(pyridin-3-yl)pyrrolidin-3-yl)methyl, ((R)-1-(4-methylpyridin-3-yl)pyrrolidin-3-yl)methyl, ((R)-1-(4-(trifluoromethyl)pyridin-3-yl)pyrrolidin-3-yl)methyl, ((R)-1-(5-(trifluoromethyl)pyridin-3-yl)pyrrolidin-3-yl)methyl, ((R)-1-(2-(trifluoromethyl)pyridin-3-yl)pyrrolidin-3-yl)methyl, ((R)-1-(4-(trifluoromethyl)pyrimidin-5-yl)pyrrolidin-3-yl)methyl, ((R)-1-(thiophen-3-yl)pyrrolidin-3-yl)methyl, ((R)-1-(benzo[d]thiazol-4-yl)pyrrolidin-3-yl)methyl, (S)-(1-(4-(trifluoromethyl)benzoyl)pyrrolidin-3-yl)methyl, ((R)-1-(o-tolyl)piperidin-3-yl)methyl, ((R)-1-(2-fluorophenyl)piperidin-3-yl)methyl, ((R)-1-(3-(trifluoromethyl)pyridin-2-yl)piperidin-3-yl)methyl, ((R)-1-(6-(trifluoromethyl)pyridin-2-yl)piperidin-3-yl)methyl, ((R)-1-(4-(trifluoromethyl)pyridin-3-yl)piperidin-3-yl)methyl, 3-fluorophenethyl, 4-fluorophenethyl, 3,4-dichlorophenethyl, 3-(trifluoromethyl) phenethyl, 4-(trifluoromethyl) phenethyl, ((R)-1-(benzo[d]thiazol-2-yl)pyrrolidin-3-yl)methyl, ((R)-1-(2-(trifluoromethyl)pyridin-3-yl)piperidin-3-yl)methyl, 4-(3,5-dimethylisoxazol-4-yl)-2,6-difluorophenethyl, 4-(3,5-dimethyl-1H-pyrazol-4-yl)-2,6-difluorophenethyl, ((R)-1-(4-(trifluoromethyl)thiazol-2-yl)pyrrolidin-3-yl)methyl, ((R)-1-(benzo[d]oxazol-2-yl)pyrrolidin-3-yl)methyl, ((R)-1-(5-isopropylthiazol-2-yl)piperidin-3-yl)methyl, ((R)-1-(4-(trifluoromethyl)thiazol-2-yl)piperidin-3-yl)methyl, ((R)-1-(benzo[d]thiazol-2-yl)piperidin-3-yl)methyl, ((R)-1-(benzo[d]thiazol-4-yl)piperidin-3-yl)methyl, ((S)-1-(3-(trifluoromethyl)pyridin-2-yl)pyrrolidin-3-yl)methyl, ((S)-1-(4-(trifluoromethyl)pyridin-3-yl)pyrrolidin-3-yl)methyl, ((S)-1-(4-(trifluoromethyl)pyrimidin-5-yl)pyrrolidin-3-yl)methyl, ((S)-1-(benzo[d]thiazol-4-yl)pyrrolidin-3-yl)methyl, ((S)-1-(3-(trifluoromethyl)pyridin-2-yl)piperidin-3-yl)methyl, ((S)-1-(4-(trifluoromethyl)pyridin-3-yl)piperidin-3-yl)methyl, ((S)-1-(6-(trifluoromethyl)pyridin-2-yl)piperidin-3-yl)methyl, ((S)-1-(benzo[d]thiazol-4-yl)piperidin-3-yl)methyl, ((R)-1-(5-(trifluoromethyl)pyridin-2-yl)pyrrolidin-3-yl)methyl, ((R)-1-(6-(trifluoromethyl)pyridin-3-yl)pyrrolidin-3-yl)methyl, ((R)-1-(3-(trifluoromethyl)pyridin-4-yl)pyrrolidin-3-yl)methyl, ((R)-1-(2-(trifluoromethyl)pyridin-4-yl)pyrrolidin-3-yl)methyl, ((S)-1-(2-(trifluoromethyl)pyridin-3-yl)pyrrolidin-3-yl)methyl, ((S)-1-(5-(trifluoromethyl)pyridin-3-yl)pyrrolidin-3-yl)methyl, ((S)-1-(4-(trifluoromethyl)pyridin-2-yl)pyrrolidin-3-yl)methyl, ((S)-1-(6-(trifluoromethyl)pyridin-2-yl)pyrrolidin-3-yl)methyl, ((S)-1-(5-(trifluoromethyl)pyridin-2-yl)pyrrolidin-3-yl)methyl, ((S)-1-(6-(trifluoromethyl)pyridin-3-yl)pyrrolidin-3-yl)methyl, ((S)-1-(3-(trifluoromethyl)pyridin-4-yl)pyrrolidin-3-yl)methyl, ((S)-1-(2-(trifluoromethyl)pyridin-4-yl)pyrrolidin-3-yl)methyl, ((R)-1-(5-(trifluoromethyl)pyridin-3-yl)piperidin-3-yl)methyl, ((R)-1-(4-(trifluoromethyl)pyridin-2-yl)piperidin-3-yl)methyl, ((R)-1-(5-(trifluoromethyl)pyridin-2-yl)piperidin-3-yl) methyl, ((R)-1-(6-(trifluoromethyl)pyridin-3-yl)piperidin-3-yl)methyl, ((R)-1-(3-(trifluoromethyl)pyridin-4-yl)piperidin-3-yl)methyl, ((R)-1-(2-(trifluoromethyl)pyridin-4-yl)piperidin-3-yl)methyl, ((S)-1-(2-(trifluoromethyl)pyridin-3-yl)piperidin-3-yl)methyl, ((S)-1-(5-(trifluoromethyl)pyridin-3-yl)piperidin-3-yl)methyl, ((S)-1-(4-(trifluoromethyl)pyridin-2-yl)piperidin-3-yl)methyl, ((S)-1-(5-(trifluoromethyl)pyridin-2-yl)piperidin-3-yl)methyl, ((S)-1-(6-(trifluoromethyl)pyridin-3-yl)piperidin-3-yl) methyl, ((S)-1-(3-(trifluoromethyl)pyridin-4-yl)piperidin-3-yl)methyl, ((S)-1-(2-(trifluoromethyl)pyridin-4-yl)piperidin-3-yl)methyl, 1-(3-chloro-2-fluorophenyl)propan-2-yl, 4-(3-chloro-2-fluorophenyl)butan-2-yl, ((1r,4R)-4-(difluoromethyl)cyclohexyl)methyl, ((1s,4S)-4-(difluoromethyl)cyclohexyl)methyl, ((1s,4S)-4-(1,1-difluoroethyl)cyclohexyl)methyl, ((1r,4R)-4-(1,1-difluoroethyl)cyclohexyl)methyl, ((1r,4R)-4-(trifluoromethoxy)cyclohexyl)methyl, (4,7-difluoro-2,3-dihydro-1H-inden-2-yl)methyl, (4-fluoro-1-(2-(trifluoromethyl)phenyl)piperidin-4-yl)methyl, (4-fluoro-1-(3-(trifluoromethyl)pyridin-2-yl)piperidin-4-yl) methyl, 4-butoxybenzyl, 4-(pentyloxy)benzyl, 4-(cyclopropylmethoxy)benzyl, 4-phenoxybenzyl, or [1,1'-biphenyl]-4-ylmethyl.

In some embodiments, $R^1$ may be (4-ethylcyclohexyl)methyl, ((1s,4S)-4-isopropylcyclohexyl)methyl, ((1r,4R)-4-isopropylcyclohexyl)methyl, ((1s,4S)-4-(tert-butyl)cyclohexyl)methyl, ((1r,4R)-4-(tert-butyl)cyclohexyl)methyl, ((1s,4S)-4-(trifluoromethyl)cyclohexyl)methyl, ((1r,4R)-4-(trifluoromethyl)cyclohexyl)methyl, ((1s,4S)-4-(2-fluoropropan-2-yl)cyclohexyl)methyl, ((1r,4R)-4-(2-fluoropropan-2-yl)cyclohexyl)methyl, ((1s,4S)-4-cyclopropylcyclohexyl)methyl, ((1r,4R)-4-cyclopropylcyclohexyl)methyl, 2-((1s,4S)-4-(trifluoromethyl)cyclohexyl)ethyl, 2-((1r,4R)-4-(trifluoromethyl)cyclohexyl)ethyl, 2,5-difluorophenethyl, 3-chloro-2-fluorophenethyl, 5-chloro-2-fluorophenethyl, 2,6-difluorophenethyl, 3-chloro-2,6-difluorophenethyl, 2,6-difluoro-4-(prop-1-en-2-yl) phenethyl, 2,6-difluoro-4-isopropylphenethyl, 2,6-difluoro-3-isopropylphenethyl, 4-cyclopropyl-2,6-difluorophenethyl, 2,6-difluoro-4-(pyrrolidin-1-yl) phenethyl, 2,6-difluoro-4-(piperidin-1-yl) phenethyl, 2,6-difluoro-4-morpholinophenethyl, 4-butoxy-2,6-difluorophenethyl, 4-(cyclopropylmethoxy)-2,6-difluorophenethyl, 2-([1,1'-biphenyl]-4-yl)ethyl, 2-(3,5-difluoro-[1,1'-biphenyl]-4-yl)ethyl, 2-(benzo[d][1,3]dioxol-5-yl)ethyl, 2-(6-fluorobenzo[d][1,3]dioxol-5-yl)ethyl, 2-(2,2-difluorobenzo[d][1,3]dioxol-5-yl)ethyl, 2-(2,3-dihydrobenzo[b][1,4]dioxin-6-yl)ethyl, (1-(2-fluorophenyl)piperidin-4-yl)methyl, (1-(3-fluorophenyl)piperidin-4-yl)methyl, (1-(4-fluorophenyl)piperidin-4-yl)methyl, (1-(4-(trifluoromethyl)phenyl)piperidin-4-yl)methyl, (2,3-dihydro-1H-inden-2-yl)methyl, (1,2,3,4-tetrahydronaphthalen-2-yl)methyl, ((R)-1-(2-(trifluoromethyl)phenyl)pyrrolidin-3-yl)methyl, ((S)-1-(2-(trifluoromethyl)phenyl)pyrrolidin-3-yl)methyl, ((R)-1-phenylpyrrolidin-3-yl)methyl, ((R)-1-(thiophen-3-yl)pyrrolidin-3-yl)methyl, ((R)-1-(2-(trifluoromethyl)pyridin-3-yl)pyrrolidin-3-yl)methyl, ((R)-1-(4-(trifluoromethyl)pyridin-3-yl)pyrrolidin-3-yl)methyl, ((R)-1-(2-fluorophenyl)piperidin-3-yl)methyl, ((R)-1-(2-fluorophenyl)pyrrolidin-3-yl)methyl, ((R)-1-(3-fluorophenyl)pyrrolidin-3-yl)methyl, ((R)-1-(o-tolyl)pyrrolidin-3-yl)methyl, ((R)-1-(2-(trifluoromethoxy)phenyl)pyrrolidin-3-yl)methyl, ((R)-1-(5-(trifluoromethyl)pyridin-3-yl)pyrrolidin-3-yl)methyl, ((R)-1-(4-(trifluoromethyl)pyridin-2-yl)pyrrolidin-3-yl)methyl, ((R)-1-(4-(trifluoromethyl)pyrimidin-5-yl)pyrrolidin-3-yl)methyl, ((R)-1-(3-(trifluoromethyl)pyridin-2-yl)pyrrolidin-3-yl)methyl, ((R)-1-(6-(trifluoromethyl)pyridin-2-yl)pyrrolidin-3-yl)methyl, ((R)-1-(o-tolyl)piperidin-3-yl)methyl, ((R)-1-(benzo[d]thiazol-4-yl)pyrrolidin-3-yl)methyl, ((R)-1-(4-(trifluoromethyl)pyridin-3-yl)piperidin-3-yl)methyl, ((R)-1-(6-(trifluoromethyl)pyridin-2-yl)piperidin-3-yl)methyl, ((R)-1-(3-(trifluoromethyl)pyridin-2-yl)piperidin-3-yl)methyl, 2,6-difluoro-4-(tetrahydro-2H-pyran-4-yl) phenethyl, ((S)-1-(3-(trifluoromethyl)pyridin-2-yl)pyrrolidin-3-yl)methyl, ((S)-1-(4-(trifluoromethyl)pyridin-3-yl)pyrrolidin-3-yl)methyl, ((S)-1-(4-(trifluoromethyl)pyrimidin-5-yl)pyrrolidin-3-yl)methyl, ((S)-1-(benzo[d]thiazol-4-yl)pyrrolidin-3-yl)methyl, ((S)-1-(3-(trifluoromethyl)pyridin-2-yl)piperidin-3-yl)methyl, ((S)-1-(4-(trifluoromethyl)pyridin-3-yl)piperidin-3-yl)methyl, ((S)-1-(6-(trifluoromethyl)pyridin-2-yl)piperidin-3-yl)methyl, or ((S)-1-(benzo[d]thiazol-4-yl)piperidin-3-yl)methyl, ((1s,4S)-4-(1,1-difluoroethyl)cyclohexyl)methyl, ((1r,4R)-4-(1,1-difluoroethyl)cyclohexyl)methyl, ((1r,4R)-4-(trifluoromethoxy)cyclohexyl)methyl, or (4,7-difluoro-2,3-dihydro-1H-inden-2-yl)methyl, (4-fluoro-1-(2-(trifluoromethyl)phenyl)piperidin-4-yl)methyl, 4-butoxybenzyl, 4-(pentyloxy)benzyl, 4-phenoxybenzyl, or [1,1'-biphenyl]-4-ylmethyl.

In specific embodiments of the invention, compounds according to Formula (I) include the compounds described in Table 1.

TABLE 1

| Example | Name | Structure |
|---|---|---|
| 1 | (3S,4R,5R)-1-(((1r,4R)-4-(trifluoromethyl)cyclohexyl)methyl)piperidine-3,4,5-triol | |
| 2 | (3S,4R,5R)-1-(((1s,4S)-4-(trifluoromethyl)cyclohexyl)methyl)piperidine-3,4,5-triol | |
| 3 | (3S,4R,5R)-1-(((1s,4S)-4-(2-fluoropropan-2-yl)cyclohexyl)methyl)piperidine-3,4,5-triol | |
| 4 | (3S,4r,5R)-1-(2-cyclohexylethyl)piperidine-3,4,5-triol | |
| 5 | (3S,4r,5R)-1-(3-cyclohexylpropyl)piperidine-3,4,5-triol | |

TABLE 1-continued

| Example | Name | Structure |
|---|---|---|
| 6 | (3S,4r,5R)-1-(3-chloro-2-fluorophenethyl)piperidine-3,4,5-triol | |
| 7 | (3S,4r,5R)-1-(3-chloro-2,6-difluorophenethyl)piperidine-3,4,5-triol | |
| 8 | (3S,4r,5R)-1-(3,4-dichlorophenethyl)piperidine-3,4,5-triol | |
| 9 | (3S,4r,5R)-1-(4-(cyclopropylmethoxy)-2,6-difluorophenethyl)piperidine-3,4,5-triol | |
| 10 | (3S,4r,5R)-1-(2,6-difluoro-4-(pyrrolidin-1-yl)phenethyl)piperidine-3,4,5-triol | |
| 11 | (3S,4r,5R)-1-(2,6-difluoro-4-(piperidin-1-yl)phenethyl)piperidine-3,4,5-triol | |

TABLE 1-continued

| Example | Name | Structure |
|---|---|---|
| 12 | (3S,4r,5R)-1-(2,6-difluoro-4-morpholinophenethyl)piperidine-3,4,5-triol | |
| 13 | (3S,4r,5R)-1-(2,6-difluoro-4-(tetrahydro-2H-pyran-4-yl)phenethyl)piperidine-3,4,5-triol | |
| 14 | (3S,4r,5R)-1-(4-(3,5-dimethylisoxazol-4-yl)-2,6-difluorophenethyl)piperidine-3,4,5-triol | |
| 15 | (3S,4r,5R)-1-(4-(3,5-dimethyl-1H-pyrazol-4-yl)-2,6-difluorophenethyl)piperidine-3,4,5-triol | |
| 16 | (3S,4r,5R)-1-(1-(3-chloro-2-fluorophenyl)propan-2-yl)piperidine-3,4,5-triol | |
| 17 | (3S,4r,5R)-1-(4-(3-chloro-2-fluorophenyl)butan-2-yl)piperidine-3,4,5-triol | |

TABLE 1-continued

| Example | Name | Structure |
|---|---|---|
| 18 | (3S,4R,5R)-1-(((R)-1-(o-tolyl)pyrrolidin-3-yl)methyl)piperidine-3,4,5-triol | |
| 19 | (3S,4R,5R)-1-(((R)-1-(3-(trifluoromethyl)pyridin-2-yl)pyrrolidin-3-yl)methyl)piperidine-3,4,5-triol | |
| 20 | (3S,4R,5R)-1-(((R)-1-(4-(trifluoromethyl)pyridin-3-yl)pyrrolidin-3-yl)methyl)piperidine-3,4,5-triol | |
| 21 | (3S,4R,5R)-1-(((R)-1-(4-(trifluoromethyl)thiazol-2-yl)pyrrolidin-3-yl)methyl)piperidine-3,4,5-triol | |
| 22 | (3S,4R,5R)-1-(((R)-1-(benzo[d]oxazol-2-yl)pyrrolidin-3-yl)methyl)piperidine-3,4,5-triol | |
| 23 | (3S,4R,5R)-1-(((R)-1-(benzo[d]thiazol-2-yl)pyrrolidin-3-yl)methyl)piperidine-3,4,5-triol | |
| 24 | (3S,4S,5R)-1-(((S)-1-(3-(trifluoromethyl)pyridin-2-yl)pyrrolidin-3-yl)methyl)piperidine-3,4,5-triol | |
| 25 | (3S,4S,5R)-1-(((S)-1-(4-(trifluoromethyl)pyridin-3-yl)pyrrolidin-3-yl)methyl)piperidine-3,4,5-triol | |

TABLE 1-continued

| Example | Name | Structure |
|---|---|---|
| 26 | (3S,4S,5R)-1-(((S)-1-(4-(trifluoromethyl)pyrimidin-5-yl)pyrrolidin-3-yl)methyl)piperidine-3,4,5-triol | |
| 27 | (3S,4S,5R)-1-(((S)-1-(4-(trifluoromethyl)thiazol-2-yl)pyrrolidin-3-yl)methyl)piperidine-3,4,5-triol | |
| 28 | (3S,4S,5R)-1-(((S)-1-(benzo[d]thiazol-4-yl)pyrrolidin-3-yl)methyl)piperidine-3,4,5-triol | |
| 29 | (3S,4R,5R)-1-(((R)-1-(3-(trifluoromethyl)pyridin-2-yl)piperidin-3-yl)methyl)piperidine-3,4,5-triol | |
| 30 | (3S,4R,5R)-1-(((R)-1-(6-(trifluoromethyl)pyridin-2-yl)piperidin-3-yl)methyl)piperidine-3,4,5-triol | |
| 31 | (3S,4R,5R)-1-(((R)-1-(2-(trifluoromethyl)pyridin-3-yl)piperidin-3-yl)methyl)piperidine-3,4,5-triol | |
| 32 | (3S,4R,5R)-1-(((R)-1-(5-isopropylthiazol-2-yl)piperidin-3-yl)methyl)piperidine-3,4,5-triol | |

TABLE 1-continued

| Example | Name | Structure |
|---|---|---|
| 33 | (3S,4R,5R)-1-(((R)-1-(4-(trifluoromethyl)thiazol-2-yl)piperidin-3-yl)methyl)piperidine-3,4,5-triol | |
| 34 | (3S,4R,5R)-1-(((R)-1-(benzo[d]thiazol-2-yl)piperidin-3-yl)methyl)piperidine-3,4,5-triol | |
| 35 | (3S,4R,5R)-1-(((R)-1-(benzo[d]thiazol-4-yl)piperidin-3-yl)methyl)piperidine-3,4,5-triol | |
| 36 | (3S,4S,5R)-1-(((S)-1-(3-(trifluoromethyl)pyridin-2-yl)piperidin-3-yl)methyl)piperidine-3,4,5-triol | |
| 37 | (3S,4S,5R)-1-(((S)-1-(6-(trifluoromethyl)pyridin-2-yl)piperidin-3-yl)methyl)piperidine-3,4,5-triol | |
| 38 | (3S,4S,5R)-1-(((S)-1-(4-(trifluoromethyl)pyridin-3-yl)piperidin-3-yl)methyl)piperidine-3,4,5-triol | |

TABLE 1-continued

| Example | Name | Structure |
|---|---|---|
| 39 | (3S,4S,5R)-1-(((S)-1-(4-(trifluoromethyl)thiazol-2-yl)piperidin-3-yl)methyl)piperidine-3,4,5-triol | |
| 40 | (3S,4r,5R)-1-(cyclohexylmethyl)piperidine-3,4,5-triol | |
| 41 | (3S,4r,5R)-1-((4,4-dimethylcyclohexyl)methyl)piperidine-3,4,5-triol | |
| 42 | (3S,4r,5R)-1-((4,4-difluorocyclohexyl)methyl)piperidine-3,4,5-triol | |
| 43 | (3S,4r,5R)-1-((4,4-dichlorocyclohexyl)methyl)piperidine-3,4,5-triol | |
| 44 | (3S,4r,5R)-1-((4-ethylcyclohexyl)methyl)piperidine-3,4,5-triol | |
| 45 | (3S,4R,5R)-1-(((1s,4S)-4-vinylcyclohexyl)methyl)piperidine-3,4,5-triol | |
| 46 | (3S,4R,5R)-1-(((1s,4S)-4-isopropylcyclohexyl)methyl)piperidine-3,4,5-triol | |
| 47 | (3S,4R,5R)-1-(((1r,4R)-4-isopropylcyclohexyl)methyl)piperidine-3,4,5-triol | |

TABLE 1-continued

| Example | Name | Structure |
|---|---|---|
| 48 | (3S,4R,5R)-1-(((1s,4S)-4-(tert-butyl)cyclohexyl)methyl)piperidine-3,4,5-triol | |
| 49 | (3S,4R,5R)-1-(((1r,4R)-4-(tert-butyl)cyclohexyl)methyl)piperidine-3,4,5-triol | |
| 50 | (3S,4R,5R)-1-(((1r,4R)-4-(2-fluoropropan-2-yl)cyclohexyl)methyl)piperidine-3,4,5-triol | |
| 51 | (3S,4R,5R)-1-(((1s,4S)-4-methoxycyclohexyl)methyl)piperidine-3,4,5-triol | |
| 52 | (3S,4R,5R)-1-(((1r,4R)-4-methoxycyclohexyl)methyl)piperidine-3,4,5-triol | |
| 53 | (3S,4r,5R)-1-((4-(methoxymethyl)cyclohexyl)methyl)piperidine-3,4,5-triol | |
| 54 | (3S,4R,5R)-1-(((1s,4S)-4-cyclopropylcyclohexyl)methyl)piperidine-3,4,5-triol | |
| 55 | (3S,4R,5R)-1-(((1r,4R)-4-cyclopropylcyclohexyl)methyl)piperidine-3,4,5-triol | |
| 56 | (3S,4r,5R)-1-((4-phenylcyclohexyl)methyl)piperidine-3,4,5-triol | |

TABLE 1-continued

| Example | Name | Structure |
|---|---|---|
| 57 | (3S,4r,5R)-1-(spiro[2.5]octan-6-ylmethyl)piperidine-3,4,5-triol | |
| 58 | (3S,4r,5R)-1-(spiro[3.5]nonan-7-ylmethyl)piperidine-3,4,5-triol | |
| 59 | (3S,4r,5R)-1-(spiro[4.5]decan-8-ylmethyl)piperidine-3,4,5-triol | |
| 60 | (3S,4R,5R)-1-(((5S,8s)-3,3-dimethyl-2-oxaspiro[4.5]decan-8-yl)methyl)piperidine-3,4,5-triol | |
| 61 | (3S,4r,5R)-1-((1,2,3,4-tetrahydronaphthalen-2-yl)methyl)piperidine-3,4,5-triol | |
| 62 | (3S,4r,5R)-1-((2,3-dihydro-1H-inden-2-yl)methyl)piperidine-3,4,5-triol | |
| 63 | (3S,4r,5R)-1-(2-(4,4-difluorocyclohexyl)ethyl)piperidine-3,4,5-triol | |
| 64 | (3S,4R,5R)-1-(2-((1s,4S)-4-(trifluoromethyl)cyclohexyl)ethyl)piperidine-3,4,5-triol | |

TABLE 1-continued

| Example | Name | Structure |
|---|---|---|
| 65 | (3S,4R,5R)-1-(2-((1r,4R)-4-(trifluoromethyl)cyclohexyl)ethyl)piperidine-3,4,5-triol | |
| 66 | (3S,4R,5R)-1-(2-((3R,5R,7R)-adamantan-1-yl)ethyl)piperidine-3,4,5-triol | |
| 67 | (3S,4r,5R)-1-phenethyl)piperidine-3,4,5-triol | |
| 68 | (3S,4r,5R)-1-(2-methylphenethyl)piperidine-3,4,5-triol | |
| 69 | (3S,4r,5R)-1-(2-methoxyphenethyl)piperidine-3,4,5-triol | |
| 70 | (3S,4r,5R)-1-(2-fluorophenethyl)piperidine-3,4,5-triol | |
| 71 | (3S,4r,5R)-1-(2-chlorophenethyl)piperidine-3,4,5-triol | |

TABLE 1-continued

| Example | Name | Structure |
|---|---|---|
| 72 | (3S,4r,5R)-1-(2,3-difluorophenethyl)piperidine-3,4,5-triol | |
| 73 | (3S,4r,5R)-1-(2,4-difluorophenethyl)piperidine-3,4,5-triol | |
| 74 | (3S,4r,5R)-1-(2,5-difluorophenethyl)piperidine-3,4,5-triol | |
| 75 | (3S,4r,5R)-1-(3,4-difluorophenethyl)piperidine-3,4,5-triol | |
| 76 | (3S,4r,5R)-1-(2-fluoro-4-methoxyphenethyl)piperidine-3,4,5-triol | |
| 77 | (3S,4r,5R)-1-(4-chloro-2-fluorophenethyl)piperidine-3,4,5-triol | |

TABLE 1-continued

| Example | Name | Structure |
|---|---|---|
| 78 | (3S,4r,5R)-1-(5-chloro-2-fluorophenethyl)piperidine-3,4,5-triol | |
| 79 | (3S,4r,5R)-1-(2,6-difluorophenethyl)piperidine-3,4,5-triol | |
| 80 | (3S,4r,5R)-1-(2,6-difluoro-4-(prop-1-en-2-yl)phenethyl)piperidine-3,4,5-triol | |
| 81 | (3S,4r,5R)-1-(2,6-difluoro-4-isopropylphenethyl)piperidine-3,4,5-triol | |
| 82 | (3S,4r,5R)-1-(2,6-difluoro-3-isopropylphenethyl)piperidine-3,4,5-triol | |
| 83 | (3S,4r,5R)-1-(4-cyclopropyl-2,6-difluorophenethyl)piperidine-3,4,5-triol | |

TABLE 1-continued

| Example | Name | Structure |
|---|---|---|
| 84 | (3S,4r,5R)-1-(2,6-difluoro-4-(trifluoromethyl)phenethyl)piperidine-3,4,5-triol | |
| 85 | (3S,4r,5R)-1-(4-butoxy-2,6-difluorophenethyl)piperidine-3,4,5-triol | |
| 86 | (3S,4r,5R)-1-(4-((tetrahydrofuran-3-yl)oxy)phenethyl)piperidine-3,4,5-triol | |
| 87 | (3S,4r,5R)-1-(4-((tetrahydro-2H-pyran-3-yl)oxy)phenethyl)piperidine-3,4,5-triol | |
| 88 | (3S,4r,5R)-1-(4-((tetrahydro-2H-pyran-4-yl)oxy)phenethyl)piperidine-3,4,5-triol | |
| 89 | (3S,4r,5R)-1-(4-phenoxyphenethyl)piperidine-3,4,5-triol | |

TABLE 1-continued

| Example | Name | Structure |
|---|---|---|
| 90 | (3S,4r,5R)-1-(4-((tetrahydrofuran-3-yl)methoxy)phenethyl)piperidine-3,4,5-triol | |
| 91 | (3S,4R,5R)-1-((R)-2-phenylpropyl)piperidine-3,4,5-triol | |
| 92 | (3S,4S,5R)-1-((S)-2-phenylpropyl)piperidine-3,4,5-triol | |
| 93 | (3S,4r,5R)-1-(2-([1,1'-biphenyl]-4-yl)ethyl)piperidine-3,4,5-triol | |
| 94 | (3S,4r,5R)-1-(2-(3,5-difluoro-[1,1'-biphenyl]-4-yl)ethyl)piperidine-3,4,5-triol | |
| 95 | (3S,4r,5R)-1-(2-(benzo[d][1,3]dioxol-5-yl)ethyl)piperidine-3,4,-triol | |

TABLE 1-continued

| Example | Name | Structure |
|---|---|---|
| 96 | (3S,4r,5R)-1-(2-(6-fluorobenzo[d][1,3]dioxol-5-yl)ethyl)piperidine-3,4,5-triol | |
| 97 | (3S,4r,5R)-1-(2-(2,2-difluorobenzo[d][1,3]dioxol-5-yl)ethyl)piperidine-3,4,5-triol | |
| 98 | (3S,4r,5R)-1-(2-(2,3-dihydrobenzo[b][1,4]dioxin-6-yl)ethyl)piperidine-3,4,5-triol | |
| 99 | (3S,4r,5R)-1-(2-(thiophen-2-yl)ethyl)piperidine-3,4,5-triol | |
| 100 | (3S,4r,5R)-1-(2-(thiophen-3-yl)ethyl)piperidine-3,4,5-triol | |
| 101 | (3S,4r,5R)-1-(2-(pyridin-2-yl)ethyl)piperidine-3,4,5-triol | |
| 102 | (3S,4r,5R)-1-(3-(2-fluorophenyl)propyl)piperidine-3,4,5-triol | |

TABLE 1-continued

| Example | Name | Structure |
|---|---|---|
| 103 | (3S,4r,5R)-1-(3-(4-fluorophenyl)propyl)piperidine-3,4,5-triol | |
| 104 | (3S,4r,5R)-1-(3-(thiophen-2-yl)propyl)piperidine-3,4,5-triol | |
| 105 | (3S,4r,5R)-1-(3-(thiophen-3-yl)propyl)piperidine-3,4,5-triol | |
| 106 | (3S,4r,5R)-1-((1-phenylpiperidin-4-yl)methyl)piperidine-3,4,5-triol | |
| 107 | (3S,4r,5R)-1-((1-(2-fluorophenyl)piperidin-4-yl)methyl)piperidine-3,4,5-triol | |
| 108 | (3S,4r,5R)-1-((1-(3-fluorophenyl)piperidin-4-yl)methyl)piperidine-3,4,5-triol | |
| 109 | (3S,4r,5R)-1-((1-(4-fluorophenyl)piperidin-4-yl)methyl)piperidine-3,4,5-triol | |
| 110 | (3S,4r,5R)-1-((1-(4-(trifluoromethyl)phenyl)piperidin-4-yl)methyl)piperidine-3,4,5-triol | |

TABLE 1-continued

| Example | Name | Structure |
|---|---|---|
| 111 | (3S,4r,5R)-1-((4-methyl-1-phenylpiperidin-4-yl)methyl)piperidine-3,4,5-triol | |
| 112 | (3S,4r,5R)-1-((4-fluoro-1-phenylpiperidin-4-yl)methyl)piperidine-3,4,5-triol | |
| 113 | (3S,4r,5R)-1-(2-(1-phenylpiperidin-4-yl)ethyl)piperidine-3,4,5-triol | |
| 114 | (3S,4r,5R)-1-((1-(pyridin-3-yl)piperidin-4-yl)methyl)piperidine-3,4,5-triol | |
| 115 | (3S,4r,5R)-1-((1-(2,2,2-trifluoroethyl)piperidin-4-yl)methyl)piperidine-3,4,5-triol | |
| 116 | 2-methyl-1-(4-(((3S,4r,5R)-3,4,5-trihydroxypiperidin-1-yl)methyl)piperidin-1-yl)propan-1-one | |
| 117 | 2,2-dimethyl-1-(4-(((3S,4r,5R)-3,4,5-trihydroxypiperidin-1-yl)methyl)piperidin-1-yl)propan-1-one | |
| 118 | 1-(4-(((3S,4r,5R)-3,4,5-trihydroxypiperidin-1-yl)methyl)piperidin-1-yl)butan-1-one | |

TABLE 1-continued

| Example | Name | Structure |
|---|---|---|
| 119 | 3-methyl-1-(4-(((3S,4r,5R)-3,4,5-trihydroxypiperidin-1-yl)methyl)piperidin-1-yl)butan-1-one | |
| 120 | 3,3-dimethyl-1-(4-(((3S,4r,5R)-3,4,5-trihydroxypiperidin-1-yl)methyl)piperidin-1-yl)butan-1-one | |
| 121 | 2-cyclopentyl-1-(4-(((3S,4r,5R)-3,4,5-trihydroxypiperidin-1-yl)methyl)piperidin-1-yl)ethanone | |
| 122 | cyclopropyl(4-(((3S,4r,5R)-3,4,5-trihydroxypiperidin-1-yl)methyl)piperidin-1-yl)methanone | |
| 123 | cyclobutyl(4-(((3S,4r,5R)-3,4,5-trihydroxypiperidin-1-yl)methyl)piperidin-1-yl)methanone | |
| 124 | cyclopentyl(4-(((3S,4r,5R)-3,4,5-trihydroxypiperidin-1-yl)methyl)piperidin-1-yl)methanone | |
| 125 | cyclohexyl(4-(((3S,4r,5R)-3,4,5-trihydroxypiperidin-1-yl)methyl)piperidin-1-yl)methanone | |
| 126 | ((1s,4S)-4-(tert-butyl)cyclohexyl)(4-(((3S,4R,5R)-3,4,5-trihydroxypiperidin-1-yl)methyl)piperidin-1-yl)methanone | |

TABLE 1-continued

| Example | Name | Structure |
|---|---|---|
| 127 | ((1r,4R)-4-(tert-butyl)cylcohexyl)(4-(((3S,4R,5R)-3,4,5-trihydroxypiperidin-1-yl)methyl)piperidin-1-yl)methanone | |
| 128 | (4-methoxycyclohexyl)(4-(((3S,4r,5R)-3,4,5-trihydroxypiperidin-1-yl)methyl)piperidin-1-yl)methanone | |
| 129 | (4-(trifluoromethyl)cyclohexyl)(4-(((3S,4r,5R)-3,4,5-trihydroxypiperidin-1-yl)methyl)piperidin-1-yl)methanone | |
| 130 | phenyl(4-(((3S,4r,5R)-3,4,5-trihydroxypiperidin-1-yl)methyl)piperidin-1-yl)methanone | |
| 131 | (3-(trifluoromethyl)phenyl)(4-(((3S,4r,5R)-3,4,5-trihydroxypiperidin-1-yl)methyl)piperidin-1-yl)methanone | |
| 132 | 2-phenyl-1-(4-(((3S,4r,5R)-3,4,5-trihydroxypiperidin-1-yl)methyl)piperidin-1-yl)ethanone | |
| 133 | thiophen-3-yl(4-(((3S,4r,5R)-3,4,5-trihydroxypiperidin-1-yl)methyl)piperidin-1-yl)methanone | |
| 134 | N-cyclohexyl-4-(((3S,4r,5R)-3,4,5-trihydroxypiperidin-1-yl)methyl)piperidine-1-carboxamide | |

TABLE 1-continued

| Example | Name | Structure |
|---|---|---|
| 135 | N-cyclohexyl-4-(((3S,4r,5R)-3,4,5-trihydroxypiperidin-1-yl)methyl)piperidine-1-carbothioamide | |
| 136 | (3S,4S,5R)-1-((1-((1S,2R)-2-(trifluoromethyl)cyclohexyl)azetidin-3-yl)methyl)piperidine-3,4,5-triol | |
| 137 | (3S,4R,5R)-1-(((R)-1-phenylpyrrolidin-3-yl)methyl)piperidine-3,4,5-triol | |
| 138 | (3S,4R,5R)-1-(((R)-1-(2-(trifluoromethyl)phenyl)pyrrolidin-3-yl)methyl)piperidine-3,4,5-triol | |
| 139 | (3S,4R,5R)-1-(((R)-1-(2-fluorophenyl)pyrrolidin-3-yl)methyl)piperidine-3,4,5-triol | |
| 140 | (3S,4R,5R)-1-(((R)-1-(3-fluorophenyl)pyrrolidin-3-yl)methyl)piperidine-3,4,5-triol | |
| 141 | (3S,4R,5R)-1-(((R)-1-(2-(trifluoromethoxy)phenyl)pyrrolidin-3-yl)methyl)piperidine-3,4,5-triol | |
| 142 | (3S,4R,5R)-1-(((R)-1-(6-(trifluoromethyl)pyridin-2-yl)pyrrolidin-3-yl)methyl)piperidine-3,4,5-triol | |

TABLE 1-continued

| Example | Name | Structure |
|---|---|---|
| 143 | (3S,4R,5R)-1-(((R)-1-(4-(trifluoromethyl)pyridin-2-yl)pyrrolidin-3-yl)methyl)piperidine-3,4,5-triol | |
| 144 | (3S,4R,5R)-1-(((R)-1-(pyridin-3-yl)pyrrolidin-3-yl)methyl)piperidine-3,4,5-triol | |
| 145 | (3S,4R,5R)-1-(((R)-1-(4-methylpyridin-3-yl)pyrrolidin-3-yl)methyl)piperidine-3,4,5-triol | |
| 146 | (3S,4R,5R)-1-(((R)-1-(5-(trifluoromethyl)pyridin-3-yl)pyrrolidin-3-yl)methyl)piperidine-3,4,5-triol | |
| 147 | (3S,4R,5R)-1-(((R)-1-(2-(trifluoromethyl)pyridin-3-yl)pyrrolidin-3-yl)methyl)piperidine-3,4,5-triol | |
| 148 | (3S,4R,5R)-1-(((R)-1-(5-(trifluoromethyl)pyridin-2-yl)pyrrolidin-3-yl)methyl)piperidine-3,4,5-triol | |
| 149 | (3S,4R,5R)-1-(((R)-1-(6-(trifluoromethyl)pyridin-3-yl)pyrrolidin-3-yl)methyl)piperidine-3,4,5-triol | |
| 150 | (3S,4R,5R)-1-(((R)-1-(3-(trifluoromethyl)pyridin-4-yl)pyrrolidin-3-yl)methyl)piperidine-3,4,5-triol | |

TABLE 1-continued

| Example | Name | Structure |
|---|---|---|
| 151 | (3S,4R,5R)-1-(((R)-1-(2-(trifluoromethyl)pyridin-4-yl)pyrrolidin-3-yl)methyl)piperidine-3,4,5-triol | |
| 152 | (3S,4R,5R)-1-(((R)-1-(4-(trifluoromethyl)pyrimidin-5-yl)pyrrolidin-3-yl)methyl)piperidine-3,4,5-triol | |
| 153 | (3R,4R,5S)-1-(((R)-1-(thiophen-3-yl)pyrrolidin-3-yl)methyl)piperidine-3,4,5-triol | |
| 154 | (3S,4R,5R)-1-(((R)-1-(benzo[d]thiazol-4-yl)pyrrolidin-3-yl)methyl)piperidine-3,4,5-triol | |
| 155 | (4-(trifluoromethyl)phenyl)((R)-3-(((3S,4R,5R)-3,4,5-trihydroxypiperidin-1-yl)methyl)pyrrolidin-1-yl)methanone | |
| 156 | (3S,4S,5R)-1-(((S)-1-(2-(trifluoromethyl)phenyl)pyrrolidin-3-yl)methyl)piperidine-3,4,5-triol | |
| 157 | (3S,4S,5R)-1-(((S)-1-(6-(trifluoromethyl)pyridin-2-yl)pyrrolidin-3-yl)methyl)piperidine-3,4,5-triol | |
| 158 | (3S,4S,5R)-1-(((S)-1-(2-(trifluoromethyl)pyridin-3-yl)pyrrolidin-3-yl)methyl)piperidine-3,4,5-triol | |

TABLE 1-continued

| Example | Name | Structure |
|---|---|---|
| 159 | (3S,4S,5R)-1-(((S)-1-(5-(trifluoromethyl)pyridin-3-yl)pyrrolidin-3-yl)methyl)piperidine-3,4,5-triol | |
| 160 | (3S,4S,5R)-1-(((S)-1-(4-(trifluoromethyl)pyridin-2-yl)pyrrolidin-3-yl)methyl)piperidine-3,4,5-triol | |
| 161 | (3S,4S,5R)-1-(((S)-1-(5-(trifluoromethyl)pyridin-2-yl)pyrrolidin-3-yl)methyl)piperidine-3,4,5-triol | |
| 162 | (3S,4S,5R)-1-(((S)-1-(6-(trifluoromethyl)pyridin-3-yl)pyrrolidin-3-yl)methyl)piperidine-3,4,5-triol | |
| 163 | (3S,4S,5R)-1-(((S)-1-(3-(trifluoromethyl)pyridin-4-yl)pyrrolidin-3-yl)methyl)piperidine-3,4,5-triol | |
| 164 | (3S,4S,5R)-1-(((S)-1-(2-(trifluoromethyl)pyridin-4-yl)pyrrolidin-3-yl)methyl)piperidine-3,4,5-triol | |
| 165 | (3S,4R,5R)-1-(((R)-1-(o-tolyl)piperidin-3-yl)methyl)piperidine-3,4,5-triol | |
| 166 | (3S,4R,5R)-1-(((R)-1-(2-fluorophenyl)piperidin-3-yl)methyl)piperidine-3,4,5-triol | |

TABLE 1-continued

| Example | Name | Structure |
|---|---|---|
| 167 | (3S,4R,5R)-1-(((R)-1-(4-(trifluoromethyl)pyridin-3-yl)piperidin-3-yl)methyl)piperidine-3,4,5-triol | |
| 168 | (3S,4R,5R)-1-(((R)-1-(5-(trifluoromethyl)pyridin-3-yl)piperidin-3-yl)methyl)piperidine-3,4,5-triol | |
| 169 | (3S,4R,5R)-1-(((R)-1-(4-(trifluoromethyl)pyridin-2-yl)piperidin-3-yl)methyl)piperidine-3,4,5-triol | |
| 170 | (3S,4R,5R)-1-(((R)-1-(5-(trifluoromethyl)pyridin-2-yl)piperidin-3-yl)methyl)piperidine-3,4,5-triol | |
| 171 | (3S,4R,5R)-1-(((R)-1-(6-(trifluoromethyl)pyridin-3-yl)piperidin-3-yl)methyl)piperidine-3,4,5-triol | |
| 172 | (3S,4R,5R)-1-(((R)-1-(3-(trifluoromethyl)pyridin-4-yl)piperidin-3-yl)methyl)piperidine-3,4,5-triol | |
| 173 | (3S,4R,5R)-1-(((R)-1-(2-(trifluoromethyl)pyridin-4-yl)piperidin-3-yl)methyl)piperidine-3,4,5-triol | |

TABLE 1-continued

| Example | Name | Structure |
|---|---|---|
| 174 | (3S,4S,5R)-1-(((S)-1-(2-(trifluoromethyl)pyridin-3-yl)piperidin-3-yl)methyl)piperidine-3,4,5-triol | |
| 175 | (3S,4S,5R)-1-(((S)-1-(5-(trifluoromethyl)pyridin-3-yl)piperidin-3-yl)methyl)piperidine-3,4,5-triol | |
| 176 | (3S,4S,5R)-1-(((S)-1-(4-(trifluoromethyl)pyridin-2-yl)piperidin-3-yl)methyl)piperidine-3,4,5-triol | |
| 177 | (3S,4S,5R)-1-(((S)-1-(5-(trifluoromethyl)pyridin-2-yl)piperidin-3-yl)methyl)piperidine-3,4,5-triol | |
| 178 | (3S,4S,5R)-1-(((S)-1-(6-(trifluoromethyl)pyridin-3-yl)piperidin-3-yl)methyl)piperidine-3,4,5-triol | |
| 179 | (3S,4S,5R)-1-(((S)-1-(3-(trifluoromethyl)pyridin-4-yl)piperidin-3-yl)methyl)piperidine-3,4,5-triol | |

TABLE 1-continued

| Example | Name | Structure |
|---|---|---|
| 180 | (3S,4S,5R)-1-(((S)-1-(2-(trifluoromethyl)pyridin-4-yl)piperidin-3-yl)methyl)piperidine-3,4,5-triol | |
| 181 | (3S,4r,5R)-1-(3-fluorophenethyl)piperidine-3,4,5-triol | |
| 182 | (3S,4r,5R)-1-(4-fluorophenethyl)piperidine-3,4,5-triol | |
| 183 | (3S,4r,5R)-1-(3-(trifluoromethyl)phenethyl)piperidine-3,4,5-triol | |
| 184 | (3S,4r,5R)-1-(4-(trifluoromethyl)phenethyl)piperidine-3,4,5-triol | |
| 185 | (3S,4R,5R)-1-(((1r,4R)-4-(difluoromethyl)cyclohexyl)methyl)piperidine-3,4,5-triol | |
| 186 | (3S,4R,5R)-1-(((1s,4S)-4-(difluoromethyl)cyclohexyl)methyl)piperidine-3,4,5-triol | |

TABLE 1-continued

| Example | Name | Structure |
|---|---|---|
| 187 | (3S,4R,5R)-1-(((1s,4S)-4-(1,1-difluoroethyl)cyclohexyl)methyl)piperidine-3,4,5-triol | |
| 188 | (3S,4R,5R)-1-(((1r,4R)-4-(1,1-difluoroethyl)cyclohexyl)methyl)piperidine-3,4,5-triol | |
| 189 | (3S,4R,5R)-1-(((1r,4R)-4-(trifluoromethoxy)cyclohexyl)methyl)piperidine-3,4,5-triol | |
| 190 | (3S,4r,5R)-1-((4,7-difluoro-2,3-dihydro-1H-inden-2-yl)methyl)piperidine-3,4,5-triol | |
| 191 | cyclohexyl(4-fluoro-4-(((3S,4r,5R)-3,4,5-trihydroxypiperidin-1-yl)methyl)piperidin-1-yl)methanone | |
| 192 | (3S,4r,5R)-1-((4-fluoro-1-(4-fluorophenyl)piperidin-4-yl)methyl)piperidine-3,4,5-triol | |
| 193 | (3S,4r,5R)-1-((4-fluoro-1-(2-(trifluoromethyl)phenyl)piperidin-4-yl)methyl)piperidine-3,4,5-triol | |
| 194 | (3S,4r,5R)-1-((4-fluoro-1-(3-(trifluoromethyl)pyridin-2-yl)piperidin-4-yl)methyl)piperidine-3,4,5-triol | |

TABLE 1-continued

| Example | Name | Structure |
|---|---|---|
| 195 | (3S,4r,5R)-1-((4-fluoro-1-(6-(trifluoromethyl)pyridin-2-yl)piperidin-4-yl)methyl)piperidine-3,4,5-triol | |
| 196 | (3S,4r,5R)-1-((1-(benzo[d]thiazol-2-yl)-4-fluoropiperidin-4-yl)methyl)piperidine-3,4,5-triol | |
| 197 | (3S,4r,5R)-1-(4-butoxybenzyl)piperidine-3,4,5-triol | |
| 198 | (3S,4r,5R)-1-(4-(pentyloxy)benzyl)piperidine-3,4,5-triol | |
| 199 | (3S,4r,5R)-1-(4-butoxy-2,6-difluorobenzyl)piperidine-3,4,5-triol | |
| 200 | (3S,4r,5R)-1-(4-(cyclopropylmethoxy)benzyl)piperidine-3,4,5-triol | |
| 201 | (3S,4r,5R)-1-(4-phenoxybenzyl)piperidine-3,4,5-triol | |
| 202 | (3S,4r,5R)-1-([1,1'-biphenyl]-4-ylmethyl)piperidine-3,4,5-triol | |

TABLE 1-continued

| Example | Name | Structure |
|---|---|---|
| 203 | (3S,4r,5R)-1-(4-(pyrrolidin-1-yl)benzyl)piperidine-3,4,5-triol | |
| 204 | (3S,4r,5R)-1-(4-(piperidin-1-yl)benzyl)piperidine-3,4,5-triol | |
| 205 | (3S,4r,5R)-1-(thiophen-2-ylmethyl)piperidine-3,4,5-triol | |

As will be appreciated by a person skilled in the art, Formula (I) above may also be represented alternatively as follows:

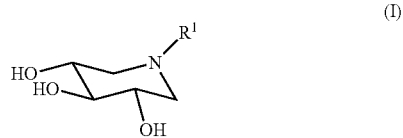

(I)

In alternative embodiments of the invention, Compounds A and B in Table 2 are specifically excluded from the compounds described in Formula (I) or Formula (Id).

TABLE 2

| Compound | Name | Structure |
|---|---|---|
| A | (3S,4r,5R)-1-(3-phenylpropyl)piperidine-3,4,5-triol | |
| B | (3S,4r,5R)-1-benzylpiperidine-3,4,5-triol | |

As used herein the singular forms "a", "and", and "the" include plural referents unless the context clearly dictates otherwise. For example, "a compound" refers to one or more of such compounds, while "the enzyme" includes a particular enzyme as well as other family member equivalents thereof as known to those skilled in the art.

Throughout this application, it is contemplated that the term "compound" or "compounds" refers to the compounds discussed herein and includes precursors and derivatives of the compounds, including acyl-protected derivatives, and pharmaceutically acceptable salts of the compounds, precursors, and derivatives. The invention also includes prodrugs of the compounds, pharmaceutical compositions including the compounds and a pharmaceutically acceptable carrier, and pharmaceutical compositions including prodrugs of the compounds and a pharmaceutically acceptable carrier.

The compounds of the present invention may contain one or more additional asymmetric centers beyond those specified in Formula (I), including any one or more of Formula (Ia)-(Ik), and can thus occur as single enantiomers, diastereomeric mixtures and individual diastereomers. Such additional asymmetric centers may be present depending upon the nature of the various substituents on the molecule. Each such additional asymmetric center will independently produce two optical isomers and it is intended that all such possible optical isomers and diastereomers in mixtures and as pure or partially purified compounds are included within the ambit of this invention. Any formulas, structures or names of compounds described in this specification that do not specify a particular stereochemistry of an additional asymmetric center are meant to encompass any and all existing isomers as described above and mixtures thereof in any proportion. When stereochemistry of an additional asymmetric center is specified, the invention is meant to encompass that particular isomer in pure form or as part of a mixture with other isomers in any proportion.

"Alkyl" refers to a straight or branched hydrocarbon chain group consisting solely of carbon and hydrogen atoms, containing no unsaturation and including, for example, from one to ten carbon atoms, such as 1, 2, 3, 4, 5, 6, 7, 8, 9, or 10 carbon atoms, and which is attached to the rest of the molecule by a single bond. In alternative embodiments, the alkyl group may contain from one to eight carbon atoms, such as 1, 2, 3, 4, 5, 6, 7, or 8 carbon atoms. In alternative embodiments, the alkyl group may contain from one to six carbon atoms, such as 1, 2, 3, 4, 5, or 6 carbon atoms. Unless stated otherwise specifically in the specification, the alkyl group may be optionally substituted by one or more substituents as described herein. Unless stated otherwise specifically herein, it is understood that the substitution can occur on any carbon of the alkyl group.

"Cycloalkyl" refers to a stable monovalent monocyclic, bicyclic or tricyclic hydrocarbon group consisting solely of carbon and hydrogen atoms, having for example from 3 to 15 carbon atoms, and which is saturated and attached to the rest of the molecule by a single bond. In alternative embodiments, the cycloalkyl group may contain from three to six carbon atoms, such as 3, 4, 5, or 6 carbon atoms. Unless otherwise stated specifically herein, the term "cycloalkyl" is meant to include cycloalkyl groups which are optionally substituted as described herein.

"Alkoxy" refers to a group of the formula —$OR_a$, where each $R_a$ is independently a $C_{1-10}$ alkyl or a $C_{1-6}$ alkyl or a $C_{1-5}$ alkyl group as described herein. The alkoxy group(s) may be optionally substituted as described herein.

"Optional" or "optionally" means that the subsequently described event of circumstances may or may not occur, and that the description includes instances where the event or circumstance occurs one or more times and instances in which it does not. For example, "optionally substituted alkyl" means that the alkyl group may or may not be substituted and that the description includes both substituted alkyl groups and alkyl groups having no substitution, and that the alkyl groups may be substituted one or more times. Examples of optionally substituted alkyl groups include, without limitation, methyl, ethyl, propyl, butyl, pentyl, hexyl, isopropyl, isobutyl, sec-butyl, tert-butyl, etc. Examples of suitable optional substituents include, without limitation, H, F, Cl, $CH_3$, OH, $OCH_3$, $CF_3$, $CHF_2$, $CH_2F$, and CN.

Therapeutic Indications

The invention provides, in part, methods of treating conditions that are modulated, directly or indirectly, by a GBA2 enzyme or GBA2 activity levels, for example, a condition that is benefited by inhibiting a GBA2 enzyme or by a reduction of GBA2 enzyme activity levels. Such conditions may include, without limitation, neurological diseases, such as Alzheimer's disease, Parkinson's disease, multiple sclerosis, Huntington's disease, and amyotrophic lateral sclerosis (ALS), and lysosomal storage diseases, such as Gaucher disease, Niemann-Pick type C disease, mucolipidosis type IV, and Sandhoff disease, and liver diseases, such as non-alcoholic steatohepatitis (NASH). Thus, one or more of the compounds of the invention may be used to treat a subject at risk for developing, or already diagnosed with, various neurological or other diseases. The term "treating" as used herein may include treatment, prevention, and/or amelioration.

In alternative embodiments, one or more of the compounds of the invention may also be useful in the treatment of diseases or disorders related to deficiency or over-expression of GBA2 or accumulation or depletion of glucosylceramide, or any disease or disorder responsive to glycosidase inhibitor therapy, or glycosidase inhibition therapy. Such diseases and disorders may include, but are not limited to, neurological diseases, such as Alzheimer's disease, Parkinson's disease, multiple sclerosis, Huntington's disease, and amyotrophic lateral sclerosis (ALS), and lysosomal storage diseases, such as Gaucher disease, Niemann-Pick type C disease, mucolipidosis type IV, and Sandhoff disease, and liver diseases, such as non-alcoholic steatohepatitis (NASH). Such diseases and disorders may also include diseases or disorders related to accumulation or deficiency in the enzyme glucosylceramide synthase, or dysregulation of glycosphingolipid metabolism and/or homeostasis. Also included is a method of protecting or treating target cells expressing GBA2, the dysregulation of which may result in disease or pathology.

In alternative embodiments, the invention provides methods of reducing levels of GBA2 enzyme activity in animal subjects, such as veterinary and human subjects. This reduction of GBA2 activity levels may be useful for the prevention or treatment of neurological or neurodegenerative diseases (e.g. Alzheimer's disease, Parkinson's disease, multiple sclerosis, Huntington's disease, and amyotrophic lateral sclerosis (ALS)); providing neuroprotective effects; preventing damage to dopaminergic neurons; and the prevention or treatment of lysosomal storage diseases (e.g. Gaucher disease, Niemann-Pick type C disease, mucolipidosis type IV, and Sandhoff disease); and the prevention or treatment of liver diseases (e.g. non-alcoholic steatohepatitis (NASH)).

In alternative embodiments, the invention provides methods of inhibiting a GBA2 enzyme in animal subjects, such as veterinary and human subjects.

In alternative embodiments, the invention provides methods of reducing CNS inflammation in animal subjects, such as veterinary and human subjects. Disease states of interest may include neurodegenerative diseases such as Alzheimer's disease, Parkinson's disease, multiple sclerosis, Huntington's disease, and amyotrophic lateral sclerosis (ALS), in which neuroinflammation is implicated in disease pathogenesis. In some embodiments, a compound according to the invention may be used to prevent, treat, or ameliorate neuroinflammation by reducing GBA2 enzyme activity levels, thereby providing therapeutic benefit.

In alternative embodiments, the invention provides methods of inhibiting aggregation of alpha-synuclein protein, or inhibiting formation of Lewy bodies, in animal subjects, such as veterinary and human subjects. Disease states of interest may include Parkinson's disease (PD) and related neurodegenerative synucleinopathies, in which abnormal aggregation of the alpha-synuclein protein is implicated in disease pathogenesis. In some embodiments, a compound according to the invention may be used to block aggregation of alpha-synuclein protein by reducing GBA2 enzyme activity levels, thereby providing therapeutic benefit.

Neurological diseases that may be treated with a compound of the invention include, without limitation: Alzheimer's disease, Parkinson's disease, multiple sclerosis, Huntington's disease, amyotrophic lateral sclerosis (ALS), amyotrophic lateral sclerosis with cognitive impairment (ALSci), addiction, anxiety, argyrophilic grain dementia, ataxia-telangiectasia (A-T), attention deficit/hyperactivity disorder (ADHD), autism spectrum disorder (ASD), Becker muscular dystrophy (BMD), bipolar disorder (BD), Bluit disease, cerebellar ataxia, Charcot-Marie-Tooth disease (CMT), chronic fatigue syndrome, corticobasal degeneration (CBD), dementia pugilistica, dementia with Lewy bodies (DLB), Dejerine-Sottas disease, diffuse neurofibrillary tangles with calcification, Down's syndrome, Duchenne muscular dystrophy (DMD), epilepsy, essential tremor (ET), familial British dementia, familial Danish dementia, fibromyalgia, frontotemporal dementia with parkinsonism linked to chromosome 17 (FTDP-17), Friedreich's ataxia, Gerstmann-Straussler-Scheinker disease, glaucoma, Guadeloupean parkinsonism, Guillain-Barre syndrome, Hallevorden-Spatz disease (neurodegeneration with brain iron accumulation type 1), insomnia, Lambert-Eaton myasthenic syndrome (LEMS), major depressive disorder (MDD), migraine, mild cognitive impairment (MCI), multi-infarct dementia, multiple system atrophy (MSA), myasthenia gravis, myotonic dystrophy (including types DM1 and DM2), neuronal ceroid lipofuscinosis (including types 1, 2, 3, 4, 5, 6, 7, 8, 9, and 10), neuropathy (including peripheral neuropathy, autonomic neuropathy, neuritis, and diabetic neuropathy), oculopharyngeal muscular dystrophy, pain, pallido-ponto-nigral degeneration, parkinsonism-dementia complex of Guam, Pick's disease (PiD), post-encephalitic parkinsonism (PEP), primary lateral sclerosis (PLS), prion diseases (including Creutzfeldt-Jakob Disease (CJD), variant Creutzfeldt-Jakob Disease (vCJD), fatal familial insomnia, and kuru), progressive supercortical gliosis, progressive supranuclear palsy (PSP), Richardson's syndrome, schizophrenia, seizures, spinal cord injury, spinal muscular atrophy (SMA), spinocerebellar ataxia (including types 1, 2, 3, 4, 5, 6, 7, 8, 10, 11, 12, 13, 14, 16, 17, 18, 19, 20, 21, 22, 23, 25, 26, 27, 28, and 29), stroke, subacute sclerosing panencephalitis, tangle-only dementia, tardive dyskinesia, Tourette syndrome (TS), vascular dementia, and Wilson's disease.

Lysosomal storage diseases that may be treated with a compound of the invention may include, without limitation: Gaucher disease (including types I, II, and III), Niemann-Pick disease (including types A, B, and C), mucolipidosis (including types I, II, III, IV, VI, and VII), cerebrotendineous xanthomatosis, Fabry disease, Farber disease, GM1 gangliosidosis, Krabbe disease, metachromatic leukodystrophy (MLD), multiple sulfatase deficiency, Pompe disease, Sandhoff disease, and Tay-Sach's disease.

Liver diseases that may be treated with a compound of the invention may include, without limitation: non-alcoholic fatty liver disease (NAFLD), non-alcoholic steatohepatitis (NASH), Alagille syndrome, alcohol-related liver disease, alpha-1 antitrypsin deficiency, autoimmune hepatitis, autoimmune cholangitis, benign liver tumors, biliary atresia, cirrhosis, Crigler-Najjar syndrome, drug-induced liver injury (DILI), galactosemia, Gilbert syndrome, hemochromatosis, hepatic encephalopathy, hepatocellular carcinoma (HCC), intrahepatic cholestasis of pregnancy (ICP), lysosomal acid lipase deficiency (LAL-D), liver cysts, liver cancer, newborn jaundice, primary biliary cholangitis (PBC), primary sclerosing cholangitis (PSC), Reye syndrome, type I glycogen storage disease, or viral hepatitis (including types A, B, C, D, and E).

In some embodiments, a compound according to the invention may be useful in the treatment of a disorder in which the regulation of GBA2 enzyme activity levels is implicated, or any condition as described herein.

Other conditions that may be treated using one or more of the compounds according the invention are those triggered, affected, or in any other way correlated with levels of GBA2 enzyme activity. It is expected that one or more of the compounds of this invention may be useful for the treatment of such conditions and in particular, but not limited to, Parkinson's disease, neuronal ceroid lipofuscinosis (Batten disease), Gaucher disease, Niemann-Pick type C disease, mucolipidosis type IV, and Sandhoff disease.

Pharmaceutical & Veterinary Compositions, Dosages, and Administration

Pharmaceutical compositions including compounds according to the invention, or for use according to the invention, are contemplated as being within the scope of the invention. In some embodiments, pharmaceutical compositions including an effective amount of a compound of Formula (I), including any one or more of Formula (Ia)-(Ik), are provided.

The compounds of Formula (I), including any one or more of Formula (Ia)-(Ik), and their pharmaceutically acceptable salts, enantiomers, solvates, or derivatives may be useful because they may have pharmacological activity in animals, including humans. In some embodiments, one or more of the compounds according to the invention may be stable in plasma, when administered to a subject, such as a human.

In general, a compound according to the invention may be administered to a subject in need thereof, or by contacting a cell or a sample, for example, with a pharmaceutical composition comprising a therapeutically effective amount of the compound according to Formula (I), including any one or more of Formula (Ia)-(Ik).

In some embodiments, a compound according to the invention, or for use according to the invention, may be provided in combination with any other active agents or pharmaceutical compositions where such combined therapy may be useful to inhibit GBA2 activity levels, for example, to treat neurological diseases, or lysosomal storage diseases, or liver diseases, or any condition described herein. In some embodiments, a compound according to the invention, or for use according to the invention, may be provided in combination with one or more agents useful in the prevention or treatment of Parkinson's disease. Examples of such agents may include, without limitation:

Levodopa (L-DOPA);
A peripheral DOPA decarboxylase inhibitor (DDCI), such as Carbidopa (Lodosyn®);
Combined carbidopa/levodopa (Kinson®, Sinemet®, Parcopa®, Atamet®);
Combined carbidopa/levodopa/entacapone (Stalevo®);
Amantadine (Symmetrel®);
Dopamine antagonists, such as bromocriptine (Cycloset®, Parlodel®), pergolide (Permax®), pramipexole (Mirapexin®, Sifrol®, Mirapex®), ropinirole (Ronirol®, Adartrel®, Requip®), piribedil (Trivastal Retard®, Trastal®, Trivastan®, Clarium®, Pronoran®), cabergoline (Cabaser®, Dostinex®), apomorphine (Ixense®, Spontane®, Uprima®, Apokyn®), Lisuride® (Dopergin®, Proclacam®, Revanil®), rotigotine (Neupro®), Ciladopa® (AY-27,110), Dihydrexidine® (DAR-0100), Dinapsoline®, Doxanthrine®, epicriptine (beta-dihydroergocryptine), N-n-propylnorapomorphine (NPA), quinagolide (Norprolac®), Roxindole® (EMD-49,980), Sumanirole® (PNU-95,666), pardoprunox, aplindore, etc.;

Monoamine oxidase-B (MAO-B) inhibitors, such as selegiline (Anipryl®, L-deprenyl®, Eldepryl®, Emsam®, Zelapar®) rasagiline (Azilect®, AGN 1135), safinamide, etc.;

Anticholinergics, such as benzatropine (benztropine, Cogentin®), diphenhydramine (Benadryl®, Dimedrol®, Daedalon®, Nytol®), orphenadrine (Norflex®, Mephenamin®, Disipal®, Banflex®, Flexon®, Biorphen®, Brocasipal®, Dolan®, Norgesic®, Orfen-Ace®), trihexyphenidyl (Artane®, Apo-Trihex®, Parkin®, Pacitane®, benzhexol, trihex), etc.;

Catechol-O-methyl transferase (COMT) inhibitors, such as entacapone (COMTan®), tolcapone (Tasmar®), nitecapone, nebicapone, etc.;

Adenosine A2A receptor antagonists, such as istradefylline (KW-6002), preladenant, fipamezole (JP-1730), SCH-420814, BIIA-014, Lu AA4707, etc.;

Metabotropic glutamate receptor 5 (mgluR5) modulators, such as dipraglurant, etc.;

AMPA receptor antagonists, such as perampanel (Fycompa®), etc.;

Anticonvulsants, such as zonisamide (Tremode®), etc.;

Nicotinic acetylcholine receptor (nAChR) agonists, such as nicotine, ABT-418, WAY-317,538 (SEN-12333), EVP-6124, MEM 3454, Nefiracetam, etc.

Acetylcholine esterase inhibitors (AChEIs) such as Aricept® (Donepezil), Exelon® (Rivastigmine), Razadyne® (Razadyne ER®, Reminyl®, Nivalin®, galantamine), Cognex® (Tacrine), Huperzine A, Phenserine, Debio-9902 SR (ZT-1 SR), Zanapezil (TAK0147), ganstigmine, NP7557, etc.;

Atypical antipsychotics, such as clozapine, etc.; or

Modafinil (Alertec®, Modavigil®, Provigil®).

It is to be understood that combination of compounds according to the invention, or for use according to the invention, with agents useful for the treatment of Parkinson's disease is not limited to the examples described herein, but may include combination with any agent useful for the treatment of Parkinson's disease. Combination of compounds according to the invention, or for use according to the invention, and other agents useful for the treatment of Parkinson's disease may be administered separately or in conjunction. The administration of one agent may be prior to, concurrent to, or subsequent to the administration of other agent(s).

In some embodiments, a compound according to the invention, or for use according to the invention, may be provided in combination with one or more agents useful in the prevention or treatment of Gaucher disease. Examples of such agents may include, without limitation:

Recombinant human GCase enzyme replacement therapy, such as imiglucerase (Cerezyme®), velaglucerase alfa (VPRIV®), taliglucerase alfa (Elelyso®), etc.;

Glucosylceramide synthase inhibitors, such as EXEL-0346, Genz-123346, Eliglustat® (Genz-112638), etc.;

Bisphosphonates, such as zoledronate (Zometa®, Zomera®, Aclasta®, Reclast®), alendronate sodium (Fosamax®), etidronate (Didronel®), clodronate (Bonefos®, Loron®), tiludronate (Skelid®), pamidronate (APD®, Aredia®), neridronate (Nerixia®), olpadronate, ibandronate (Boniva®), risedronate (Actonel®), etc.;

Antiepileptics, such as Tegretol® (Carbatrol®, carbamazepine), Zarontin® (ethosuximide), Felbatol® (felbamate), Gabitril® (tiagabine), Keppra® (levetiracetam), Lamictal® (lamotrigine), Lyrica® (pregabalin), Neurontin® (gabapentin), Dilantin® (phenytoin), Topamax® (topiramate), Trileptal® (oxcarbazepine), Depakene® (Depakote®, valproate, valproic acid), Zonegran® (zonisamide), Valium® (diazepam), Ativan® (lorazepam) Klonopin® (clonazepam), Fycompa® (perampanel), Oxtellar XR® (oxcarbazepine), etc.; or Gene therapy.

It is to be understood that combination of compounds according to the invention, or for use according to the invention, with agents useful for the treatment of Gaucher disease is not limited to the examples described herein, but may include combination with any agent useful for the treatment of Gaucher disease. Combination of compounds according to the invention, or for use according to the invention, and other agents useful for the treatment of Gaucher disease may be administered separately or in conjunction. The administration of one agent may be prior to, concurrent to, or subsequent to the administration of other agent(s).

In alternative embodiments, a compound according to the invention may be supplied as a "prodrug" or as protected forms, which release the compound after administration to a subject. For example, a compound may carry a protective group which is split off by hydrolysis in body fluids, e.g., in the bloodstream, thus releasing the active compound or is oxidized or reduced in body fluids to release the compound. Accordingly, a "prodrug" is meant to indicate a compound that may be converted under physiological conditions or by solvolysis to a biologically active compound of the invention. Thus, the term "prodrug" refers to a metabolic precursor of a compound of the invention that is pharmaceutically acceptable. A prodrug may be inactive when administered to a subject in need thereof, but may be converted in vivo to an active compound of the invention. Prodrugs are typically rapidly transformed in vivo to yield the parent compound of the invention, for example, by hydrolysis in blood. The prodrug compound often offers advantages of solubility, tissue compatibility or delayed release in a subject.

The term "prodrug" is also meant to include any covalently bonded carriers which release the active compound of the invention in vivo when such prodrug is administered to a subject. Prodrugs of a compound of the invention may be prepared by modifying functional groups present in the compound of the invention in such a way that the modifications are cleaved, either in routine manipulation or in vivo, to the parent compound of the invention. Prodrugs include compounds of the invention where a hydroxy, amino or mercapto group is bonded to any group that, when the prodrug of the compound of the invention is administered to a mammalian subject, cleaves to form a free hydroxy, free amino or free mercapto group, respectively. Examples of prodrugs include, but are not limited to, acetate, formate and benzoate derivatives of alcohol and acetamide, formamide, and benzamide derivatives of amine functional groups in one or more of the compounds of the invention and the like.

A discussion of prodrugs may be found in "Smith and Williams' Introduction to the Principles of Drug Design," H. J. Smith, Wright, Second Edition, London (1988); Bundgard, H., *Design of Prodrugs* (1985), pp. 7-9, 21-24 (Elsevier, Amsterdam); The Practice of Medicinal Chemistry, Camille G. Wermuth et al., Ch 31, (Academic Press, 1996); A Textbook of Drug Design and Development, P. Krogsgaard-Larson and H. Bundgaard, eds. Ch 5, pgs 113 191 (Harwood Academic Publishers, 1991); Higuchi, T., et al., "Pro-drugs as Novel Delivery Systems," A.C.S. Symposium Series, Vol. 14; or in Bioreversible Carriers in Drug Design, ed. Edward B. Roche, American Pharmaceutical Association and Pergamon Press, 1987.

Suitable prodrug forms of one or more of the compounds of the invention may include embodiments in which one or more OH groups as set forth in Formula (I), including any one or more of Formula (Ia)-(Ik), may be protected as OC(O)R, where R may be optionally substituted $C_{1-6}$ alkyl. In these cases, the ester groups may be hydrolyzed in vivo (e.g. in bodily fluids), liberating the OH groups and releasing the active compounds. Preferred prodrug embodiments of the invention may include compounds of Formula (I), including any one or more of Formula (Ia)-(Ik), where one or more OH groups may be protected with acetate, for example as $OC(O)CH_3$.

Compounds according to the invention, or for use according to the invention, may be provided alone or in combination with other compounds in the presence of a liposome, a nanoparticle, an adjuvant, or any pharmaceutically acceptable carrier, diluent or excipient, in a form suitable for administration to a subject such as a mammal, for example, humans, cattle, sheep, etc. If desired, treatment with a compound according to the invention may be combined with more traditional and existing therapies for the therapeutic indications described herein. Compounds according to the invention may be provided chronically or intermittently. "Chronic" administration refers to administration of the compound(s) in a continuous mode as opposed to an acute mode, so as to maintain the initial therapeutic effect (activity) for an extended period of time. "Intermittent" administration is treatment that is not consecutively done without interruption, but rather is cyclic in nature. The terms "administration," "administrable," or "administering" as used herein should be understood to mean providing a compound of the invention to the subject in need of treatment.

"Pharmaceutically acceptable carrier, diluent or excipient" may include, without limitation, any adjuvant, carrier, excipient, glidant, sweetening agent, diluent, preservative, dye/colorant, flavor enhancer, surfactant, wetting agent, dispersing agent, suspending agent, stabilizer, isotonic agent, solvent, or emulsifier that has been approved, for example, by the United States Food and Drug Administration or other governmental agency as being acceptable for use in humans or domestic animals.

A compound of the present invention may be administered in the form of a pharmaceutically acceptable salt. In such cases, pharmaceutical compositions in accordance with this invention may comprise a salt of such a compound, preferably a physiologically acceptable salt, which are known in the art. In some embodiments, the term "pharmaceutically acceptable salt" as used herein means an active ingredient comprising compounds of Formula I, including any one or more of Formula (Ia)-(Ik), used in the form of a salt thereof, particularly where the salt form confers on the active ingredient improved pharmacokinetic properties as compared to the free form of the active ingredient or other previously disclosed salt form.

A "pharmaceutically acceptable salt" may include both acid and base addition salts. A "pharmaceutically acceptable acid addition salt" refers to those salts which retain the biological effectiveness and properties of the free bases, which are not biologically or otherwise undesirable, and which may be formed with inorganic acids such as hydrochloric acid, hydrobromic acid, sulfuric acid, nitric acid, phosphoric acid and the like, and organic acids such as acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like.

A "pharmaceutically acceptable base addition salt" refers to those salts which may retain the biological effectiveness and properties of the free acids, which may not be biologically or otherwise undesirable. These salts may be prepared from addition of an inorganic base or an organic base to the free acid. Salts derived from inorganic bases may include, but are not limited to, the sodium, potassium, lithium, ammonium, calcium, magnesium, iron, zinc, copper, manganese, aluminum salts and the like. Preferred inorganic salts may be the ammonium, sodium, potassium, calcium, and magnesium salts. Salts derived from organic bases may include, but are not limited to, salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-dimethylaminoethanol, 2-diethylaminoethanol, dicyclohexylamine, lysine, arginine, histidine, caffeine, procaine, hydrabamine, choline, betaine, ethylenediamine, glucosamine, methylglucamine, theobromine, purines, piperazine, piperidine, N-ethylpiperidine, polyamine resins and the like. Particularly preferred organic bases may be isopropylamine, diethylamine, ethanolamine, trimethylamine, dicyclohexylamine, choline and caffeine.

Thus, the term "pharmaceutically acceptable salt" encompasses all acceptable salts including but not limited to acetate, lactobionate, benzenesulfonate, laurate, benzoate, malate, bicarbonate, maleate, bisulfate, mandelate, bitartarate, mesylate, borate, methylbromide, bromide, methylnitrite, calcium edetate, methylsulfate, camsylate, mucate, carbonate, napsylate, chloride, nitrate, clavulanate, N-methylglucamine, citrate, ammonium salt, dihydrochloride, oleate, edetate, oxalate, edisylate, pamoate (embonate), estolate, palmitate, esylate, pantothenate, fumarate, phosphate/diphosphate, gluceptate, polygalacturonate, gluconate, salicylate, glutame, stearate, glycollylarsanilate, sulfate, hexylresorcinate, subacetate, hydradamine, succinate, hydrobromide, tannate, hydrochloride, tartrate, hydroxynaphthoate, teoclate, iodide, tosylate, isothionate, triethiodide, lactate, panoate, valerate, and the like.

Pharmaceutically acceptable salts of a compound of the present invention may be used as a dosage for modifying solubility or hydrolysis characteristics, or may be used in sustained release or prodrug formulations. Also, pharmaceutically acceptable salts of a compound of this invention may include those formed from cations such as sodium, potassium, aluminum, calcium, lithium, magnesium, zinc, and from bases such as ammonia, ethylenediamine, N-methylglutamine, lysine, arginine, ornithine, choline, N,N'-dibenzylethylene-diamine, chloroprocaine, diethanolamine, procaine, N-benzylphenethyl-amine, diethylamine, piperazine, tris(hydroxymethyl)aminomethane, and tetramethylammonium hydroxide.

Pharmaceutical formulations may typically include one or more carriers acceptable for the mode of administration of the preparation, be it by injection, inhalation, topical administration, lavage, or other modes suitable for the selected treatment. Suitable carriers may be those known in the art for use in such modes of administration.

Suitable pharmaceutical compositions may be formulated by means known in the art and their mode of administration and dose determined by the skilled practitioner. For parenteral administration, a compound may be dissolved in sterile water or saline or a pharmaceutically acceptable vehicle used for administration of non-water-soluble compounds such as those used for vitamin K. For enteral administration, the compound may be administered in a tablet, capsule or dissolved in liquid form. The table or capsule may be enteric coated, or in a formulation for sustained release. Many suitable formulations are known, including, polymeric or protein microparticles encapsulating a compound to be released, ointments, gels, hydrogels, or solutions which can be used topically or locally to administer a compound. A sustained release patch or implant may be employed to provide release over a prolonged period of time. Many techniques known to skilled practitioners are described in *Remington: The Science & Practice of Pharmacy* by Alfonso Gennaro, 20$^{th}$ ed., Williams & Wilkins, (2000). Formulations for parenteral administration may, for example, contain excipients, polyalkylene glycols such as polyethylene glycol, oils of vegetable origin, or hydrogenated naphthalenes. Biocompatible, biodegradable lactide polymer, lactide/glycolide copolymer, or polyoxyethylene-polyoxypropylene copolymers may be used to control the release of a compound. Other potentially useful parenteral delivery systems for modulatory compounds may include ethylene-vinyl acetate copolymer particles, osmotic pumps, implantable infusion systems, and liposomes. Formulations for inhalation may contain excipients, for example, lactose, or may be aqueous solutions containing, for example, polyoxyethylene-9-lauryl ether, glycocholate and deoxycholate, or may be oily solutions for administration in the form of nasal drops, or as a gel.

A compound or a pharmaceutical composition according to the present invention may be administered by oral or non-oral, e.g., intramuscular, intraperitoneal, intravenous, intracisternal injection or infusion, subcutaneous injection, transdermal or transmucosal routes. In some embodiments, a compound or pharmaceutical composition in accordance with this invention or for use in this invention may be administered by means of a medical device or appliance such as an implant, graft, prosthesis, stent, etc. Implants may be devised which are intended to contain and release such compounds or compositions. An example would be an implant made of a polymeric material adapted to release the compound over a period of time. A compound may be administered alone or as a mixture with a pharmaceutically acceptable carrier e.g., as solid formulations such as tablets, capsules, granules, powders, etc.; liquid formulations such as syrups, injections, etc.; injections, drops, suppositories, pessaryies. In some embodiments, compounds or pharmaceutical compositions in accordance with this invention or for use in this invention may be administered by inhalation spray, nasal, vaginal, rectal, sublingual, or topical routes and may be formulated, alone or together, in suitable dosage unit formulations containing conventional non-toxic pharmaceutically acceptable carriers, adjuvants and vehicles appropriate for each route of administration.

A compound of the invention may be used to treat animals, including mice, rats, horses, cattle, sheep, dogs, cats, and monkeys. However, a compound of the invention may also be used in other organisms, such as avian species (e.g., chickens). One or more of the compounds of the invention may also be effective for use in humans. The term "subject" or alternatively referred to herein as "patient" is intended to be referred to an animal, preferably a mammal, most preferably a human, who has been the object of treatment, observation or experiment. However, one or more of the compounds, methods and pharmaceutical compositions of the present invention may be used in the treatment of animals. Accordingly, as used herein, a "subject" may be a human, non-human primate, rat, mouse, cow, horse, pig, sheep, goat, dog, cat, etc. The subject may be suspected of having or at risk for having a condition that may require inhibition of GBA2 activity.

An "effective amount" of a compound according to the invention may include a therapeutically effective amount or a prophylactically effective amount. A "therapeutically effective amount" refers to an amount effective, at dosages and for periods of time necessary, to achieve the desired therapeutic result, such as inhibition of a GBA2, reducing GBA2 enzyme activity levels, inhibition of alpha-synuclein aggregation, or any condition described herein. A therapeutically effective amount of a compound may vary according to factors such as the disease state, age, sex, and weight of the individual, and the ability of the compound to elicit a desired response in the individual. Dosage regimens may be adjusted to provide the optimum therapeutic response. A therapeutically effective amount may also be one in which any toxic or detrimental effects of the compound are outweighed by the therapeutically beneficial effects. A "prophylactically effective amount" may refer to an amount effective, at dosages and for periods of time necessary, to achieve the desired prophylactic result, such as inhibition of a GBA2, reduction of GBA2 enzyme activity levels, inhibition of alpha-synuclein aggregation, or any condition described herein. Typically, a prophylactic dose may be used in subjects prior to or at an earlier stage of disease, so that a prophylactically effective amount may be less than a therapeutically effective amount. A suitable range for therapeutically or prophylactically effective amounts of a compound may be any integer from 0.1 nM-0.1 M, 0.1 nM-0.05 M, 0.05 nM-15 µM or 0.01 nM-10 µM.

In alternative embodiments, in the treatment or prevention of conditions which may require inhibition of GBA2 activity, an appropriate dosage level may generally be about 0.01 to 500 mg per kg subject body weight per day and may be administered in single or multiple doses. In some embodiments, the dosage level may be about 0.1 to about 250 mg/kg per day. It will be understood that the specific dose level and frequency of dosage for any particular patient may be varied and may depend upon a variety of factors including the activity of the specific compound used, the metabolic stability and length of action of that compound, the age, body weight, general health, sex, diet, mode and time of administration, rate of excretion, drug combination, the severity of the particular condition, and the patient undergoing therapy.

It is to be noted that dosage values may vary with the severity of the condition to be alleviated. For any particular subject, specific dosage regimens may be adjusted over time according to the individual need and the professional judgement of the person administering or supervising the administration of the compositions. Dosage ranges set forth herein are exemplary only and do not limit the dosage ranges that may be selected by medical practitioners. The amount of active compound(s) in the composition may vary according to factors such as the disease state, age, sex, and weight of the subject. Dosage regimens may be adjusted to provide the optimum therapeutic response. For example, a single bolus may be administered, several divided doses may be administered over time or the dose may be proportionally reduced or increased as indicated by the exigencies of the therapeutic situation. It may be advantageous to formulate parenteral compositions in dosage unit form for ease of administration and uniformity of dosage. In general, compounds of the invention should be used without causing substantial toxicity, and as described herein, one or more of the compounds may exhibit a suitable safety profile for therapeutic use.

Toxicity of a compound of the invention may be determined using standard techniques, for example, by testing in cell cultures or experimental animals and determining the therapeutic index, i.e., the ratio between the LD50 (the dose lethal to 50% of the population) and the LD100 (the dose lethal to 100% of the population). In some circumstances however, such as in severe disease conditions, it may be necessary to administer substantial excesses of the compositions.

In the compounds of generic Formula (I), including any one or more of Formula (Ia)-(Ik), the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of generic Formula (I), including any one or more of Formula (Ia)-(Ik). For example, different isotopic forms of hydrogen (H) include protium ($^1H$), deuterium ($^2H$) and tritium ($^3H$). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds within generic Formula (I), including any one or more of Formula (Ia)-(Ik), may be prepared by conventional techniques well known to those skilled in the art or by processes analogous to those described in the schemes and examples herein using appropriate isotopically-enriched reagents and/or intermediates.

Other Uses

In alternative embodiments, one or more of the compounds of the invention may be used in studying the physiological role of GBA2 at the cellular and organismal level. In some embodiments, one or more of the compounds may be useful in the development of animal models for studying diseases or disorders that may be related to deficiencies in GBA2, over-expression of GBA2, accumulation of glucosylceramide, depletion of glucosylceramide, accumulation of glycosphingolipids, depletion of glycosphingolipids, and for studying treatment of diseases and disorders that may be related to deficiency or over-expression of GBA2, or accumulation or depletion of glucosylceramide, or accumulation or depletion of glycosphingolipids. Such diseases and disorders may include, without limitation, neurological diseases, including Alzheimer's disease, Parkinson's disease, multiple sclerosis, Huntington's disease, amyotrophic lateral sclerosis (ALS), and neuronal ceroid lipofuscinosis (Batten disease); lysosomal storage diseases, including Gaucher disease, Niemann-Pick type C disease, mucolipidosis type IV and Sandhoff disease; or liver diseases, including non-alcoholic steatohepatitis (NASH).

The effectiveness of a compound in treating pathology associated with a lysosomal storage disease (for example, Gaucher disease, Niemann-Pick type C disease, mucolipidosis type IV, or Sandhoff disease) may be confirmed using standard techniques, for example, by testing the ability of a compound to prevent, treat, or ameliorate disease symptoms in established cellular and/or transgenic animal models of disease.[13,14,16,17,27] ENREF 18

Various alternative embodiments and examples of the invention are described herein. These embodiments and examples are illustrative and should not be construed as limiting the scope of the invention.

EXAMPLES

The following examples are intended to illustrate embodiments of the invention and are not intended to be construed in a limiting manner.

ABBREVIATIONS

ABCN=1,1'-azobis(cyclohexanecarbonitrile)
DAST=diethylaminosulfur trifluoride
DCM=dichloromethane
DIPEA=diisopropylethylamine
DMF=N,N-dimethylformamide
DMA=dimethylacetamide
DMP=Dess-Martin periodinane
Et$_2$O=diethyl ether
LAH=lithium aluminum hydride
MeOH=methanol
MsCI=methanesulfonyl chloride
RT=room temperature
RuPhos=2-dicyclohexylphosphino-2',6'-diisopropoxybiphenyl
TBDMSCI=tert-butyldimethylsilyl chloride
TFA=2,2,2-trifluoroacetic acid
THF=tetrahydrofuran Example 1

(3S,4R,5R)-1-(((1r,4R)-4-(trifluoromethyl)cyclohexyl)methyl)piperidine-3,4,5-triol

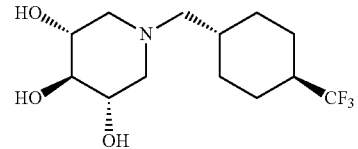 [SMILES: O[C@H]1[C@H](O)CN(C[C@H]2CC[C@H](C(F)(F)F)CC2)C[C@@H]1O]

To a stirred solution of (3S,4r,5R)-3,4,5-tris(benzyloxy)piperidine (30 mg, 0.074 mmol) and (1r,4r)-4-(trifluoromethyl)cyclohexanecarbaldehyde (20 mg, 0.11 mmol) in anhydrous DCM (2 mL) was added HOAc (2 drops) and the mixture was stirred for 30 min. NaBH(OAc)$_3$ (31 mg, 0.15 mmol) was added, and the resulting mixture was stirred at RT for 18 h. The reaction was quenched with satd. aqueous NaHCO$_3$ at 0° C. The mixture was extracted with EtOAc (3×30 mL). The combined organic layer was washed with water (2×20 mL), separated, and dried over Na$_2$SO$_4$. After filtration, the solvent was evaporated under reduced pressure, and the residue was purified on silica gel by flash chromatography affording (3S,4R,5R)-3,4,5-tris(benzyloxy)-1-(((1r,4R)-4-(trifluoromethyl)cyclohexyl)methyl)piperidine as an oil (40 mg, 95%). ESI MS m/z 568.31 [M+H]$^+$.

To a stirred solution of the above material (40 mg, 0.070 mmol) in anhydrous DCM (5 mL) was added BCl$_3$ (1M in DCM, 0.35 mL, 0.35 mmol) at −78° C. under N$_2$. The mixture was stirred at 0° C. for 2 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, after which solvent was removed under vacuum. The residue was purified on silica gel by flash chromatography to give (3S,4R,5R)-1-(((1r,4R)-4-(trifluoromethyl)cyclohexyl)methyl)piperidine-3,4,5-triol as a white solid (15 mg, 72%). ¹H NMR (400 MHZ, CD₃OD) δ 3.54-3.45 (m, 2H), 3.09 (t, J=8.9 Hz, 1H), 2.97-2.88 (m, 2H), 2.22 (d, J=7.1 Hz, 2H), 2.17-2.01 (m, 1H), 2.01-1.83 (m, 6H), 1.60-1.44 (m, 1H), 1.44-1.26 (m, 2H), 1.05-0.89 (m, 2H); ESI MS m/z 298.16 [M+H]⁺.

Example 2

(3S,4R,5R)-1-(((1s,4S)-4-(trifluoromethyl)cyclohexyl)methyl)piperidine-3,4,5-triol

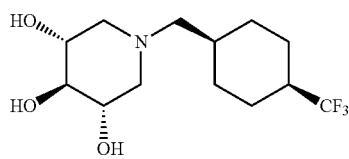 [SMILES: O[C@H]1[C@H](O)CN(C[C@H]2CC[C@@H](C(F)(F)F)CC2)C[C@@H]1O]

DIPEA (0.52 mL, 3.0 mmol) was added to a stirred solution of (3S,4r,5R)-3,4,5-tris(benzyloxy)piperidine (400 mg, 0.99 mmol) and 4-(trifluoromethyl)cyclohexane carboxylic acid (29 2 mg, 1.49 mmol) in DMF (10 mL) at 0° C., followed by the addition of HATU (566 mg, 1.49 mmol). The mixture was stirred at RT for 2 h. Water was added to quench the reaction. The mixture was extracted with EtOAc (3×20 mL). The combined organic layer was washed with water (2×30 mL), separated, and dried over Na₂SO₄. After filtration, the solvent was evaporated under reduced pressure, and the residue was purified on silica gel by flash chromatography affording ((1s,4S)-4-(trifluoromethyl)cyclohexyl)((3S,4R,5R)-3,4,5-tris(benzyloxy)piperidin-1-yl)methanone as an oil (274 mg, 48%). ESI MS m/z 582.67 [M+H]⁺.

To a solution of the above material (94 mg, 0.16 mmol) in anhydrous THF (3 mL) at 0° C., was added LAH (25 mg, 0.65 mmol), and the mixture was stirred at 0° C. for 2 h. The mixture was quenched slowly with satd. aqueous Na₂SO₄ and filtered. The solid was washed with EtOAc. The combined organic layer was washed with water (2×20 mL), separated, and dried over Na₂SO₄. After filtration, the solvent was evaporated under reduced pressure, and the residue was purified on silica gel by flash chromatography affording (3S,4R,5R)-3,4,5-tris(benzyloxy)-1-(((1s,4S)-4-(trifluoromethyl)cyclohexyl)methyl)piperidine as an oil (45 mg, 50%). ESI MS m/z 568.69 [M+H]⁺.

To a stirred solution of the above material (40 mg, 0.07 mmol) in anhydrous DCM (5 mL) was added BCl₃ (1M in DCM, 0.35 mL, 0.35 mmol) at −78° C. under N₂. The mixture was stirred at 0° C. for 2 h before being quenched with anhydrous MeOH (1 mL). The mixture was stirred at RT for 10 min. Solvent was removed under vacuum, the residue was dissolved in 1M NH₃ in MeOH (10 mL) and stirred for another 10 min, after which solvent was removed under vacuum. The residue was purified on silica gel by flash chromatography to give (3S,4R,5R)-1-(((1s,4S)-4-(trifluoromethyl)cyclohexyl)methyl)piperidine-3,4,5-triol as a white solid (16 mg, 77%). ¹H NMR (400 MHZ, CD₃OD) δ 3.54-3.45 (m, 2H), 3.10 (t, J=8.8 Hz, 1H), 2.99-2.91 (m, 2H), 2.35 (d, J=7.6 Hz, 2H), 2.25-2.11 (m, 1H), 1.97-1.83 (m, 3H), 1.74-1.48 (m, 8H); ESI MS m/z 298.16 [M+H]⁺.

Example 3

(3S,4R,5R)-1-(((1s,4S)-4-(2-fluoropropan-2-yl)cyclohexyl)methyl)piperidine-3,4,5-triol

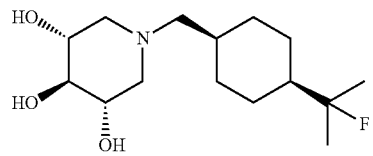 [SMILES: CC(C)(F)[C@H]1CC[C@@H](CN2C[C@@H](O)[C@H](O)[C@@H](O)C2)CC1]

At −78° C., and under Ar, to a solution of (3S,4r,5R)-3,4,5-tris(benzyloxy)piperidine (0.70 g, 1.7 mmol) in anhydrous DCM (20 mL) was added BCl₃ (1.0 M in DCM, 10.0 mL, 10.0 mmol), and the mixture was stirred at 0° C. for 3 h. The reaction mixture was cooled at −78° C., quenched with MeOH, and then concentrated to dryness. The residue was washed with mixed EtOAc/hexanes (1:1) (3×20 mL), and dried under high vacuum overnight to give the HCl salt as a pale-yellow solid. Under Ar, a mixture of the above solid (0.16 g, 0.94 mmol), cis-4-(2-fluoropropan-2-yl)cyclohexanecarbaldehyde (0.18 g, 1.0 mmol), NaOAc (0.082 g, 1.0 mmol) and NaBH₃CN (0.15 g, 2.4 mmol) in MeOH (10 mL) was stirred at RT for 16 h. The reaction mixture was diluted with water (3 mL) and concentrated to dryness at 40° C., and the residue was purified on silica gel by flash (0.5 M NH₃ MeOH/DCM, 1:6), affording (3S,4R,5R)-1-(((1s,4S)-4-(2-fluoropropan-2-yl)cyclohexyl)methyl)piperidine-3,4,5-triol (0.058 g, 21%, two steps) as a white solid. ¹H NMR (400 MHZ, CD₃OD) δ 3.49 (ddd, J=10.2, 8.8, 4.7 Hz, 2H), 3.09 (t, J=8.9 Hz, 1H), 2.94 (ddd, J=10.7, 4.8, 1.6 Hz, 2H), 2.37 (d, J=7.5 Hz, 2H), 1.96-1.82 (m, 3H), 1.80-1.71 (m, 2H), 1.62-1.42 (m, 5H), 1.33-1.10 (m, 8H, including 1.27 (d, J=21.8 Hz, 6H)); ESI MS m/z 290.216 [M+H]⁺.

Example 4

(3S,4r,5R)-1-(2-cyclohexylethyl)piperidine-3,4,5-triol

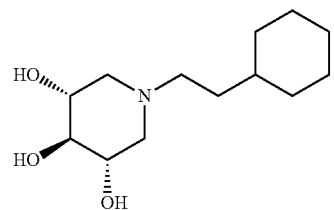 [SMILES: O[C@H]1[C@H](O)CN(CCC2CCCCC2)C[C@@H]1O]

A mixture of (3S,4r,5R)-3,4,5-tris(benzyloxy)piperidine (0.20 g, 0.50 mmol), (2-bromoethyl)cyclohexane (0.30 g, 1.5 mmol) and DIPEA (0.22 g, 1.7 mmol) in anhydrous DMF (5 mL) in a sealed tube was stirred at 90° C. for 16 h. The reaction mixture was cooled at RT and diluted with satd. aqueous NaHCO₃ (10 mL). After extraction with EtOAc (3×10 mL) the combined extract was washed with brine (2×15 mL) and dried over anhydrous Na₂SO₄. After filtration the solvent was evaporated under reduced pressure, and the residue was purified on silica gel by flash chromatography (EtOAc/hexanes, 1:9 to 1:5), affording (3S,4r,5R)-3, 4,5-tris(benzyloxy)-1-(2-cyclohexylethyl)piperidine as a pale-yellow solid (0.23 g, 90%). ESI MS m/z 514.338 [M+H]⁺.

At −78° C., and under Ar, to a solution of the above material (0.23 g, 0.45 mmol) in anhydrous DCM (6 mL) was added BCl₃ (1.0 M in DCM, 4.0 mL, 4.0 mmol), and the mixture was stirred at 0° C. for 3 h. The reaction mixture was cooled at −78° C., quenched with MeOH, and concentrated to dryness. The residue was neutralized with 1 M NH₃ in MeOH and then purified on silica gel by flash chromatography (0.5 M NH₃ in MeOH/DCM, 1:5), affording (3S,4r,5R)-1-(2-cyclohexylethyl)piperidine-3,4,5-triol as a white solid (0.075 g, 69%). ¹H NMR (400 MHZ, DMSO-d₆) δ 4.67 (d, J=4.3 Hz, 1H), 4.64 (d, J=4.8 Hz, 2H), 3.29-3.16 (m, 2H), 2.85 (td, J=8.7, 4.3 Hz, 1H), 2.76 (ddd, J=10.2, 4.6, 1.5 Hz, 2H), 2.35-2.19 (m, 2H), 1.75-1.53 (m, 7H), 1.35-1.04 (m, 6H), 0.97-0.76 (m, 2H); ESI MS m/z 244.194 [M+H]⁺.

Example 5

(3S,4r,5R)-1-(3-cyclohexylpropyl)piperidine-3,4,5-triol

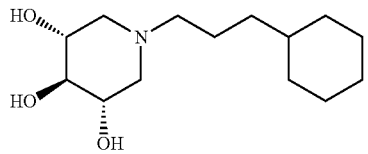 [SMILES: O[C@H]1[C@H](O)CN(CCCC2CCCCC2)C[C@@H]1O]

A mixture of (3S,4r,5R)-3,4,5-tris(benzyloxy)piperidine (0.15 g, 0.37 mmol), (3-bromopropyl)cyclohexane (0.30 g, 1.5 mmol) and DIPEA (0.22 g, 1.7 mmol) in anhydrous DMF (4 mL) in a sealed tube was stirred at 90° C. for 16 h. The reaction mixture was cooled at RT and diluted with satd. aqueous NaHCO₃ (10 mL). After extraction with EtOAc (3×10 mL) the combined extract was washed with brine (2×15 mL) and dried over anhydrous Na₂SO₄. After filtration the solvent was evaporated under reduced pressure, and the residue was purified on silica gel by flash chromatography (EtOAc/hexanes, 1:9 to 1:6), affording (3S,4r,5R)-3,4,5-tris(benzyloxy)-1-(3-cyclohexylpropyl)piperidine as a pale-yellow oil (0.16 g, 83%). ESI MS m/z 528.351 [M+H]⁺.

At −78° C., and under Ar, to a solution of the above material (0.15 g, 0.28 mmol) in anhydrous DCM (5 mL) was added BCl₃ (1.0 M in DCM, 2.5 mL, 2.5 mmol), and the mixture was stirred at 0° C. for 3 h. The reaction mixture was cooled at −78° C., quenched with MeOH, and concentrated to dryness. The residue was neutralized with 1 M NH₃ in MeOH and then purified on silica gel by flash chromatography (0.5 M NH₃ in MeOH/DCM, 1:6), affording (3S,4r,5R)-1-(3-cyclohexylpropyl)piperidine-3,4,5-triol as a white solid (0.062 g, 86%). ¹H NMR (400 MHZ, DMSO-d₆) δ 4.67 (d, J=4.3 Hz, 1H), 4.65 (d, J=4.8 Hz, 2H), 3.22 (dq, J=13.5, 4.8 Hz, 2H), 2.85 (td, J=8.6, 4.3 Hz, 1H), 2.82-2.70 (m, 2H), 2.22 (t, J=7.4 Hz, 2H), 1.79-1.53 (m, 7H), 1.37 (p, J=7.5 Hz, 2H), 1.25-1.06 (m, 6H), 0.91-0.73 (m, 2H); ESI MS m/z 258.210 [M+H]⁺.

Example 6

(3S,4r,5R)-1-(3-chloro-2-fluorophenethyl)piperidine-3,4,5-triol

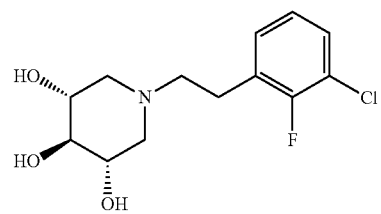 [SMILES: O[C@H]1[C@H](O)CN(CCc2cccc(Cl)c2F)C[C@@H]1O]

(3S,4r,5R)-1-(3-chloro-2-fluorophenethyl)piperidine-3,4,5-triol was synthesized from (3S,4r,5R)-3,4,5-tris(benzyloxy)piperidine and 2-(3-chloro-2-fluorophenyl) acetaldehyde using the procedure described for Example 7. ¹H NMR (400 MHZ, CD₃OD) δ 7.32 (ddd, J=8.5, 7.1, 1.7 Hz, 1H), 7.24 (td, J=7.2, 6.7, 1.7 Hz, 1H), 7.10 (td, J=7.9, 1.1 Hz, 1H), 3.54-3.45 (m, 2H), 3.12 (t, J=8.9 Hz, 1H), 3.06-3.01 (m, 2H), 2.89 (dd, J=9.0, 6.5 Hz, 2H), 2.67 (dd, J=9.2, 6.3 Hz, 2H), 2.04 (dd, J=11.2, 10.3 Hz, 2H); ESI MS m/z 290.06 [M+H]⁺.

Example 7

(3S,4r,5R)-1-(3-chloro-2,6-difluorophenethyl)piperidine-3,4,5-triol

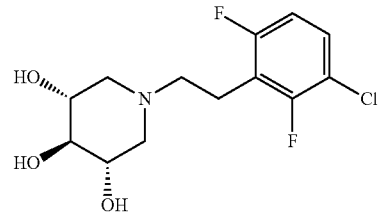 [SMILES: O[C@H]1[C@H](O)CN(CCc2c(F)ccc(Cl)c2F)C[C@@H]1O]

At 0° C., and under Ar, to a solution of xylitol (25.0 g, 164 mmol) and imidazole (34.0 g, 500 mmol) in anhydrous DMF (300 mL) was added TBDMSCI (54.5 g, 362 mmol). The mixture was stirred at RT for 5 h, and then diluted with brine (1 L). The mixture was extracted with EtOAc (4×150 mL), and the combined extract was washed with brine (1 L) and dried over anhydrous Na₂SO₄. After filtration the solvent was evaporated under reduced pressure, and the residue was purified on silica gel by flash chromatography (EtOAc/hexanes, 1:1), affording (6R,7r,8S)-2,2,3,3,11,11,12,12-octamethyl-4,10-dioxa-3,11-disilatridecane-6,7,8-triol as a white solid (58.5 g, 94%). ESI MS m/z 403.224 [M+Na]⁺.

At 0° C., and under Ar, a solution of the above material (57.7 g, 152 mmol) in anhydrous DMF (200 mL) was added to a suspension of NaH (60% with mineral oil, 24.3 g, 605 mmol) slowly. After addition the mixture was stirred at 0° C. for 1 h, and a solution of BnBr (103 g, 602 mmol) in anhydrous DMF (150 mL) was added slowly. The mixture was brought to RT and stirred at RT overnight. Cooled at 0° C., the reaction was quenched with water carefully and then diluted with water (1 L). After extraction with EtOAc (4×150 mL) the combined extract was washed with brine (2×500 mL) and dried over anhydrous Na₂SO₄. After filtration the solvent was evaporated under reduced pressure, and the residue was treated with HCl in MeOH (0.5 N, 600 mL) at RT for 1 h. The reaction mixture was concentrated under reduced pressure, and the residue was diluted with satd. aqueous NaHCO$_3$ (500 mL) and extracted with DCM (4×200 mL). The combined extract was washed with brine (500 mL) and dried over anhydrous Na$_2$SO$_4$. After filtration the solvent was evaporated under reduced pressure, and the residue was purified on silica gel by flash chromatography (EtOAc/hexanes, 1:2 to 1:1), affording (2R,3r,4S)-2,3,4-tris(benzyloxy) pentane-1,5-diol as a white solid (44.0 g, 69%). ESI MS m/z 445.206 [M+Na]$^+$.

At −10° C., and under Ar, to a solution of the above material (27.0 g, 63.9 mmol) and DIPEA (20.7 g, 160 mmol) in anhydrous DCM (300 mL) was added MsCl (16.0 g, 140 mmol) dropwise, and the mixture was stirred at 0° C. for 2 h. The reaction mixture was diluted with water (500 mL), and the DCM layer was collected and the aqueous extracted with DCM (2×50 mL). The combined extract was washed with satd. aqueous NaHCO$_3$ (300 mL) and dried over anhydrous Na$_2$SO$_4$. After filtration the solvent was evaporated under reduced pressure at RT, and the residue was further dried under high vacuum to afford sticky oil. The sticky oil was dissolved in allylamine (50 mL) and the mixture was stirred at 50° C. for 3 days. After concentration under reduced pressure the residue was diluted with satd. aqueous NaHCO$_3$ (200 mL) and extracted with EtOAc (3×100 mL). The combined extract was dried over anhydrous Na$_2$SO$_4$. After filtration the solvent was evaporated under reduced pressure, and the residue was purified on silica gel by flash chromatography (EtOAc/hexanes, 1:3), affording (3S,4r,5R)-1-allyl-3,4,5-tris(benzyloxy)piperidine as a pale-yellow oil (16.2 g, 69%). ESI MS m/z 444.260 [M+H]$^+$.

At 75° C., and under Ar, to a solution of the above material (10.5 g, 23.7 mmol) in anhydrous DMSO (50 mL) was added KOtBu (1.68 g, 15.0 mmol), and the mixture was stirred at 100° C. for 50 min. At 100° C. aqueous HCl (1 N, 50 mL) was added and the heating bath was removed. After cooling the reaction mixture was diluted with satd. aqueous NaHCO$_3$ (300 mL), and extracted with EtOAc (3×100 mL). The combined extract was washed with brine (3×100 mL) and dried over anhydrous Na$_2$SO$_4$. After filtration the solvent was evaporated under reduced pressure, and the residue was purified on silica gel by flash chromatography (MeOH/DCM, 1:20), affording (3S,4r,5R)-3,4,5-tris(benzyloxy)piperidine as a pale-yellow solid (8.4 g, 69%). $^1$H NMR (400 MHZ, CD$_3$OD) δ 7.36-7.21 (m, 15H), 4.83 (s, 2H), 4.65 (s, 4H), 3.47-3.41 (m, 3H), 3.21-3.12 (m, 2H), 2.44-2.33 (m, 2H); ESI MS m/z 404.227 [M+H]$^+$.

Under Ar, a mixture of (3S,4r,5R)-3,4,5-tris(benzyloxy)piperidine (0.18 g, 0.45 mmol), 2-(3-chloro-2,6-difluorophenyl) acetaldehyde (0.10 g, 0.52 mmol) and NaBH(OAc)$_3$ (0.15 g, 0.72 mmol) in DCM (10 mL) was stirred at RT for 16 h. The reaction mixture was diluted with satd. aqueous NaHCO$_3$ (10 mL), and extracted with DCM (3×15 mL). The combined extract was dried over anhydrous Na$_2$SO$_4$. After filtration the solvent was evaporated under reduced pressure, and the residue was purified on silica gel by flash chromatography (EtOAc/hexanes, 1:12 to 1:6), affording (3S,4r,5R)-3,4,5-tris(benzyloxy)-1-(3-chloro-2,6-difluorophenethyl)piperidine as colorless oil (0.24 g, 92%). ESI MS m/z 578.232 [M+H]$^+$.

At −78° C., and under Ar, to a solution of the above material (0.24 g, 0.42 mmol) in anhydrous DCM (10 mL) was added BCl$_3$ (1.0 M in DCM, 3.0 mL, 3.0 mmol), and the mixture was stirred at 0° C. for 3 h. The reaction mixture was cooled at −78° C., quenched with MeOH, and then concentrated to dryness. The residue was neutralized with 1 M NH$_3$ in MeOH and then purified on silica gel by flash chromatography (0.5 M NH$_3$ in MeOH/DCM, 1:6), affording (3S, 4r,5R)-1-(3-chloro-2,6-difluorophenethyl)piperidine-3,4,5-triol as a white solid (0.10 g, 81%). $^1$H NMR (400 MHZ, DMSO-d$_6$) δ 7.50 (td, J=8.8, 5.8 Hz, 1H), 7.13 (td, J=9.0, 1.8 Hz, 1H),), 4.72-4.67 (m, 3H), 3.26-3.11 (m, 2H), 2.93-2.70 (m, 5H), 2.52-2.45 (m, 2H), 1.83 (t, J=10.5 Hz, 2H); ESI MS m/z 308.089 [M+H]$^+$.

Example 8

(3S,4r,5R)-1-(3,4-dichlorophenethyl)piperidine-3,4,5-triol

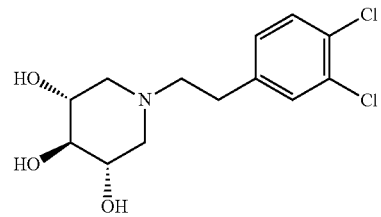 [SMILES: O[C@H]1[C@H](O)CN(CCc2ccc(Cl)c(Cl)c2)C[C@@H]1O]

At 0° C., and under Ar, to a solution of 2-(3,4-dichlorophenyl) acetic acid (2.05 g, 10.0 mmol) in anhydrous THF (20 mL) was added LAH (0.48 g, 12.7 mmol), and the mixture was stirred at 0° C. for 1 h. Wet sodium sulfate heptahydrate (100 g) was added to quench the reaction, and the suspension was stirred at RT for 1 h. After filtration the solvent was evaporated, and the residue was purified on silica gel by flash chromatography (EtOAc/hexanes, 1:3 to 1:2), affording 2-(3,4-dichlorophenyl) ethanol as clear liquid (1.50 g, 79%). $^1$H NMR (500 MHZ, CDCl$_3$) δ 7.37 (d, J=8.2 Hz, 1H), 7.34 (d, J=2.1 Hz, 1H), 7.07 (dd, J=8.2, 2.1 Hz, 1H), 3.86 (t, J=6.5 Hz, 2H), 2.82 (t, J=6.5 Hz, 2H).

A mixture of the above material (1.50 g, 7.85 mmol) and DMP (4.0 g. 9.4 mmol) in DCM (40 mL) was stirred at RT for 1.5 h, forming a white suspension. Hexanes (100 mL) was added, and the suspension was filtered through a celite cake. The filtrate was collected and concentrated to dryness under reduced pressure, and the residue was purified on silica gel by flash chromatography (EtOAc/hexanes, 1:6 to 1:4), affording 2-(3,4-dichlorophenyl) acetaldehyde as a pale green liquid (1.15 g, 77%). $^1$H NMR (400 MHZ, CDCl$_3$) δ 9.75 (t, J=1.9 Hz, 1H), 7.44 (d, J=8.2 Hz, 1H), 7.32 (d, J=2.1 Hz, 1H), 7.05 (dd, J=8.2, 2.1 Hz, 1H), 3.68 (d, J=1.9 Hz, 2H).

Under Ar, a mixture of (3S,4r,5R)-3,4,5-tris(benzyloxy) piperidine (0.10 g, 0.25 mmol), 2-(3,4-dichlorophenyl) acetaldehyde (0.070 g, 0.37 mmol) and NaBH(OAc)$_3$ (0.11 g, 0.52 mmol) in DCM (5 mL) was stirred at RT for 16 h. The reaction mixture was diluted with satd. aqueous NaHCO$_3$ (5 mL), and extracted with DCM (2×5 mL). The combined extract was dried over anhydrous Na$_2$SO$_4$. After filtration the solvent was evaporated under reduced pressure, and the residue was purified on silica gel by flash chromatography (EtOAc/hexanes, 1:6 to 1:4), affording (3S,4r,5R)-3,4,5-tris(benzyloxy)-1-(3,4-dichlorophenethyl)piperidine as a colorless oil (0.15 g, 100%). ESI MS m/z 576.209 [M+H]$^+$.

At −78° C., and under Ar, to a solution of the above material (0.14 g, 0.25 mmol) in anhydrous DCM (5 mL) was added BCl$_3$ (1.0 M in DCM, 2.5 mL, 2.5 mmol), and the mixture was stirred at 0° C. for 3 h. The reaction mixture was cooled at −78° C., quenched with MeOH, and then concentrated to dryness. The residue was neutralized with 1 M NH$_3$ in MeOH and then purified on silica gel by flash chromatography (0.5 M NH$_3$ in MeOH/DCM, 1:6), affording (3S,4r,5R)-1-(3,4-dichlorophenethyl)piperidine-3,4,5-triol as a white solid (0.053 g, 69%). 1H NMR (400 MHZ, DMSO-d$_6$) δ 7.57-7.47 (m, 2H), 7.23 (dd, J=8.3, 2.0 Hz, 1H), 4.73-4.67 (m, 3H), 3.26-3.10 (m, 2H), 2.93-2.79 (m, 3H), 2.70 (dd, J=8.6, 6.8 Hz, 2H), 2.55-2.50 (m, 2H), 1.81 (t, J=10.5 Hz, 2H); ESI MS m/z 306.065 [M+H]$^+$.

Example 9

(3S,4r,5R)-1-(4-(cyclopropylmethoxy)-2,6-difluorophenethyl)piperidine-3,4,5-

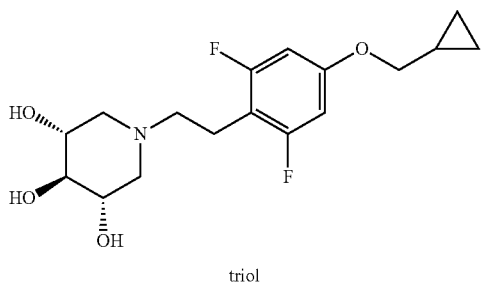 [SMILES: O[C@H]1[C@H](O)CN(CCc2c(F)cc(OCC3CC3)cc2F)C[C@@H]1O]

triol

Under Ar, a mixture of (3S,4r,5R)-3,4,5-tris(benzyloxy)piperidine (0.10 g, 0.25 mmol), 2-(4-(cyclopropylmethoxy)-2,6-difluorophenyl) acetaldehyde (0.066 g, 0.29 mmol) and NaBH(OAc)$_3$ (0.10 g, 0.47 mmol) in DCM (5 ml) was stirred at RT for 16 h. The reaction mixture was diluted with satd. aqueous NaHCO$_3$ (10 mL), and extracted with DCM (3×10 mL). The combined extract was dried over anhydrous Na$_2$SO$_4$. After filtration the solvent was evaporated under reduced pressure, and the residue was purified on silica gel by flash chromatography (EtOAc/hexanes, 1:10 to 1:6), affording (3S,4r,5R)-3,4,5-tris(benzyloxy)-1-(4-(cyclopropylmethoxy)-2,6-difluorophenethyl)piperidine as a white solid (0.14 g, 92%). ESI MS m/z 614.311 [M+H]$^+$.

A mixture of the above material (0.14 g, 0.23 mmol) and Pd(OH)$_2$/C (20% Pd in weight, 0.050 g, 0.094 mmol) and three drops of concentrated HCl in MeOH (20 mL) was stirred under hydrogen at one atmosphere of pressure overnight. The mixture was filtered through a celite cake, and the filtrate was collected and concentrated to dryness. The residue was neutralized with 1 M NH$_3$ in MeOH and then purified on silica gel by flash chromatography (0.5 M NH$_3$ MeOH/DCM, 1:6), affording (3S,4r,5R)-1-(4-(cyclopropylmethoxy)-2,6-difluorophenethyl)piperidine-3,4,5-triol (0.057 g, 73%) as a white solid. $^1$H NMR (400 MHZ, DMSO-d$_6$) δ 6.70-6.59 (m, 2H), 4.72-4.65 (m, 3H), 3.80 (d, J=7.1 Hz, 2H), 3.28-3.15 (m, 2H), 2.92-2.73 (m, 3H), 2.63 (t, J=7.5 Hz, 2H), 2.42 (t, J=7.4 Hz, 2H), 1.81 (t, J=10.4 Hz, 2H), 1.26-1.10 (m, 1H), 0.63-0.50 (m, 2H), 0.38-0.25 (m, 2H); ESI MS m/z 344.169 [M+H]$^+$.

Example 10

(3S,4r,5R)-1-(2,6-difluoro-4-(pyrrolidin-1-yl)phenethyl)piperidine-3,4,5-triol

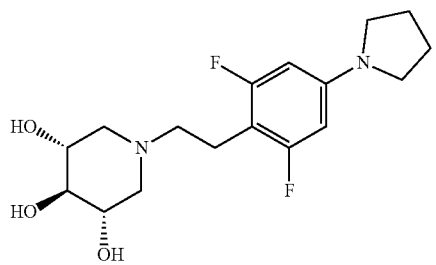 [SMILES: O[C@H]1[C@H](O)CN(CCc2c(F)cc(N3CCCC3)cc2F)C[C@@H]1O]

A mixture of (3S,4r,5R)-3,4,5-tris(benzyloxy)-1-(4-bromo-2,6-difluorophenethyl)piperidine (0.18 g, 0.29 mmol), pyrrolidine (0.10 g, 1.4 mmol), Cs$_2$CO$_3$ (0.26 g, 0.80 mmol), RuPhos (0.026 g, 0.056 mmol) and Pd$_2$(dba)3 (0.025 g, 0.028 mmol) in anhydrous toluene (15 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:9 to 1:6), affording (3S,4r,5R)-3,4,5-tris(benzyloxy)-1-(2,6-difluoro-4-(pyrrolidin-1-yl)phenethyl)piperidine as a pale-yellow oil (0.17 g, 96%).

At −78° C., and under Ar, to a solution of the above material (0.14 g, 0.23 mmol) in anhydrous DCM (5 mL) was added BCl$_3$ (1.0 M in DCM, 3.0 mL, 3.0 mmol), and the mixture was stirred at 0° C. for 3 h. The reaction mixture was cooled at −78° C., quenched with MeOH, and then concentrated to dryness. The residue was neutralized with 1 M NH$_3$ in MeOH and then purified on silica gel by flash chromatography (0.5 M NH$_3$ in MeOH/DCM, 1:6), affording (3S,4r,5R)-1-(2,6-difluoro-4-(pyrrolidin-1-yl)phenethyl)piperidine-3,4,5-triol as a white solid (0.043 g, 55%). $^1$H NMR (400 MHZ, DMSO-d$_6$) δ 6.22-6.08 (m, 2H), 4.72-4.66 (m, 3H), 3.27-3.10 (m, 6H), 2.93-2.74 (m, 3H), 2.58 (t, J=7.6 Hz, 2H), 2.39 (dd, J=8.7, 6.4 Hz, 2H), 2.04-1.86 (m, 4H), 1.80 (t, J=10.5 Hz, 2H); ESI MS m/z 343.187 [M+H]$^+$.

Example 11

(3S,4r,5R)-1-(2,6-difluoro-4-(piperidin-1-yl)phenethyl)piperidine-3,4,5-triol

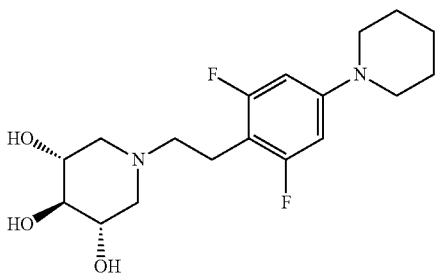 [SMILES: O[C@H]1[C@H](O)CN(CCc2c(F)cc(N3CCCCC3)cc2F)C[C@@H]1O]

At −10° C., and under Ar, to a solution of (methoxymethyl)triphenylphosphonium chloride (22.0 g, 64.2 mmol) in anhydrous THF (150 mL) was added KO′Bu (7.20 g, 64.2 mmol) and the mixture was stirred at −10° C. for 1 h. To the above solution 4-bromo-2,6-difluorobenzaldehyde (7.10 g, 32.1 mmol) was added, and the mixture was stirred at RT for 24 h. The reaction mixture was diluted with satd. aqueous NaHCO$_3$ (100 mL), and extracted with EtOAc (2×50 mL). The combined extract was dried over anhydrous Na$_2$SO$_4$. After filtration the solvent was evaporated under reduced pressure, and the residue was purified on silica gel by flash chromatography (EtOAc/hexanes, 1:19 to 1:9), affording a pale-yellow solid (8.20 g, 100%, a mixture of trans & cis isomers). To a solution of the pale-yellow solid (2.0 g, 8.0 mmol) in THF (40 mL) was added aqueous HCl (2.5 N, 40 mL), and the mixture was stirred at reflux for 5 h. The reaction mixture was diluted with icy water (50 mL) and extracted with EtOAc (2×40 mL). The combined extract was washed with satd. aqueous NaHCO$_3$ (50 mL) and dried over anhydrous Na$_2$SO$_4$. After filtration the solvent was evaporated under reduced pressure, and the residue was purified on silica gel by flash chromatography (EtOAc/hexanes, 1:15 to 1:6), affording 2-(4-bromo-2,6-difluorophenyl) acetaldehyde as a pale-yellow oil (1.29 g, 70%). $^1$H NMR (400 MHz, CDCl$_3$) δ 9.74 (s, 1H), 7.18-7.08 (m, 2H), 3.76 (s, 2H).

Under Ar, a mixture of the above material (0.90 g, 3.8 mmol) and NaBH(OAc)$_3$ (1.2 g, 5.7 mmol) in DCM (30 mL) was stirred at RT for 16 h. The reaction mixture was diluted with satd. aqueous NaHCO$_3$ (30 mL) and extracted with DCM (2×20 mL). The combined extract was dried over anhydrous Na$_2$SO$_4$. After filtration the solvent was evaporated under reduced pressure, and the residue was purified on silica gel by flash chromatography (EtOAc/hexanes, 1:12 to 1:6), affording (3S,4r,5R)-3,4,5-tris(benzyloxy)-1-(4-bromo-2,6-difluorophenethyl)piperidine as a pale-yellow oil (2.03 g, 86%). ESI MS m/z 626.315 [M+H]$^+$.

A mixture of the above material (0.18 g, 0.29 mmol), piperidine (0.10 g, 1.2 mmol), Cs$_2$CO$_3$ (0.26 g, 0.80 mmol), RuPhos (0.026 g, 0.056 mmol) and Pd$_2$(dba)3 (0.025 g, 0.028 mmol) in anhydrous toluene (15 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:9 to 1:6), affording (3S,4r,5R)-3,4,5-tris(benzyloxy)-1-(2,6-difluoro-4-(piperidin-1-yl)phenethyl)piperidine as a pale-yellow oil (0.18 g, 99%). ESI MS m/z 627.372 [M+H]$^+$.

At −78° C., and under Ar, to a solution of the above material (0.18 g, 0.29 mmol) in anhydrous DCM (10 mL) was added BCl$_3$ (1.0 M in DCM, 3.0 mL, 3.0 mmol), and the mixture was stirred at 0° C. for 3 h. The reaction mixture was cooled at −78° C., quenched with MeOH, and then concentrated to dryness. The residue was neutralized with 1 M NH$_3$ in MeOH and then purified on silica gel by flash chromatography (0.5 M NH$_3$ in MeOH/DCM, 1:6), affording (3S,4r,5R)-1-(2,6-difluoro-4-(piperidin-1-yl)phenethyl)piperidine-3,4,5-triol as a white solid (0.079 g, 76%). $^1$H NMR (400 MHZ, DMSO-d$_6$) δ 6.60-6.47 (m, 2H), 4.72-4.66 (m, 3H), 3.28-3.06 (m, 6H), 2.90-2.78 (m, 3H), 2.62-2.52 (m, 2H), 2.44-2.36 (m, 2H), 1.80 (t, J=10.5 Hz, 2H), 1.63-1.43 (m, 6H); ESI MS m/z 357.206 [M+H]$^+$.

Example 12

(3S,4r,5R)-1-(2,6-difluoro-4-morpholinophenethyl) piperidine-3,4,5-triol

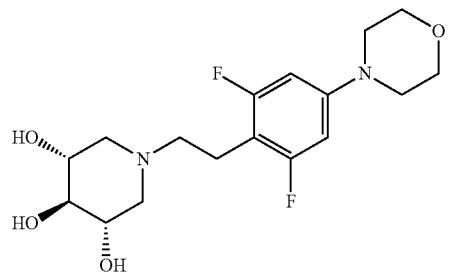 [SMILES: O[C@H]1[C@H](O)CN(CCc2c(F)cc(N3CCOCC3)cc2F)C[C@@H]1O]

A mixture of (3S,4r,5R)-3,4,5-tris(benzyloxy)-1-(4-bromo-2,6-difluorophenethyl)piperidine (0.18 g, 0.29 mmol), morpholine (0.10 g, 1.2 mmol), Cs$_2$CO$_3$ (0.26 g, 0.80 mmol), RuPhos (0.026 g, 0.056 mmol) and Pd$_2$(dba)3 (0.025 g, 0.028 mmol) in anhydrous toluene (15 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:4 to 1:3), affording 4-(3,5-difluoro-4-(2-((3S,4r,5R)-3,4,5-tris (benzyloxy)piperidin-1-yl)ethyl)phenyl) morpholine as a pale-yellow oil (0.15 g, 83%). ESI MS m/z 629.326 [M+H]$^+$.

At −78° C., and under Ar, to a solution of the above material (0.15 g, 0.24 mmol) in anhydrous DCM (5 mL) was added BCl$_3$ (1.0 M in DCM, 3.0 mL, 3.0 mmol), and the mixture was stirred at 0° C. for 3 h. The reaction mixture was cooled at −78° C., quenched with MeOH, and then concentrated to dryness. The residue was neutralized with 1 M NH$_3$ in MeOH and then purified on silica gel by flash chromatography (0.5 M NH$_3$ in MeOH/DCM, 1:6), affording (3S,4r,5R)-1-(2,6-difluoro-4-morpholinophenethyl)piperidine-3,4,5-triol as a white solid (0.054 g, 63%). $^1$H NMR (400 MHZ, DMSO-d$_6$) δ 6.72-6.50 (m, 2H), 4.72-4.66 (m, 3H), 3.79-3.61 (m, 4H), 3.28-3.15 (m, 2H), 3.16-3.03 (m, 4H), 2.94-2.74 (m, 3H), 2.61 (t, J=7.5 Hz, 2H), 2.44-2.37 (m, 2H), 1.81 (t, J=10.5 Hz, 2H); ESI MS m/z 359.187 [M+H]$^+$.

Example 13

(3S,4r,5R)-1-(2,6-difluoro-4-(tetrahydro-2H-pyran-4-yl)phenethyl)piperidine-

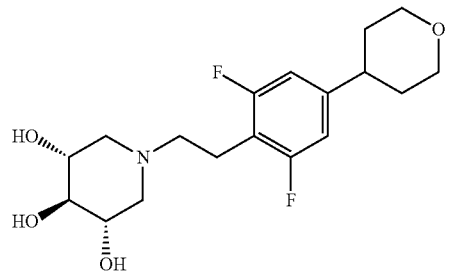 [SMILES: O[C@H]1[C@H](O)CN(CCc2c(F)cc(C3CCOCC3)cc2F)C[C@@H]1O]

Under N₂, a mixture of (3S,4r,5R)-3,4,5-tris(benzyloxy) piperidine (0.25 g, 0.62 mmol), 2-(4-(3,6-dihydro-2H-pyran-4-yl)-2,6-difluorophenyl) acetaldehyde (0.19 g, 0.80 mmol) and NaBH(OAc)₃ (0.21 g, 1.0 mmol) in DCM (15 mL) was stirred at RT for 16 h. The reaction mixture was diluted with satd. aqueous NaHCO₃ (15 mL), and extracted with DCM (2×20 mL). The combined extract was dried over anhydrous Na₂SO₄. After filtration the solvent was evaporated under reduced pressure, and the residue was purified on silica gel by flash chromatography (EtOAc/hexanes, 1:6 to 1:3), affording (3S,4r,5R)-3,4,5-tris(benzyloxy)-1-(4-(3,6-dihydro-2H-pyran-4-yl)-2,6-difluorophenethyl)piperidine as a pale-yellow solid (0.34 g, 88%). ESI MS m/z 626.315 [M+H]⁺.

A mixture of the above material (0.14 g, 0.22 mmol) and Pd(OH)₂/C (20% Pd in weight, 0.075 g, 0.14 mmol) and five drops of concentrated HCl in MeOH/THF (15/5 mL) was stirred under hydrogen at one atmosphere of pressure overnight. The mixture was filtered through a celite cake, and the filtrate was collected and concentrated to dryness. The residue was neutralized with 1 M NH₃ in MeOH and then purified on silica gel by flash chromatography (0.5 M NH₃ MeOH/DCM, 1:6), affording (3S,4r,5R)-1-(2,6-difluoro-4-(tetrahydro-2H-pyran-4-yl)phenethyl)piperidine-3,4,5-triol (0.058 g, 73%) as a white solid. 1H NMR (400 MHZ, DMSO-d₆) δ 7.01-6.89 (m, 2H), 4.75-4.63 (m, 3H), 3.97-3.87 (m, 2H), 3.39 (td, J=11.4, 2.7 Hz, 2H), 3.28-3.16 (m, 2H), 2.96-2.62 (m, 6H), 2.45 (t, J=7.6 Hz, 2H), 1.82 (t, J=10.5 Hz, 2H), 1.75-1.47 (m, 4H); ESI MS m/z 358.183 [M+H]⁺.

Example 14

(3S,4r,5R)-1-(4-(3,5-dimethylisoxazol-4-yl)-2,6-difluorophenethyl)piperidine-

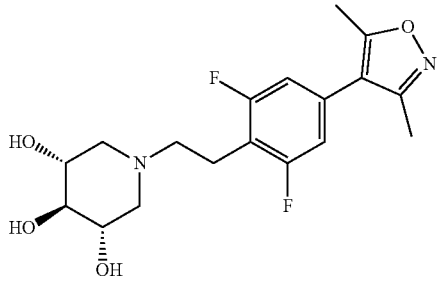 [SMILES: Cc1noc(C)c1-c1cc(F)c(CCN2C[C@@H](O)[C@H](O)[C@@H](O)C2)c(F)c1]

A mixture of (3S,4r,5R)-3,4,5-tris(benzyloxy)-1-(4-bromo-2,6-difluorophenethyl)piperidine (0.15 g, 0.24 mmol), (3,5-dimethylisoxazol-4-yl) boronic acid (0.042 g, 0.30 mmol), K₂CO₃ (0.69 g, 0.50 mmol, in 1 mL water), and Pd(PPh₃)₄ (0.028 g, 0.024 mmol) in 1,4-dioxane (6 mL) was bubbled with Ar for 10 min, and then stirred in a sealed tube at 90° C. for 16 h. After cooling the reaction mixture was diluted with satd. aqueous NaHCO₃ (20 mL). After extraction with EtOAc (2×20 mL) the combined extract was dried over anhydrous Na₂SO₄. After filtration the solvent was evaporated under reduced pressure, and the residue was purified on silica gel by flash chromatography (EtOAc/hexanes, 1:4 to 1:3), affording 4-(3,5-difluoro-4-(2-((3S,4r,5R)-3,4,5-tris(benzyloxy)piperidin-1-yl)ethyl)phenyl)-3,5-dimethylisoxazole as clear oil (0.13 g, 85%). ESI MS m/z 639.403 [M+H]⁺.

At −78° C., and under Ar, to a solution of the above material (0.13 g, 0.20 mmol) in anhydrous DCM (5 mL) was added BCl₃ (1.0 M in DCM, 2.0 mL, 2.0 mmol), and the mixture was stirred at 0° C. for 3 h. The reaction mixture was cooled at −78° C., quenched with MeOH, and then concentrated to dryness. The residue was neutralized with 1 M NH₃ in MeOH and then purified on silica gel by flash chromatography (0.5 M NH₃ in MeOH/DCM, 1:6), affording (3S,4r,5R)-1-(4-(3,5-dimethylisoxazol-4-yl)-2,6-difluorophenethyl)piperidine-3,4,5-triol as a white solid (0.063 g, 85%). 1H NMR (400 MHZ, DMSO-d₆) δ 7.19-7.10 (m, 2H), 4.76-4.65 (m, 3H), 3.24 (tt, J=9.6, 4.8 Hz, 2H), 2.92-2.83 (m, 3H), 2.78 (t, J=7.6 Hz, 2H), 2.55-2.48 (m, 2H), 2.42 (s, 3H), 2.24 (s, 3H), 1.85 (t, J=10.5 Hz, 2H); ESI MS m/z 369.163 [M+H]⁺.

Example 15

(3S,4r,5R)-1-(4-(3,5-dimethyl-1H-pyrazol-4-yl)-2,6-difluorophenethyl)piperidine-3,4,5-triol

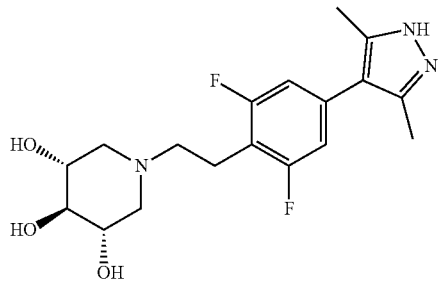 [SMILES: Cc1n[nH]c(C)c1-c1cc(F)c(CCN2C[C@@H](O)[C@H](O)[C@@H](O)C2)c(F)c1]

A mixture of (3S,4r,5R)-3,4,5-tris(benzyloxy)-1-(4-bromo-2,6-difluorophenethyl)piperidine (0.15 g, 0.24 mmol), (3,5-dimethyl-1H-pyrazol-4-yl) boronic acid (0.042 g, 0.30 mmol), K₂CO₃ (0.69 g, 0.50 mmol, in 1 mL water), and Pd(PPh3)4 (0.028 g, 0.024 mmol) in 1,4-dioxane (6 mL) was bubbled with Ar for 10 min, and then stirred in a sealed tube at 90° C. for 16 h. After cooling the reaction mixture was diluted with satd. aqueous NaHCO₃ (20 mL). After extraction with EtOAc (2×20 mL) the combined extract was dried over anhydrous Na₂SO₄. After filtration the solvent was evaporated under reduced pressure, and the residue was purified on silica gel by flash chromatography (EtOAc/hexanes, 2:1 to 5:1), affording (3S,4r,5R)-3,4,5-tris(benzyloxy)-1-(4-(3,5-dimethyl-1H-pyrazol-4-yl)-2,6-difluorophenethyl)piperidine as clear oil (0.048 g, 31%). ESI MS m/z 638.420 [M+H]⁺.

At −78° C., and under Ar, to a solution of the above material (0.048 g, 0.075 mmol) in anhydrous DCM (5 mL) was added BCl₃ (1.0 M in DCM, 1.5 mL, 1.5 mmol), and the mixture was stirred at 0° C. for 3 h. The reaction mixture was cooled at −78° C., quenched with MeOH, and then concentrated to dryness. The residue was neutralized with 1 M NH₃ in MeOH and then purified on silica gel by flash chromatography (0.5 M NH₃ in MeOH/DCM, 1:4), affording (3S,4r,5R)-1-(4-(3,5-dimethyl-1H-pyrazol-4-yl)-2,6-difluorophenethyl)piperidine-3,4,5-triol as a white solid (0.016 g, 58%). 1H NMR (400 MHZ, CD₃OD) δ 6.91-6.83 (m, 2H), 3.51 (ddd, J=10.0, 8.7, 4.6 Hz, 2H), 3.18-3.01 (m, 3H), 2.91 (t, J=7.7 Hz, 2H), 2.68 (dd, J=9.1, 6.3 Hz, 2H), 2.26 (s, 6H), 2.08 (t, J=10.6 Hz, 2H); ESI MS m/z 368.178 [M+H]⁺.

Example 16

(3S,4r,5R)-1-(1-(3-chloro-2-fluorophenyl)propan-2-yl)piperidine-3,4,5-triol

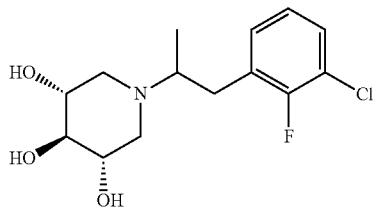 [SMILES: CC(Cc1cccc(Cl)c1F)N1C[C@@H](O)[C@H](O)[C@@H](O)C1]

To a stirred solution of 3-chloro-2-fluorophenylacetic acid (1.0 g, 5.30 mmol) in pyridine (5 mL) was added acetic anhydride (5 mL) and heated at 125° C. for 5 h. The reaction was quenched with water (50 mL) at 0° C. The mixture was extracted with EtOAc (3×30 mL). The combined organic layer was washed with water (2×20 mL), separated, and dried over $Na_2SO_4$. After filtration, the solvent was evaporated under reduced pressure, and the residue was purified on silica gel by flash chromatography affording 1-(3-chloro-2-fluorophenyl)propan-2-one as an oil (347 mg, 35%). $^1$H NMR (400 MHZ, $CDCl_3$) δ 7.35 (td, J=7.1, 2.7 Hz, 1H), 7.14-7.03 (m, 2H), 3.79 (d, J=1.5 Hz, 2H), 2.26 (s, 3H).

To a stirred solution of (3S,4r,5R)-3,4,5-tris(benzyloxy)piperidine (150 mg, 0.37 mmol) and 1-(3-chloro-2-fluorophenyl)propan-2-one (138 mg, 0.74 mmol) in anhydrous DCM (5 mL) was added HOAc (5 drops) and stirred for 30 min. $NaBH(OAc)_3$ (157 mg, 0.74 mmol) was added, and the resulting mixture was stirred at RT for 18 h. The reaction was quenched with satd. aqueous $NaHCO_3$ at 0° C. The mixture was extracted with EtOAc (3×30 mL). The combined organic layer was washed with water (2×20 mL), separated, and dried over $Na_2SO_4$. After filtration, the solvent was evaporated under reduced pressure, and the residue was purified on silica gel by flash chromatography affording (3S,4r,5R)-3,4,5-tris(benzyloxy)-1-(1-(3-chloro-2-fluorophenyl)propan-2-yl)piperidine as an oil (43 mg, 20%). ESI MS m/z [M+H]$^+$574.26.

To a stirred solution of the above material (40 mg, 0.07 mmol) in anhydrous DCM (5 mL) was added $BCl_3$ (1M in DCM, 0.35 mL, 0.35 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, after which solvent was removed under vacuum. The residue was purified on silica gel by flash chromatography to give (3S,4r,5R)-1-(1-(3-chloro-2-fluorophenyl)propan-2-yl)piperidine-3,4,5-triol as a white solid (16 mg, 75%). $^1$H NMR (400 MHZ, $CD_3OD$) δ 7.31 (ddd, J=8.4, 7.1, 1.7 Hz, 1H), 7.20 (ddd, J=8.1, 6.6, 1.7 Hz, 1H), 7.08 (td, J=7.8, 1.1 Hz, 1H), 3.46-3.34 (m, 2H), 3.07 (t, J=8.8 Hz, 1H), 3.03-2.92 (m, 3H), 2.90-2.83 (m, 1H), 2.66-2.56 (m, 1H), 2.27 (t, J=10.4 Hz, 1H), 2.20 (t, J=10.4 Hz, 1H), 1.02 (d, J=6.3 Hz, 3H); ESI MS m/z [M+H]$^+$ 304.15.

Example 17

(3S,4r,5R)-1-(4-(3-chloro-2-fluorophenyl)butan-2-yl)piperidine-3,4,5-triol

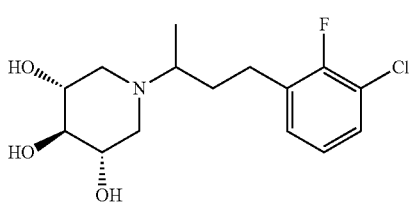 [SMILES: CC(CCc1cccc(Cl)c1F)N1C[C@@H](O)[C@H](O)[C@@H](O)C1]

To a stirred solution of 3-chloro-2-fluorobenzyl bromide (1.0 g, 4.47 mmol) and acetylacetone (0.50 mL, 4.92 mmol) in anhydrous EtOH (20 mL) was added $K_2CO_3$ (618 mg, 4.47 mmol) and the mixture was refluxed for 18 h. The reaction was quenched with water (50 mL) at 0° C. The mixture was extracted with EtOAc (3×30 mL). The combined organic layer was washed with water (2×20 mL), separated, and dried over $Na_2SO_4$. After filtration, the solvent was evaporated under reduced pressure, and the residue was purified on silica gel by flash chromatography affording 4-(3-chloro-2-fluorophenyl)butan-2-one as an oil (595 mg, 66%). $^1$H NMR (400 MHZ, $CDCl_3$) δ 7.28-7.23 (m, 1H), 7.16-7.09 (m, 1H), 7.01 (td, J=7.8, 1.1 Hz, 1H), 2.96 (t, J=7.5 Hz, 2H), 2.79 (t, J=7.5 Hz, 2H), 2.17 (s, 3H).

To a stirred solution of (3S,4r,5R)-3,4,5-tris(benzyloxy)piperidine (150 mg, 0.37 mmol) and 4-(3-chloro-2-fluorophenyl)butan-2-one (138 mg, 0.74 mmol) in anhydrous DCM (5 mL) was added HOAc (5 drops) and the mixture was stirred for 30 min. $NaBH(OAc)_3$ (157 mg, 0.74 mmol) was added, and the resulting mixture was stirred at RT for 18 h. The reaction was quenched with satd. aqueous $NaHCO_3$ at 0° C. The mixture was extracted with EtOAc (3×30 mL). The combined organic layer was washed with water (2×20 mL), separated, and dried over $Na_2SO_4$. After filtration, the solvent was evaporated under reduced pressure, and the residue was purified on silica gel by flash chromatography affording (3S,4r,5R)-3,4,5-tris(benzyloxy)-1-(4-(3-chloro-2-fluorophenyl)butan-2-yl)piperidine as an oil (107 mg, 49%). ESI MS m/z 588.27 [M+H]$^+$.

To a stirred solution of the above material (107 mg, 0.18 mmol) in anhydrous DCM (5 mL) was added $BCl_3$ (1M in DCM, 0.97 mL, 0.97 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, after which solvent was removed under vacuum. The residue was purified on silica gel by flash chromatography to give (3S,4r,5R)-1-(4-(3-chloro-2-fluorophenyl)butan-2-yl)piperidine-3,4,5-triol as a white solid (34 mg, 59%). $^1$H NMR (400 MHZ, $CD_3OD$) δ 7.29 (ddd, J=8.4, 7.1, 1.7 Hz, 1H), 7.21 (td, J=7.2, 6.6, 1.7 Hz, 1H), 7.08 (td, J=7.8, 1.1 Hz, 1H), 3.55-3.38 (m, 2H), 3.07 (t, J=8.8 Hz, 1H), 2.90-2.86 (m, 1H), 2.82-2.60 (m, 4H), 2.28 (t, J=10.4 Hz, 1H), 2.03 (t, J=10.5 Hz, 1H), 1.88-1.74 (m, 1H), 1.66-1.53 (m, 1H), 1.02 (d, J=6.6 Hz, 3H); ESI MS m/z 318.13 [M+H]$^+$.

Example 18

(3S,4R,5R)-1-(((R)-1-(o-tolyl)pyrrolidin-3-yl)methyl)piperidine-3,4,5-triol

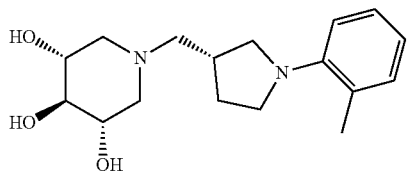 [SMILES: Cc1ccccc1N1CC[C@H](CN2C[C@@H](O)[C@H](O)[C@@H](O)C2)C1]

To a stirred solution of (2R,3R,4R,5S)-3,4,5-tris(benzyloxy)-2-methyl-1-((S)-pyrrolidin-3-ylmethyl)piperidine (150 mg, 0.31 mmol) and 2-bromotoluene (106 mg, 0.62 mmol) in toluene (5 mL) was added $Pd_2$(dba)3 (28 mg, 0.031 mmol) and RuPhos (29 mg, 0.062 mmol), followed by $Cs_2CO_3$ (304 mg, 1.24 mmol) under Ar. The mixture was stirred at 90° C. for 18 h, and then water was added at 0° C. The mixture was extracted with EtOAc (2×20 mL). The combined organic layer was washed with water (2×10 mL), separated, and dried over $Na_2SO_4$. After filtration the solvent was evaporated under reduced pressure, and the residue was purified on silica gel by flash chromatography affording (3S,4R,5R)-3,4,5-tris(benzyloxy)-1-(((R)-1-(o-tolyl)pyrrolidin-3-yl)methyl)piperidine as an oil (122 mg, 68%). ESI MS m/z [M+H]+577.35.

To a stirred solution of the above material (122 mg, 0.21 mmol) in anhydrous DCM (5 mL) was added $BCl_3$ (1M in DCM, 1.06 mL, 1.06 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, after which solvent was removed under vacuum. The residue was purified on silica gel by flash chromatography to give (3S,4R,5R)-1-(((R)-1-(o-tolyl)pyrrolidin-3-yl)methyl)piperidine-3,4,5-triol as a white solid (49 mg, 76%). $^1$H NMR (400 MHZ, DMSO-$d_6$) δ 7.09-7.02 (m, 2H), 6.84 (d, J=7.7 Hz, 1H), 6.77 (td, J=7.3, 1.1 Hz, 1H), 4.72-4.67 (m, 3H), 3.30-3.22 (m, 2H), 3.18-3.03 (m, 3H), 2.96-2.74 (m, 4H), 2.46-2.29 (m, 3H), 2.23 (s, 3H), 2.04-1.93 (m, 1H), 1.84-1.70 (m, 2H), 1.61-1.49 (m, 1H); ESI MS m/z [M+H]+307.21.

Example 19

(3S,4R,5R)-1-(((R)-1-(3-(trifluoromethyl)pyridin-2-yl)pyrrolidin-3-yl)methyl)piperidine-3,4,5-triol

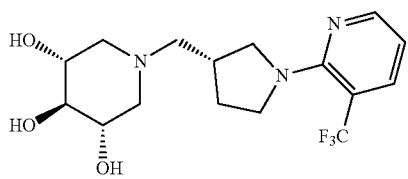 [SMILES: O[C@H]1[C@H](O)CN(C[C@H]2CCN(c3ncccc3C(F)(F)F)C2)C[C@@H]1O]

To a stirred solution of (2R,3R,4R,5S)-3,4,5-tris(benzyloxy)-2-methyl-1-((S)-pyrrolidin-3-ylmethyl)piperidine (150 mg, 0.31 mmol) and 2-chloro-3-(trifluoromethyl)pyridine (113 mg, 0.62 mmol) in toluene (5 mL) was added $Pd_2$(dba)3 (28 mg, 0.031 mmol) and RuPhos (29 mg, 0.062 mmol), followed by $Cs_2CO_3$ (304 mg, 1.24 mmol) under Ar. The mixture was stirred at 90° C. for 18 h, and then water was added at 0° C. The mixture was extracted with EtOAc (2×20 mL). The combined organic layer was washed with water (2×10 mL), separated, and dried over $Na_2SO_4$. After filtration the solvent was evaporated under reduced pressure, and the residue was purified on silica gel by flash chromatography affording 3-(trifluoromethyl)-2-((R)-3-(((3S,4R,5R)-3,4,5-tris(benzyloxy)piperidin-1-yl)methyl)pyrrolidin-1-yl)pyridine as an oil (100 mg, 51%). ESI MS m/z [M+H]+ 632.31.

To a stirred solution of the above material (100 mg, 0.16 mmol) in anhydrous DCM (5 mL) was added BCl3 (1M in DCM, 0.80 mL, 0.80 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, after which solvent was removed under vacuum. The residue was purified on silica gel by flash chromatography to give (3S,4R,5R)-1-(((R)-1-(3-(trifluoromethyl)pyridin-2-yl)pyrrolidin-3-yl)methyl)piperidine-3,4,5-triol as a white solid (29 mg, 50%). $^1$H NMR (400 MHZ, $CD_3OD$) δ 8.26 (dd, J=4.7, 1.8 Hz, 1H), 7.88 (dd, J=7.8, 1.9 Hz, 1H), 6.75 (dd, J=7.8, 4.7 Hz, 1H), 3.74-3.60 (m, 3H), 3.57-3.47 (m, 2H), 3.41-3.34 (m, 1H), 3.11 (t, J=8.8 Hz, 1H), 3.07-2.94 (m, 2H), 2.59-2.31 (m, 3H), 2.18-2.07 (m, 1H), 2.04-1.91 (m, 2H), 1.78-1.65 (m, 1H); ESI MS m/z [M+H]+ 362.17.

Example 20

(3S,4R,5R)-1-(((R)-1-(4-(trifluoromethyl)pyridin-3-yl)pyrrolidin-3-yl)methyl)piperidine-3,4,5-triol

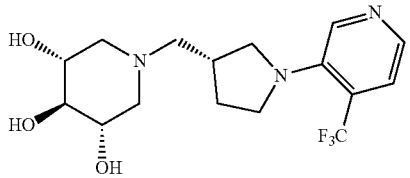 [SMILES: O[C@H]1[C@H](O)CN(C[C@H]2CCN(c3cnccc3C(F)(F)F)C2)C[C@@H]1O]

To a stirred solution of (2R,3R,4R,5S)-3,4,5-tris(benzyloxy)-2-methyl-1-((S)-pyrrolidin-3-ylmethyl)piperidine (150 mg, 0.31 mmol) and 3-bromo-4-(trifluoromethyl)pyridine (139 mg, 0.62 mmol) in toluene (5 mL) was added $Pd_2$(dba)3 (28 mg, 0.031 mmol) and RuPhos (29 mg, 0.062 mmol), followed by $Cs_2CO_3$ (304 mg, 1.24 mmol) under Ar. The mixture was stirred at 90° C. for 18 h, and then water was added at 0° C. The mixture was extracted with EtOAc (2×20 mL). The combined organic layer was washed with water (2×10 mL), separated, and dried over $Na_2SO_4$. After filtration the solvent was evaporated under reduced pressure, and the residue was purified on silica gel by flash chromatography affording 4-(trifluoromethyl)-3-((R)-3-(((3S,4R,5R)-3,4,5-tris(benzyloxy)piperidin-1-yl)methyl)pyrrolidin-1-yl)pyridine as an oil (115 mg, 59%). ESI MS m/z [M+H]+ 632.31.

To a stirred solution of the above material (115 mg, 0.18 mmol) in anhydrous DCM (5 mL) was added BCl3 (1M in DCM, 0.91 mL, 0.91 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, after which solvent was removed under vacuum. The residue was purified on silica gel by flash chromatography to give (3S,4R,5R)-1-(((R)-1-(4-(trifluoromethyl)pyridin-3-yl)pyrrolidin-3-yl)methyl)piperidine-3,4,5-triol as a white solid (38 mg, 58%). $^1$H NMR (400 MHZ, CD$_3$OD) δ 8.33 (s, 1H), 8.01 (d, J=5.2 Hz, 1H), 7.50 (d, J=5.2 Hz, 1H), 3.60-3.43 (m, 5H), 3.32-3.25 (m, 1H), 3.12 (t, J=8.8 Hz, 1H), 3.08-2.94 (m, 2H), 2.64-2.53 (m, 1H), 2.52-2.46 (m, 2H), 2.23-2.11 (m, 1H), 2.06-1.92 (m, 2H), 1.82-1.70 (m, 1H); ESI MS m/z [M+H]$^+$362.17.

Example 21

(3S,4R,5R)-1-(((R)-1-(4-(trifluoromethyl)thiazol-2-yl)pyrrolidin-3-yl)methyl)piperidine-3,4,5-triol

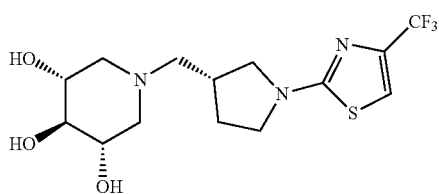 [SMILES: O[C@H]1[C@H](O)CN(C[C@H]2CCN(c3nc(C(F)(F)F)cs3)C2)C[C@@H]1O]

To a stirred solution of (2R,3R,4R,5S)-3,4,5-tris(benzyloxy)-2-methyl-1-((S)-pyrrolidin-3-ylmethyl)piperidine (100 mg, 0.21 mmol) and 2-bromo-5-(trifluoromethyl)thiazole (72 mg, 0.31 mmol) in DMA (3 mL) was added Cs$_2$CO$_3$ (276 mg, 0.84 mmol). The mixture was stirred at 70° C. for 24 h, and then water was added at 0° C. The mixture was extracted with EtOAc (2×20 mL). The combined organic layer was washed with water (2×10 mL), separated, and dried over Na$_2$SO$_4$. After filtration the solvent was evaporated under reduced pressure, and the residue was purified on silica gel by flash chromatography affording 5-(trifluoromethyl)-2-((R)-3-(((3S,4R,5R)-3,4,5-tris(benzyloxy)piperidin-1-yl)methyl)pyrrolidin-1-yl) thiazole as an oil (68 mg, 51%). ESI MS m/z [M+H]$^+$. 638.27.

To a stirred solution of the above material (68 mg, 0.11 mmol) in anhydrous DCM (5 mL) was added BCl$_3$ (1M in DCM, 0.55 mL, 0.55 mmol) at −78° C. under N$_2$. The mixture was stirred at 0° C. for 2 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, after which solvent was removed under vacuum. The residue was purified on silica gel by flash chromatography to give (3S,4R,5R)-1-(((R)-1-(4-(trifluoromethyl)thiazol-2-yl)pyrrolidin-3-yl)methyl)piperidine-3,4,5-triol as a white solid (19 mg, 47%). $^1$H NMR (400 MHZ, CD$_3$OD) δ 7.15 (q, J=1.1 Hz, 1H), 3.69-3.60 (m, 1H), 3.60-3.43 (m, 4H), 3.23 (dd, J=10.1, 7.1 Hz, 1H), 3.12 (t, J=8.8 Hz, 1H), 3.09-2.95 (m, 2H), 2.76-2.63 (m, 1H), 2.56-2.44 (m, 2H), 2.29-2.18 (m, 1H), 2.01 (t, J=10.5 Hz, 1H), 1.95 (t, J=10.5 Hz, 1H), 1.90-1.78 (m, 1H); ESI MS m/z [M+H]$^+$368.13.

Example 22

(3S,4R,5R)-1-(((R)-1-(benzo[d]oxazol-2-yl)pyrrolidin-3-yl)methyl)piperidine-3,4,5-triol

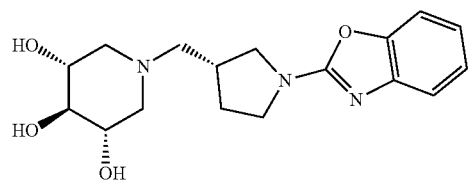 [SMILES: O[C@H]1[C@H](O)CN(C[C@H]2CCN(c3nc4ccccc4o3)C2)C[C@@H]1O]

To a stirred solution of (2R,3R,4R,5S)-3,4,5-tris(benzyloxy)-2-methyl-1-((S)-pyrrolidin-3-ylmethyl)piperidine (108 mg, 0.22 mmol) and 2-chlorobenzo[d]oxazole (68 mg, 0.44 mmol) in DMA (3 mL) was added Cs$_2$CO$_3$ (289 mg, 0.88 mmol). The mixture was stirred at 80° C. for 24 h, and then water was added at 0° C. The mixture was extracted with EtOAc (2×20 mL). The combined organic layer was washed with water (2×10 mL), separated, and dried over Na$_2$SO$_4$. After filtration the solvent was evaporated under reduced pressure, and the residue was purified on silica gel by flash chromatography affording 2-((R)-3-(((3S,4R,5R)-3,4,5-tris(benzyloxy)piperidin-1-yl)methyl)pyrrolidin-1-yl) benzo[d]oxazole as an oil (128 mg, 96%). ESI MS m/z [M+H]$^+$604.31.

To a stirred solution of the above material (128 mg, 0.21 mmol) in anhydrous DCM (5 mL) was added BCl$_3$ (1M in DCM, 1.06 mL, 1.06 mmol) at −78° C. under N$_2$. The mixture was stirred at 0° C. for 2 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, after which solvent was removed under vacuum. The residue was purified on silica gel by flash chromatography to give (3S,4R,5R)-1-(((R)-1-(benzo[d]oxazol-2-yl)pyrrolidin-3-yl)methyl)piperidine-3,4,5-triol as a white solid (27 mg, 39%). $^1$H NMR (400 MHZ, DMSO-d$_6$) δ 7.38 (dd, J=7.9, 1.0 Hz, 1H), 7.27-7.22 (m, 1H), 7.12 (td, J=7.6, 1.1 Hz, 1H), 6.97 (td, J=7.7, 1.2 Hz, 1H), 4.76-4.70 (m, 3H), 3.71-3.60 (m, 2H), 3.57-3.49 (m, 1H), 3.32-3.22 (m, 3H), 2.93-2.85 (m, 2H), 2.84-2.75 (m, 1H), 2.60-2.52 (m, 1H), 2.39-2.30 (m, 2H), 2.11-2.02 (m, 1H), 1.87-1.65 (m, 3H); ESI MS m/z [M+H]$^+$334.18.

Example 23

(3S,4R,5R)-1-(((R)-1-(benzo[d]thiazol-2-yl)pyrroli-din-3-yl)methyl)piperidine-3,4,5-triol

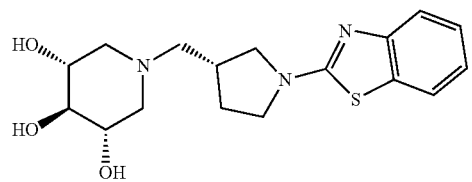 [SMILES: O[C@H]1[C@H](O)CN(C[C@H]2CCN(c3nc4ccccc4s3)C2)C[C@@H]1O]

To a stirred solution of (2R,3R,4R,5S)-3,4,5-tris(benzyloxy)-2-methyl-1-((S)-pyrrolidin-3-ylmethyl)piperidine (100 mg, 0.21 mmol) and 2-bromobenzo[d]thiazole (66 mg, 0.31 mmol) in DMA (3 mL) was added Cs$_2$CO$_3$ (276 mg, 0.84 mmol). The mixture was stirred at 70° C. for 24 h, and then water was added at 0° C. The mixture was extracted with EtOAc (2×20 mL). The combined organic layer was washed with water (2×10 mL), separated, and dried over Na₂SO₄. After filtration the solvent was evaporated under reduced pressure, and the residue was purified on silica gel by flash chromatography affording 2-((R)-3-(((3S,4R,5R)-3,4,5-tris(benzyloxy)piperidin-1-yl)methyl)pyrrolidin-1-yl)benzo[d]thiazole as an oil (68 mg, 51%). ESI MS m/z [M+H]⁺620.30.

To a stirred solution of the above material (68 mg, 0.11 mmol) in anhydrous DCM (5 mL) was added BCl₃ (1M in DCM, 0.55 mL, 0.55 mmol) at −78° C. under N₂. The mixture was stirred at 0° C. for 2 h before being quenched with anhydrous MeOH (1 mL). The mixture was stirred at RT for 10 min. Solvent was removed under vacuum, the residue was dissolved in 1M NH₃ in MeOH (10 mL) and stirred for another 10 min, after which solvent was removed under vacuum. The residue was purified on silica gel by flash chromatography to give (3S,4R,5R)-1-(((R)-1-(benzo[d]thiazol-2-yl)pyrrolidin-3-yl)methyl)piperidine-3,4,5-triol as a white solid (19 mg, 49%). ¹H NMR (400 MHZ, CD₃OD) δ 7.68-7.62 (m, 1H), 7.49 (dd, J=8.4, 1.0 Hz, 1H), 7.30 (ddd, J=8.3, 7.3, 1.3 Hz, 1H), 7.12-7.04 (m, 1H), 3.77-3.63 (m, 2H), 3.62-3.48 (m, 3H), 3.36-3.29 (m, 1H), 3.13 (t, J=8.8 Hz, 1H), 3.09-2.95 (m, 2H), 2.76-2.63 (m, 1H), 2.56-2.44 (m, 2H), 2.29-2.18 (m, 1H), 2.02 (t, J=10.5 Hz, 1H), 1.96 (t, J=10.5 Hz, 1H), 1.92-1.80 (m, 1H); ESI MS m/z [M+H]⁺ 350.15.

Example 24

(3S,4S,5R)-1-(((S)-1-(3-(trifluoromethyl)pyridin-2-yl)pyrrolidin-3-yl)methyl)piperidine-3,4,5-triol

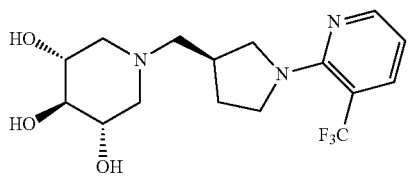 [SMILES: O[C@H]1[C@H](O)CN(C[C@@H]2CCN(c3ncccc3C(F)(F)F)C2)C[C@@H]1O]

Under Ar, a mixture of (3S,4r,5R)-3,4,5-tris(benzyloxy)piperidine (2.02 g, 5.00 mmol), (R)-tert-butyl 3-formylpyrrolidine-1-carboxylate (1.60 g, 8.03 mmol) and NaBH(OAc)₃ (2.12 g, 10.0 mmol) in DCM (40 mL) was stirred at RT for 16 h. The reaction mixture was diluted with satd. aqueous NaHCO₃ (40 mL), and extracted with DCM (2×30 mL). The combined extract was dried over anhydrous Na₂SO₄. After filtration the solvent was evaporated under reduced pressure, and the residue was purified on silica gel by flash chromatography (EtOAc/hexanes, 1:6 to 1:3), affording(S)-tert-butyl 3-(((3S,4S,5R)-3,4,5-tris(benzyloxy)piperidin-1-yl)methyl)pyrrolidine-1-carboxylate as a pale-yellow oil (2.7 g, 92%). ESI MS m/z 587.352 [M+H]⁺.

To a solution of the above material (2.7 g, 4.6 mmol) in DCM (30 mL) was added TFA (8 mL), and the mixture was stirred at RT for 16 h. The reaction mixture was concentrated under reduced pressure, and the residue was diluted with satd. aqueous NaHCO₃ (50 mL). After extraction with DCM (3×50 mL) the combined extract was dried over anhydrous Na₂SO₄. After filtration the solvent was evaporated under reduced pressure, and the residue was purified on silica gel by flash chromatography (1 M NH₃ in MeOH/DCM, 1:10), affording (3S,4R,5R)-3,4,5-tris(benzyloxy)-1-((R)-pyrrolidin-3-ylmethyl)piperidine as a pale-yellow oil (2.2 g, 98%). ESI MS m/z 487.298 [M+H]⁺.

A mixture of (3S,4R,5R)-3,4,5-tris(benzyloxy)-1-((R)-pyrrolidin-3-ylmethyl)piperidine (0.25 g, 0.51 mmol), 2-chloro-3-(trifluoromethyl)pyridine (0.18 g, 1.0 mmol) and DIPEA (0.26 g, 2.0 mmol) in anhydrous DMF (6 mL) was stirred in a sealed tube at 100° C. for 3 days. After cooling the mixture was diluted with satd. aqueous NaHCO₃ (30 mL) and extracted with EtOAc (2×30 mL). The combined extract was washed with brine (20 mL) and then dried over anhydrous Na₂SO₄. After filtration the solvent was evaporated under reduced pressure, and the residue was purified on silica gel by flash chromatography (EtOAc/hexanes, 1:5 to 1:3), affording (3S,4S,5R)-1-(((S)-1-(3-(trifluoromethyl)pyridin-2-yl)pyrrolidin-3-yl)methyl)piperidine-3,4,5-triol as a pale-yellow oil (0.26 g, 80%). ESI MS m/z 632.301 [M+H]⁺.

At −78° C., and under Ar, to a solution of the above material (0.23 g, 0.36 mmol) in anhydrous DCM (8 mL) was added BCl₃ (1.0 M in DCM, 3.0 mL, 3.0 mmol), and the mixture was stirred at 0° C. for 3 h. The reaction mixture was cooled at −78° C., quenched with MeOH, and concentrated to dryness. The residue was neutralized with 1 M NH₃ in MeOH and subsequently purified on silica gel by flash column chromatography (0.5 M NH₃ in MeOH/DCM, 1:7), affording (3S,4S,5R)-1-(((S)-1-(4-(trifluoromethyl)pyridin-3-yl)pyrrolidin-3-yl)methyl)piperidine-3,4,5-triol as a white solid (0.102 g, 78%). ¹H NMR (500 MHz, DMSO-d₆) δ 8.32 (dd, J=4.6, 1.8 Hz, 1H), 7.90 (dd, J=7.8, 1.8 Hz, 1H), 6.77 (dd, J=7.8, 4.6 Hz, 1H), 4.73 (d, J=4.4 Hz, 1H), 4.70 (dd, J=4.9, 1.3 Hz, 2H), 3.60-3.47 (m, 3H), 3.30-3.19 (m, 3H), 2.96-2.81 (m, 2H), 2.81-2.72 (m, 1H), 2.47-2.38 (m, 1H), 2.38-2.20 (m, 2H), 2.00 (dq, J=11.8, 5.9 Hz, 1H), 1.77 (dt, J=26.1, 10.4 Hz, 2H), 1.64-1.54 (m, 1H); ESI MS m/z 362.167 [M+H]⁺.

Example 25

(3S,4S,5R)-1-(((S)-1-(4-(trifluoromethyl)pyridin-3-yl)pyrrolidin-3-yl)methyl)piperidine-3,4,5-triol

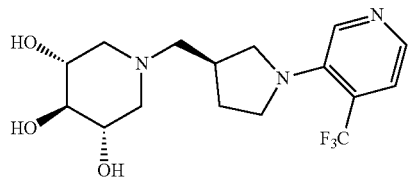 [SMILES: O[C@H]1[C@H](O)CN(C[C@@H]2CCN(c3cnccc3C(F)(F)F)C2)C[C@@H]1O]

A mixture of (3S,4R,5R)-3,4,5-tris(benzyloxy)-1-((R)-pyrrolidin-3-ylmethyl)piperidine (0.14 g, 0.28 mmol), 3-bromo-4-(trifluoromethyl)pyridine (0.11 g, 0.50 mmol), Cs₂CO₃ (0.26 g, 0.80 mmol), RuPhos (0.026 g, 0.056 mmol) and Pd₂(dba)₃ (0.026 g, 0.028 mmol) in anhydrous toluene (6 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:2 to 1:1), affording 4-(trifluoromethyl)-3-(((S)-3-(((3S,4S,5R)-3,4,5-tris(benzyloxy)piperidin-1-yl)methyl)pyrrolidin-1-yl)pyridine as a pale-yellow oil (0.15 g, 85%). ESI MS m/z 632.315 [M+H]⁺.

At −78° C., and under Ar, to a solution of the above material (0.14 g, 0.22 mmol) in anhydrous DCM (6 mL) was added BCl₃ (1.0 M in DCM, 2.0 mL, 2.0 mmol), and the mixture was stirred at 0° C. for 3 h. The reaction mixture was cooled at −78° C., quenched with MeOH, and concentrated to dryness. The residue was neutralized with 1 M NH₃ in MeOH and subsequently purified on silica gel by flash column chromatography (0.5 M NH₃ in MeOH/DCM, 1:6), affording (3S,4S,5R)-1-(((S)-1-(4-(trifluoromethyl)pyridin-3-yl)pyrrolidin-3-yl)methyl)piperidine-3,4,5-triol as a white solid (0.033 g, 41%). $^1$H NMR (400 MHz, DMSO-d₆) δ 8.37 (s, 1H), 8.05 (d, J=5.1 Hz, 1H), 7.46 (d, J=5.1 Hz, 1H), 4.75-4.65 (m, 3H), 3.52-3.38 (m, 3H), 3.35-3.20 (m, 2H), 3.20-3.14 (m, 1H), 2.95-2.85 (m, 3H), 2.50-2.40 (m, 1H), 2.40-2.28 (m, 2H), 2.09-1.98 (m, 1H), 1.85-1.70 (m, 2H), 1.70-1.60 (m, 1H); ESI MS m/z 362.166 [M+H]⁺.

Example 26

(3S,4S,5R)-1-(((S)-1-(4-(trifluoromethyl)pyrimidin-5-yl)pyrrolidin-3-yl)methyl)piperidine-3,4,5-triol

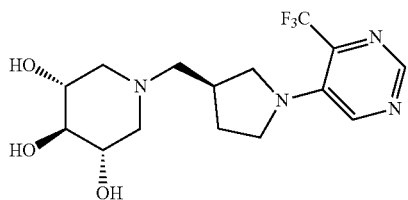 [SMILES: O[C@H]1[C@H](O)CN(C[C@@H]2CCN(c3cncnc3C(F)(F)F)C2)C[C@@H]1O]

A mixture of (3S,4R,5R)-3,4,5-tris(benzyloxy)-1-((R)-pyrrolidin-3-ylmethyl)piperidine (0.20 g, 0.41 mmol), 5-bromo-4-(trifluoromethyl)pyrimidine (0.12 g, 0.53 mmol), Cs₂CO₃ (0.30 g, 0.92 mmol), RuPhos (0.035 g, 0.075 mmol) and Pd₂(dba)₃ (0.035 g, 0.038 mmol) in anhydrous toluene (8 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:4 to 1:2), affording 4-(trifluoromethyl)-5-((S)-3-(((3S,4S,5R)-3,4,5-tris(benzyloxy)piperidin-1-yl)methyl)pyrrolidin-1-yl)pyrimidine as a pale-yellow oil (0.16 g, 62%). ESI MS m/z 633.298 [M+H]⁺.

At −78° C., and under Ar, to a solution of the above material (0.16 g, 0.25 mmol) in anhydrous DCM (8 mL) was added BCl₃ (1.0 M in DCM, 2.0 mL, 2.0 mmol), and the mixture was stirred at 0° C. for 3 h. The reaction mixture was cooled at −78° C., quenched with MeOH, and concentrated to dryness. The residue was neutralized with 1 M NH₃ in MeOH and subsequently purified on silica gel by flash column chromatography (0.5 M NH₃ in MeOH/DCM, 1:5), affording (3S,4S,5R)-1-(((S)-1-(4-(trifluoromethyl)pyrimidin-5-yl)pyrrolidin-3-yl)methyl)piperidine-3,4,5-triol as a white solid (0.030 g, 33%). $^1$H NMR (400 MHz, DMSO-d₆) δ 8.59 (s, 1H), 8.58 (s, 1H), 4.82-4.62 (m, 3H), 3.51-3.41 (m, 3H), 3.35-3.15 (m, 3H), 2.98-2.70 (m, 3H), 2.50-2.40 (m, 1H), 2.40-2.24 (m, 2H), 2.10-1.98 (m, 1H), 1.90-1.58 (m, 3H); ESI MS m/z 363.159 [M+H]⁺.

Example 27

(3S,4S,5R)-1-(((S)-1-(4-(trifluoromethyl)thiazol-2-yl)pyrrolidin-3-yl)methyl)piperidine-3,4,5-triol

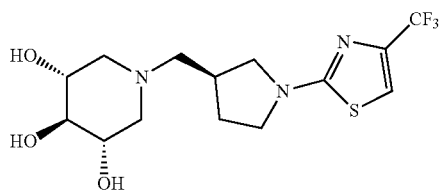 [SMILES: O[C@H]1[C@H](O)CN(C[C@@H]2CCN(c3nc(C(F)(F)F)cs3)C2)C[C@@H]1O]

A mixture of (3S,4R,5R)-3,4,5-tris(benzyloxy)-1-((R)-pyrrolidin-3-ylmethyl)piperidine (0.19 g, 0.39 mmol), 2-bromo-4-(trifluoromethyl)thiazole (0.12 g, 0.52 mmol), Cs₂CO₃ (0.30 g, 0.92 mmol), RuPhos (0.035 g, 0.075 mmol) and Pd₂(dba)₃ (0.035 g, 0.038 mmol) in anhydrous toluene (8 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:4 to 1:3), affording 4-(trifluoromethyl)-2-((S)-3-(((3S,4S,5R)-3,4,5-tris(benzyloxy)piperidin-1-yl)methyl)pyrrolidin-1-yl) thiazole as a pale-yellow oil (0.20 g, 80%). ESI MS m/z 638.262 [M+H]⁺.

At −78° C., and under Ar, to a solution of the above material (0.20 g, 0.31 mmol) in anhydrous DCM (8 mL) was added BCl₃ (1.0 M in DCM, 2.0 mL, 2.0 mmol), and the mixture was stirred at 0° C. for 3 h. The reaction mixture was cooled at −78° C., quenched with MeOH, and concentrated to dryness. The residue was neutralized with 1 M NH₃ in MeOH and subsequently purified on silica gel by flash column chromatography (0.5 M NH₃ in MeOH/DCM, 1:6), affording (3S,4S,5R)-1-(((S)-1-(4-(trifluoromethyl)thiazol-2-yl)pyrrolidin-3-yl)methyl)piperidine-3,4,5-triol as a white solid (0.078 g, 68%). $^1$H NMR (400 MHz, DMSO-d₆) δ 7.41 (t, J=1.2 Hz, 1H), 4.78-4.67 (m, 3H), 3.57-3.41 (m, 2H), 3.41-3.19 (m, 3H), 3.09 (dd, J=10.0, 6.9 Hz, 1H), 2.92-2.75 (m, 3H), 2.63-2.51 (m, 1H), 2.33 (d, J=7.5 Hz, 2H), 2.07 (td, J=12.0, 6.8 Hz, 1H), 1.87-1.52 (m, 3H); ESI MS m/z 368.123 [M+H]⁺.

Example 28

(3S,4S,5R)-1-(((S)-1-(benzo[d]thiazol-4-yl)pyrrolidin-3-yl)methyl)piperidine-3,4,5-triol

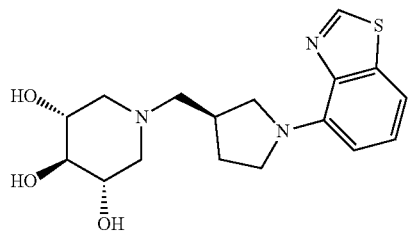 [SMILES: O[C@H]1[C@H](O)CN(C[C@@H]2CCN(c3cccc4scnc34)C2)C[C@@H]1O]

A mixture of (3S,4R,5R)-3,4,5-tris(benzyloxy)-1-((R)-pyrrolidin-3-ylmethyl)piperidine (0.14 g, 0.28 mmol), 4-bromobenzo[d]thiazole (0.12 g, 0.56 mmol), Cs₂CO₃

(0.26 g, 0.80 mmol), RuPhos (0.026 g, 0.056 mmol) and Pd$_2$(dba)$_3$ (0.026 g, 0.028 mmol) in anhydrous toluene (6 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:5 to 1:3), affording 4-((S)-3-(((3S,4S,5R)-3,4,5-tris(benzyloxy)piperidin-1-yl)methyl)pyrrolidin-1-yl)benzo[d]thiazole as yellow oil (0.17 g, 98%). ESI MS m/z 620.295 [M+H]$^+$.

At −78° C., and under Ar, to a solution of the above material (0.16 g, 0.26 mmol) in anhydrous DCM (8 mL) was added BCl$_3$ (1.0 M in DCM, 2.0 mL, 2.0 mmol), and the mixture was stirred at 0° C. for 3 h. The reaction mixture was cooled at −78° C., quenched with MeOH, and concentrated to dryness. The residue was neutralized with 1 M NH$_3$ in MeOH and subsequently purified on silica gel by flash column chromatography (0.5 M NH$_3$ in MeOH/DCM, 1:7), affording (3S,4S,5R)-1-(((S)-1-(benzo[d]thiazol-4-yl)pyrrolidin-3-yl)methyl)piperidine-3,4,5-triol as a pale-blue solid (0.048 g, 53%). $^1$H NMR (500 MHz, DMSO-d$_6$) δ 9.07 (s, 1H), 7.29 (dd, J=7.8, 1.0 Hz, 1H), 7.23 (t, J=7.8 Hz, 1H), 6.52 (dd, J=8.0, 1.1 Hz, 1H), 4.73 (d, J=4.3 Hz, 1H), 4.71 (d, J=4.9 Hz, 2H), 3.81 (dd, J=10.3, 7.2 Hz, 1H), 3.75-3.71 (m, 1H), 3.67-3.62 (m, 1H), 3.40 (dd, J=10.3, 6.8 Hz, 1H), 3.32-3.25 (m, 2H), 2.94-2.77 (m, 3H), 2.53-2.44 (m, 1H), 2.42-2.31 (m, 2H), 2.14-1.99 (m, 1H), 1.78 (dt, J=13.5, 10.5 Hz, 2H), 1.72-1.64 (m, 1H); ESI MS m/z 350.151 [M+H]$^+$.

Example 29

(3S,4R,5R)-1-(((R)-1-(3-(trifluoromethyl)pyridin-2-yl)piperidin-3-yl)methyl)piperidine-3,4,5-triol

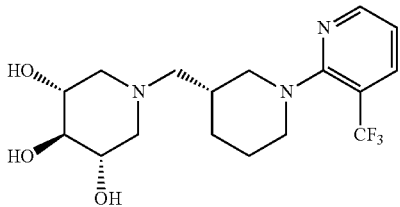 [SMILES: O[C@H]1[C@H](O)CN(C[C@H]2CCCN(c3ncccc3C(F)(F)F)C2)C[C@@H]1O]

A solution of (3S,4S,5R)-3,4,5-tris(benzyloxy)-1-((S)-piperidin-3-ylmethyl)piperidine (0.3 g, 0.6 mmol) and 2-chloro-3-(trifluoromethyl)pyridine (0.3 g, 1.8 mmol) in 1,4-dioxane (3 mL) was charged to a microwave vial. DIPEA (0.5 mL, 3.0 mmol) was added and reaction mixture was subject to microwave irradiation at 150° C. for 90 min. The reaction mixture was partitioned between EtOAc (50 mL) and water, organics were separated, dried over anhydrous Na$_2$SO$_4$. After filtration the solvent was evaporated under reduced pressure, and the residue was purified on silica gel by flash chromatography 3-(trifluoromethyl)-2-((R)-3-(((3S,4R,5R)-3,4,5-tris(benzyloxy)piperidin-1-yl)methyl)piperidin-1-yl)pyridine as an oil (0.22 g, 56.7%). $^1$H NMR (400 MHZ, CDCl$_3$) δ 8.42 (dd, J=4.8, 1.8 Hz, 1H), 7.85 (dd, J=7.8, 1.9 Hz, 1H), 7.40-7.24 (m, 15H), 6.95 (dd, J=7.8, 4.8 Hz, 1H), 4.91 (s, 2H), 4.76-4.61 (m, 4H), 3.74-3.66 (m, 1H), 3.63-3.53 (m, 3H), 3.42 (t, J=8.9 Hz, 1H), 3.21 (ddd, J=10.9, 5.1, 2.1 Hz, 1H), 2.97-2.87 (m, 2H), 2.52 (dd, J=12.4, 9.9 Hz, 1H), 2.28-2.21 (m, 2H), 2.02-1.91 (m, 2H), 1.89-1.62 (m, 4H), 1.08 (qd, J=13.1, 7.3 Hz, 1H); ESI MS m/z 376.189 [M+H]$^+$.

At −78° C., under Ar, to a solution of the above material (0.31 g, 0.46 mmol) in DCM (8 mL) was added BCl$_3$ (1.0 M in DCM, 2.3 mL, 2.3 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH$_3$ in MeOH (2×5 mL) and concentrated again under reduced pressure. The residue was purified on silica gel by flash chromatography (MeOH/DCM, 1:9) yielding (3S,4R,5R)-1-(((R)-1-(3-(trifluoromethyl)pyridin-2-yl)piperidin-3-yl)methyl)piperidine-3,4,5-triol (0.11 g, 63%) as a white solid. $^1$H NMR (400 MHZ, CD$_3$OD) δ 8.44 (dd, J=4.9, 1.8 Hz, 1H), 7.98 (dd, J=7.8, 1.9 Hz, 1H), 7.14-7.08 (m, 1H), 3.66 (dt, J=12.4, 2.4 Hz, 1H), 3.52-3.43 (m, 3H), 3.13-3.01 (m, 2H), 2.94 (ddd, J=13.3, 11.2, 2.8 Hz, 1H), 2.86 (ddd, J=10.9, 5.0, 2.2 Hz, 1H), 2.60 (dd, J=12.4, 9.7 Hz, 1H), 2.36-2.23 (m, 2H), 2.03-1.92 (m, 2H), 1.89-1.76 (m, 3H), 1.75-1.64 (m, 1H), 1.17 (qd, J=12.8, 4.6 Hz, 1H); ESI MS m/z 376.179 [M+H]$^+$.

Example 30

(3S,4R,5R)-1-(((R)-1-(6-(trifluoromethyl)pyridin-2-yl)piperidin-3-yl)methyl)piperidine-3,4,5-triol

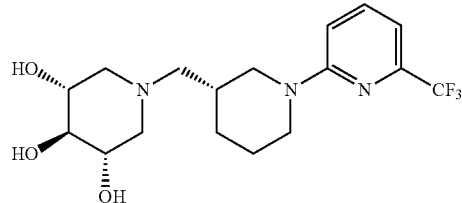 [SMILES: O[C@H]1[C@H](O)CN(C[C@H]2CCCN(c3cccc(C(F)(F)F)n3)C2)C[C@@H]1O]

To a solution of (S)-tert-butyl 3-(hydroxymethyl)piperidine-1-carboxylate (1.07 g, 5 mmol) at 0° C. in dry DCM (15 mL) was added DMP (2.7 g, 6.5 mmol). After stirring at 0° C. for 30 min, the reaction mixture was warmed to RT for the next 1.5h. The reaction mixture was diluted with a 1:1 mixture of 1M Na$_2$S2O3 and satd. aqueous NaHCO$_3$ (50 mL) and stirred for 30 min. DCM (30 mL) was added and organics were separated, dried over anhydrous Na$_2$SO$_4$ and concentrated. The residue was purified on silica gel by flash chromatography (EtOAc/hexanes, 1:1), affording(S)-tert-butyl 3-formylpiperidine-1-carboxylate (0.79 g, 74%) as gummy solid. $^1$H NMR (400 MHZ, CDCl$_3$) δ 9.63 (s, 1H), 3.86 (d, J=13.3 Hz, 1H), 3.57 (dt, J=13.4, 4.8 Hz, 1H), 3.27 (dd, J=13.6, 8.3 Hz, 1H), 3.03 (ddd, J=13.1, 9.3, 3.4 Hz, 1H), 2.36 (qd, J=9.8, 9.2, 4.7 Hz, 1H), 1.95-1.82 (m, 1H), 1.69-1.53 (m, 2H), 1.49-1.41 (m, 1H), 1.39 (s, 9H).

To a solution of (3S,4r,5R)-3,4,5-tris(benzyloxy)piperidine (0.98 g, 2.42 mmol) in DCM (20 mL) was added(S)-tert-butyl 3-formylpiperidine-1-carboxylate (0.7 g, 3.6 mmol) and HOAc (0.3 mL). After stirring at RT for 10 min, NaBH(OAc)$_3$ (0.8 g, 4.1 mmol) was added and the mixture was stirred at RT overnight. The reaction mixture was concentrated before diluting with DCM (25 mL). Organics were washed with satd. aqueous NaHCO$_3$, brine, dried over anhydrous Na$_2$SO$_4$ and concentrated. The residue was purified on silica gel by flash chromatography (EtOAc/hexanes, 3:7) affording (R)-tert-butyl 3-(((3S,4R,5R)-3,4,5-tris(benzyloxy)piperidin-1-yl)methyl)piperidine-1-carboxylate (1.37 g, 94%) as an oil. $^1$H NMR (400 MHZ, CDCl$_3$) δ 7.43-7.24 (m, 15H), 4.92 (s, 2H), 4.80-4.62 (m, 4H), 4.05-

3.83 (m, 2H), 3.66-3.54 (m, 2H), 3.44 (t, J=8.9 Hz, 1H), 3.15-3.02 (m, 1H), 3.02-2.92 (m, 1H), 2.88-2.74 (m, 1H), 2.49 (m, 1H), 2.25-2.21 (m, 2H), 2.0-1.88 (m, 2H), 1.75 (d, J=13.3 Hz, 1H), 1.68-1.56 (m, 2H), 1.52-1.59 (m, 1H), 1.48 (s, 9H), 1.12-1.00 (m, 1H); ESI MS m/z 601.369 [M+1]$^+$.

The above material (1.37 g, 2.28 mmol) was taken up in 1:1 TFA: DCM (10 mL) at 0° C., and stirred for 30 min. The reaction mixture was warmed to RT over a period of 2 h then concentrated to dryness. The residue was diluted with EtOAc (30 mL) and washed with satd. NaHCO$_3$ (2×50 mL), dried over anhydrous Na$_2$SO$_4$, then concentrated to afford (3S,4S,5R)-3,4,5-tris(benzyloxy)-1-((S)-piperidin-3-ylmethyl)piperidine as an oil (1.01 g, 88%). $^1$H NMR (400 MHZ, CDCl$_3$) δ 7.45-7.23 (m, 15H), 6.77 (bs, 1H), 4.91 (s, 2H), 4.77-4.59 (m, 4H), 3.63-3.49 (m, 2H), 3.43 (t, J=8.8 Hz, 1H), 3.27 (dd, J=12.4, 3.6 Hz, 1H), 3.19 (dd, J=12.5, 3.4 Hz, 1H), 3.10 (ddd, J=11.0, 5.1, 2.0 Hz, 1H), 2.96 (ddd, J=11.0, 5.1, 2.0 Hz, 1H), 2.67 (tt, J=12.3, 3.9 Hz, 1H), 2.35 (dd, J=12.4, 10.7 Hz, 1H), 2.25-2.19 (m, 2H), 2.00 (t, J=10.6 Hz, 1H), 1.94-1.85 (m, 2H), 1.82-1.74 (m, 2H), 1.72-1.59 (m, 1H), 1.10-0.95 (m, 1H); ESI MS m/z 501.318 [M+1]$^+$.

To a stirred solution of the above material (0.15 g, 0.3 mmol) and 2-chloro-6-(trifluoromethyl)pyridine (0.1 g, 0.6 mmol) in toluene (5 mL) was added Pd$_2$(dba)$_3$ (28 mg, 0.03 mmol) and RuPhos (28 mg, 0.06 mmol), followed by Cs$_2$CO$_3$ (0.3 g, 0.9 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na$_2$SO$_4$. After filtration the solvent was evaporated under reduced pressure, and the residue was purified on silica gel by flash chromatography affording 2-(trifluoromethyl)-6-((R)-3-(((3S,4R,5R)-3,4,5-tris(benzyloxy)piperidin-1-yl)methyl)piperidin-1-yl)pyridine as an oil (0.14 g, 72%). $^1$H NMR (400 MHZ, CDCl$_3$) δ 7.50 (t, J=8.0 Hz, 1H), 7.42-7.24 (m, 15H), 6.88 (d, J=7.1 Hz, 1H), 6.75 (d, J=8.8 Hz, 1H), 4.93 (s, 2H), 4.75 (dd, J=11.5, 5.8 Hz, 2H), 4.67 (dd, J=11.5, 3.2 Hz, 2H), 4.23-4.10 (m, 2H), 3.65 (bs, 2H), 3.47 (t, J=8.8 Hz, 1H), 3.17-3.06 (m, 2H), 2.98 (s, 1H), 2.73 (t, J=11.2 Hz, 1H), 2.40-2.20 (m, 2H), 2.07-2.01 (m, 1H), 1.91 (d, J=11.2 Hz, 1H), 1.87-1.69 (m, 3H), 1.62-1.47 (m, 1H), 1.21 (m, 1H); ESI MS m/z 646.318 [M+H]$^+$.

At −78° C., under Ar, to a solution of the above material (0.14 g, 0.21 mmol) in DCM (5 mL) was added BCl$_3$ (1.0 M in DCM, 1.08 mL, 1.08 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH$_3$ in MeOH (2×5 mL) and concentrated again under reduced pressure. The residue was purified on silica gel by flash chromatography (MeOH/DCM, 1:9), affording (3S,4R,5R)-1-(((R)-1-(6-(trifluoromethyl)pyridin-2-yl)piperidin-3-yl)methyl)piperidine-3,4,5-triol (0.05 g, 63%) as a white solid. $^1$H NMR (400 MHZ, CD$_3$OD) δ 7.64 (t, J=8.0 Hz, 1H), 6.96 (d, J=8.8 Hz, 1H), 6.89 (d, J=7.2 Hz, 1H), 4.35-4.27 (m, 1H), 4.17 (dt, J=13.5, 4.2 Hz, 1H), 3.59-3.51 (m, 2H), 3.15-3.01 (m, 3H), 2.90 (ddd, J=11.0, 5.0, 2.1 Hz, 1H), 2.77 (dd, J=13.2, 9.5 Hz, 1H), 2.36 (dd, J=12.4, 8.5 Hz, 1H), 2.26 (dd, J=12.4, 5.8 Hz, 1H), 2.03-1.94 (m, 1H), 1.92-1.85 (m, 1H), 1.85-1.71 (m, 3H), 1.56 (dddd, J=15.0, 13.2, 7.9, 4.0 Hz, 1H), 1.34-1.23 (m, 1H); ESI MS m/z 376.189 [M+H]$^+$.

Example 31

(3S,4R,5R)-1-(((R)-1-(2-(trifluoromethyl)pyridin-3-yl)piperidin-3-yl)methyl)piperidine-3,4,5-triol

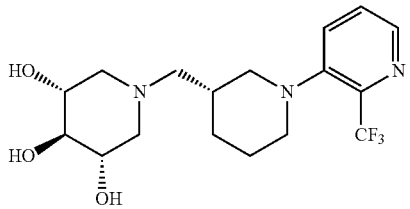 [SMILES: O[C@H]1[C@H](O)CN(C[C@H]2CCCN(c3cccnc3C(F)(F)F)C2)C[C@@H]1O]

To a stirred solution of (3S,4S,5R)-3,4,5-tris(benzyloxy)-1-((S)-piperidin-3-ylmethyl)piperidine (0.14 g, 0.28 mmol) and 3-bromo-2-(trifluoromethyl)pyridine (0.12 g, 0.56 mmol) in toluene (5 mL) was added Pd$_2$(dba)$_3$ (26 mg, 0.028 mmol) and RuPhos (26 mg, 0.056 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na$_2$SO$_4$. After filtration the solvent was evaporated under reduced pressure, and the residue was purified on silica gel by flash chromatography affording 2-(trifluoromethyl)-3-((R)-3-(((3S,4R,5R)-3,4,5-tris(benzyloxy)piperidin-1-yl)methyl)piperidin-1-yl)pyridine as an oil (0.098 g, 54%). $^1$H NMR (500 MHZ, CDCl$_3$) δ 8.42 (dd, J=4.6, 1.3 Hz, 1H), 7.63 (d, J=8.2 Hz, 1H), 7.43 (dd, J=8.3, 4.5 Hz, 1H), 7.40-7.24 (m, 15H), 4.94-4.87 (m, 2H), 4.74-4.62 (m, 4H), 3.59-3.52 (m, 2H), 3.42 (t, J=8.9 Hz, 1H), 3.28-3.22 (m, 1H), 3.21-3.14 (m, 1H), 3.06 (d, J=11.2 Hz, 1H), 2.97-2.90 (m, 1H), 2.75 (td, J=10.4, 3.0 Hz, 1H), 2.33 (t, J=10.6 Hz, 1H), 2.28-2.23 (m, 2H), 2.03-1.94 (m, 2H), 1.84 (t, J=10.6 Hz, 1H), 1.81-1.70 (m, 3H), 1.05 (dq, J=14.2, 8.1, 6.5 Hz, 1H); ESI MS m/z 646.318 [M+H]$^+$.

At −78° C., under Ar, to a solution of the above material (0.098 g, 0.15 mmol) in DCM (5 mL) was added BCl$_3$ (1.0 M in DCM, 0.75 mL, 0.75 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH$_3$ in MeOH (2×5 mL) and concentrated again under reduced pressure. The residue was purified on silica gel by flash chromatography (MeOH/DCM, 1:9) affording (3S,4R,5R)-1-(((R)-1-(2-(trifluoromethyl)pyridin-3-yl)piperidin-3-yl)methyl)piperidine-3,4,5-triol (0.05 g, 88%) as a white solid. $^1$H NMR (400 MHZ, CD$_3$OD) δ 8.36 (dd, J=4.6, 1.3 Hz, 1H), 7.91 (dd, J=8.3, 1.3 Hz, 1H), 7.60 (dd, J=8.3, 4.5 Hz, 1H), 3.50-3.40 (m, 2H), 3.28-3.21 (m, 1H), 3.08 (t, J=8.9 Hz, 1H), 3.05-3.01 (m, 2H), 2.87 (ddd, J=10.9, 4.9, 2.2 Hz, 1H), 2.80 (td, J=10.8, 2.7 Hz, 1H), 2.46 (dd, J=11.3, 9.3 Hz, 1H), 2.37-2.25 (m, 2H), 2.05-1.96 (m, 1H), 1.94 (t, J=10.6 Hz, 1H), 1.86-1.65 (m, 4H), 1.21-1.09 (m, 1H); ESI MS m/z 376.193 [M+H]$^+$.

Example 32

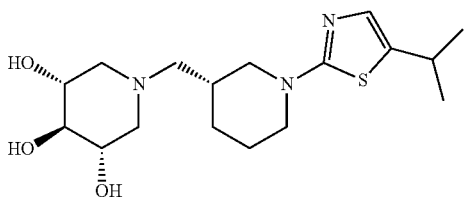 [SMILES: CC(C)c1cnc(N2CCC[C@H](CN3C[C@@H](O)[C@H](O)[C@@H](O)C3)C2)s1]

To a stirred solution of (3S,4S,5R)-3,4,5-tris(benzyloxy)-1-((S)-piperidin-3-ylmethyl)piperidine (0.14 g, 0.28 mmol) and 2-bromo-5-isopropylthiazole (0.11 g, 0.56 mmol) in toluene (5 mL) was added Pd$_2$(dba)$_3$ (26 mg, 0.028 mmol) and RuPhos (26 mg, 0.056 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na$_2$SO$_4$. After filtration the solvent was evaporated under reduced pressure, and the residue was purified on silica gel by flash chromatography affording 5-isopropyl-2-((R)-3-(((3S,4R,5R)-3,4,5-tris(benzyloxy)piperidin-1-yl)methyl)piperidin-1-yl) thiazole as an oil (0.1 g, 57%). $^1$H NMR (400 MHZ, CDCl$_3$) δ 7.41-7.23 (m, 15H), 6.82 (d, J=1.1 Hz, 1H), 4.90 (s, 2H), 4.76-4.61 (m, 4H), 3.94-3.79 (m, 2H), 3.67-3.59 (m, 2H), 3.43 (t, J=8.9 Hz, 1H), 3.12 (ddd, J=10.9, 5.1, 2.1 Hz, 1H), 3.06-2.92 (m, 3H), 2.69 (dd, J=12.8, 9.8 Hz, 1H), 2.33-2.20 (m, 2H), 2.02 (t, J=10.6 Hz, 1H), 1.89 (t, J=10.7 Hz, 1H), 1.83-1.69 (m, 3H), 1.69-1.51 (m, 1H), 1.27 (s, 3H), 1.25 (s, 3H), 1.21-1.06 (m, 2H); ESI MS m/z 626.746 [M+H]$^+$.

At −78° C., under Ar, to a solution of the above material (0.1 g, 0.15 mmol) in DCM (5 mL) was added BCl$_3$ (1.0 M in DCM, 0.7 mL, 0.7 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH$_3$ in MeOH (2×5 mL) and concentrated again under reduced pressure. The residue was purified on silica gel by flash chromatography (MeOH/DCM, 1:9), affording (3S,4R,5R)-1-(((R)-1-(5-isopropylthiazol-2-yl)piperidin-3-yl)methyl)piperidine-3,4,5-triol (0.026 g, 48.7%) as a white solid. $^1$H NMR (400 MHZ, CD$_3$OD) δ 6.77 (s, 1H), 3.86 (dd, J=13.0, 3.8 Hz, 1H), 3.79 (dt, J=12.9, 4.1 Hz, 1H), 3.60-3.51 (m, 2H), 3.13 (t, J=8.8 Hz, 1H), 3.09-2.97 (m, 3H), 2.91 (ddd, J=10.9, 5.0, 2.0 Hz, 1H), 2.77 (dd, J=12.8, 9.7 Hz, 1H), 2.38-2.25 (m, 2H), 2.00 (t, J=10.6 Hz, 1H), 1.92-1.82 (m, 3H), 1.78 (dt, J=13.4, 3.8 Hz, 1H), 1.69-1.57 (m, 1H), 1.29 (s, J=6.8 Hz, 3H), 1.27 (s, 3H), 1.26-1.19 (m, 2H); ESI MS m/z 356.502 [M+H]$^+$.

Example 33

(3S,4R,5R)-1-(((R)-1-(4-(trifluoromethyl)thiazol-2-yl)piperidin-3-yl)methyl)piperidine-3,4,5-triol

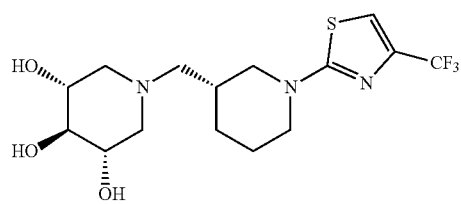 [SMILES: O[C@H]1[C@H](O)CN(C[C@H]2CCCN(c3nc(C(F)(F)F)cs3)C2)C[C@@H]1O]

To a stirred solution of (3S,4S,5R)-3,4,5-tris(benzyloxy)-1-((S)-piperidin-3-ylmethyl)piperidine (0.14 g, 0.28 mmol) and 2-bromo-4-(trifluoromethyl)thiazole (0.13 g, 0.56 mmol) in DMA (5 mL) was added Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na$_2$SO$_4$. After filtration the solvent was evaporated under reduced pressure, and the residue was purified on silica gel by flash chromatography affording 4-(trifluoromethyl)-2-((R)-3-(((3S,4R,5R)-3,4,5-tris(benzyloxy)piperidin-1-yl)methyl)piperidin-1-yl) thiazole as an oil (0.09 g, 49.3%). $^1$H NMR (400 MHZ, CDCl$_3$) δ 7.41-7.24 (m, 15H), 6.91 (s, 1H), 4.91 (s, 2H), 4.76-4.63 (m, 4H), 3.96-3.80 (m, 2H), 3.61 (bs, 2H), 3.44 (t, J=8.8 Hz, 1H), 3.15 (ddd, J=12.8, 10.8, 3.1 Hz, 1H), 3.10-3.03 (m, 1H), 2.94 (d, J=8.9 Hz, 1H), 2.78 (t, J=11.4 Hz, 1H), 2.34-2.17 (m, 2H), 2.03 (t, J=10.7 Hz, 1H), 1.93-1.84 (m, 1H), 1.83-1.71 (m, 3H), 1.60 (ddt, J=14.4, 10.6, 7.8 Hz, 1H), 1.23-1.08 (m, 1H); ESI MS m/z 652.295 [M+H]$^+$.

At −78° C., under Ar, to a solution of the above material (0.09 g, 0.14 mmol) in DCM (5 mL) was added BCl$_3$ (1.0 M in DCM, 0.7 mL, 0.7 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH$_3$ in MeOH (2×5 mL) and concentrated again under reduced pressure. The residue was purified on silica gel by flash chromatography (MeOH/DCM, 1:9), affording (3S,4R,5R)-1-(((R)-1-(4-(trifluoromethyl)thiazol-2-yl)piperidin-3-yl)methyl)piperidine-3,4,5-triol (0.041 g, 76%) as a white solid. $^1$H NMR (400 MHZ, CD$_3$OD) δ 7.18 (s, 1H), 3.98-3.87 (m, 2H), 3.57-3.50 (m, 2H), 3.21-3.15 (m, 1H), 3.14-3.08 (m, 1H), 3.04 (ddd, J=11.0, 4.9, 2.1 Hz, 1H), 2.94-2.83 (m, 2H), 2.37 (dd, J=12.5, 8.7 Hz, 1H), 2.28 (dd, J=12.5, 5.5 Hz, 1H), 2.00 (t, J=10.5 Hz, 1H), 1.94-1.84 (m, 3H), 1.80 (dt, J=13.4, 3.8 Hz, 1H), 1.71-1.58 (m, 1H), 1.34-1.20 (m, 1H); ESI MS m/z 382.140 [M+H]$^+$.

Example 34

(3S,4R,5R)-1-(((R)-1-(benzo[d]thiazol-2-yl)piperidin-3-yl)methyl)piperidine-3,4,5-

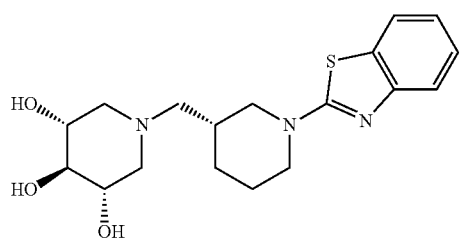 [SMILES: O[C@H]1[C@H](O)CN(C[C@H]2CCCN(c3nc4ccccc4s3)C2)C[C@@H]1O]

To a stirred solution of (3S,4S,5R)-3,4,5-tris(benzyloxy)-1-((S)-piperidin-3-ylmethyl)piperidine (0.14 g, 0.28 mmol) and 2-bromobenzo[d]thiazole (0.12 g, 0.56 mmol) in toluene (5 mL) was added Pd$_2$(dba)$_3$ (26 mg, 0.028 mmol) and RuPhos (26 mg, 0.056 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na₂SO₄. After filtration the solvent was evaporated under reduced pressure, and the residue was purified on silica gel by flash chromatography affording 2-((R)-3-(((3S,4R,5R)-3,4,5-tris(benzyloxy)piperidin-1-yl)methyl)piperidin-1-yl)benzo[d]thiazole as an oil (0.1 g, 57%). ¹H NMR (400 MHZ, CDCl₃) δ 7.59-7.52 (m, 2H), 7.42-7.23 (m, 16H), 7.06 (td, J=7.6, 1.2 Hz, 1H), 4.93 (s, 2H), 4.81-4.63 (m, 4H), 4.11-3.94 (m, 2H), 3.75-3.61 (m, 2H), 3.46 (t, J=8.8 Hz, 1H), 3.26 (ddd, J=13.6, 10.8, 3.1 Hz, 1H), 3.14 (bs, 1H), 3.03-2.84 (m, 2H), 2.33-2.21 (m, 2H), 2.11-2.01 (m, 1H), 1.98-1.88 (m, 1H), 1.88-1.73 (m, 3H), 1.72-1.61 (m, 1H), 1.30-1.14 (m, 1H); ESI MS m/z 634.716 [M+H]⁺.

At −78° C., under Ar, to a solution of the above material (0.14 g, 0.22 mmol) in DCM (5 mL) was added BCl₃ (1.0 M in DCM, 0.75 mL, 0.75 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH₃ in MeOH (2×5 mL) and concentrated again under reduced pressure. The residue was purified on silica gel by flash chromatography (MeOH/DCM, 1:9), affording (3S,4R,5R)-1-(((R)-1-(benzo[d]thiazol-2-yl)piperidin-3-yl)methyl)piperidine-3,4,5-triol (0.06 g, 75%) as a white solid. ¹H NMR (400 MHZ, CD₃OD) δ 7.63 (dd, J=7.9, 1.2 Hz, 1H), 7.49-7.44 (m, 1H), 7.28 (td, J=8.2, 7.7, 1.3 Hz, 1H), 7.08 (td, J=7.6, 1.2 Hz, 1H), 4.09-3.99 (m, 2H), 3.63-3.52 (m, 2H), 3.26 (ddd, J=13.0, 11.1, 3.3 Hz, 1H), 3.13 (t, J=8.8 Hz, 1H), 3.07 (ddd, J=11.0, 5.0, 2.1 Hz, 1H), 3.01-2.87 (m, 2H), 2.37 (dd, J=12.4, 8.9 Hz, 1H), 2.28 (dd, J=12.4, 5.4 Hz, 1H), 2.01 (t, J=10.5 Hz, 1H), 1.94-1.77 (m, 4H), 1.74-1.60 (m, 1H), 1.35-1.25 (m, 1H); ESI MS m/z 364.169 [M+H]⁺.

Example 35

(3S,4R,5R)-1-(((R)-1-(benzo[d]thiazol-4-yl)piperidin-3-yl)methyl)piperidine-3,4,5-

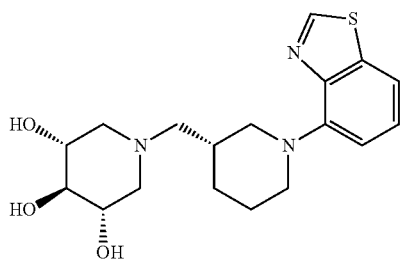 [SMILES: O[C@H]1[C@H](O)CN(C[C@H]2CCCN(c3cccc4scnc34)C2)C[C@@H]1O]

To a stirred solution of (3S,4S,5R)-3,4,5-tris(benzyloxy)-1-((S)-piperidin-3-ylmethyl)piperidine (0.14 g, 0.28 mmol) and 3-bromo-2-(trifluoromethyl)pyridine (0.12 g, 0.56 mmol) in toluene (5 mL) was added Pd₂(dba)₃ (26 mg, 0.028 mmol) and RuPhos (26 mg, 0.056 mmol), followed by Cs₂CO₃ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, dried over Na₂SO₄. After filtration the solvent was evaporated under reduced pressure, and the residue was purified on silica gel by flash chromatography affording 4-((R)-3-(((3S,4R,5R)-3,4,5-tris(benzyloxy)piperidin-1-yl)methyl)piperidin-1-yl)benzo[d]thiazole as an oil (0.11 g, 62%). ¹H NMR (500 MHZ, CDCl₃) δ 8.81 (s, 1H), 7.52 (d, J=7.9 Hz, 1H), 7.40-7.24 (m, 15H), 6.94 (d, J=7.8 Hz, 1H), 4.91 (s, 2H), 4.77-4.61 (m, 4H), 4.11-4.05 (m, 1H), 3.99 (d, J=11.5 Hz, 1H), 3.64-3.55 (m, 2H), 3.44 (t, J=8.9 Hz, 1H), 3.31-3.24 (m, 1H), 3.07-3.00 (m, 1H), 2.79 (t, J=11.2 Hz, 1H), 2.46 (t, J=10.9 Hz, 1H), 2.37-2.29 (m, 2H), 2.19-2.10 (m, 1H), 2.02 (t, J=10.7 Hz, 1H), 1.96-1.81 (m, 4H), 1.64 (bs, 1H), 1.16-1.01 (m, 1H); ESI MS m/z 634.316 [M+H]⁺.

At −78° C., under Ar, to a solution of the above material (0.11 g, 0.17 mmol) in DCM (5 mL) was added BCl₃ (1.0 M in DCM, 0.85 mL, 0.85 mmol), and the mixture was stirred for 3 h while the bath temperature reached RT. The mixture was then cooled at −78° C., and MeOH (2 mL) was added carefully. After stirring at RT for 30 min the mixture was concentrated under reduced pressure. The resulting residue was neutralized with 1M NH₃ in MeOH (2×5 mL) and concentrated again under reduced pressure. The crude residue was re-dissolved in pyridine (6 mL) and treated with Ac₂O (0.6 mL). After stirring overnight at RT, contents were concentrated and purified on a silica gel by flash chromatography (EtOAc/hexanes, 3:7), affording the acetate derivative (3S,4R,5R)-1-(((R)-1-(benzo[d]thiazol-4-yl)piperidin-3-yl)methyl)piperidine-3,4,5-triyl triacetate, which was further hydrolyzed by stirring with 1M NH₃ in MeOH (10 mL) overnight. After concentrating, the residue was purified on silica gel by flash chromatography (MeOH/DCM, 1:9), affording (3S,4R,5R)-1-(((R)-1-(benzo[d]thiazol-4-yl)piperidin-3-yl)methyl)piperidine-3,4,5-triol (0.034 g, 55.8%) as a white solid. ¹H NMR (400 MHz, CD₃OD) δ 9.11 (s, 1H), 7.57 (dd, J=8.1, 0.9 Hz, 1H), 7.34 (t, J=7.9 Hz, 1H), 6.98 (dd, J=7.9, 1.0 Hz, 1H), 4.04 (d, J=11.6 Hz, 1H), 3.74 (d, J=11.4 Hz, 1H), 3.55-3.45 (m, 2H), 3.24-3.04 (m, 2H), 2.99-2.88 (m, 1H), 2.88-2.73 (m, 1H), 2.55-2.25 (m, 3H), 2.15 (br s, 1H), 2.04-1.95 (m, 1H), 1.92-1.77 (m, 4H), 1.20-1.09 (m, 1H); ESI MS m/z 364.169 [M+H]⁺.

Example 36

(3S,4S,5R)-1-(((S)-1-(3-(trifluoromethyl)pyridin-2-yl)piperidin-3-yl)methyl)piperidine-3,4,5-triol

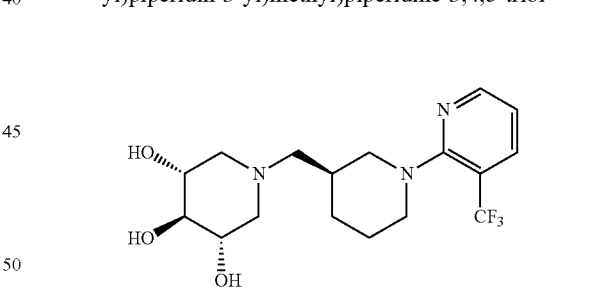

Under Ar, a mixture of (3S,4r,5R)-3,4,5-tris(benzyloxy)piperidine (1.50 g, 3.71 mmol), (R)-tert-butyl 3-formylpiperidine-1-carboxylate (1.07 g, 5.00 mmol) and NaBH(OAc)₃ (1.5 g, 7.0 mmol) in DCM (30 mL) was stirred at RT for 16 h. The reaction mixture was diluted with satd. aqueous NaHCO₃ (40 mL), and extracted with DCM (2×30 mL). The combined extract was dried over anhydrous Na₂SO₄. After filtration the solvent was evaporated under reduced pressure, and the residue was purified on silica gel by flash chromatography (EtOAc/hexanes, 1:6 to 1:3), affording(S)-tert-butyl 3-(((3S,4S,5R)-3,4,5-tris(benzyloxy)piperidin-1-yl)methyl)piperidine-1-carboxylate as a pale-yellow oil (2.2 g, 99%). ESI MS m/z 601.358 [M+H]⁺.

To a solution of the above material (2.2 g, 3.7 mmol) in DCM (20 mL) was added TFA (8 mL), and the mixture was stirred at RT for 3 h. The reaction mixture was concentrated under reduced pressure, and the residue was diluted with satd. aqueous NaHCO₃ (50 mL). After extraction with DCM (3×30 mL) the combined extract was dried over anhydrous Na₂SO₄. After filtration the solvent was evaporated under reduced pressure, and the residue was purified on silica gel by flash chromatography (1 M NH₃ in MeOH/DCM, 1:10), affording (3S,4R,5R)-3,4,5-tris(benzyloxy)-1-((R)-piperidin-3-ylmethyl)piperidine as a pale-yellow oil (1.8 g, 97%). ESI MS m/z 501.306 [M+H]⁺.

Example 37

(3S,4S,5R)-1-(((S)-1-(6-(trifluoromethyl)pyridin-2-yl)piperidin-3-yl)methyl)piperidine-3,4,5-triol

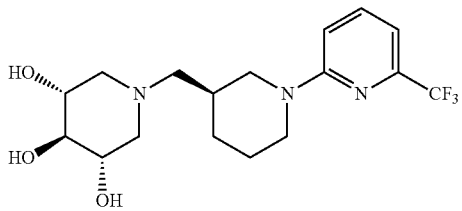 [SMILES: O[C@H]1[C@H](O)CN(C[C@@H]2CCCN(c3cccc(C(F)(F)F)n3)C2)C[C@@H]1O]

To a stirred solution of (3S,4R,5R)-3,4,5-tris(benzyloxy)-1-((R)-piperidin-3-ylmethyl)piperidine (0.13 g, 0.27 mmol) and 2-chloro-6-(trifluoromethyl)pyridine (0.1 g, 0.6 mmol) in toluene (5 mL) was added Pd₂(dba)₃ (28 mg, 0.03 mmol) and RuPhos (28 mg, 0.06 mmol), followed by Cs₂CO₃ (0.26 g, 0.8 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na₂SO₄. After filtration the solvent was evaporated under reduced pressure, and the residue was purified on silica gel by flash chromatography (EtOAc/hexanes, 2:8), affording 2-(trifluoromethyl)-6-((S)-3-(((3S,4S,5R)-3,4,5-tris(benzyloxy)piperidin-1-yl)methyl)piperidin-1-yl)pyridine as an oil (0.15 g, 85%). ¹H NMR (400 MHZ, CDCl₃) δ 7.49 (t, J=8.0 Hz, 1H), 7.41-7.26 (m, 15H), 6.87 (d, J=7.2 Hz, 1H), 6.75 (d, J=8.7 Hz, 1H), 4.92 (s, 2H), 4.75 (dd, J=11.5, 5.7 Hz, 2H), 4.67 (dd, J=11.5, 3.1 Hz, 2H), 4.19-4.12 (m, 2H), 3.67-3.59 (m, 2H), 3.46 (t, J=8.9 Hz, 1H), 3.15-3.06 (m, 2H), 3.01-2.93 (m, 1H), 2.72 (dd, J=13.2, 9.3 Hz, 1H), 2.33 (dd, J=12.4, 8.8 Hz, 1H), 2.24 (dd, J=12.3, 5.7 Hz, 1H), 2.08-1.98 (m, 1H), 1.91 (t, J=10.7 Hz, 1H), 1.84-1.69 (m, 3H), 1.62-1.48 (m, 1H), 1.20 (q, J=12.2, 11.2 Hz, 1H); ESI MS m/z 646.312 [M+H]⁺.

At –78° C., under Ar, to a solution of the above material (0.15 g, 0.23 mmol) in DCM (8 ml) was added BCl₃ (1.0 M in DCM, 1.2 mL, 1.2 mmol), and the mixture was stirred for 3 h while the bath temperature reached 0° C. The mixture was then cooled at –78° C., and MeOH (2 mL) was added carefully. After stirring at RT for 30 min the mixture was concentrated under reduced pressure. The resulting residue was neutralized with 1M NH₃ in MeOH solution (2×5 mL) and concentrated again under reduced pressure. The residue was purified on silica gel by flash chromatography (MeOH/DCM, 1:9), affording (3S,4S,5R)-1-(((S)-1-(6-(trifluoromethyl)pyridin-2-yl)piperidin-3-yl)methyl)piperidine-3,4,5-triol (0.058 g, 67%) as a white solid. ¹H NMR (400 MHZ, CD₃OD) δ 7.63 (ddt, J=8.8, 7.3, 0.8 Hz, 1H), 6.96 (d, J=8.8 Hz, 1H), 6.89 (d, J=7.2 Hz, 1H), 4.31 (ddt, J=13.1, 3.4, 1.5 Hz, 1H), 4.17 (dt, J=13.1, 4.2 Hz, 1H), 3.59-3.51 (m, 2H), 3.16-2.99 (m, 3H), 2.90 (ddd, J=10.9, 4.9, 2.2 Hz, 1H), 2.77 (dd, J=13.2, 9.5 Hz, 1H), 2.36 (dd, J=12.4, 8.5 Hz, 1H), 2.25 (dd, J=12.4, 5.8 Hz, 1H), 1.98 (t, J=10.6 Hz, 1H), 1.92-1.70 (m, 4H), 1.56 (dtt, J=13.3, 11.1, 4.0 Hz, 1H), 1.34-1.23 (m, 1H); ESI MS m/z 376.179 [M+H]⁺.

Example 38

(3S,4S,5R)-1-(((S)-1-(4-(trifluoromethyl)pyridin-3-yl)piperidin-3-yl)methyl)piperidine-3,4,5-triol

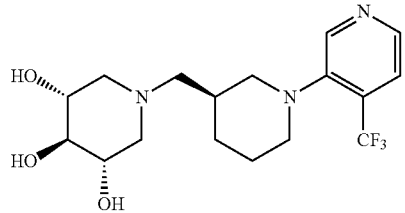 [SMILES: O[C@H]1[C@H](O)CN(C[C@@H]2CCCN(c3cnccc3C(F)(F)F)C2)C[C@@H]1O]

A mixture of (3S,4R,5R)-3,4,5-tris(benzyloxy)-1-((R)-piperidin-3-ylmethyl)piperidine (0.22 g, 0.44 mmol), 3-bromo-4-(trifluoromethyl)pyridine (0.12 g, 0.53 mmol), Cs₂CO₃ (0.30 g, 0.92 mmol), RuPhos (0.035 g, 0.075 mmol) and Pd₂(dba)₃ (0.035 g, 0.038 mmol) in anhydrous toluene (8 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:2 to 1:1), affording 4-(trifluoromethyl)-3-((S)-3-(((3S,4S,5R)-3,4,5-tris(benzyloxy)piperidin-1-yl)methyl)piperidin-1-yl)pyridine as a pale-yellow oil (0.10 g, 35%).

At –78° C., and under Ar, to a solution of the above material (0.10 g, 0.16 mmol) in anhydrous DCM (8 mL) was added BCl₃ (1.0 M in DCM, 2.0 mL, 2.0 mmol), and the mixture was stirred at 0° C. for 3 h. The reaction mixture was cooled at –78° C., quenched with MeOH, and concentrated to dryness. The residue was neutralized with 1 M NH₃ in MeOH and subsequently purified on silica gel by flash column chromatography (0.5 M NH₃ in MeOH/DCM, 1:5), affording (3S,4S,5R)-1-(((S)-1-(4-(trifluoromethyl)pyridin-3-yl)piperidin-3-yl)methyl)piperidine-3,4,5-triol as a white solid (0.032 g, 55%). ¹H NMR (400 MHz, DMSO-d₆) δ 8.73 (s, 1H), 8.52 (d, J=4.9 Hz, 1H), 7.62 (d, J=5.0 Hz, 1H), 4.79-4.59 (m, 3H), 3.26-3.12 (m, 3H), 3.06-3.00 (m, 1H), 2.96-2.75 (m, 3H), 3.73-2.64 (m, 1H), 2.53-2.41 (m, 1H), 2.20-2.15 (m, 2H), 1.94-1.39 (m, 6H), 1.09-1.01 (m, 1H); ESI MS m/z 376.180 [M+H]⁺.

Example 39

(3S,4S,5R)-1-(((S)-1-(4-(trifluoromethyl)thiazol-2-yl)piperidin-3-yl)methyl)piperidine-3,4,5-triol

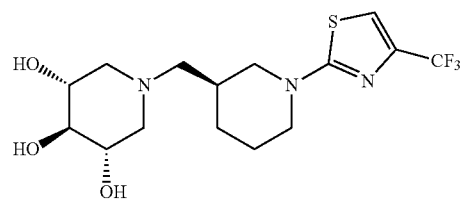 [SMILES: O[C@H]1[C@H](O)CN(C[C@@H]2CCCN(c3nc(C(F)(F)F)cs3)C2)C[C@@H]1O]

A mixture of (3S,4R,5R)-3,4,5-tris(benzyloxy)-1-((R)-piperidin-3-ylmethyl)piperidine (0.22 g, 0.44 mmol), 2-bromo-4-(trifluoromethyl)thiazole (0.13 g, 0.56 mmol), $Cs_2CO_3$ (0.30 g, 0.92 mmol), RuPhos (0.035 g, 0.075 mmol) and $Pd_2(dba)_3$ (0.035 g, 0.038 mmol) in anhydrous toluene (8 mL) was bubbled with Ar for 10 min, and then stirred in a sealed tube at 100° C. for 16 h. After cooling the reaction mixture was filtered through a celite cake. The filtrate was concentrated under reduced pressure, and the residue was purified on silica gel by flash chromatography (EtOAc/hexanes, 1:4 to 1:3), affording 4-(trifluoromethyl)-2-((S)-3-(((3S,4S,5R)-3,4,5-tris(benzyloxy)piperidin-1-yl)methyl)piperidin-1-yl) thiazole as a pale-yellow oil (0.19 g, 66%).

At −78° C., and under Ar, to a solution of the above material (0.18 g, 0.28 mmol) in anhydrous DCM (10 mL) was added $BCl_3$ (1.0 M in DCM, 2.5 mL, 2.5 mmol), and the mixture was stirred at 0° C. for 3 h. The reaction mixture was cooled at −78° C., quenched with MeOH, and concentrated to dryness. The residue was neutralized with 1 M $NH_3$ in MeOH and subsequently purified on silica gel by flash column chromatography (0.5 M $NH_3$ in MeOH/DCM, 1:6), affording (3S,4S,5R)-1-(((S)-1-(4-(trifluoromethyl)thiazol-2-yl)piperidin-3-yl)methyl)piperidine-3,4,5-triol as a white solid (0.070 g, 94%). $^1$H NMR (400 MHz, DMSO-$d_6$) δ 7.48 (q, J=1.1 Hz, 1H), 4.78-4.64 (m, 3H), 3.98-3.64 (m, 2H), 3.33-3.27 (m, 2H), 3.15-3.04 (m, 1H), 2.95-2.76 (m, 3H), 2.76-2.66 (m, 1H), 2.30-2.19 (m, 1H), 2.14 (dd, J=12.3, 5.6 Hz, 1H), 1.85-1.64 (m, 5H), 1.55-1.45 (m, 1H), 1.24-1.10 (m, 1H); ESI MS m/z 382.138 [M+H]$^+$.

Example 62

(3S,4r,5R)-1-((2,3-dihydro-1H-inden-2-yl)methyl)piperidine-3,4,5-triol

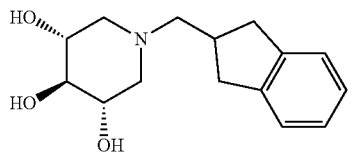 [SMILES: O[C@H]1[C@H](O)CN(CC2Cc3ccccc3C2)C[C@@H]1O]

To a stirred solution of (3S,4R,5R)-3,4,5-tris(benzyloxy)-1-((R)-piperidin-3-ylmethyl)piperidine (104 mg, 0.26 mmol) and 2,3-dihydro-1H-indene-2-carbaldehyde (38 mg, 0.26 mmol) in anhydrous DCM (5 mL) was added HOAc (0.1 mL) and stirred for 30 min. NaBH(OAc)$_3$ (73 mg, 0.35 mmol) was added, and the resulting mixture was stirred at RT for 18 h. The reaction was quenched with satd. aqueous NaHCO$_3$ at 0° C. The mixture was extracted with EtOAc (3×20 mL). The combined organic layer was washed with water (2×10 mL), separated, and dried over Na$_2$SO$_4$. After filtration, the solvent was evaporated under vacuum, and the residue was purified on silica gel by flash chromatography affording (3S,4r,5R)-3,4,5-tris(benzyloxy)-1-((2,3-dihydro-1H-inden-2-yl)methyl)piperidine as an oil (64 mg, 46%); ESI MS m/z 534.30 [M+H]$^+$.

To a stirred solution of the above material (63 mg, 0.12 mmol) in anhydrous DCM (5 mL) was added BCl$_3$ (1M in DCM, 0.75 mL, 0.75 mmol) at −78° C. under N$_2$. The mixture was stirred at 0° C. for 4 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, then solvent was removed under vacuum. The residue was purified by silica gel flash chromatography to give (3S,4r,5R)-1-((2,3-dihydro-1H-inden-2-yl)methyl)piperidine-3,4,5-triol as a white solid (13 mg, 41%). $^1$H NMR (400 MHZ, CD$_3$OD) δ 7.17 (dd, J=5.4, 3.3 Hz, 2H), 7.12-7.07 (m, 2H), 3.58-3.48 (m, 2H), 3.12 (t, J=8.9 Hz, 1H), 3.08-2.96 (m, 4H), 2.78-2.64 (m, 3H), 2.45 (d, J=6.9 Hz, 2H), 1.95 (dd, J=11.3, 10.2 Hz, 2H); ESI MS m/z 264.16 [M+H]$^+$.

Example 106

(3S,4r,5R)-1-((1-phenylpiperidin-4-yl)methyl)piperidine-3,4,5-triol

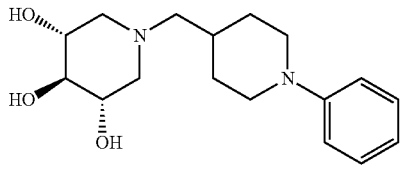

To a stirred solution of (((3S,4r,5R)-3,4,5-tris(benzyloxy)piperidine (260 mg, 0.64 mmol) and 1-phenylpiperidine-4-carbaldehyde (153 mg, 0.81 mmol) in anhydrous DCM (5 mL) was added NaBH(OAc)$_3$ (206 mg, 0.97 mmol), and the resulting mixture was stirred at RT for 18 h. The reaction was quenched with satd. aqueous NaHCO$_3$ at 0° C. The mixture was extracted with EtOAc (3×30 mL). The combined organic layer was washed with water (2×20 mL), separated, and dried over Na$_2$SO$_4$. After filtration, the solvent was evaporated under vacuum, and the residue was purified on silica gel by flash chromatography affording (3S,4r,5R)-3,4,5-tris(benzyloxy)-1-((1-phenylpiperidin-4-yl)methyl)piperidine as a white foam (340 mg, 92%).

To a stirred solution of the above material (340 mg, 0.6 mmol) in anhydrous DCM (5 mL) was added BCl$_3$ (1M in DCM, 4 mL, 4 mmol) at −78° C. under N$_2$. The mixture was stirred at 0° C. for 2 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, then solvent was removed under vacuum. The residue was purified by silica gel flash chromatography to give (3S,4r,5R)-1-((1-phenylpiperidin-4-yl)methyl)piperidine-3,4,5-triol as a white solid (47 mg, 22%). $^1$H NMR (400 MHZ, CD$_3$OD) δ 7.24 (dd, J=8.7, 7.3 Hz, 2H), 7.07-6.96 (m, 2H), 6.92-6.73 (m, 1H), 3.66 (d, J=12.2 Hz, 2H), 3.60-3.46 (m, 2H), 3.11 (t, J=8.8 Hz, 1H), 2.97 (dd, J=10.8, 4.8 Hz, 2H), 2.69 (t, J=12.0 Hz, 2H), 2.30 (d, J=7.1 Hz, 2H), 2.06-1.75 (m, 4H), 1.70-1.67 (m, 1H), 1.48-1.26 (m, 2H); ESI MS m/z 307.2 [M+H]$^+$.

Example 142

(3S,4R,5R)-1-(((R)-1-(6-(trifluoromethyl)pyridin-2-yl)pyrrolidin-3-yl)methyl)piperidine-3,4,5-triol

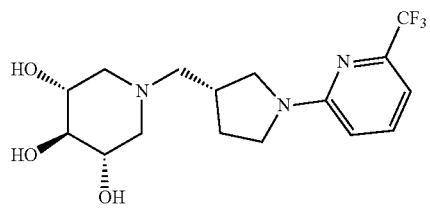 [SMILES: O[C@H]1[C@H](O)CN(C[C@H]2CCN(c3cccc(C(F)(F)F)n3)C2)C[C@@H]1O]

To a stirred solution of (3S,4S,5R)-3,4,5-tris(benzyloxy)-1-((S)-pyrrolidin-3-ylmethyl)piperidine (0.13 g, 0.28 mmol) and 2-chloro-6-(trifluoromethyl)pyridine (0.10 g, 0.56 mmol) in toluene (6 mL) was added Pd$_2$(dba)$_3$ (26 mg, 0.03 mmol) and RuPhos (28 mg, 0.06 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na$_2$SO$_4$. After filtration the solvent was evaporated under vacuum, and the residue was purified on silica gel by flash chromatography (EtOAc/hexanes, 3:7), affording 2-(trifluoromethyl)-5-((R)-3-(((3S,4R,5R)-3,4,5-tris(benzyloxy)piperidin-1-yl)methyl)pyrrolidin-1-yl)pyridine as an oil (0.12 g, 67%). $^1$H NMR (400 MHZ, CDCl$_3$) δ 7.56-7.49 (m, 1H), 7.44-7.27 (m, 15H), 6.89 (d, J=7.2 Hz, 1H), 6.48 (d, J=8.6 Hz, 1H), 4.94 (s, 2H), 4.78-4.74 (m, 2H), 4.69-4.66 (m, 2H), 3.66-3.54 (m, 4H), 3.51-3.40 (m, 2H), 3.18-3.01 (m, 3H), 2.50-2.39 (m, 3H), 2.11-1.94 (m, 3H), 1.71 (dq, J=12.6, 7.6 Hz, 1H); ESI MS m/z 632.314 [M+H]$^+$.

At −78° C., under Ar, to a solution of the above material (0.12 g, 0.19 mmol) in DCM (8 mL) was added BCl$_3$ (1.0 M in DCM, 1.0 mL, 1.0 mmol) was added, and the mixture was stirred for 4 h while the bath temperature reached 0° C. The mixture was then cooled at −78° C., and MeOH (3 mL) was added carefully. After stirring at RT for 30 min the mixture was concentrated under vacuum. The resulting residue was neutralized with 1M NH$_3$ in MeOH solution (2×5 mL) and concentrated again under vacuum. The crude residue was purified and separated on silica gel by flash chromatography (MeOH/DCM, 1:9), (3S,4R,5R)-1-(((R)-1-(6-(trifluoromethyl)pyridin-2-yl)pyrrolidin-3-yl)methyl)piperidine-3,4,5-triol (0.040 g, 58%) as a white solid. $^1$H NMR (400 MHZ, CD$_3$OD) δ 7.61 (t, J=7.9 Hz, 1H), 6.88 (d, J=7.2 Hz, 1H), 6.63 (d, J=8.6 Hz, 1H), 3.69 (dd, J=10.5, 7.1 Hz, 1H), 3.64-3.49 (m, 3H), 3.44 (dt, J=10.4, 7.7 Hz, 1H), 3.18 (dd, J=10.6, 7.2 Hz, 1H), 3.12 (t, J=8.9 Hz, 1H), 3.06 (ddd, J=11.1, 5.0, 2.0 Hz, 1H), 3.00 (ddd, J=10.9, 5.0, 2.1 Hz, 1H), 2.61 (dq, J=14.7, 7.2 Hz, 1H), 2.52-2.47 (m, 2H), 2.23-2.13 (m, 1H), 1.02-1.93 (m, 2H), 1.78 (dq, J=12.4, 8.2 Hz, 1H); ESI MS m/z 362.168 [M+H]$^+$.

Example 146

(3S,4R,5R)-1-(((R)-1-(5-(trifluoromethyl)pyridin-3-yl)pyrrolidin-3-yl)methyl)piperidine-3,4,5-triol

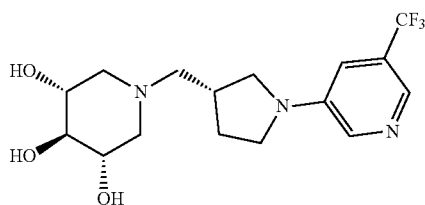 [SMILES: O[C@H]1[C@H](O)CN(C[C@H]2CCN(c3cncc(C(F)(F)F)c3)C2)C[C@@H]1O]

To a stirred solution of (3S,4S,5R)-3,4,5-tris(benzyloxy)-1-((S)-pyrrolidin-3-ylmethyl)piperidine (0.13 g, 0.28 mmol) and 3-bromo-5-(trifluoromethyl)pyridine (0.12 g, 0.56 mmol) in toluene (6 mL) was added Pd$_2$(dba)$_3$ (26 mg, 0.03 mmol) and RuPhos (28 mg, 0.06 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na$_2$SO$_4$. After filtration the solvent was evaporated under vacuum, and the residue was purified on silica gel by flash chromatography (EtOAc/hexanes, 4:6), affording 3-(trifluoromethyl)-5-((R)-3-(((3S,4R,5R)-3,4,5-tris(benzyloxy)piperidin-1-yl)methyl)pyrrolidin-1-yl)pyridine as an oil (0.13 g, 73%). $^1$H NMR (400 MHZ, CDCl$_3$) δ 8.19 (d, J=2.1 Hz, 1H), 8.11 (d, J=2.8 Hz, 1H), 7.42-7.25 (m, 15H), 6.92 (t, J=2.3 Hz, 1H), 4.92 (s, 2H), 4.78-4.74 (m, 2H), 4.67-4.65 (m, 2H), 3.67-3.56 (m, 2H), 3.45 (t, J=8.9 Hz, 1H), 3.42-3.29 (m, 3H), 3.08-2.98 (m, 3H), 2.52-2.39 (m, 3H), 2.18-2.08 (m, 1H), 2.07-1.95 (m, 2H), 1.75 (dq, J=12.6, 7.7 Hz, 1H); ESI MS m/z 632.309 [M+H]$^+$.

At −78° C., under Ar, to a solution of the above material (0.13 g, 0.2 mmol) in DCM (8 mL) was added BCl$_3$ (1.0 M in DCM, 1.0 mL, 1.0 mmol) was added, and the mixture was stirred for 4 h while the bath temperature reached to 0° C. The mixture was then cooled at −78° C., and MeOH (3 mL) was added carefully. After stirring at RT for 30 min the mixture was concentrated under vacuum. The resulting residue was neutralized with 1M NH$_3$ in MeOH solution (2×5 mL) and concentrated again under vacuum. The crude residue was purified and separated on silica gel by flash chromatography (MeOH/DCM, 1:9), (3S,4R,5R)-1-(((R)-1-(5-(trifluoromethyl)pyridin-3-yl)pyrrolidin-3-yl)methyl)piperidine-3,4,5-triol (0.052 g, 68%) as a white solid. $^1$H NMR (400 MHZ, CD$_3$OD) δ 8.10 (d, J=2.7 Hz, 1H), 8.08-8.03 (m, 1H), 7.12 (t, J=2.3 Hz, 1H), 3.58-3.48 (m, 3H), 3.48-3.43 (m, 1H), 3.40-3.34 (m, 1H), 3.15-3.10 (m, 2H), 3.06 (ddd, J=10.9, 4.9, 2.1 Hz, 1H), 2.99 (ddd, J=10.9, 5.0, 2.1 Hz, 1H), 2.72-2.62 (m, 1H), 2.52-2.49 (m, 2H), 2.23 (dtd, J=11.4, 7.0, 4.2 Hz, 1H), 2.04-1.93 (m, 2H), 1.84 (dq, J=12.4, 8.1 Hz, 1H); ESI MS m/z 362.168 [M+H]$^+$.

Example 149

(3S,4R,5R)-1-(((R)-1-(6-(trifluoromethyl)pyridin-3-yl)pyrrolidin-3-yl)methyl)piperidine-3,4,5-triol

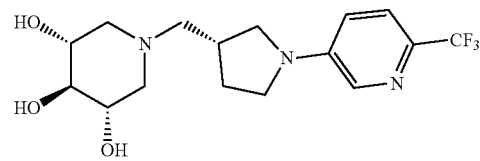 [SMILES: O[C@H]1[C@H](O)CN(C[C@H]2CCN(c3ccc(C(F)(F)F)nc3)C2)C[C@@H]1O]

To a solution of (2S,3R,4R,5S)-3,4,5-tris(benzyloxy)-2-((benzyloxy)methyl)piperidine (1.3 g, 3.2 mmol) in DCM (25 mL) was added (S)-tert-butyl 3-formylpyrrolidine-1-carboxylate (0.96 g, 4.8 mmol) and HOAc (0.5 mL). After stirring at RT for 10 mins, NaBH(OAc)$_3$ (1.1 g, 5.4 mmol) was added and contents stirred at RT overnight. The reaction mixture was concentrated before diluting with DCM (25 mL). Organics were washed with satd. solution of NaHCO$_3$, brine, dried over anhydrous Na$_2$SO$_4$ and concentrated. The residue was purified on silica gel by flash chromatography (EtOAc/hexanes, 3:7) affording (R)-tert-butyl 3-(((3S,4R,5R)-3,4,5-tris(benzyloxy)piperidin-1-yl)methyl) pyrrolidine-1-carboxylate as an oil (1.86 g, 98%). $^1$H NMR (400 MHZ, CDCl$_3$) δ 7.38-7.32 (m, 15H), 4.89 (s, 2H), 4.74-4.71 (m, 2H), 4.65-4.62 (m, 2H), 3.60-3.48 (m, 2H), 3.46-3.33 (m, 3H), 3.32-3.20 (m, 1H), 3.05-2.87 (m, 3H), 2.40-2.18 (m, 3H), 1.98-1.83 (m, 3H), 1.56-1.49 (m, 1H), 1.47 (s, 9H); ESI MS m/z 587.341 [M+H]$^+$.

The above material (0.89 g, 1.51 mmol) was taken in 3:7 TFA: DCM (16 mL) solution at 0° C., and stirred for 30 mins. The reaction mixture was warmed to RT over a period of 2 h before concentrated to dryness. Diluted with EtOAc (30 mL) and washed organics with satd. NaHCO$_3$ (2×50 mL), dried over anhydrous Na$_2$SO$_4$ concentrated to yield (3S,4S,5R)-3,4,5-tris(benzyloxy)-1-((S)-pyrrolidin-3-ylmethyl)piperidine as an oil (0.7 g, 95%). $^1$H NMR (400 MHZ, CDCl$_3$) δ 7.71 (bs, 1H), 7.40-7.27 (m, 15H), 4.87 (s, 2H), 4.73-4.70 (m, 2H), 4.66-4.62 (m, 2H), 3.58-3.48 (m, 2H), 3.41 (t, J=8.6 Hz, 1H), 3.31-3.19 (m, 2H), 3.18-3.12 (m, 1H), 3.02-2.87 (m, 3H), 2.48-2.32 (m, 3H), 2.09-2.00 (m, 2H), 1.96 (t, J=10.6 Hz, 1H), 1.62 (dq, J=13.1, 7.7 Hz, 1H); ESI MS m/z 487.299 [M+H]$^+$.

To a stirred solution of the above material (0.13 g, 0.28 mmol) and 5-bromo-2-(trifluoromethyl)pyridine (0.12 g, 0.56 mmol) in toluene (6 mL) was added Pd$_2$(dba)$_3$ (26 mg, 0.03 mmol) and RuPhos (28 mg, 0.06 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na$_2$SO$_4$. After filtration the solvent was evaporated under vacuum, and the residue was purified on silica gel by flash chromatography (EtOAc/hexanes, 3:7), affording 2-(trifluoromethyl)-5-((R)-3-(((3S,4R,5R)-3,4,5-tris(benzyloxy)piperidin-1-yl)methyl)pyrrolidin-1-yl)pyridine as an oil (0.13 g, 73.4%). $^1$H NMR (400 MHZ, CDCl$_3$) δ 7.98 (d, J=2.8 Hz, 1H), 7.47 (d, J=8.7 Hz, 1H), 7.40-7.27 (m, 15H), 6.79 (d, J=8.5 Hz, 1H), 4.95-4.86 (m, 2H), 4.76-4.73 (m, 2H), 4.67-4.63 (m, 2H), 3.62-3.52 (m, 2H), 3.46-3.30 (m, 4H), 3.08-2.95 (m, 2H), 2.52-2.36 (m, 2H), 2.11 (s, 1H), 2.07-1.89 (m, 2H), 1.80-1.75 (m, 1H), 1.60 (s, 1H); ESI MS m/z 632.309 [M+H]$^+$.

At −78° C., under Ar, to a solution of the above material (0.12 g, 0.19 mmol) in DCM (8 mL) was added BCl$_3$ (1.0 M in DCM, 1.0 mL, 1.0 mmol) was added, and the mixture was stirred for 4 h while the bath temperature reached to 0° C. The mixture was then cooled at −78° C., and MeOH (3 mL) was added carefully. After stirring at RT for 30 min the mixture was concentrated under vacuum. The resulting residue was neutralized with 1M NH$_3$ in MeOH solution (2×5 mL) and concentrated again under vacuum. The crude residue was purified and separated on silica gel by flash chromatography (MeOH/DCM, 1:9), (3S,4R,5R)-1-(((R)-1-(6-(trifluoromethyl)pyridin-3-yl)pyrrolidin-3-yl)methyl)piperidine-3,4,5-triol (0.052 g, 75%) as a white solid. $^1$H NMR (400 MHZ, CD$_3$OD) δ 7.95 (d, J=2.8 Hz, 1H), 7.56 (d, J=8.8 Hz, 1H), 7.03 (dd, J=8.8, 2.9 Hz, 1H), 3.58-3.45 (m, 4H), 3.43-3.35 (m, 1H), 3.17-3.10 (m, 2H), 3.06 (ddd, J=10.9, 4.9, 2.1 Hz, 1H), 3.00 (ddd, J=10.9, 5.0, 2.1 Hz, 1H), 2.72-2.59 (m, 1H), 2.53-2.48 (m, 2H), 2.28-2.18 (m, 1H), 2.04-1.92 (m, 2H), 1.83 (dq, J=12.4, 8.1 Hz, 1H); ESI MS m/z 362.171 [M+H]$^+$.

Example 161

(3S,4S,5R)-1-(((S)-1-(5-(trifluoromethyl)pyridin-2-yl)pyrrolidin-3-yl)methyl)piperidine-3,4,5-triol

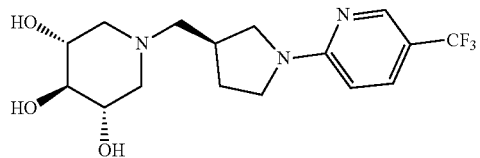 [SMILES: O[C@H]1[C@H](O)CN(C[C@@H]2CCN(c3ccc(C(F)(F)F)cn3)C2)C[C@@H]1O]

To a stirred solution of (3S,4R,5R)-3,4,5-tris(benzyloxy)-1-((R)-pyrrolidin-3-ylmethyl)piperidine (0.13 g, 0.28 mmol) and 2-chloro-5-(trifluoromethyl)pyridine (0.10 g, 0.56 mmol) in toluene (6 mL) was added Pd$_2$(dba)$_3$ (26 mg, 0.03 mmol) and RuPhos (28 mg, 0.06 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na$_2$SO$_4$. After filtration the solvent was evaporated under vacuum, and the residue was purified on silica gel by flash chromatography (EtOAc/hexanes, 3:7), affording 5-(trifluoromethyl)-2-((S)-3-(((3S,4S,5R)-3,4,5-tris(benzyloxy)piperidin-1-yl)methyl)pyrrolidin-1-yl)pyridine as an oil (0.13 g, 78%). $^1$H NMR (400 MHZ, CDCl$_3$) δ 8.40 (dt, J=2.2, 1.1 Hz, 1H), 7.60 (dd, J=8.9, 2.5 Hz, 1H), 7.40-7.27 (m, 15H), 6.35 (d, J=8.9 Hz, 1H), 4.91 (s, 2H), 4.76-4.73 (m, 2H), 4.67-4.63 (m, 2H), 3.66-3.53 (m, 4H), 3.47-3.42 (m, 2H), 3.16 (dd, J=10.5, 5.7 Hz, 1H), 3.08-2.99 (m, 2H), 2.49-2.34 (m, 3H), 2.12-1.93 (m, 3H), 1.72 (dq, J=12.2, 7.7 Hz, 1H); ESI MS m/z 632.310 [M+H]$^+$.

At −78° C., under Ar, to a solution of the above material (0.13 g, 0.20 mmol) in DCM (8 mL) was added BCl$_3$ (1.0 M in DCM, 1.0 mL, 1.0 mmol) was added, and the mixture was stirred for 4 h while the bath temperature reached to 0° C. The mixture was then cooled at −78° C., and MeOH (3 mL) was added carefully. After stirring at RT for 30 min the mixture was concentrated under vacuum. The resulting residue was neutralized with 1M NH$_3$ in MeOH solution (2×5 mL) and concentrated again under vacuum. The crude residue was purified and separated on silica gel by flash chromatography (MeOH/DCM, 1:9), affording (3S,4S,5R)-1-(((S)-1-(5-(trifluoromethyl)pyridin-2-yl)pyrrolidin-3-yl)methyl)piperidine-3,4,5-triol (0.031 g, 42.8%) as a white solid. $^1$H NMR (400 MHz, CD$_3$OD) δ 8.30-8.25 (m, 1H), 7.69 (dd, J=9.0, 2.5 Hz, 1H), 6.58 (d, J=9.0 Hz, 1H), 3.70 (dd, J=10.7, 7.2 Hz, 1H), 3.62 (td, J=9.7, 8.7, 3.8 Hz, 1H), 3.57-3.43 (m, 3H), 3.23 (dd, J=10.7, 7.2 Hz, 1H), 3.13 (t, J=8.8 Hz, 1H), 3.05 (ddd, J=10.9, 4.9, 2.1 Hz, 1H), 2.99 (ddd, J=10.9, 5.0, 2.1 Hz, 1H), 2.68-2.57 (m, 1H), 2.55-2.44 (m, 2H), 2.20 (dtd, J=11.2, 6.9, 4.1 Hz, 1H), 2.04-1.94 (m, 2H), 1.80 (dq, J=12.5, 8.3 Hz, 1H); ESI MS m/z 362.168 [M+H]$^+$.

Example 162

(3S,4S,5R)-1-(((S)-1-(6-(trifluoromethyl)pyridin-3-yl)pyrrolidin-3-yl)methyl)piperidine-3,4,5-triol

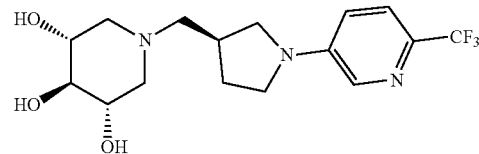 [SMILES: O[C@H]1[C@H](O)CN(C[C@@H]2CCN(c3ccc(C(F)(F)F)nc3)C2)C[C@@H]1O]

To a stirred solution of (3S,4R,5R)-3,4,5-tris(benzyloxy)-1-((R)-pyrrolidin-3-ylmethyl)piperidine (0.13 g, 0.28 mmol) and 5-bromo-2-(trifluoromethyl)pyridine (0.12 g, 0.56 mmol) in toluene (6 mL) was added Pd$_2$(dba)$_3$ (26 mg, 0.03 mmol) and RuPhos (28 mg, 0.06 mmol), followed by Cs$_2$CO$_3$ (0.27 g, 0.84 mmol) under Ar. The mixture was stirred at 100° C. for 18 h, and then water was added at 0° C. The mixture was extracted with EtOAc (2×20 mL). The combined organic layer was washed with water (2×20 mL), separated, and dried over Na$_2$SO$_4$. After filtration the solvent was evaporated under vacuum, and the residue was purified on silica gel by flash chromatography (EtOAc/hexanes, 3:7), affording 2-(trifluoromethyl)-5-((S)-3-(((3S,4S,5R)-3,4,5-tris(benzyloxy)piperidin-1-yl)methyl)pyrrolidin-1-yl)pyridine as an oil (0.14 g, 80%). $^1$H NMR (400 MHZ, CDCl$_3$) δ 8.00 (d, J=2.8 Hz, 1H), 7.48 (d, J=8.7 Hz, 1H), 7.41-7.26 (m, 15H), 6.79 (dd, J=8.8, 2.8 Hz, 1H), 4.92 (s, 2H), 4.77-4.74 (m, 2H), 4.67-4.64 (m, 2H), 3.63-3.53 (m, 2H), 3.49-3.28 (m, 4H), 3.08-2.97 (m, 3H), 2.55-2.36 (m, 3H), 2.12 (dq, J=12.9, 6.5 Hz, 1H), 2.02 (t, J=10.1 Hz 1H), 1.97 (t, J=10.8 Hz, 1H), 1.75 (dq, J=12.9, 7.8 Hz, 1H); ESI MS m/z 632.316 [M+H]$^+$.

At −78° C., under Ar, to a solution of the above material (0.14 g, 0.22 mmol) in DCM (8 mL) was added BCl$_3$ (1.0 M in DCM, 1.3 mL, 1.3 mmol) was added, and the mixture was stirred for 4 h while the bath temperature reached to 0° C. The mixture was then cooled at −78° C., and MeOH (3 mL) was added carefully. After stirring at RT for 30 min the mixture was concentrated under vacuum. The resulting residue was neutralized with 1M NH$_3$ in MeOH solution (2×5 mL) and concentrated again under vacuum. The crude residue was purified and separated on silica gel by flash chromatography (MeOH/DCM, 1:9), affording (3S,4S,5R)-1-(((S)-1-(6-(trifluoromethyl)pyridin-3-yl)pyrrolidin-3-yl)methyl)piperidine-3,4,5-triol (0.047 g, 59%) as a white solid. $^1$H NMR (400 MHz, CD$_3$OD) δ 7.95 (d, J=2.8 Hz, 1H), 7.56 (d, J=8.8 Hz, 1H), 7.03 (dd, J=8.7, 2.8 Hz, 1H), 3.59-3.45 (m, 4H), 3.44-3.36 (m, 1H), 3.17-3.10 (m, 2H), 3.06 (ddd, J=10.9, 4.9, 2.1 Hz, 1H), 2.99 (ddd, J=11.0, 5.0, 2.2 Hz, 1H), 2.72-2.59 (m, 1H), 2.52-2.48 (m, 2H), 2.23 (dtd, J=11.7, 7.0, 4.2 Hz, 1H), 2.04-1.92 (m, 2H), 1.83 (dq, J=12.4, 8.1 Hz, 1H); ESI MS m/z 362.169 [M+H]$^+$.

Example 167

(3S,4R,5R)-1-(((R)-1-(4-(trifluoromethyl)pyridin-3-yl)piperidin-3-yl)methyl)piperidine-3,4,5-triol

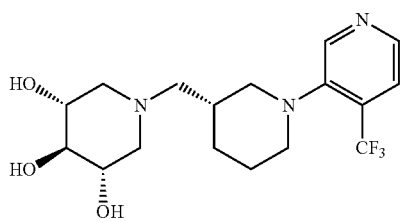 [SMILES: O[C@H]1[C@H](O)CN(C[C@H]2CCCN(c3cnccc3C(F)(F)F)C2)C[C@@H]1O]

Under Ar a mixture of (3S,4r,5R)-3,4,5-tris(benzyloxy)piperidine (2.63 g, 6.52 mmol), (S)-tert-butyl 3-formylpiperidine-1-carboxylate (1.84 g, 8.63 mmol) and NaBH(OAc)$_3$ (2.12 g, 10.0 mmol) in DCM (25 mL) was stirred at RT for 16 h. The reaction mixture was diluted with satd. aqueous NaHCO$_3$ (40 mL) and extracted with DCM (3×30 mL). The combined extract was dried over anhydrous Na$_2$SO$_4$. After filtration the solvent was evaporated under vacuum, and the residue was purified on silica gel by flash chromatography (EtOAc/hexanes, 1:4 to 1:3), affording (R)-tert-butyl 3-(((3S,4R,5R)-3,4,5-tris(benzyloxy)piperidin-1-yl)methyl)piperidine-1-carboxylate as a pale-yellow oil (2.70 g, 69%).

Under Ar to a solution of the above material (2.70 g, 4.49 mmol) in DCM (20 mL) was added TFA (8 mL), and the mixture was stirred at RT for 2 h. The reaction mixture was concentrated at RT and diluted with satd. aqueous NaHCO$_3$ (50 mL). After extraction with DCM (3×30 mL) the combined extract was dried over anhydrous Na$_2$SO$_4$. After filtration the solvent was evaporated under vacuum, and the residue was purified on silica gel by flash chromatography (MeOH/DCM with ammonia, 1:16), affording (3S,4S,5R)-3,4,5-tris(benzyloxy)-1-((S)-piperidin-3-ylmethyl)piperidine as a pale-yellow oil (2.15 g, 96%).

A mixture of the above material (0.200 g, 0.400 mmol), 3-bromo-4-(trifluoromethyl)pyridine (0.12 g, 0.53 mmol), RuPhos (0.035 g, 0.075 mmol), Cs$_2$CO$_3$ (0.30 g, 0.92 mmol) and Pd$_2$(dba)$_3$ (0.035 g, 0.038 mmol) in anhydrous toluene (8 mL) in a sealed tube was bubbled with Ar for 10 min, and then stirred at 100° C. for 16 h. The reaction mixture was cooled to RT and filtered through a Celite cake. The filtrate was concentrated, and the residue was purified on silica gel by flash chromatography (EtOAc/hexanes, 1:3 to 1:2), affording 4-(trifluoromethyl)-3-((R)-3-(((3S,4R,5R)-3,4,5-tris(benzyloxy)piperidin-1-yl)methyl)piperidin-1-yl)pyridine as a pale-yellow oil (0.105 g, 41%); ESI MS m/z 646.325 [M+H]$^+$.

Under Ar to a solution of the above material (0.105 g, 0.163 mmol) in anhydrous DCM (8 mL) cooled at −78° C. was added BCl$_3$ (1.0 M in DCM, 2.0 mL, 2.0 mmol), and the mixture was stirred at 0° C. for 3 h. The reaction mixture was cooled at −78° C., then quenched with MeOH, and then concentrated to dryness. The residue was neutralized with 1 M NH$_3$ in MeOH and subsequently purified on silica gel by flash chromatography (0.5 M NH$_3$ in MeOH/DCM, 1:6), affording (3S,4R,5R)-1-(((R)-1-(4-(trifluoromethyl)pyridin-3-yl)piperidin-3-yl)methyl)piperidine-3,4,5-triol as a white solid (0.030 g, 49%). $^1$H NMR (400 MHz, DMSO-d$_6$) δ 8.73 (s, 1H), 8.53 (d, J=5.0 Hz, 1H), 7.62 (d, J=5.0 Hz, 1H), 4.80-4.55 (m, 3H), 3.28-3.14 (m, 3H), 3.08-2.97 (m, 1H), 2.93-2.74 (m, 3H), 2.74-2.62 (m, 1H), 2.50-2.45 (m, 1H), 2.24-2.10 (m, 2H), 1.96-1.49 (m, 6H), 1.12-0.97 (m, 1H); ESI MS m/z 376.186 [M+H]$^+$.

Example 168

(3S,4R,5R)-1-(((R)-1-(5-(trifluoromethyl)pyridin-3-yl)piperidin-3-yl)methyl)piperidine-3,4,5-triol

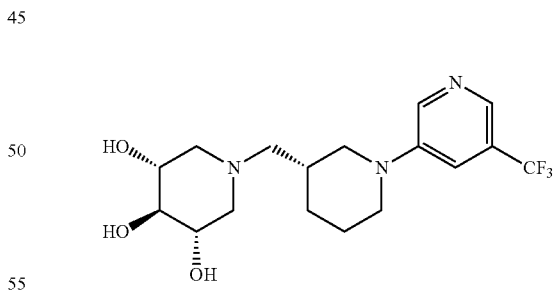

A mixture of (3S,4S,5R)-3,4,5-tris(benzyloxy)-1-((S)-piperidin-3-ylmethyl)piperidine (0.200 g, 0.400 mmol), 3-bromo-5-(trifluoromethyl)pyridine (0.12 g, 0.53 mmol), RuPhos (0.035 g, 0.075 mmol), Cs$_2$CO$_3$ (0.30 g, 0.92 mmol) and Pd$_2$(dba)$_3$ (0.035 g, 0.038 mmol) in anhydrous toluene (8 mL) in a sealed tube was bubbled with Ar for 10 min, and then stirred at 100° C. for 16 h. The reaction mixture was cooled to RT and filtered through a Celite cake. The filtrate was concentrated, and the residue was purified on silica gel by flash chromatography (EtOAc/hexanes, 1:4 to 1:2), affording 3-(trifluoromethyl)-5-((R)-3-(((3S,4R,5R)-3,4,5- tris(benzyloxy)piperidin-1-yl)methyl)piperidin-1-yl)pyridine as a pale-yellow oil (0.16 g, 62%).

Under Ar to a solution of the above material (0.16 g, 0.25 mmol) in anhydrous DCM (6 mL) cooled at −78° C. was added BCl₃ (1.0 M in DCM, 2.0 mL, 2.0 mmol), and the mixture was stirred at 0° C. for 3 h. The reaction mixture was cooled at −78° C., then quenched with MeOH, and then concentrated to dryness. The residue was neutralized with 1 M NH₃ in MeOH and subsequently purified on silica gel by flash chromatography (0.5 M NH₃ in MeOH/DCM, 1:6), affording (3S,4R,5R)-1-(((R)-1-(5-(trifluoromethyl)pyridin-3-yl)piperidin-3-yl)methyl)piperidine-3,4,5-triol as a white solid (0.053 g, 56%). ¹H NMR (500 MHz, DMSO-d₆) δ 8.51 (dd, J=2.0, 1.0 Hz, 1H), 8.21 (dd, J=2.0, 1.0 Hz, 1H), 7.46 (t, J=2.0 Hz, 1H), 4.75 (d, J=4.3 Hz, 1H), 4.70 (d, J=4.9 Hz, 2H), 3.76-3.08 (m, 2H), 3.33-3.23 (m, 2H), 2.95-2.85 (m, 2H), 2.86-2.78 (m, 1H), 2.75-2.70 (m, 1H), 2.66 (dd, J=12.7, 9.3 Hz, 1H), 2.26 (dd, J=12.2, 7.9 Hz, 1H), 2.13 (dd, J=12.2, 6.2 Hz, 1H), 1.89-1.65 (m, 5H), 1.58-1.44 (m, 1H), 1.17-1.08 (m, 1H); ESI MS m/z 376.181 [M+H]⁺.

Example 169

(3S,4R,5R)-1-(((R)-1-(4-(trifluoromethyl)pyridin-2-yl)piperidin-3-yl)methyl)piperidine-3,4,5-triol

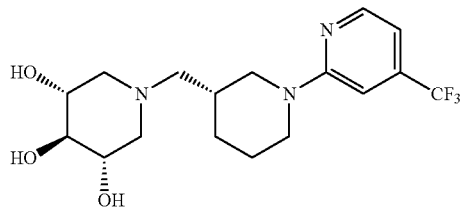

A mixture of (3S,4S,5R)-3,4,5-tris(benzyloxy)-1-((S)-piperidin-3-ylmethyl)piperidine (0.25 g, 0.50 mmol), 2-chloro-4-(trifluoromethyl)pyridine (0.20 g, 1.1 mmol), and DIPEA (0.26 g, 2.0 mmol) in anhydrous DMF (6 mL) in a sealed tube was stirred at 100° C. for 16 h. The reaction mixture was cooled to RT and diluted with satd. aqueous NaHCO₃ (10 mL). After extraction with EtOAc (3×15 mL) the combined extract was washed with brine (2×15 mL) and dried over anhydrous Na₂SO₄. After filtration the solvent was evaporated under vacuum, and the residue was purified on silica gel by flash chromatography (EtOAc/hexanes, 1:8 to 1:4), affording 4-(trifluoromethyl)-2-((R)-3-(((3S,4R,5R)-3,4,5-tris(benzyloxy)piperidin-1-yl)methyl)piperidin-1-yl)pyridine as a pale-yellow oil (0.13 g, 50%).

Under Ar to a solution of the above material (0.13 g, 0.20 mmol) in anhydrous DCM (8 mL) cooled at −78° C. was added BCl₃ (1.0 M in DCM, 2.0 mL, 2.0 mmol), and the mixture was stirred at 0° C. for 3 h. The reaction mixture was cooled at −78° C., then quenched with MeOH, and then concentrated to dryness. The residue was neutralized with 1 M NH₃ in MeOH and subsequently purified on silica gel by flash chromatography (0.5 M NH₃ in MeOH/DCM, 1:6), affording (3S,4R,5R)-1-(((R)-1-(4-(trifluoromethyl)pyridin-2-yl)piperidin-3-yl)methyl)piperidine-3,4,5-triol as a white solid (0.061 g, 81%). ¹H NMR (500 MHz, DMSO-d₆) δ 8.29 (d, J=5.1 Hz, 1H), 6.98 (s, 1H), 6.79 (d, J=5.1 Hz, 1H), 4.74 (d, J=4.3 Hz, 1H), 4.73-4.67 (m, 2H), 4.27-4.19 (m, 1H), 4.16-4.07 (m, 1H), 3.31-3.22 (m, 2H), 3.06-2.97 (m, 1H), 2.88 (td, J=8.6, 4.3 Hz, 1H), 2.85-2.78 (m, 1H), 2.76-2.60 (m, 2H), 2.23 (dd, J=12.2, 8.2 Hz, 1H), 2.11 (dd, J=12.2, 6.4 Hz, 1H), 1.83-1.61 (m, 5H), 1.49-1.35 (m, 1H), 1.26-1.10 (m, 1H); ESI MS m/z 376.182 [M+H]⁺.

Example 170

(3S,4R,5R)-1-(((R)-1-(5-(trifluoromethyl)pyridin-2-yl)piperidin-3-yl)methyl)piperidine-3,4,5-triol

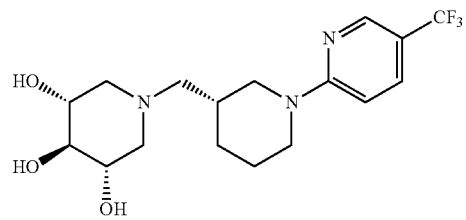 [SMILES: O[C@H]1[C@H](O)CN(C[C@H]2CCCN(c3ccc(C(F)(F)F)cn3)C2)C[C@@H]1O]

A mixture of (3S,4S,5R)-3,4,5-tris(benzyloxy)-1-((S)-piperidin-3-ylmethyl)piperidine (0.25 g, 0.50 mmol), 2-chloro-5-(trifluoromethyl)pyridine (0.20 g, 1.1 mmol), and DIPEA (0.26 g, 2.0 mmol) in anhydrous DMF (6 mL) in a sealed tube was stirred at 100° C. for 16 h. The reaction mixture was cooled to RT and diluted with satd. aqueous NaHCO₃ (10 mL). After extraction with EtOAc (3×15 mL) the combined extract was washed with brine (2×15 mL) and dried over anhydrous Na₂SO₄. After filtration the solvent was evaporated under vacuum, and the residue was purified on silica gel by flash chromatography (EtOAc/hexanes, 1:8 to 1:4), affording 5-(trifluoromethyl)-2-((R)-3-(((3S,4R,5R)-3,4,5-tris(benzyloxy)piperidin-1-yl)methyl)piperidin-1-yl)pyridine as a pale-yellow oil (0.26 g, 81%).

Under Ar to a solution of the above material (0.25 g, 0.39 mmol) in anhydrous DCM (10 mL) cooled at −78° C. was added BCl₃ (1.0 M in DCM, 3.0 mL, 3.0 mmol), and the mixture was stirred at 0° C. for 3 h. The reaction mixture was cooled at −78° C., then quenched with MeOH, and then concentrated to dryness. The residue was neutralized with 1 M NH₃ in MeOH and subsequently purified on silica gel by flash chromatography (0.5 M NH₃ in MeOH/DCM, 1:6), affording (3S,4R,5R)-1-(((R)-1-(5-(trifluoromethyl)pyridin-2-yl)piperidin-3-yl)methyl)piperidine-3,4,5-triol as a white solid (0.14 g, 94%). ¹H NMR (500 MHZ, DMSO-d₆) δ 8.37 (d, J=2.8 Hz, 1H), 7.73 (dd, J=9.1, 2.8 Hz, 1H), 6.87 (d, J=9.1 Hz, 1H), 4.76-4.68 (m, 3H), 4.31-4.21 (m, 1H), 4.20-4.13 (m, 1H), 3.32-3.24 (m, 2H), 3.11-3.02 (m, 1H), 2.88 (td, J=8.6, 4.3 Hz, 1H), 2.85-2.79 (m, 1H), 2.77-2.64 (m, 2H), 2.21 (dd, J=12.2, 8.4 Hz, 1H), 2.11 (dd, J=12.2, 6.3 Hz, 1H), 1.82-1.73 (m, 2H), 1.73-1.60 (m, 3H), 1.49-1.35 (m, 1H), 1.25-1.13 (m, 1H); ESI MS m/z 376.182 [M+H]⁺.

Example 171

(3S,4R,5R)-1-(((R)-1-(6-(trifluoromethyl)pyridin-3-yl)piperidin-3-yl)methyl)piperidine-3,4,5-triol

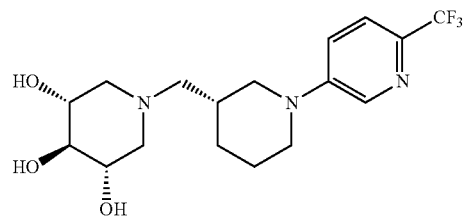 [SMILES: O[C@H]1[C@H](O)CN(C[C@H]2CCCN(c3ccc(C(F)(F)F)nc3)C2)C[C@@H]1O]

A mixture of (3S,4S,5R)-3,4,5-tris(benzyloxy)-1-((S)-piperidin-3-ylmethyl)piperidine (0.200 g, 0.400 mmol), 5-bromo-2-(trifluoromethyl)pyridine (0.12 g, 0.53 mmol), RuPhos (0.035 g, 0.075 mmol), Cs$_2$CO$_3$ (0.30 g, 0.92 mmol) and Pd$_2$(dba)$_3$ (0.035 g, 0.038 mmol) in anhydrous toluene (8 mL) in a sealed tube was bubbled with Ar for 10 min, and then stirred at 100° C. for 16 h. The reaction mixture was cooled to RT and filtered through a Celite cake. The filtrate was concentrated, and the residue was purified on silica gel by flash chromatography (EtOAc/hexanes, 1:4 to 1:3), affording 2-(trifluoromethyl)-5-((R)-3-(((3S,4R,5R)-3,4,5-tris(benzyloxy)piperidin-1-yl)methyl)piperidin-1-yl)pyridine as a pale-yellow oil (0.25 g, 97%).

Under Ar to a solution of the above material (0.24 g, 0.37 mmol) in anhydrous DCM (10 mL) cooled at −78° C. was added BCl$_3$ (1.0 M in DCM, 3.0 mL, 3.0 mmol), and the mixture was stirred at 0° C. for 3 h. The reaction mixture was cooled at −78° C., then quenched with MeOH, and then concentrated to dryness. The residue was neutralized with 1 M NH$_3$ in MeOH and subsequently purified on silica gel by flash chromatography (0.5 M NH$_3$ in MeOH/DCM, 1:6), affording (3S,4R,5R)-1-(((R)-1-(6-(trifluoromethyl)pyridin-3-yl)piperidin-3-yl)methyl)piperidine-3,4,5-triol as a white solid (0.11 g, 80%). $^1$H NMR (400 MHZ, DMSO-d$_6$) δ 8.35 (d, J=2.9 Hz, 1H), 7.60 (d, J=8.8 Hz, 1H), 7.34 (dd, J=8.8, 2.9 Hz, 1H), 4.81-4.64 (m, 3H), 3.86-3.72 (m, 2H), 3.39-3.22 (m, 2H), 3.01-2.85 (m, 2H), 2.85-2.76 (m, 1H), 2.77-2.66 (m, 2H), 2.25 (dd, J=12.2, 8.2 Hz, 1H), 2.13 (dd, J=12.2, 6.0 Hz, 1H), 1.84-1.66 (m, 5H), 1.58-1.45 (m, 1H), 1.25-1.11 (m, 1H); ESI MS m/z 376.189 [M+H]$^+$.

Example 172

(3S,4R,5R)-1-(((R)-1-(3-(trifluoromethyl)pyridin-4-yl)piperidin-3-yl)methyl)piperidine-3,4,5-triol

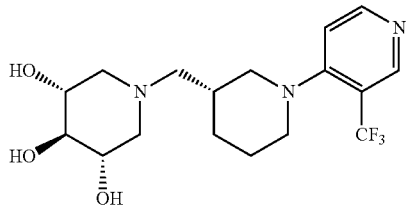

A mixture of (3S,4S,5R)-3,4,5-tris(benzyloxy)-1-((S)-piperidin-3-ylmethyl)piperidine (0.25 g, 0.50 mmol), 4-chloro-3-(trifluoromethyl)pyridine (0.20 g, 1.1 mmol), and DIPEA (0.26 g, 2.0 mmol) in anhydrous DMF (6 mL) in a sealed tube was stirred at 100° C. for 16 h. The reaction mixture was cooled to RT and diluted with satd. aqueous NaHCO$_3$ (10 mL). After extraction with EtOAc (3×15 mL) the combined extract was washed with brine (2×15 mL) and dried over anhydrous Na$_2$SO$_4$. After filtration the solvent was evaporated under vacuum, and the residue was purified on silica gel by flash chromatography (EtOAc/hexanes, 1:3 to 1:2), affording 3-(trifluoromethyl)-4-((R)-3-(((3S,4R,5R)-3,4,5-tris(benzyloxy)piperidin-1-yl)methyl)piperidin-1-yl)pyridine as a pale-yellow oil (0.22 g, 69%).

Under Ar to a solution of the above material (0.22 g, 0.34 mmol) in anhydrous DCM (10 mL) cooled at −78° C. was added BCl$_3$ (1.0 M in DCM, 3.0 mL, 3.0 mmol), and the mixture was stirred at 0° C. for 3 h. The reaction mixture was cooled at −78° C., then quenched with MeOH, and then concentrated to dryness. The residue was neutralized with 1 M NH$_3$ in MeOH and subsequently purified on silica gel by flash chromatography (0.5 M NH$_3$ in MeOH/DCM, 1:6), affording (3S,4R,5R)-1-(((R)-1-(3-(trifluoromethyl)pyridin-4-yl)piperidin-3-yl)methyl)piperidine-3,4,5-triol as a white solid (0.079 g, 62%). $^1$H NMR (500 MHz, DMSO-d$_6$) δ 8.62 (s, 1H), 8.50 (d, J=5.7 Hz, 1H), 7.13 (d, J=5.7 Hz, 1H), 4.79-4.63 (m, 3H), 3.55-3.46 (m, 1H), 3.36-3.28 (m, 1H), 3.27-3.18 (m, 2H), 2.90-2.78 (m, 3H), 2.71-2.60 (m, 1H), 2.54-2.47 (m, 1H), 2.23-2.07 (m, 2H), 1.90-1.68 (m, 4H), 1.68-1.48 (m, 2H), 1.12-0.99 (m, 1H); ESI MS m/z 376.183 [M+H]$^+$.

Example 173

(3S,4R,5R)-1-(((R)-1-(2-(trifluoromethyl)pyridin-4-yl)piperidin-3-yl)methyl)piperidine-3,4,5-triol

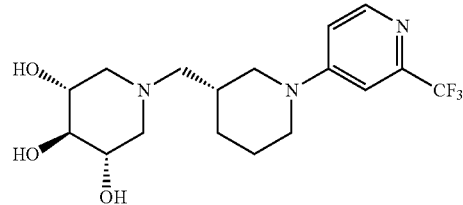 [SMILES: O[C@H]1[C@H](O)CN(C[C@H]2CCCN(c3ccnc(C(F)(F)F)c3)C2)C[C@@H]1O]

A mixture of (3S,4S,5R)-3,4,5-tris(benzyloxy)-1-((S)-piperidin-3-ylmethyl)piperidine (0.200 g, 0.400 mmol), 4-bromo-2-(trifluoromethyl)pyridine (0.12 g, 0.53 mmol), RuPhos (0.035 g, 0.075 mmol), Cs$_2$CO$_3$ (0.30 g, 0.92 mmol) and Pd$_2$(dba)$_3$ (0.035 g, 0.038 mmol) in anhydrous toluene (8 mL) in a sealed tube was bubbled with Ar for 10 min, and then stirred at 100° C. for 16 h. The reaction mixture was cooled to RT and filtered through a Celite cake. The filtrate was concentrated, and the residue was purified on silica gel by flash chromatography (EtOAc/hexanes, 1:3 to 1:2), affording 2-(trifluoromethyl)-4-((R)-3-(((3S,4R,5R)-3,4,5-tris(benzyloxy)piperidin-1-yl)methyl)piperidin-1-yl)pyridine as a pale-yellow oil (0.16 g, 62%).

Under Ar to a solution of the above material (0.16 g, 0.25 mmol) in anhydrous DCM (8 mL) cooled at −78° C. was added BCl$_3$ (1.0 M in DCM, 2.0 mL, 2.0 mmol), and the mixture was stirred at 0° C. for 3 h. The reaction mixture was cooled at −78° C., then quenched with MeOH, and then concentrated to dryness. The residue was neutralized with 1 M NH$_3$ in MeOH and subsequently purified on silica gel by flash chromatography (0.5 M NH$_3$ in MeOH/DCM, 1:6), affording (3S,4R,5R)-1-(((R)-1-(2-(trifluoromethyl)pyridin-4-yl)piperidin-3-yl)methyl)piperidine-3,4,5-triol as a white solid (0.077 g, 83%). $^1$H NMR (500 MHz, DMSO-d$_6$) δ 8.22 (d, J=6.0 Hz, 1H), 7.11 (d, J=2.6 Hz, 1H), 6.95 (dd, J=6.0, 2.6 Hz, 1H), 4.76 (d, J=4.2 Hz, 1H), 4.74-4.68 (m, 2H), 3.85-3.75 (m, 2H), 3.35-3.25 (m, 2H), 3.12-3.02 (m, 1H), 2.94-2.78 (m, 3H), 2.72-2.05 (m, 1H), 2.24 (dd, J=12.3, 8.5 Hz, 1H), 2.09 (dd, J=12.2, 5.9 Hz, 1H), 1.83-1.59 (m, 5H), 1.52-1.39 (m, 1H), 1.26-1.15 (m, 1H); ESI MS m/z 376.183 [M+H]$^+$.

Example 174

(3S,4S,5R)-1-(((S)-1-(2-(trifluoromethyl)pyridin-3-yl)piperidin-3-yl)methyl)piperidine-3,4,5-triol

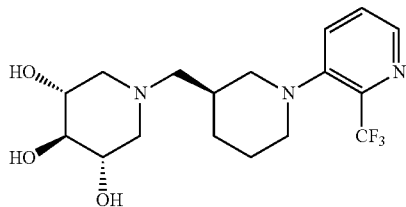

To a stirred solution of (3S,4R,5R)-3,4,5-tris(benzyloxy)-1-((R)-piperidin-3-ylmethyl)piperidine (110 mg, 0.22 mmol) and 3-bromo-2-trifluoromethylpyridine (99 mg, 0.44 mmol) in toluene (5 mL) was added Pd$_2$(dba)$_3$ (20 mg, 0.022 mmol) and RuPhos (21 mg, 0.044 mmol), followed with Cs$_2$CO$_3$ (287 mg, 0.88 mmol) under the protection of Ar. The mixture was stirred at 100° C. for 18 h, and then water was added at 0° C. The mixture was extracted with EtOAc (2×30 mL). The combined organic layer was washed with water (2×10 mL), separated, and dried over Na$_2$SO$_4$. After filtration the solvent was evaporated under vacuum, and the residue was purified on silica gel by flash chromatography affording 2-(trifluoromethyl)-3-((S)-3-(((3S,4S,5R)-3,4,5-tris(benzyloxy)piperidin-1-yl)methyl)piperidin-1-yl)pyridine as an oil (60 mg, 42%); ESI MS m/z 646.32 [M+H]$^+$.

To a stirred solution of the above material (60 mg, 0.09 mmol) in anhydrous DCM (5 mL) was added BCl$_3$ (1M in DCM, 0.75 mL, 0.75 mmol) at −78° C. under N$_2$. The mixture was stirred at 0° C. for 4 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, then solvent was removed under vacuum. The residue was purified by silica gel flash chromatography to give (3S,4S,5R)-1-(((S)-1-(2-(trifluoromethyl)pyridin-3-yl)piperidin-3-yl)methyl)piperidine-3,4,5-triol as a white solid (9 mg, 26%). $^1$H NMR (400 MHZ, CD$_3$OD) δ 8.37 (dd, J=4.5, 1.4 Hz, 1H), 7.95-7.87 (m, 1H), 7.62 (dd, J=8.3, 4.6 Hz, 1H), 3.51-3.41 (m, 2H), 3.25 (dd, J=11.5, 3.6 Hz, 1H), 3.15-2.97 (m, 3H), 2.92-2.76 (m, 2H), 2.47 (dd, J=11.3, 9.3 Hz, 1H), 2.38-2.24 (m, 2H), 2.09-1.90 (m, 2H), 1.88-1.69 (m, 4H), 1.22-1.10 (m, 1H); ESI MS m/z 376.19 [M+H]$^+$.

Example 175

(3S,4S,5R)-1-(((S)-1-(5-(trifluoromethyl)pyridin-3-yl)piperidin-3-yl)methyl)piperidine-3,4,5-triol

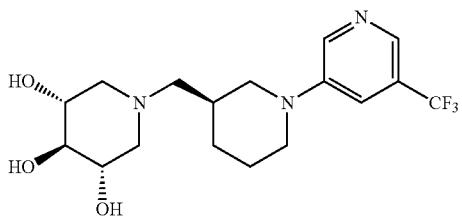 [SMILES: O[C@H]1[C@H](O)CN(C[C@@H]2CCCN(c3cncc(C(F)(F)F)c3)C2)C[C@@H]1O]

To a stirred solution of (3S,4R,5R)-3,4,5-tris(benzyloxy)-1-((R)-piperidin-3-ylmethyl)piperidine (100 mg, 0.20 mmol) and 3-bromo-5-trifluoromethylpyridine (90 mg, 0.40 mmol) in toluene (5 mL) was added Pd$_2$(dba)$_3$ (18 mg, 0.020 mmol) and RuPhos (19 mg, 0.040 mmol), followed with Cs$_2$CO$_3$ (261 mg, 0.81 mmol) under the protection of Ar. The mixture was stirred at 100° C. for 18 h, and then water was added at 0° C. The mixture was extracted with EtOAc (2×30 mL). The combined organic layer was washed with water (2×10 mL), separated, and dried over Na$_2$SO$_4$. After filtration the solvent was evaporated under vacuum, and the residue was purified on silica gel by flash chromatography affording 3-(trifluoromethyl)-5-((S)-3-(((3S,4S,5R)-3,4,5-tris(benzyloxy)piperidin-1-yl)methyl)piperidin-1-yl)pyridine as an oil (108 mg, 84%); ESI MS m/z 646.32 [M+H]$^+$.

To a stirred solution of the above material (108 mg, 0.17 mmol) in anhydrous DCM (5 mL) was added BCl$_3$ (1M in DCM, 0.75 mL, 0.75 mmol) at −78° C. under N$_2$. The mixture was stirred at 0° C. for 4 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, then solvent was removed under vacuum. The residue was purified by silica gel flash chromatography to give (3S,4S,5R)-1-(((S)-1-(5-(trifluoromethyl)pyridin-3-yl)piperidin-3-yl)methyl)piperidine-3,4,5-triol as a white solid (46 mg, 72%). $^1$H NMR (400 MHz, CD$_3$OD) δ 8.46 (d, J=2.8 Hz, 1H), 8.17 (d, J=0.7 Hz, 1H), 7.52 (t, J=2.3 Hz, 1H), 3.81 (dd, J=12.5, 3.6 Hz, 1H), 3.72 (dt, J=12.7, 4.2 Hz, 1H), 3.59-3.49 (m, 2H), 3.13 (t, J=8.8 Hz, 1H), 3.07-2.94 (m, 2H), 2.90 (ddd, J=11.0, 4.9, 2.1 Hz, 1H), 2.75 (dd, J=12.6, 9.3 Hz, 1H), 2.42 (dd, J=12.4, 8.7 Hz, 1H), 2.27 (dd, J=12.4, 5.4 Hz, 1H), 2.01 (t, J=10.6 Hz, 1H), 1.95-1.79 (m, 4H), 1.75-1.60 (m, 1H), 1.32-1.19 (m, 1H); ESI MS m/z 376.19 [M+H]$^+$.

Example 176

(3S,4S,5R)-1-(((S)-1-(4-(trifluoromethyl)pyridin-2-yl)piperidin-3-yl)methyl)piperidine-3,4,5-triol

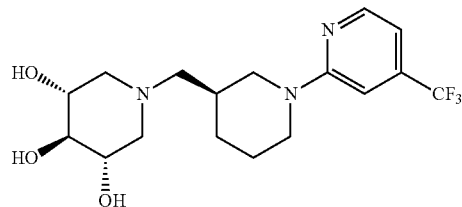 [SMILES: O[C@H]1[C@H](O)CN(C[C@@H]2CCCN(c3cc(C(F)(F)F)ccn3)C2)C[C@@H]1O]

To a stirred solution of (3S,4R,5R)-3,4,5-tris(benzyloxy)-1-((R)-piperidin-3-ylmethyl)piperidine (150 mg, 0.30 mmol) and 2-chloro-4-(trifluoromethyl)pyridine (272 mg, 1.50 mmol) in DMF (5 mL) was added DIPEA (0.42 mL, 2.40 mmol). The mixture was stirred at 100° C. for 18 h, and then water was added at 0° C. The mixture was extracted with EtOAc (2×30 mL). The combined organic layer was washed with water (2×10 mL), separated, and dried over Na$_2$SO$_4$. After filtration the solvent was evaporated under vacuum, and the residue was purified on silica gel by flash chromatography affording 4-(trifluoromethyl)-2-((S)-3-(((3S,4S,5R)-3,4,5-tris(benzyloxy)piperidin-1-yl)methyl)piperidin-1-yl)pyridine as an oil (73 mg, 38%); ESI MS m/z 646.33 [M+H]$^+$.

To a stirred solution of 4-(trifluoromethyl)-2-((S)-3-(((3S,4S,5R)-3,4,5-tris(benzyloxy)piperidin-1-yl)methyl)piperidin-1-yl)pyridine (73 mg, 0.11 mmol) in anhydrous DCM (5 mL) was added BCl₃ (1M in DCM, 0.75 mL, 0.75 mmol) at −78° C. under N₂. The mixture was stirred at 0° C. for 4 h before being quenched with anhydrous MeOH (1 mL). The mixture was stirred at RT for 10 min. Solvent was removed under vacuum, the residue was dissolved in 1M NH₃ in MeOH (10 mL) and stirred for another 10 min, then solvent was removed under vacuum. The residue was purified by silica gel flash chromatography to give (3S,4S,5R)-1-(((S)-1-(4-(trifluoromethyl)pyridin-2-yl)piperidin-3-yl)methyl)piperidine-3,4,5-triol as a white solid (37 mg, 89%). ¹H NMR (400 MHZ, CD₃OD) δ 8.26 (d, J=5.2 Hz, 1H), 6.97 (d, J=0.8 Hz, 1H), 6.81-6.73 (m, 1H), 4.29 (dd, J=13.0, 3.7 Hz, 1H), 4.14 (d, J=13.2 Hz, 1H), 3.60-3.48 (m, 2H), 3.17-3.00 (m, 3H), 2.90 (ddd, J=10.9, 4.9, 2.1 Hz, 1H), 2.79 (dd, J=13.1, 9.6 Hz, 1H), 2.38 (dd, J=12.4, 8.5 Hz, 1H), 2.25 (dd, J=12.4, 5.7 Hz, 1H), 1.97 (t, J=10.6 Hz, 1H), 1.94-1.74 (m, 4H), 1.66-1.52 (m, 1H), 1.37-1.19 (m, 1H); ESI MS m/z 376.19 [M+H]⁺.

Example 177

(3S,4S,5R)-1-(((S)-1-(5-(trifluoromethyl)pyridin-2-yl)piperidin-3-yl)methyl)piperidine-3,4,5-triol

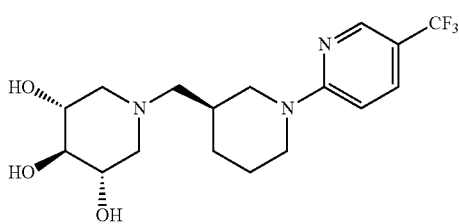 [SMILES: O[C@H]1[C@H](O)CN(C[C@@H]2CCCN(c3ccc(C(F)(F)F)cn3)C2)C[C@@H]1O]

To a stirred solution of (3S,4R,5R)-3,4,5-tris(benzyloxy)-1-((R)-piperidin-3-ylmethyl)piperidine (120 mg, 0.24 mmol) and 2-chloro-5-(trifluoromethyl)pyridine (218 mg, 1.20 mmol) in DMF (5 mL) was added DIPEA (0.33 mL, 1.92 mmol). The mixture was stirred at 100° C. for 18 h, and then water was added at 0° C. The mixture was extracted with EtOAc (2×30 mL). The combined organic layer was washed with water (2×10 mL), separated, and dried over Na₂SO₄. After filtration the solvent was evaporated under vacuum, and the residue was purified on silica gel by flash chromatography affording 5-(trifluoromethyl)-2-((S)-3-(((3S,4S,5R)-3,4,5-tris(benzyloxy)piperidin-1-yl)methyl)piperidin-1-yl)pyridine as an oil (98 mg, 63%); ESI MS m/z 646.33 [M+H]⁺.

To a stirred solution of 5-(trifluoromethyl)-2-((S)-3-(((3S,4S,5R)-3,4,5-tris(benzyloxy)piperidin-1-yl)methyl)piperidin-1-yl)pyridine (98 mg, 0.15 mmol) in anhydrous DCM (5 mL) was added BCl₃ (1M in DCM, 0.75 mL, 0.75 mmol) at −78° C. under N₂. The mixture was stirred at 0° C. for 4 h before being quenched with anhydrous MeOH (1 mL). The mixture was stirred at RT for 10 min. Solvent was removed under vacuum, the residue was dissolved in 1M NH₃ in MeOH (10 mL) and stirred for another 10 min, then solvent was removed under vacuum. The residue was purified by silica gel flash chromatography to give (3S,4S,5R)-1-(((S)-1-(5-(trifluoromethyl)pyridin-2-yl)piperidin-3-yl)methyl)piperidine-3,4,5-triol as a white solid (54 mg, 94%). ¹H NMR (400 MHZ, CD₃OD) δ 8.32 (dd, J=1.7, 0.9 Hz, 1H), 7.75-7.63 (m, 1H), 6.86 (d, J=9.1 Hz, 1H), 4.34 (dd, J=13.3, 3.8 Hz, 1H), 4.19 (dt, J=13.2, 4.2 Hz, 1H), 3.60-3.49 (m, 2H), 3.24-3.09 (m, 2H), 3.04 (ddd, J=10.9, 4.9, 2.2 Hz, 1H), 2.96-2.77 (m, 2H), 2.36 (dd, J=12.4, 8.6 Hz, 1H), 2.25 (dd, J=12.4, 5.8 Hz, 1H), 1.98 (t, J=10.6 Hz, 1H), 1.93-1.73 (m, 4H), 1.63-1.47 (m, 1H), 1.38-1.24 (m, 1H); ESI MS m/z 376.18 [M+H]⁺.

Example 178

(3S,4S,5R)-1-(((S)-1-(6-(trifluoromethyl)pyridin-3-yl)piperidin-3-yl)methyl)piperidine-3,4,5-triol

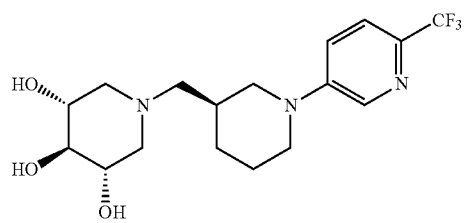 [SMILES: O[C@H]1[C@H](O)CN(C[C@@H]2CCCN(c3ccc(C(F)(F)F)nc3)C2)C[C@@H]1O]

To a stirred solution of (3S,4R,5R)-3,4,5-tris(benzyloxy)-1-((R)-piperidin-3-ylmethyl)piperidine (135 mg, 0.27 mmol) and 5-bromo-2-trifluoromethylpyridine (122 mg, 0.54 mmol) in toluene (5 mL) was added Pd₂(dba)₃ (25 mg, 0.027 mmol) and RuPhos (25 mg, 0.054 mmol), followed with Cs₂CO₃ (264 mg, 0.81 mmol) under the protection of Ar. The mixture was stirred at 100° C. for 18 h, and then water was added at 0° C. The mixture was extracted with EtOAc (2×30 mL). The combined organic layer was washed with water (2×10 mL), separated, and dried over Na₂SO₄. After filtration the solvent was evaporated under vacuum, and the residue was purified on silica gel by flash chromatography affording 2-(trifluoromethyl)-5-((S)-3-(((3S,4S,5R)-3,4,5-tris(benzyloxy)piperidin-1-yl)methyl)piperidin-1-yl)pyridine as an oil (84 mg, 48%); ESI MS m/z 646.33 [M+H]⁺.

To a stirred solution of the above material (84 mg, 0.13 mmol) in anhydrous DCM (5 mL) was added BCl₃ (1M in DCM, 0.75 mL, 0.75 mmol) at −78° C. under N₂. The mixture was stirred at 0° C. for 4 h before being quenched with anhydrous MeOH (1 mL). The mixture was stirred at RT for 10 min. Solvent was removed under vacuum, the residue was dissolved in 1M NH₃ in MeOH (10 mL) and stirred for another 10 min, then solvent was removed under vacuum. The residue was purified by silica gel flash chromatography to give (3S,4S,5R)-1-(((S)-1-(6-(trifluoromethyl)pyridin-3-yl)piperidin-3-yl)methyl)piperidine-3,4,5-triol as a white solid (33 mg, 68%). ¹H NMR (400 MHZ, CD₃OD) δ 8.30 (d, J=2.9 Hz, 1H), 7.59 (d, J=8.9 Hz, 1H), 7.42-7.38 (m, 1H), 3.94-3.85 (m, 1H), 3.82-3.75 (m, 1H), 3.58-3.49 (m, 2H), 3.13 (t, J=8.8 Hz, 1H), 3.10-2.99 (m, 2H), 2.89 (ddd, J=11.0, 5.0, 2.2 Hz, 1H), 2.80 (dd, J=12.9, 9.4 Hz, 1H), 2.40 (dd, J=12.5, 8.7 Hz, 1H), 2.27 (dd, J=12.5, 5.4 Hz, 1H), 2.07-1.97 (m, 1H), 1.96-1.77 (m, 4H), 1.74-1.61 (m, 1H), 1.34-1.20 (m, 1H); ESI MS m/z 376.19 [M+H]⁺.

Example 179

(3S,4S,5R)-1-(((S)-1-(3-(trifluoromethyl)pyridin-4-yl)piperidin-3-yl)methyl)piperidine-3,4,5-triol

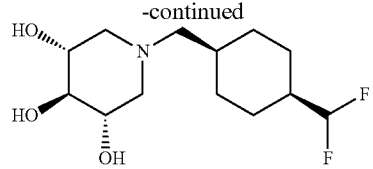

To a stirred solution of (3S,4R,5R)-3,4,5-tris(benzyloxy)-1-((R)-piperidin-3-ylmethyl)piperidine (200 mg, 0.40 mmol) and 4-chloro-3-(trifluoromethyl)pyridine (218 mg, 1.20 mmol) in DMF (5 mL) was added DIPEA (0.56 mL, 3.20 mmol). The mixture was stirred at 100° C. for 18 h, and then water was added at 0° C. The mixture was extracted with EtOAc (2×30 mL). The combined organic layer was washed with water (2×10 mL), separated, and dried over Na$_2$SO$_4$. After filtration the solvent was evaporated under vacuum, and the residue was purified on silica gel by flash chromatography affording 3-(trifluoromethyl)-4-((S)-3-(((3S,4S,5R)-3,4,5-tris(benzyloxy)piperidin-1-yl)methyl)piperidin-1-yl)pyridine as an oil (150 mg, 58%); ESI MS m/z 646.32 [M+H]$^+$.

To a stirred solution of the above material (150 mg, 0.23 mmol) in anhydrous DCM (5 mL) was added BCl$_3$ (1M in DCM, 1.16 mL, 1.16 mmol) at −78° C. under N$_2$. The mixture was stirred at 0° C. for 4 h before being quenched with anhydrous MeOH (1 mL). The mixture was stirred at RT for 10 min. Solvent was removed under vacuum, the residue was dissolved in 1M NH$_3$ in MeOH (10 mL) and stirred for another 10 min, then solvent was removed under vacuum. The residue was purified by silica gel flash chromatography to give (3S,4S,5R)-1-(((S)-1-(3-(trifluoromethyl)pyridin-4-yl)piperidin-3-yl)methyl)piperidine-3,4,5-triol as an oil (54 mg, 63%). $^1$H NMR (400 MHZ, CD$_3$OD) δ 8.57 (s, 1H), 8.43 (d, J=5.9 Hz, 1H), 7.16 (d, J=6.0 Hz, 1H), 3.73-3.60 (m, 1H), 3.54-3.41 (m, 3H), 3.10 (t, J=8.8 Hz, 1H), 3.06-2.93 (m, 2H), 2.84 (ddd, J=11.0, 5.0, 2.2 Hz, 1H), 2.64 (dd, J=12.5, 9.7 Hz, 1H), 2.39-2.20 (m, 2H), 1.98 (t, J=10.6 Hz, 2H), 1.91-1.78 (m, 3H), 1.77-1.64 (m, 1H), 1.26-1.12 (m, 1H); ESI MS m/z 376.18 [M+H]$^+$.

Examples 185 and 186

(3S,4R,5R)-1-(((1r,4R)-4-(difluoromethyl)cyclohexyl)methyl)piperidine-3,4,5-triol and (3S,4R,5R)-1-(((1s,4S)-4-(difluoromethyl)cyclohexyl)methyl)piperidine-3,4,5-triol

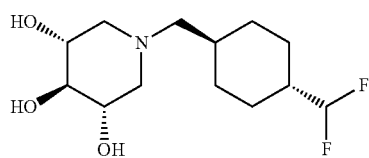

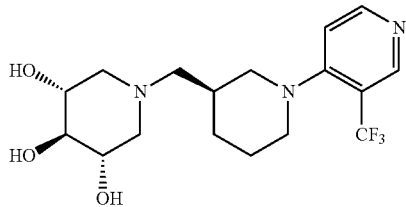 [SMILES: O[C@H]1[C@H](O)CN(C[C@@H]2CCCN(c3ccncc3C(F)(F)F)C2)C[C@@H]1O]

Under Ar to a solution of cyclohexane-1,4-diyldimethanol (2.00 g, 13.9 mmol) in anhydrous DCM (60 mL) cooled at 0° C. was added DIPEA (2.06 g, 16.0 mmol) and benzoyl chloride (1.97 g, 14.0 mmol). The mixture was stirred at RT for 16 h, and then diluted with satd. aqueous NaHCO$_3$ (50 mL). After extraction with DCM (3×30 mL) the combined extract was dried over anhydrous Na$_2$SO$_4$. After filtration the solvent was evaporated under vacuum, and the residue was purified on silica gel by flash chromatography (EtOAc/hexanes, 1:3 to 1:2) to give (4-(hydroxymethyl)cyclohexyl)methyl benzoate as a pale-yellow oil (1.51 g, 43%).

A mixture of the above material (0.950 g, 3.83 mmol) and DMP (2.12 g, 5.0 mmol) in DCM (30 mL) was stirred at RT for 1 h, forming a white suspension. Hexanes (40 mL) was added, and the suspension was filtered through a Celite cake. The filtrate was collected and concentrated under vacuum, and the residue was purified on silica gel by flash chromatography (EtOAc/hexanes, 1:4), affording (4-formylcyclohexyl)methyl benzoate as a colorless oil (0.50 g, 53%).

Under Ar to a solution of the above material (0.50 g, 2.0 mmol) in anhydrous DCM (10 mL) cooled at −78° C. was added DAST (0.80 g, 5.0 mmol), and the mixture was stirred at −78° C. for 30 min and then at RT for 5 h. The reaction mixture was cooled at −78° C., and quenched with satd. aqueous NaHCO$_3$ (20 mL). The organic layer was collected, and the aqueous was extracted with DCM (3×20 mL). The combined extract was dried over anhydrous Na$_2$SO$_4$. After filtration the solvent was evaporated under vacuum, and the residue was purified on silica gel by flash chromatography (EtOAc/hexanes, 1:10), affording (4-(difluoromethyl)cyclohexyl)methyl benzoate as a colorless oil (0.40 g, 75%).

A mixture of the above material (0.40 g, 1.5 mmol) and K$_2$CO$_3$ (0.45 g, 0.33 mmol) in MeOH (25 mL) was stirred for 16 h. The solvent was removed under vacuum, and the residue was purified on silica gel by flash chromatography (EtOAc/hexanes, 1:2), affording (4-(difluoromethyl)cyclohexyl) methanol as a clear liquid (0.21 g, 86%).

To solution of the above material (0.21 g, 1.3 mmol) in acetone (25 mL) cooled at 0° C. was added a solution of CrO$_3$ (0.60 g. 6.0 mmol) in 2.0 M aqueous H$_2$SO$_4$ (6 mL) pre-cooled at 0° C. The mixture was stirred at 0° C. for 1 h, and at RT for 16 h. Then isopropanol (5 mL) was added, and the mixture was stirred for another 1 h. After concentration under vacuum the mixture was diluted with water (50 mL) and extracted with DCM (3×20 mL). The combined extract was dried over anhydrous Na$_2$SO$_4$. After filtration the solvent was evaporated under vacuum, and the residue was purified on silica gel by flash chromatography (EtOAc/hexanes, 1:1 to 3:1), affording 4-(difluoromethyl)cyclohexanecarboxylic acid as a white solid (0.22 g, 96%). 1H NMR indicated the solid contains a mixture of cis and trans isomers in a ratio of cis:trans=0.32:0.68).

A mixture of the above material of cis and trans isomers (0.050 g, 0.28 mmol), (3S,4r,5R)-3,4,5-tris(benzyloxy)piperidine (0.112 g, 0.28 mmol), HATU (0.20 g, 0.53 mmol) and DIPEA (0.11 g, 0.85 mmol) in DMF (5 mL) was stirred at RT for 16 h. The reaction mixture was diluted with satd. aqueous NaHCO$_3$ (20 mL) and extracted with EtOAc (3×15 mL). The combined extract was washed with brine (2×20 mL) and dried over anhydrous Na₂SO₄. After filtration the solvent was evaporated under vacuum, and the residue was purified and separated on silica gel by flash chromatography (EtOAc/hexanes, 1:3 to 1:2), affording ((1s,4S)-4-(difluoromethyl)cyclohexyl)((3S,4R,5R)-3,4,5-tris(benzyloxy)piperidin-1-yl)methanone (0.048 g, 32%) and ((1r,4R)-4-(difluoromethyl)cyclohexyl)((3S,4R,5R)-3,4,5-tris(benzyloxy)piperidin-1-yl)methanone (0.105 g, 62%), both as white solids; ESI MS m/z 564.291 [M+H]⁺.

Under Ar to a solution of ((1s,4S)-4-(difluoromethyl)cyclohexyl)((3S,4R,5R)-3,4,5-tris(benzyloxy)piperidin-1-yl)methanone (0.10 g, 0.18 mmol) in anhydrous Et₂O (10 mL) cooled at 0° C. was added LAH (0.050 g, 1.3 mmol), and the mixture was stirred at 0° C. for 4 h. The reaction was then quenched with water and diluted with satd. aqueous NaHCO₃ (20 mL). After extraction with Et₂O (3×30 mL) the combined extract was dried over anhydrous Na₂SO₄. After filtration the solvent was evaporated under vacuum, and the residue was purified on silica gel by flash chromatography (EtOAc/hexanes, 1:9 to 1:7) to give (3S,4R,5R)-3,4,5-tris(benzyloxy)-1-(((1s,4S)-4-(difluoromethyl)cyclohexyl)methyl)piperidine as a colorless oil (0.085 g, 87%); ESI MS m/z 550.316 [M+H]⁺.

A mixture of the above material (0.085 g, 0.16 mmol), Pd(OH)₂/C (20% Pd in weight, 0.050 g, 0.094 mmol) and 2 drops of concentrated HCl in MeOH (20 mL) was stirred under hydrogen at one atmosphere of pressure overnight. The mixture was filtered through a Celite cake, and the filtrate was collected and concentrated to dryness. The residue was neutralized with 1 M NH₃ in MeOH and subsequently purified on silica gel by flash chromatography (0.5 M NH₃ MeOH/DCM, 1:6), affording (3S,4R,5R)-1-(((1s,4S)-4-(difluoromethyl)cyclohexyl)methyl)piperidine-3,4,5-triol (0.030 g, 68%) as a white solid. ¹H NMR (400 MHZ, CD₃OD) δ 5.74 (td, J=57.1, 5.3 Hz, 1H), 3.48 (ddd, J=10.3, 8.8, 4.7 Hz, 2H), 3.08 (t, J=8.9 Hz, 1H), 2.99-2.88 (m, 2H), 2.31 (d, J=7.4 Hz, 2H), 1.97-1.73 (m, 4H), 1.62-1.45 (m, 8H); ESI MS m/z 280.174 [M+H]⁺.

(3S,4R,5R)-1-(((1r,4R)-4-(difluoromethyl)cyclohexyl)methyl)piperidine-3,4,5-triol was prepared from ((1r,4R)-4-(difluoromethyl)cyclohexyl)((3S,4R,5R)-3,4,5-tris(benzyloxy)piperidin-1-yl)methanone as described for (3S,4R,5R)-1-(((1s,4S)-4-(difluoromethyl)cyclohexyl)methyl)piperidine-3,4,5-triol, and was obtained as a white solid. ¹H NMR (400 MHZ, CD₃OD) δ 5.60 (td, J=57.1, 4.5 Hz, 1H), 3.48 (ddd, J=10.2, 8.7, 4.7 Hz, 2H), 3.08 (t, J=8.8 Hz, 1H), 2.92 (ddd, J=10.6, 4.7, 1.6 Hz, 2H), 2.20 (d, J=7.0 Hz, 2H), 1.92-162 (m, 7H), 1.55-1.44 (m, 1H), 1.25-1.12 (m, 2H), 1.01-0.84 (m, 2H); ESI MS m/z 280.168 [M+H]⁺.

Example 187 and 188

(3S,4R,5R)-1-(((1s,4S)-4-(1,1-difluoroethyl)cyclohexyl)methyl)piperidine-3,4,5-triol and (3S,4R,5R)-1-(((1r,4R)-4-(1,1-difluoroethyl)cyclohexyl)methyl)piperidine-3,4,5-triol

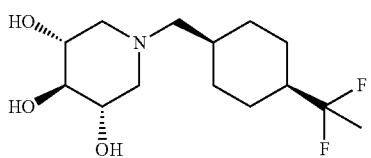

-continued

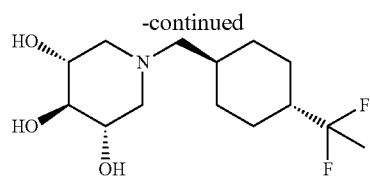

To a solution of cis/trans-4-(hydroxymethyl)cyclohexanecarboxylic acid (3.20 g, 20.2 mmol) in anhydrous MeOH (50 mL) was added SOCl₂ (4.8 g, 40 mmol) dropwise, and the mixture was stirred at RT for 4 h. The solvent was then removed under vacuum, and the residue was diluted with satd. aqueous NaHCO₃ (40 mL). After extraction with DCM (3×40 mL) the combined extract was dried over anhydrous Na₂SO₄. After filtration the solvent was evaporated under vacuum to give a clear liquid. The liquid was dissolved in anhydrous DMF (30 mL) and cooled at 0° C., and imidazole (2.72 g, 40.0 mmol) and TBDMSCI (4.52 g, 30.0 mmol) was then added. After stirred at RT for 16 h the reaction mixture was diluted with brine (100 mL) and extracted with EtOAc (3×40 mL). The combined extract was washed with brine (2×100 mL) and dried over anhydrous Na₂SO₄. After filtration the solvent was evaporated under vacuum, and the residue was purified on silica gel by flash chromatography (EtOAc/hexanes, 1:9), affording a colorless oil. Under Ar the oil was dissolved in anhydrous THF 50 mL), and the solution was cooled at 0° C. LAH (1.00 g, 26.3 mmol) was added portion-wise, and the mixture was stirred at 0° C. for 1 h. Wet sodium sulfate heptahydrate (50 g) was added to quench the reaction, and the suspension was stirred for 30 min. After filtration the solvent was evaporated under vacuum, and the residue was purified on silica gel by flash chromatography (EtOAc/hexanes, 1:4 to 1:2) to give a mixture of cis and trans-(4-(((tert-butyldimethylsilyl)oxy)methyl)cyclohexyl) methanol as a colorless oil (4.6 g, 88%, 3 steps).

Under Ar to a solution of DMSO (1.95 g, 25.0 mmol) in anhydrous DCM (80 mL) cooled at −78° C. was added a solution of oxalyl chloride (1.93 g, 15.0 mmol) in anhydrous DCM (20 mL). After addition the mixture was stirred −78° C. for 1 h, and a solution of the above material (2.58 g, 10.0 mmol) in anhydrous DCM (20 mL) was added. After the mixture was stirred at −78° C. for 1 h Et₃N (5.4 mL, 40 mmol) was added, and the mixture was stirred at −78° C. for 30 min, and then at RT for 30 min. The mixture was then diluted with satd. aqueous NaHCO₃ (50 mL) and the organic layer was collected. The aqueous layer was extracted with DCM (50 mL) and the combined organic extract was dried over anhydrous Na₂SO₄. After filtration the solvent was evaporated under vacuum, and the residue was purified on silica gel by flash chromatography (EtOAc/hexanes, 1:9), affording 4-(((tert-butyldimethylsilyl)oxy)methyl)-cyclohexanecarbaldehyde as a colorless oil (2.30 g, 90%).

Under Ar to a solution of the above material (2.30 g, 9.00 mmol) in anhydrous THF (40 mL) cooled 0° C. was added MeMgCl (3.0 M in THF, 4.0 mL, 12 mmol), and the mixture was stirred at RT for 16 h. The reaction mixture was quenched with icy water, diluted with satd. aqueous NH₄Cl (30 mL), and extracted with EtOAc (2×50 mL). The combined extract was dried over anhydrous Na₂SO₄. After filtration the solvent was evaporated under vacuum, and the residue was purified on silica gel by flash chromatography (EtOAc/hexanes, 1:4), affording 1-(4-(((tert-butyldimethylsilyl)oxy)methyl)cyclohexyl) ethanol as a colorless oil (2.40 g, 98%).

A mixture of the above material (2.40 g, 8.80 mmol) and DMP (5.60 g. 13.2 mmol) in DCM (50 mL) was stirred at RT for 3 h, forming a white suspension. Hexanes (50 mL) was added, and the suspension was filtered through a Celite cake. The filtrate was collected and concentrated under vacuum, and the residue was purified on silica gel by flash chromatography (EtOAc/hexanes, 1:15 to 1:6), affording 1-(4-(((tert-butyldimethylsilyl)oxy)methyl)cyclohexyl) ethanone as a colorless oil (2.11 g, 89%).

Under Ar to a solution of the above material (2.11 g, 7.8 mmol) in anhydrous THF (30 mL) cooled at 0° C. was added TBAF (1.0 M in THF, 10.0 mL, 10.0 mmol), and the mixture was stirred at RT for 3 h. After diluted with satd. aqueous $NaHCO_3$ (40 mL) the mixture was extracted with EtOAc (2×30 mL), and the combined extract was dried over anhydrous $Na_2SO_4$. After filtration the solvent was evaporated under vacuum, and the residue was purified on silica gel by flash chromatography (EtOAc/hexanes, 2:3 to 1:1), affording 1-(4-(hydroxymethyl)cyclohexyl) ethanone as a clear liquid (1.10 g, 92%).

Under Ar to a solution of the above material (1.10 g, 7.20 mmol) in anhydrous DCM (25 mL) cooled at 0° C. was added DMAP (0.25 g, 2.0 mmol), DIPEA (1.93 g, 15.0 mmol) and benzoyl chloride (1.40 g, 10.0 mmol). The mixture was stirred at RT for 16 h, and diluted with satd. aqueous $NaHCO_3$ (30 mL). After extraction with DCM (3×30 mL) the combined extract was dried over anhydrous $Na_2SO_4$. After filtration the solvent was evaporated under vacuum, and the residue was purified on silica gel by flash chromatography (EtOAc/hexanes, 1:6 to 1:3) to give (4-acetylcyclohexyl)methyl benzoate as a pale-yellow oil (1.85 g, 99%).

Under Ar to a solution of the above material (1.70 g, 6.53 mmol) in anhydrous DCM (15 mL) was added DAST (5.74 g, 35.9 mmol), and the mixture was stirred at RT for 1 h, and then heated at reflux for 4 days. The reaction mixture was cooled at −78° C., and quenched with satd. aqueous $NaHCO_3$ (50 mL). After extracted with DCM (2×50 mL) the combined extract was dried over anhydrous $Na_2SO_4$. After filtration the solvent was evaporated under vacuum, and the residue was purified on silica gel by flash chromatography (EtOAc/hexanes, 1:11 to 1:9), affording (4-(1,1-difluoroethyl)cyclohexyl)methyl benzoate as a pale-yellow oil (1.45 g, 79%).

A mixture of the above material (1.45 g, 5.13 mmol) and $K_2CO_3$ (1.5 g, 11 mmol) in MeOH (40 mL) was stirred for 16 h. The solvent was removed under vacuum, and the residue was purified on silica gel by flash chromatography (EtOAc/hexanes, 1:4 to 1:2), affording (4-(1,1-difluoroethyl)cyclohexyl) methanol as a clear liquid (0.85 g, 93%).

To solution of the above material (0.85 g, 4.8 mmol) in acetone (40 mL) cooled at 0° C. was added a solution of $CrO_3$ (1.5 g. 15 mmol) in 2.0 M aqueous $H_2SO_4$ (10 mL) pre-cooled at 0° C. The mixture was stirred at 0° C. for 1 h, and at RT for 16 h. Then isopropanol (5 mL) was added, and the mixture was stirred for another 1 h. After concentration under vacuum the mixture was diluted with water (50 mL) and extracted with DCM (3×30 mL). The combined extract was dried over anhydrous $Na_2SO_4$. After filtration the solvent was evaporated under vacuum, affording 4-(1,1-difluoroethyl)cyclohexanecarboxylic acid as a white solid (0.90 g, 98%). $^1H$ NMR indicated the solid contained a mixture of cis and trans isomers in a ratio of cis:trans=0.35:0.65.

A mixture of the above mixture of cis and trans isomers (0.190 g, 1.00 mmol), (3S,4S,5R)-3,4,5-tris(benzyloxy)-1-((S)-piperidin-3-ylmethyl)piperidine (0.300 g, 0.743 mmol), HATU (0.46 g, 1.2 mmol) and DIPEA (0.19 g, 1.5 mmol) in DMF (10 mL) was stirred at RT for 16 h. The reaction mixture was diluted with satd. aqueous $NaHCO_3$ (30 mL), and extracted with EtOAc (2×30 mL). The combined extract was washed with brine (2×20 mL) and dried over anhydrous $Na_2SO_4$. After filtration the solvent was evaporated under vacuum, and the residue was purified and separated on silica gel by flash chromatography (EtOAc/hexanes, 1:5 to 1:3), affording ((1s,4S)-4-(1,1-difluoroethyl)cyclohexyl)((3S,4R,5R)-3,4,5-tris(benzyloxy)piperidin-1-yl)methanone (0.127 g, 31%) and ((1r,4R)-4-(1,1-difluoroethyl)cyclohexyl)((3S,4R,5R)-3,4,5-tris(benzyloxy)piperidin-1-yl)methanone (0.228 g, 55%), both as white solids.

Under Ar to a solution of ((1s,4S)-4-(1,1-difluoroethyl)cyclohexyl)((3S,4R,5R)-3,4,5-tris(benzyloxy)piperidin-1-yl)methanone (0.127 g, 0.220 mmol) in anhydrous $Et_2O$ (15 mL) cooled at 0° C. was added LAH (0.050 g, 1.3 mmol), and the mixture was stirred at 0° C. for 4 h. The reaction was then quenched with water and diluted with satd. aqueous $NaHCO_3$ (20 mL). After extraction with $Et_2O$ (3×30 mL) the combined extract was dried over anhydrous $Na_2SO_4$. After filtration the solvent was evaporated under vacuum, and the residue was purified on silica gel by flash chromatography (EtOAc/hexanes, 1:9 to 1:7) to give (3S,4R,5R)-3,4,5-tris(benzyloxy)-1-(((1s,4S)-4-(1,1-difluoroethyl)cyclohexyl)methyl)piperidine as a colorless oil (0.11 g, 89%); ESI MS m/z 564.326 $[M+H]^+$.

A mixture of the above material (0.11 g, 0.20 mmol), $Pd(OH)_2/C$ (20% Pd in weight, 0.050 g, 0.094 mmol) and 2 drops of concentrated HCl in MeOH (15 mL) was stirred under hydrogen at one atmosphere of pressure overnight. The mixture was filtered through a celite cake, and the filtrate was collected and concentrated to dryness. The residue was neutralized with 1 M $NH_3$ in MeOH and subsequently purified on silica gel by flash chromatography (0.5 M $NH_3$ MeOH/DCM, 1:6), affording (3S,4R,5R)-1-(((1s,4S)-4-(1,1-difluoroethyl)cyclohexyl)methyl)piperidine-3,4,5-triol (0.050 g, 88%) as a white solid. $^1H$ NMR (400 MHz, $CD_3OD$) δ 3.48 (ddd, J=10.3, 8.8, 4.7 Hz, 2H), 3.09 (t, J=8.8 Hz, 1H), 3.00-2.85 (m, 2H), 2.36 (d, J=7.5 Hz, 2H), 2.01-1.84 (m, 2H), 1.78-1.67 (m, 2H), 1.73 (dq, J=13.4, 3.7 Hz, 2H), 1.68-1.43 (m, 7H), 1.44-1.28 (m, 2H); ESI MS m/z 294.188 $[M+H]^+$.

((3S,4R,5R)-1-(((1r,4R)-4-(1,1-difluoroethyl)cyclohexyl)methyl)piperidine-3,4,5-triol was prepared from ((1r,4R)-4-(1,1-difluoroethyl)cyclohexyl)((3S,4R,5R)-3,4,5-tris(benzyloxy)piperidin-1-yl)methanone as described for (3S,4R,5R)-1-(((1s,4S)-4-(1,1-difluoroethyl)cyclohexyl)methyl) piperidine-3,4,5-triol, and was obtained as a white solid. $^1H$ NMR (400 MHZ, DMSO-$d_6$) δ 4.70 (d, J=4.3 Hz, 1H), 4.66 (d, J=4.8 Hz, 2H), 3.33-3.18 (m, 2H), 2.87 (td, J=8.6, 4.4 Hz, 1H), 2.78-2.71 (m, 2H), 2.07 (d, J=7.1 Hz, 2H), 1.83-1.74 (m, 4H), 1.74-1.64 (m, 3H), 1.53 (t, J=19.4 Hz, 3H), 1.44-1.33 (m, 1H), 1.21-1.06 (m, 2H), 0.88-0.78 (m, 2H); ESI MS m/z 294.189 $[M+H]^+$.

Example 189

(3S,4R,5R)-1-(((1r,4R)-4-(trifluoromethoxy)cyclohexyl)methyl)piperidine-3,4,5-triol

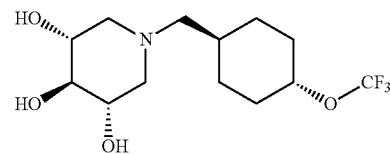 [SMILES: O[C@H]1[C@H](O)CN(C[C@H]2CC[C@H](OC(F)(F)F)CC2)C[C@@H]1O]

HATU (285 mg, 0.75 mmol) was added to a mixed solution of (3S,4r,5R)-3,4,5-tris(benzyloxy)piperidine (200 mg, 0.50 mmol) and 4-(trifluoromethoxy)cyclohexanecarboxylic acid (105 mg, 0.50 mmol) in DMF (10 mL) at 0° C., followed with the addition of DIPEA (0.26 mL, 1.5 mmol). The mixture was stirred at RT for 18 h. Water was added to quench the reaction. The mixture was extracted with EtOAc (3×20 mL). The combined organic layer was washed with water (2×30 mL), separated, and dried over $Na_2SO_4$. After filtration, the solvent was evaporated under vacuum, and the residue was purified on silica gel by flash chromatography affording ((1r,4R)-4-(trifluoromethoxy)cyclohexyl)((3S,4R,5R)-3,4,5-tris(benzyloxy)piperidin-1-yl)methanone as a white solid (90 mg, 30%); ESI MS m/z 598.27 $[M+H]^+$.

To a solution of the above material (90 mg, 0.15 mmol) in anhydrous $Et_2O$ (5 mL) at 0° C., was added LAH (30 mg, 0.75 mmol), and the mixture was stirred at 0° C. for 4 h. The mixture was quenched slowly with satd. aqueous $Na_2SO_4$ and filtered. The solid was washed with EtOAc. The combined organic layer was washed with water (2×20 mL), separated, and dried over $Na_2SO_4$. After filtration, the solvent was evaporated under vacuum, and the residue was purified on silica gel by flash chromatography affording (3S,4R,5R)-3,4,5-tris(benzyloxy)-1-(((1r,4R)-4-(trifluoromethoxy)cyclohexyl)methyl)piperidine as an oil (64 mg, 73%); ESI MS m/z 584.29 $[M+H]^+$.

To a stirred solution of the above material (60 mg, 0.10 mmol) in anhydrous DCM (5 mL) was added $BCl_3$ (1M in DCM, 0.50 mL, 0.50 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, then solvent was removed under vacuum. The residue was purified by silica gel flash chromatography to give (3S,4R,5R)-1-(((1r,4R)-4-(trifluoromethoxy)cyclohexyl)methyl)piperidine-3,4,5-triol as a white solid (18 mg, 57%). $^1$H NMR (400 MHZ, $CD_3OD$) δ 4.28-4.14 (m, 1H), 3.55-3.42 (m, 2H), 3.09 (t, J=8.8 Hz b, 1H), 2.92 (ddd, J=10.4, 4.3, 1.5 Hz, 2H), 2.92 (ddd, J=10.4, 4.3, 1.5 Hz, 2H), 2.15-2.06 (m, 2H), 1.99-1.83 (m, 5H), 1.59-1.42 (m, 3H), 1.12-0.95 (m, 2H); ESI MS m/z 314.15 $[M+H]^+$.

Example 190

(3S,4r,5R)-1-((4,7-difluoro-2,3-dihydro-1H-inden-2-yl)methyl)piperidine-3,4,5-triol

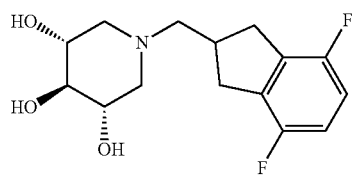 [SMILES: O[C@H]1[C@H](O)CN(CC2Cc3c(F)ccc(F)c3C2)C[C@@H]1O]

NBS (1.55 g, 8.68 mmol) was added to a solution of 1,4-difluoro-2,3-dimethylbenzene (560 mg, 3.94 mmol) in $CHCl_3$ (20 mL) at RT, followed with the addition of ABCN (77 mg, 0.32 mmol). The mixture was stirred at reflux for 3 h, and cooled to RT. Water was added to quench the reaction. The mixture was extracted with DCM (3×20 mL). The combined organic layer was washed with water (2×30 mL), separated, and dried over $Na_2SO_4$. After filtration, the solvent was evaporated under vacuum, and the residue was purified on silica gel by flash chromatography affording 2,3-bis(bromomethyl)-1,4-difluorobenzene as an oil (600 mg, 51%).

Dimethylmalonate (0.28 mL, 2.42 mmol) was added to NaH (480 mg, 60%, 12 mmol) in THF (150 mL) and stirred for 30 min at RT before the addition of the above material (600 mg, 2.01 mmol). The mixture was stirred for 18 h at RT, then quenched with water slowly. The mixture was extracted with EtOAc (3×20 mL). The combined organic layer was washed with water (2×30 mL), separated, and dried over $Na_2SO_4$. After filtration, the solvent was evaporated under vacuum, and the residue was purified on silica gel by flash chromatography affording dimethyl 4,7-difluoro-1H-indene-2,2 (3H)-dicarboxylate as an oil (136 mg, 25%).

The above material (130 mg, 0.44 mmol) was dissolved in dioxane (4 mL) and 6N HCl (8 mL), the mixture was refluxed for 20 h, and cooled to RT. The mixture was extracted with EtOAc (3×20 mL). The combined organic layer was washed with water (2×30 mL), separated, and dried over $Na_2SO_4$. After filtration, the solvent was evaporated under vacuum, and the residue containing 4,7-difluoro-2,3-dihydro-1H-indene-2-carboxylic acid was used in the next step without purification (44 mg, 49%).

HATU (205 mg, 0.54 mmol) was added to a stirred solution of (3S,4r,5R)-3,4,5-tris(benzyloxy)piperidine (147 mg, 0.36 mmol) and the above material (87 mg, 0.44 mmol) in DMF (8 mL) at 0° C., followed with the addition of DIPEA (0.25 mL, 1.44 mmol). The mixture was stirred at RT for 18 h. Water was added to quench the reaction. The mixture was extracted with EtOAc (3×20 mL). The combined organic layer was washed with water (2×30 mL), separated, and dried over $Na_2SO_4$. After filtration, the solvent was evaporated under vacuum, and the residue was purified on silica gel by flash chromatography affording (4,7-difluoro-2,3-dihydro-1H-inden-2-yl)((3S,4r,5R)-3,4,5-tris(benzyloxy)piperidin-1-yl)methanone as an oil (208 mg, 99%); ESI MS m/z 584.26 $[M+H]^+$.

To a solution of the above material (140 mg, 0.18 mmol) in anhydrous $Et_2O$ (5 mL) at 0° C., was added LAH (30 mg, 0.75 mmol), and the mixture was stirred at 0° C. for 4 h. The mixture was quenched slowly with satd. aqueous $Na_2SO_4$ and filtered. The solid was washed with EtOAc. The combined organic layer was washed with water (2×20 mL), separated, and dried over $Na_2SO_4$. After filtration, the solvent was evaporated under vacuum, and the residue was purified on silica gel by flash chromatography affording (3S,4r,5R)-3,4,5-tris(benzyloxy)-1-((4,7-difluoro-2,3-dihydro-1H-inden-2-yl)methyl)piperidine as an oil (102 mg, 99%); ESI MS m/z 570.27 $[M+H]^+$.

To a stirred solution of the above material (102 mg, 0.18 mmol) in anhydrous DCM (5 mL) was added $BCl_3$ (1M in DCM, 0.88 mL, 0.88 mmol) at −78° C. under $N_2$. The mixture was stirred at 0° C. for 2 h before being quenched with anhydrous MeOH (1 mL). The mixture was stirred at RT for 10 min. Solvent was removed under vacuum, the residue was dissolved in 1M $NH_3$ in MeOH (10 mL) and stirred for another 10 min, then solvent was removed under vacuum. The residue was purified by silica gel flash chromatography to (3S,4r,5R)-1-((4,7-difluoro-2,3-dihydro-1H-inden-2-yl)methyl)piperidine-3,4,5-triol as a white solid (42 mg, 78%). $^1$H NMR (400 MHZ, $CD_3OD$) δ 6.88-6.82 (m, 2H), 3.59-3.49 (m, 2H), 3.19-3.06 (m, 3H), 3.05-2.96 (m, 2H), 2.88-2.79 (m, 1H), 2.78-2.70 (m, 2H), 2.46 (d, J=7.6 Hz, 2H), 2.03-1.92 (m, 2H); ESI MS m/z 300.14 $[M+H]^+$.

Example 191

Cyclohexyl(4-fluoro-4-(((3S,4r,5R)-3,4,5-trihydroxypiperidin-1-yl)methyl)piperidin-1-yl)methanone

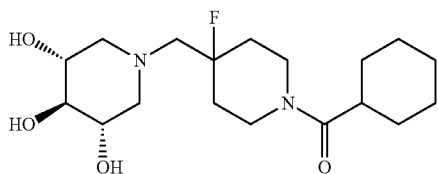 [SMILES: O=C(C1CCCCC1)N1CCC(F)(CN2C[C@@H](O)[C@H](O)[C@@H](O)C2)CC1]

Under Ar, to a mixture of (3S,4r,5R)-3,4,5-tris(benzyloxy)-1-((4-fluoropiperidin-4-yl)methyl)piperidine) (167 mg, 0.32 mmol), cyclohexanecarboxylic acid (41 mg, 0.32 mmol), and DIPEA (0.2 mL, 1.0 mmol) in anhydrous DMF (5 mL) was added HATU (43.5 mg, 0.32 mmol). The mixture was stirred at RT for 18 h, satd. aqueous NaHCO$_3$ (30 mL) was added, and the mixture was extracted with EtOAc (3×30 mL). The combined organic extract was dried over anhydrous Na$_2$SO$_4$. After filtration the solvent was evaporated under reduced pressure and the residue was purified on silica gel by flash chromatography using 30% EtOAc in hexanes, affording cyclohexyl(4-fluoro-4-(((3S,4r,5R)-3,4,5-tris(benzyloxy)piperidin-1-yl)methyl)piperidin-1-yl)methanone as a white foam (80 mg, 40%).

At −78° C. under Ar, to a solution of the above material (80 mg, 0.13 mmol) in anhydrous DCM (2 mL) was added BCl$_3$ solution (0.63 mL, 1 M in DCM, 1.50 mmol). The mixture was stirred at −78° C. for 1 h and 0° C. for 4 h, then MeOH (20 mL) was added. The mixture was stirred for an additional 2 h at 0° C. and evaporated to dryness under reduced pressure. The residue was purified on silica gel by flash chromatography (dry load) using 10% MeOH and 2% NH$_3$ solution in DCM, affording cyclohexyl(4-fluoro-4-(((3S,4r,5R)-3,4,5-trihydroxypiperidin-1-yl)methyl)piperidin-1-yl)methanone (25 mg, 55%). $^1$H NMR (400 MHZ, CD$_3$OD) δ 4.32 (d, J=13.0 Hz, 1H), 3.89 (d, J=13.8 Hz, 1H), 3.49 (ddd, J=10.2, 8.7, 4.8 Hz, 2H), 3.45-3.35 (m, 1H), 3.15-2.92 (m, 4H), −2.72-2.65 (m, 1H), 2.59 (d, J=22.8 Hz, 2H), 2.12 (dd, J=11.5, 9.7 Hz, 2H), 2.05-1.97 (m, 2H), 1.84-1.69 (m, 5H), 1.65-1.20 (m, 7H); ESI MS m/z 359.2 [M+H]$^+$.

Example 192

(3S,4r,5R)-1-((4-fluoro-1-(4-fluorophenyl)piperidin-4-yl)methyl)piperidine-3,4,5-triol

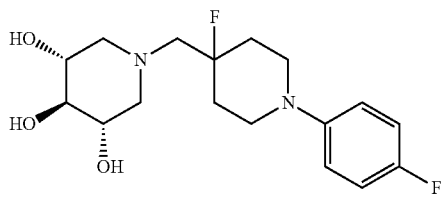 [SMILES: O[C@H]1[C@H](O)CN(CC2(F)CCN(c3ccc(F)cc3)CC2)C[C@@H]1O]

To a stirred solution of oxalyl chloride (1.80 mL, 21.4 mmol) in DCM (100 mL) was added DMSO (3.8 mL, 53.5 mmol) at −78° C. The mixture was stirred at −78° C. for 30 min, then tert-butyl 4-fluoro-4-(hydroxymethyl)piperidine-1-carboxylate (2.5 g, 10.7 mmol) in DCM (10 mL) was added. The mixture was stirred at −78° C. for 1 h and Et$_3$N (14.9 mL, 107 mmol) was added. The mixture was stirred at −78° C. for 15 min, then 0° C. for another 15 min, then quenched with water. The mixture was extracted with EtOAc (3×100 mL). The combined organic layer was washed with satd. aqueous NaHCO$_3$ (30 mL), separated, and dried over Na$_2$SO$_4$. After filtration the solvent was evaporated under reduced pressure, and the crude tert-butyl 4-fluoro-4-formylpiperidine-1-carboxylate was used in the next step without further purification.

To a stirred solution of ((3S,4r,5R)-3,4,5-tris(benzyloxy)piperidine (2.87 g, 7.13 mmol) and the above material (10.7 mmol crude) in anhydrous DCM (80 mL) was added HOAc (0.5 mL) and the mixture was stirred for 30 min. NaBH(OAc)$_3$ (2.57 g, 12.1 mmol) was added, and the resulting mixture was stirred at RT for 18 h. The reaction was quenched with satd. aqueous NaHCO$_3$ at 0° C. The mixture was extracted with EtOAc (3×50 mL). The combined organic layer was washed with water (2×30 mL), separated, and dried over Na$_2$SO$_4$. After filtration, the solvent was evaporated under reduced pressure, and the residue was purified on silica gel by flash chromatography affording tert-butyl 4-fluoro-4-(((3S,4r,5R)-3,4,5-tris(benzyloxy)piperidin-1-yl)methyl)piperidine-1-carboxylate as an oil (3.72 g, 84%). ESI MS m/z 619.36 [M+H]$^+$.

TFA (5 mL) was cooled to 0° C., and added to the above material (1.80 g, 2.91 mmol) in DCM (30 mL), The mixture was stirred at 0° C. for 10 min, then RT for 2 h. TFA and DCM were removed under reduced pressure. The residue was dissolved in EtOAc (80 mL) and washed with satd. aqueous NaHCO$_3$ (2×20 mL) then washed with water, separated, and dried over Na$_2$SO$_4$. After filtration, the solvent was evaporated under reduced pressure. The residue was purified on silica gel by flash chromatography affording (3S,4r,5R)-3,4,5-tris(benzyloxy)-1-((4-fluoropiperidin-4-yl)methyl)piperidine as an oil (1.50 g, 99%). ESI MS m/z 519.31 [M+H]$^+$.

To a stirred solution of the above material (225 mg, 0.43 mmol) and 4-bromofluorobenzene (152 mg, 0.87 mmol) in toluene (5 mL) was added Pd$_2$(dba)$_3$ (25 mg, 0.043 mmol) and BINAP (54 mg, 0.086 mmol), followed by sodium tert-butoxide (124 mg, 1.29 mmol) under Ar. The mixture was stirred at 100° C. for 18 h and then water was added at 0° C. The mixture was extracted with EtOAc (2×30 mL). The combined organic layer was washed with water (2×10 mL), separated, and dried over Na$_2$SO$_4$. After filtration the solvent was evaporated under reduced pressure, and the residue was purified on silica gel by flash chromatography affording (3S,4r,5R)-3,4,5-tris(benzyloxy)-1-((4-fluoro-1-(4-fluorophenyl)piperidin-4-yl)methyl)piperidine as an oil (135 mg, 51%). ESI MS m/z 613.33 [M+H]$^+$.

To a solution of the above material (130 mg, 0.21 mmol) in EtOH (10 mL) was added Pd(OH)$_2$/C (20 wt. %, 8.6 mg, 0.012 mmol) and 6 N HCl (0.5 mL). The mixture was treated with hydrogen (1 atm) for 18 h. Catalyst was filtered through celite and the solvent was evaporated under reduced pressure. The residue was dissolved in 1M NH$_3$ in MeOH (10 mL) and stirred for another 10 min, after which solvent was removed under vacuum. The residue was purified by flash chromatography on silica gel to give (3S,4r,5R)-1-((4-fluoro-1-(4-fluorophenyl)piperidin-4-yl)methyl)piperidine-3,4,5-triol as a white solid (45 mg, 63%). $^1$H NMR (400 MHZ, CD$_3$OD) δ 7.08-6.90 (m, 4H), 3.57-3.44 (m, 2H), 3.39-3.34 (m, 1H), 3.12-2.93 (m, 6H), 2.61 (d, J=22.8 Hz, 2H), 2.13 (dd, J=11.3, 10.2 Hz, 2H), 2.05-1.97 (m, 2H), 1.95-1.70 (m, 2H); ESI MS m/z 343.19 [M+H]⁺.

Example 193

(3S,4r,5R)-1-((4-fluoro-1-(2-(trifluoromethyl)phenyl)piperidin-4-yl)methyl)piperidine-3,4,5-triol

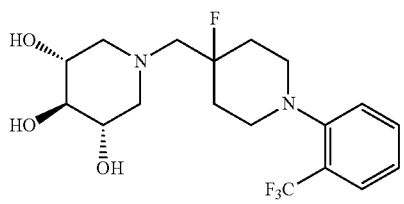 [SMILES: O[C@H]1[C@H](O)CN(CC2(F)CCN(c3ccccc3C(F)(F)F)CC2)C[C@@H]1O]

To a stirred solution of (3S,4r,5R)-3,4,5-tris(benzyloxy)-1-((4-fluoropiperidin-4-yl)methyl)piperidine (290 mg, 0.56 mmol) and 1-bromo-2-trifluoromethyl-benzene (256 mg, 1.13 mmol) in toluene (5 mL) was added Pd₂(dba)₃ (51 mg, 0.056 mmol) and BINAP (70 mg, 0.112 mmol), followed by KO$^t$Bu (163 mg, 1.67 mmol) under Ar. The mixture was stirred at 100° C. for 18 h and then water was added at 0° C. The mixture was extracted with EtOAc (2×30 mL). The combined organic layer was washed with water (2×10 mL), separated, and dried over Na₂SO₄. After filtration the solvent was evaporated under reduced pressure, and the residue was purified on silica gel by flash chromatography affording (3S,4r,5R)-3,4,5-tris(benzyloxy)-1-((4-fluoro-1-(2-(trifluoromethyl)phenyl)piperidin-4-yl)methyl)piperidine as an oil (136 mg, 37%).

To a solution of the above material (136 mg, 0.13 mmol) in anhydrous MeOH (10 mL) with two drops HCl (6 N) was added Pd(OH)₂ (cat.). The mixture was charged with H₂ gas (1 atm.), and stirred for 18 h. Filtration though a short column packed with celite, followed by evaporation and flash chromatography (dry load) using 10% MeOH and 2% NH₃ solution in DCM, afforded (3S,4r,5R)-1-((4-fluoro-1-(2-(trifluoromethyl)phenyl)piperidin-4-yl)methyl)piperidine-3,4,5-triol (54 mg, 76%). ¹H NMR (400 MHZ, CD₃OD) δ 7.73-7.41 (m, 3H), 7.29 (t, J=7.3 Hz, 1H), 3.53 (td, J=9.3, 4.4 Hz, 2H), 3.23-2.96 (m, 5H), 2.93-2.77 (m, 2H), 2.63 (d, J=23.1 Hz, 2H), 2.14 (dd, J=11.4, 10.0 Hz, 2H), 2.04-1.70 (m, 4H); ESI MS m/z 393.2 [M+H]⁺.

Example 194

(3S,4r,5R)-1-((4-fluoro-1-(3-(trifluoromethyl)pyridin-2-yl)piperidin-4-yl)methyl)piperidine-3,4,5-triol

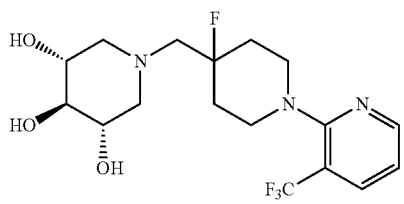 [SMILES: O[C@H]1[C@H](O)CN(CC2(F)CCN(c3ncccc3C(F)(F)F)CC2)C[C@@H]1O]

To a stirred solution of (3S,4r,5R)-3,4,5-tris(benzyloxy)-1-((4-fluoropiperidin-4-yl)methyl)piperidine (152 mg, 0.29 mmol) and 2-chloro-3-trifluoromethyl-pyridine (106 mg, 0.58 mmol) in DMF (5 mL) was added K₂CO₃ (121 mg, 0.87 mmol) under Ar. The mixture was stirred at 100° C. for 18 h, and then water was added. The mixture was extracted with EtOAc (2×30 mL). The combined organic layer was washed with water (2×10 mL), separated, and dried over Na₂SO₄. After filtration the solvent was evaporated under reduced pressure, and the residue was purified on silica gel by flash chromatography affording 2-(4-fluoro-4-(((3S,4r,5R)-3,4,5-tris(benzyloxy)piperidin-1-yl)methyl)piperidin-1-yl)-3-(trifluoromethyl)pyridine as an oil (78 mg, 40%).

At −78° C. under Ar, to a solution of the above material (74 mg, 0.11 mmol) in anhydrous DCM (2 mL) was added BCl₃ solution (0.6 mL, 1 M in DCM, 0.6 mmol). The mixture was stirred at −78° C. for 1 h and 0° C. for 4 h, then MeOH (20 mL) was added. The mixture was stirred for an additional 2 h at 0° C., and evaporated to dryness under reduced pressure. The residue was purified on silica gel by flash chromatography (dry load) using 10% MeOH and 2% NH₃ solution in DCM, affording (3S,4r,5R)-1-((4-fluoro-1-(3-(trifluoromethyl)pyridin-2-yl)piperidin-4-yl)methyl)piperidine-3,4,5-triol (14 mg, 33%). ¹H NMR (400 MHZ, CD₃OD) δ 8.66-8.30 (m, 1H), 8.01 (dd, J=7.8, 1.8 Hz, 1H), 7.15 (ddd, J=7.8, 4.8, 0.9 Hz, 1H), 3.52 (ddd, J=10.2, 8.8, 4.8 Hz, 2H), 3.37 (dt, J=13.1, 4.1 Hz, 2H), 3.29-3.18 (m, 2H), 3.15-3.04 (m, 3H), 2.63 (d, J=22.9 Hz, 2H), 2.13 (dd, J=11.3, 10.1 Hz, 2H), 2.00 (dd, J=13.6, 10.2 Hz, 2H), 1.95-1.80 (m, 2H); ESI MS m/z 394.2 [M+H]⁺.

Example 195

(3S,4r,5R)-1-((4-fluoro-1-(6-(trifluoromethyl)pyridin-2-yl)piperidin-4-yl)methyl)piperidine-3,4,5-triol

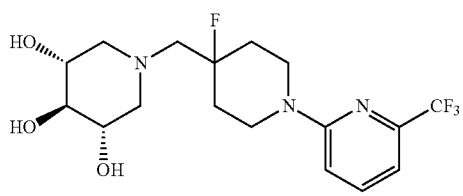 [SMILES: O[C@H]1[C@H](O)CN(CC2(F)CCN(c3cccc(C(F)(F)F)n3)CC2)C[C@@H]1O]

To a stirred solution of (3S,4r,5R)-3,4,5-tris(benzyloxy)-1-((4-fluoropiperidin-4-yl)methyl)piperidine (200 mg, 0.39 mmol) and 2-chloro-6-trifluoromethyl-pyridine (200 mg, 0.77 mmol) in DMF (5 mL) was added K₂CO₃ (161 mg, 1.17 mmol) under Ar. The mixture was stirred at 100° C. for 18 h and then water was added. The mixture was extracted with EtOAc (2×30 mL). The combined organic layer was washed with water (2×10 mL), separated, and dried over Na₂SO₄. After filtration the solvent was evaporated under reduced pressure, and the residue was purified on silica gel by flash chromatography affording 2-(4-fluoro-4-(((3S,4r,5R)-3,4,5-tris(benzyloxy)piperidin-1-yl)methyl)piperidin-1-yl)-6-(trifluoromethyl)pyridine as an oil (88 mg, 34%).

At −78° C. under Ar, to a solution of the above material (88 mg, 0.11 mmol) in anhydrous DCM (2 mL) was added BCl₃ solution (0.8 mL, 1 M in DCM, 0.8 mmol). The mixture was stirred at −78 for 1 h and 0° C. for 4 h, then MeOH (20 mL) was added. The mixture was stirred for an additional 2 h at 0° C., and evaporated to dryness under reduced pressure. The residue was purified on silica gel by flash chromatography (dry load) using 10% MeOH and 2% NH₃ solution in DCM, affording (3S,4r,5R)-1-((4-fluoro-1-(6-(trifluoromethyl)pyridin-2-yl)piperidin-4-yl)methyl)piperidine-3,4,5-triol (3.9 mg, 7.5%). ¹H NMR (400 MHZ, CD₃OD) δ 8.01-7.44 (m, 1H), 7.04 (d, J=8.7 Hz, 1H), 7.04 (d, J=8.7 Hz, 1H), 4.19 (d, J=13.0 Hz, 2H), 3.50 (ddd, J=10.1, 8.7, 4.8 Hz, 2H), 3.3-3.1 (m, 2H), 3.14-2.97 (m, 3H), 2.60 (d, J=23.0 Hz, 2H), 2.12 (t, J=10.7 Hz, 2H), 2.03-1.90 (m, 2H), 1.83-1.58 (m, 2H); ESI MS m/z 394.2 [M+H]⁺.

Example 196

(3S,4r,5R)-1-((1-(benzo[d]thiazol-2-yl)-4-fluoropiperidin-4-yl)methyl)piperidine-3,4,5-triol

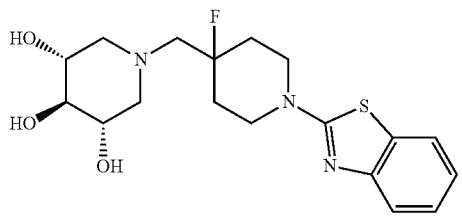 [SMILES: O[C@H]1[C@H](O)CN(CC2(F)CCN(c3nc4ccccc4s3)CC2)C[C@@H]1O]

To a stirred solution of (3S,4r,5R)-3,4,5-tris(benzyloxy)-1-((4-fluoropiperidin-4 yl)methyl)piperidine (210 mg, 0.41 mmol) and 2-bromobenzo[d]thiazole (174 mg, 0.81 mmol) in toluene (5 mL) was added Pd₂(dba)₃ (38 mg, 0.04 mmol) and RuPhos (37 mg, 0.08 mmol), followed by Cs₂CO₃ (401 mg, 1.23 mmol) under Ar. The mixture was stirred at 100° C. for 18 h, and then water was added at 0° C. The mixture was extracted with EtOAc (2×30 mL). The combined organic layer was washed with water (2×10 mL), separated, and dried over Na₂SO₄. After filtration the solvent was evaporated under reduced pressure, and the residue was purified on silica gel by flash chromatography affording 2-(4-fluoro-4-(((3S,4r,5R)-3,4,5-tris(benzyloxy)piperidin-1-yl)methyl)piperidin-1-yl)benzo[d]thiazole as an oil (200 mg, 75%).

At −78° C. under Ar, to a solution of the above material (42 mg, 0.064 mmol) in anhydrous DCM (2 mL) was added BCl₃ solution (0.35 mL, 1 M in DCM, 0.35 mmol). The mixture was stirred at −78° C. for 1 h and 0° C. for 4 h, then MeOH (20 mL) was added. The mixture was stirred for an additional 2 h at 0° C., and evaporated to dryness under reduced pressure. The residue was purified on silica gel by flash chromatography (dry load) using 10% MeOH and 2% NH₃ solution in DCM, affording (3S,4r,5R)-1-((1-(benzo[d]thiazol-2-yl)-4-fluoropiperidin-4-yl)methyl)piperidine-3,4,5-triol (13 mg, 50%). ¹H NMR (400 MHz, CD₃OD) δ 7.74-7.61 (m, 1H), 7.57-7.42 (m, 1H), 7.30 (ddd, J=8.3, 7.3, 1.3 Hz, 1H), 7.17-7.04 (m, 1H), 4.07-3.85 (m, 2H), 3.61-3.44 (m, 4H), 3.21-2.91 (m, 3H), 2.64 (d, J=23.0 Hz, 2H), 2.2-2.00 (m, 4H), 1.95-1.74 (m, 2H); ESI MS m/z 382.2 [M+H]⁺.

Example 197

(3S,4r,5R)-1-(4-butoxybenzyl)piperidine-3,4,5-triol

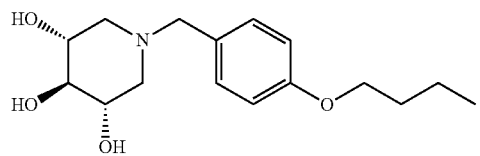 [SMILES: CCCCOc1ccc(CN2C[C@@H](O)[C@H](O)[C@@H](O)C2)cc1]

To a solution of (3S,4r,5R)-3,4,5-tris(benzyloxy)piperidine (4.03 g, 10.0 mmol) in MeOH (150 mL) was added Pd(OH)₂/C (20 wt. %, 0.50 g, 0.94 mmol) and concentrated aqueous HCl (2.0 mL). The mixture was stirred under hydrogen (1 atm) for 18 h. Solid K₂CO₃ (2.0 g) and anhydrous Na₂SO₄ (10 g) was added, and the mixture was stirred for another 1 h. The solid was filtered off through celite, and the solvent was evaporated under reduced pressure. The residue was dissolved in DMF (50 mL), followed by addition of DIPEA (3.5 mL, 20 mmol) and Boc₂O (4.5 g, 20 mmol). After stirring for 16 h the mixture was concentrated under reduced pressure, and the residue was purified on silica gel by flash chromatography (MeOH/EtOAc, 1:9) to give tert-butyl(3S,4r,5R)-3,4,5-trihydroxypiperidine-1-carboxylate as a white solid (2.3 g, 99%).

To a stirred solution of the above material (2.3 g, 9.9 mmol) in pyridine (40 mL) was added acetic anhydride (6.0 mL) at 0° C. After stirring at RT for 18 h the mixture was concentrated under reduced pressure at ~40° C., and the residue was diluted with satd. aqueous NaHCO₃ (80 mL). The mixture was extracted with EtOAc (3×50 mL), and the combined extract was dried over anhydrous Na₂SO₄. After filtration the solvent was evaporated under reduced pressure, and the residue was co-evaporated with hexanes (2×100 mL), and further dried under vacuum to give a pale yellow crystalline solid. The solid was dissolved in DCM (50 mL), followed by addition of TFA (8 mL). After stirring at RT for 2 h, the mixture was concentrated under reduced pressure, and the residue was diluted with satd. aqueous NaHCO₃ (100 mL). After extraction with DCM (3×50 mL) the combined extract was dried over anhydrous Na₂SO₄. After filtration the solvent was evaporated under reduced pressure to give (3S,4r,5R)-piperidine-3,4,5-triyl triacetate as a pale-yellow solid (2.5 g, 98%). ¹H NMR (400 MHZ, CD₃OD) δ 5.09 (t, J=9.3 Hz, 1H), 4.92-4.76 (m, 2H), 3.21-3.15 (m, 2H), 2.53 (dd, J=12.9, 10.3 Hz, 2H), 2.01 (s, 3H), 2.00 (s, 6H); ESI MS m/z 260.12 [M+H]⁺.

To a stirred solution of (3S,4r,5R)-piperidine-3,4,5-triyl triacetate (0.075 g, 0.29 mmol) and 4-butoxybenzaldehyde (0.071 g, 0.40 mmol) in DCM (5 mL) was added NaBH(OAc)₃ (0.11 mg, 0.52 mmol), and the mixture was stirred at RT for 18 h. The mixture was diluted with satd. aqueous NaHCO₃ (10 mL) and then extracted with DCM (2×10 mL). The combined extract was dried over anhydrous Na₂SO₄. After filtration the solvent was evaporated under reduced pressure, and the residue was purified on silica gel by flash chromatography (EtOAc/hexanes, 1:6 to 1:4), affording (3S,4r,5R)-1-(4-butoxybenzyl)piperidine-3,4,5-triyl triacetate as a white solid (0.107 g, 88%). ESI MS m/z 422.22 [M+H]⁺.

The above material (0.107 g, 0.254 mmol) was dissolved in 1 M NH₃ in MeOH (10 mL), and the mixture was stirred at RT for 18 h. The solvent was removed under reduced pressure, and the residue was dried under high vacuum at 60° C. to remove acetamide by sublimation, affording (3S,4r,5R)-1-(4-butoxybenzyl)piperidine-3,4,5-triol as a white solid (0.0675 g, 90%). ¹H NMR (400 MHZ, CD₃OD) δ 7.30-7.18 (m, 2H), 6.92-6.83 (m, 2H), 3.98 (t, J=6.4 Hz, 2H), 3.55-3.44 (m, 4H), 3.09 (t, J=8.8 Hz, 1H), 2.98-2.92 (m, 2H), 1.92 (t, J=10.8 Hz, 2H), 1.82-1.70 (m, 2H), 1.59-1.45 (m, 2H), 1.00 (t, J=7.4 Hz, 3H); ESI MS m/z 296.19 [M+H]⁺.

Example 198

(3S,4r,5R)-1-(4-(pentyloxy)benzyl)piperidine-3,4,5-triol

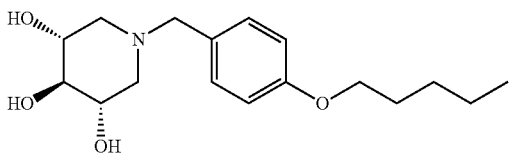 [SMILES: CCCCCOc1ccc(CN2C[C@@H](O)[C@H](O)[C@@H](O)C2)cc1]

To a stirred solution of (3S,4r,5R)-piperidine-3,4,5-triyl triacetate (0.090 g, 0.35 mmol) and 4-(pentyloxy)benzaldehyde (0.077 g, 0.40 mmol) in DCM (5 mL) was added NaBH(OAc)$_3$ (0.11 g, 0.52 mmol), and the mixture was stirred at RT for 18 h. The mixture was diluted with satd. aqueous NaHCO$_3$ (10 mL) and extracted with DCM (2×10 mL). The combined extract was dried over anhydrous Na$_2$SO$_4$. After filtration the solvent was evaporated under reduced pressure, and the residue was purified on silica gel by flash chromatography (EtOAc/hexanes, 1:6 to 1:4), affording (3S,4r,5R)-1-(4-(pentyloxy)benzyl)piperidine-3,4,5-triyl triacetate as a white solid (0.13 g, 86%). ESI MS m/z 436.24 [M+H]$^+$.

The above material (0.130 g, 0.299 mmol) was dissolved in 1 M NH$_3$ in MeOH (10 mL), and the mixture was stirred at RT for 18 h. The solvent was removed under reduced pressure, and the residue was dried under high vacuum at 60° C. to remove acetamide by sublimation, followed by recrystallization from MeOH to give (3S,4r,5R)-1-(4-(pentyloxy)benzyl)piperidine-3,4,5-triol as a white solid (0.063 g, 68%). $^1$H NMR (400 MHZ, CD$_3$OD) δ 7.27-7.18 (m, 2H), 6.92-6.84 (m, 2H), 3.97 (t, J=6.5 Hz, 2H), 3.55-3.44 (m, 4H), 3.09 (t, J=8.9 Hz, 1H) 2.99-2.90 (m, 2H), 1.92 (t, J=10.8 Hz, 2H), 1.85-1.73 (m, 2H), 1.52-1.38 (m, 4H), 0.97 (t, J=7.1 Hz, 3H); ESI MS m/z 310.21 [M+H]$^+$.

Example 199

(3S,4r,5R)-1-(4-butoxy-2,6-difluorobenzyl)piperidine-3,4,5-triol

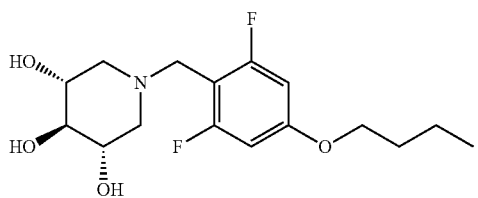 [SMILES: CCCCOc1cc(F)c(CN2C[C@@H](O)[C@H](O)[C@@H](O)C2)c(F)c1]

To a stirred solution of (3S,4r,5R)-piperidine-3,4,5-triyl triacetate (0.090 g, 0.35 mmol) and 4-butoxy-2,6-difluorobenzaldehyde (0.086 g, 0.40 mmol) in DCM (5 mL) was added NaBH(OAc)$_3$ (0.11 mg, 0.52 mmol), and the mixture was stirred at RT for 18 h. The mixture was diluted with satd. aqueous NaHCO$_3$ (10 mL) and extracted with DCM (2×10 mL). The combined extract was dried over anhydrous Na$_2$SO$_4$. After filtration the solvent was evaporated under reduced pressure, and the residue was purified on silica gel by flash chromatography (EtOAc/hexanes, 1:6 to 1:4), affording (3S,4r,5R)-1-(4-butoxy-2,6-difluorobenzyl)piperidine-3,4,5-triyl triacetate as a white solid (0.146 g, 92%). ESI MS m/z 458.21 [M+H]$^+$.

The above material (0.146 g, 0.319 mmol) was dissolved in 1 M NH$_3$ in MeOH (10 mL), and the mixture was stirred at RT for 18 h. The solvent was removed under reduced pressure, and the residue was dried under high vacuum at 60° C. to remove acetamide by sublimation, affording (3S,4r,5R)-1-(4-butoxy-2,6-difluorobenzyl)piperidine-3,4,5-triol as a white solid (0.089 g, 84%). $^1$H NMR (400 MHZ, CD$_3$OD) δ 6.64-6.53 (m, 2H), 3.99 (t, J=6.4 Hz, 2H), 3.68 (d, J=1.5 Hz, 2H), 3.54-3.44 (m, 2H), 3.07-2.93 (m, 3H), 1.99 (dd, J=11.4, 10.0 Hz, 2H), 1.83-1.71 (m, 2H), 1.59-1.44 (m, 2H), 1.00 (t, J=7.4 Hz, 3H); ESI MS m/z 332.18 [M+H]$^+$.

Example 200

(3S,4r,5R)-1-(4-(cyclopropylmethoxy)benzyl)piperidine-3,4,5-triol

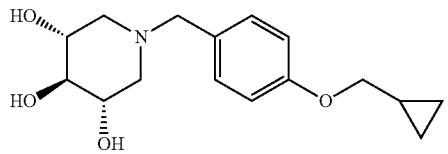 [SMILES: O[C@H]1[C@H](O)CN(Cc2ccc(OCC3CC3)cc2)C[C@@H]1O]

To a stirred solution of (3S,4r,5R)-piperidine-3,4,5-triyl triacetate (0.075 g, 0.29 mmol) and 4-(cyclopropylmethoxy)benzaldehyde (0.070 g, 0.40 mmol) in DCM (5 mL) was added NaBH(OAc)$_3$ (106 mg, 0.50 mmol), and the mixture was stirred at RT for 18 h. The mixture was diluted with satd. aqueous NaHCO$_3$ (10 mL), and then extracted with DCM (2×10 mL). The combined extract was dried over anhydrous Na$_2$SO$_4$. After filtration the solvent was evaporated under reduced pressure, and the residue was purified on silica gel by flash chromatography (EtOAc/hexanes, 1:6 to 1:4), affording (3S,4r,5R)-1-(4-(cyclopropylmethoxy)benzyl)piperidine-3,4,5-triyl triacetate as a white crystalline solid (0.10 g, 82%). ESI MS m/z 420.21 [M+H]$^+$.

The above material (0.100 g, 0.238 mmol) was dissolved in 1 M NH$_3$ in MeOH (10 mL), and the mixture was stirred at RT for 18 h. The solvent was removed under reduced pressure, and the residue was dried under high vacuum at 60° C. to remove acetamide by sublimation, followed by purification on silica gel by flash chromatography (0.5 M NH$_3$ in MeOH/DCM, 1:7), affording (3S,4r,5R)-1-(4-(cyclopropylmethoxy)benzyl)piperidine-3,4,5-triol as a white solid (0.0493 g, 71%). $^1$H NMR (400 MHZ, CD$_3$OD) δ 7.31-7.22 (m, 2H), 6.95-6.87 (m, 2H), 3.83 (d, J=6.8 Hz, 2H), 3.69-3.64 (m, 2H), 3.62-3.50 (m, 2H), 3.18 (t, J=8.6 Hz, 1H), 3.07-2.98 (m, 2H), 2.14 (s, br., 2H), 1.33-1.20 (m, 1H), 0.69-0.56 (m, 2H), 0.43-0.31 (m, 2H); ESI MS m/z 294.18 [M+H]$^+$.

Example 201

(3S,4r,5R)-1-(4-phenoxybenzyl)piperidine-3,4,5-triol

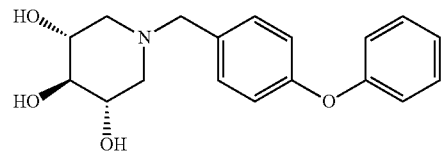 [SMILES: O[C@H]1[C@H](O)CN(Cc2ccc(Oc3ccccc3)cc2)C[C@@H]1O]

To a stirred solution of (3S,4r,5R)-piperidine-3,4,5-triyl triacetate (0.100 g, 0.386 mmol) and 4-phenoxybenzaldehyde (0.110 g, 0.557 mmol) in DCM (10 mL) was added NaBH(OAc)₃ (0.15 mg, 0.71 mmol), and the mixture was stirred at RT for 18 h. The mixture was diluted with satd. aqueous NaHCO₃ (10 mL) and extracted with DCM (2×10 mL). The combined extract was dried over anhydrous Na₂SO₄. After filtration the solvent was evaporated under reduced pressure, and the residue was purified on silica gel by flash chromatography (EtOAc/hexanes, 1:6 to 1:4), affording (3S,4r,5R)-1-(4-phenoxybenzyl)piperidine-3,4,5-triyl triacetate as a white solid (0.14 g, 82%). ESI MS m/z 442.19 [M+H]⁺.

The above material (0.140 g, 0.317 mmol) was dissolved in 1 M NH₃ in MeOH (10 mL), and the mixture was stirred at RT for 18 h. The solvent was removed under reduced pressure, and the residue was dried under high vacuum at 60° C. to remove acetamide by sublimation, followed by recrystallization from MeOH to give (3S,4r,5R)-1-(4-phenoxybenzyl)piperidine-3,4,5-triol as a white solid (0.095 g, 95%). ¹H NMR (400 MHZ, CD₃OD) δ 7.41-7.28 (m, 4H), 7.17-7.07 (m, 1H), 7.03-6.92 (m, 4H), 3.59-3.46 (m, 4H), 3.11 (t, J=8.9 Hz, 1H), 2.96 3.00-2.92 (m, 2H), 1.95 (t, J=10.7 Hz, 2H); ESI MS m/z 316.16 [M+H]⁺.

Example 202

(3S,4r,5R)-1-([1,1'-biphenyl]-4-ylmethyl)piperidine-3,4,5-triol

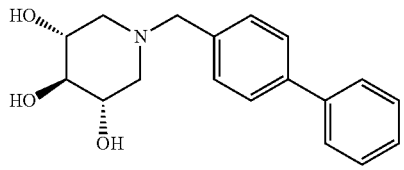 [SMILES: O[C@H]1[C@H](O)CN(Cc2ccc(-c3ccccc3)cc2)C[C@@H]1O]

To a stirred solution of (3S,4r,5R)-piperidine-3,4,5-triyl triacetate (0.100 g, 0.386 mmol) and [1,1'-biphenyl]-4-carbaldehyde (0.100 g, 0.549 mmol) in DCM (10 mL) was added NaBH(OAc)₃ (0.15 mg, 0.71 mmol), and the mixture was stirred at RT for 18 h. The mixture was diluted with satd. aqueous NaHCO₃ (10 mL) and extracted with DCM (2×10 mL). The combined extract was dried over anhydrous Na₂SO₄. After filtration the solvent was evaporated under reduced pressure, and the residue was purified on silica gel by flash chromatography (EtOAc/hexanes, 1:6 to 1:4), affording (3S,4r,5R)-1-([1,1'-biphenyl]-4-ylmethyl)piperidine-3,4,5-triyl triacetate as a white solid (0.14 g, 85%). ESI MS m/z 426.20 [M+H]⁺.

The above material (0.146 g, 0.329 mmol) was dissolved in 1 M NH₃ in MeOH (10 mL), and the mixture was stirred at RT for 18 h. The solvent was removed under reduced pressure, and the residue was dried under high vacuum at 60° C. to remove acetamide by sublimation, followed by recrystallization from MeOH to give (3S,4r,5R)-1-([1,1'-biphenyl]-4-ylmethyl)piperidine-3,4,5-triol as a white solid (0.080 g, 81%). ¹H NMR (500 MHZ, CD₃OD) δ 7.65-7.57 (m, 4H), 7.48-7.39 (m, 4H), 7.38-7.31 (m, 1H), 3.63 (s, 2H), 3.58-3.48 (m, 2H), 3.12 (t, J=8.9 Hz, 1H), 3.03-2.95 (m, 2H), 1.98 (t, J=10.7 Hz, 2H); ESI MS m/z 300.16 [M+H]⁺.

Example 203

(3S,4r,5R)-1-(4-(pyrrolidin-1-yl)benzyl)piperidine-3,4,5-triol

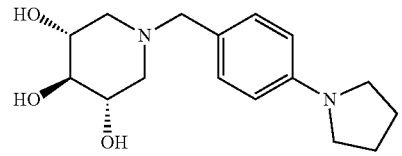 [SMILES: O[C@H]1[C@H](O)CN(Cc2ccc(N3CCCC3)cc2)C[C@@H]1O]

To a stirred solution of (3S,4r,5R)-piperidine-3,4,5-triyl triacetate (130 mg, 0.50 mmol) and 4-(pyrrolidin-1-yl)benzaldehyde (130 mg, 0.75 mmol) in anhydrous DCM (8 mL) was added HOAc (0.1 mL), followed by NaBH(OAc)₃ (180 mg, 0.55 mmol), and the resulting mixture was stirred at RT for 24 h. The mixture was diluted with DCM, then washed with satd. aqueous NaHCO₃, separated, and dried over Na₂SO₄. After filtration, the solvent was evaporated under reduced pressure, and the residue was purified on silica gel by flash chromatography affording (3S,4r,5R)-1-(4-(pyrrolidin-1-yl)benzyl)piperidine-3,4,5-triyl triacetate (180 mg, 87%). ¹H NMR (400 MHZ, CD₃OD) δ 7.13-7.04 (m, 2H), 6.57-6.48 (m, 2H), 5.02-4.86 (m, 3H), 3.49 (s, 2H), 3.28-3.21 (m, 4H), 3.08 (dd, J=5.1, 1.5 Hz, 1H), 3.06-3.04 (m, 1H), 2.08-1.99 (m, 6H), 1.98 (s, 3H), 1.96 (s, 6H); ESI MS m/z 419.228 [M+H]⁺.

The above material (180 mg, 0.43 mmol) was dissolved in 2 M NH₃ in MeOH (30 mL) and stirred at RT for 24 h. Solvent was removed under reduced pressure, and the residue was purified on silica gel by flash chromatography affording (3S,4r,5R)-1-(4-(pyrrolidin-1-yl)benzyl)piperidine-3,4,5-triol (46.6 mg, 37%). ¹H NMR (400 MHZ, DMSO-d₆) δ 7.04-7.02 (m, 2H), 6.48-6.46 (m, 2H), 4.68 (d, J=4.3 Hz, 1H), 4.64-4.63 (m, 2H), 3.33-3.31 (m, 3H), 3.26-3.16 (m, 5H), 2.85 (td, J=8.7, 4.3 Hz, 1H), 2.76 (d, J=5.1 Hz, 1H), 2.73 (d, J=5.0 Hz, 1H), 1.95-1.92 (m, 4H), 1.70-1.65 (m, 2H); ESI MS m/z 293.187 [M+H]⁺.

Example 204

(3S,4r,5R)-1-(4-(piperidin-1-yl)benzyl)piperidine-3,4,5-triol

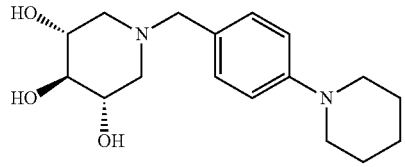 [SMILES: O[C@H]1[C@H](O)CN(Cc2ccc(N3CCCCC3)cc2)C[C@@H]1O]

To a stirred solution of (3S,4r,5R)-piperidine-3,4,5-triyl triacetate (130 mg, 0.50 mmol) and 4-(piperidin-1-yl)benzaldehyde (142 mg, 0.75 mmol) in anhydrous DCM (8 mL) was added HOAc (0.1 mL), followed by NaBH(OAc)₃ (180 mg, 0.55 mmol), and the resulting mixture was stirred at RT for 24 h. The mixture was diluted with DCM, then washed with satd. aqueous NaHCO₃, separated, and dried over Na₂SO₄. After filtration, the solvent was evaporated under reduced pressure, and the residue was purified on silica gel by flash chromatography affording (3S,4r,5R)-1-(4-(piperidin-1-yl)benzyl)piperidine-3,4,5-triyl triacetate (190 mg, 88%). $^1$H NMR (400 MHZ, CD$_3$OD) δ 7.23-7.15 (m, 2H), 7.01-6.91 (m, 2H), 5.04-4.90 (m, 3H), 3.56 (s, 2H), 3.17-3.12 (m, 4H), 3.11 (dd, J=5.1, 1.4 Hz, 1H), 3.09-3.07 (m, 1H), 2.14-2.05 (m, 2H), 2.01 (s, 3H), 1.99 (s, 6H), 1.75-1.70 (m, 4H), 1.64-1.57 (m, 2H). ESI MS m/z 433.245 [M+H]$^+$.

The above material (190 mg, 0.44 mmol) was dissolved in 2 M NH$_3$ in MeOH (30 mL) and stirred at RT for 24 h. Solvent was removed under reduced pressure, and the residue was purified on silica gel by flash chromatography affording (3S,4r,5R)-1-(4-(piperidin-1-yl)benzyl)piperidine-3,4,5-triol (105 mg, 78%). $^1$H NMR (400 MHZ, CD$_3$OD) δ 7.25-7.14 (m, 2H), 7.00-6.92 (m, 2H), 3.55-3.46 (m, 4H), 3.17-3.12 (m, 4H), 3.09 (td, J=9.1, 1.4 Hz, 1H), 2.98-2.95 (m, 1H), 2.94 (dd, J=5.2, 1.6 Hz, 1H), 1.95-1.89 (m, 2H), 1.76-1.70 (m, 4H), 1.64-1.57 (m, 2H); ESI MS m/z 307.207 [M+H]$^+$.

Example 205

(3S,4r,5R)-1-(thiophen-2-ylmethyl)piperidine-3,4,5-triol

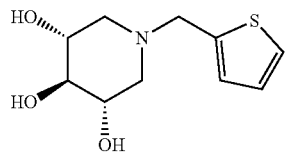 [SMILES: O[C@H]1[C@H](O)CN(Cc2cccs2)C[C@@H]1O]

To a stirred solution of (3S,4r,5R)-piperidine-3,4,5-triyl triacetate (130 mg, 0.50 mmol) and thiophene-2-carbaldehyde (85 mg, 0.75 mmol) in anhydrous DCM (5 mL) was added NaBH(OAc)$_3$ (180 mg, 0.85 mmol), and the resulting mixture was stirred at RT for 18 h. The mixture was diluted with satd. aqueous NaHCO$_3$ (10 mL), extracted with DCM (2×10 mL). The organic layer was separated, and dried over Na$_2$SO$_4$. After filtration, the solvent was evaporated under reduced pressure, and the residue was purified on silica gel by flash chromatography affording (3S,4r,5R)-1-(thiophen-2-ylmethyl)piperidine-3,4,5-triyl triacetate as a white solid (150 mg, 84%). ESI MS m/z 356.12 [M+H]$^+$.

The above material (150 mg, 0.42 mmol) was dissolved in 2 M NH$_3$ in MeOH (10 mL) and stirred at RT for 18 h. Solvent was removed under reduced pressure, dried under high vacuum at 60° C. for 4 h, and the residue was purified on silica gel by flash chromatography affording (3S,4r,5R)-1-(thiophen-2-ylmethyl)piperidine-3,4,5-triol as a white solid (75 mg, 78%). $^1$H NMR (400 MHZ, CD$_3$OD) δ 7.35-7.32 (m, 1H), 7.00-6.96 (m, 2H), 3.81 (s, 2H), 3.56-3.46 (m, 2H), 3.09 (t, J=8.9 Hz, 1H), 3.02-2.94 (m, 2H), 1.98 (dd, J=11.2, 10.2 Hz, 2H); ESI MS m/z 230.08 [M+H]$^+$.

Examples 40-61, 63-105, 107-141, 143-145, 147-148, 150-160, 160-166, and 180-184, as indicated in Table 1, are synthesized according to procedures analogous to the schemes and examples outlined herein.

Biological Activity

Assay for Determination of IC$_{50}$ Values for Inhibition of GBA2 in Cell Lysate Stable GBA2-expressing HEK293T cells were generated as follows. The PCR-amplified human GBA2 (GBA2 nucleotide accession number BC011363) using the following primers: Sense 5'-CGC AAA TGG GCG GTA GGC GTG (SEQ ID NO:2)-3' and antisense 5'-TAG TCA GCC ATG GGG CGG AGA (SEQ ID NO:3')-3') was cloned into pLenti-GIII-CMV by ABM Inc. The correctness of the construct was verified by sequencing. Lentivirus particles containing GBA2 in the pLenti-GIII-CMV plasmid were prepared using a third Generation Virus Packaging Mix (ABM cat #LV053-G074) in HEK293T cells and supplied as a virus particle suspension. The virus suspension was used for infection of HEK293T cells. Cell populations stably expressing human GBA2 were selected using puromycin for several weeks as determined by activity assays and western blot.

Various concentrations of test compounds were prepared in DMSO and then diluted into buffer consisting of 100 mM citric acid, 200 mM disodium phosphate with 1% v/v C10E6, pH 5.5. Cellular homogenates (0.25 mg/ml) of the stable HEK293T-overexpressing GBA2 cell line were pre-incubated for 10 min on ice with an inhibitor of GCase (20 M (6R,7R,8S)-8-ethyl-4-azaspiro[2.5]octane-6,7-diol). The reaction solution consisted of 20 μL of 750 μM 4-methyl-umbelliferone-3-D glucopyranoside in 5% DMSO in the same buffer, 20 μL of GBA2-cellular homogenate pre-treated with (6R,7R,8S)-8-ethyl-4-azaspiro[2.5]octane-6,7-diol and 20 μL of various concentrations of test compound in 10% DMSO in the same buffer. The final concentrations in the reaction were 0.083 mg/mL GBA2-cellular homogenate, 250 μM 4-methylumbelliferone-3-D glucopyranoside, and various concentrations of inhibitor. The inhibitor and GBA2-cellular homogenate were preincubated together for 5 min at 37° C. The reaction was initiated by addition of substrate and allowed to proceed for 20 min at 37° C. to assess GBA2 activity. Reactions were stopped by the addition of an equal volume (60 μL) of 0.5 M NaOH, 0.3 M glycine, pH 10.5. Fluorescence was measured on a Biotek Synergy H4 plate reader at wavelengths of 365 nm for excitation and 450 nm for emission. Incubations without added enzyme or added inhibitors were used to define no enzyme activity and maximal enzyme activity, respectively. IC$_{50}$ values were determined by fitting the data to a log [inhibitor concentration] versus response curve using GraphPad Prism. IC$_{50}$ values were calculated as the concentration of inhibitor required to inhibit GBA2 activity by 50%.

The compounds of the invention tested exhibit IC$_{50}$ values for inhibition of GBA2 in the range 0.1 nM-50 μM.

Assay for Determination of Inhibition of Rat Intestinal Alpha-Glucosidases

Various concentrations of test compounds were prepared in DMSO and then diluted into buffer consisting of 100 mM citric acid, 200 mM disodium phosphate, pH 6.0. Rat intestinal acetone powder (Sigma) was dissolved to 12.5 mg/mL in assay buffer and sonicated in an ice bath, centrifuged, and the supernatant was collected, aliquoted and stored at −20° C. until use. On the day of the assay, the rat intestinal lysate was diluted to 6.25 mg/mL (sucrose reactions) and 2.1 mg/ml (maltose reactions) in assay buffer. The final reaction solutions for sucrose contained 2.1 mg/mL rat intestinal lysate, 40 mM sucrose, 50 or 25 μM of test compound, and 3.3% DMSO. The final reaction solution for maltose contained 0.69 mg/mL rat intestinal lysate, 10 mM maltose, 50 or 25 μM of test compound, and 3.3% DMSO. The reaction was initiated by the addition of substrate (sucrose or maltose) and allowed to proceed at 37° C. for 20 min to assess rat intestinal alpha-glycosidase activities. The reaction was stopped by addition of 20 μL of 2 M Tris-HCl, pH 7.0. The glucose produced during the reaction was detected using a commercial Amplex Red glucose detection kit from Thermo Fisher. For a full plate, the Amplex Red detection mixture was prepared by mixing 35 μL glucose oxidase, 35 μL horseradish peroxidase and 35 μL Amplex Red into 3395 μL 1× Amplex Red detection buffer. A total of 30 μL of detection mixture was added to each well. Fluorescence was measured in kinetic mode on a Biotek Synergy H4 plate reader at a wavelength of 573 nm for excitation and 610 nm for emission for 15 min and quantified from the data at 10 min. Incubations without added rat intestinal lysate were used to correct for the background amount of glucose present in the samples. Incubations without added test compound were used to define maximal enzyme activity. Percent inhibition of rat intestinal alpha-glucosidases was determined by dividing the amount of glucose detected in the presence of test compound by the amount of glucose detected in the maximal enzyme activity wells. All conditions were analyzed in triplicate. Test compounds were pre-screened to ensure that they did not inhibit any of the enzymes contained in the Amplex Red detection kit. If greater than 15% inhibition of the Amplex Red kit enzymes was detected, then the test compounds were screened using a hexokinase glucose detection kit from Sigma. The final reaction solutions were the same as described above for the Amplex Red Detection kit. After a 20 min reaction time at 37° C., 100 μL of hexokinase glucose reagent was added to all test wells except for the no enzyme added control wells and no test compound added wells. The plate was incubated for a further 15 min at room temperature and the absorbance was read at 340 nm on a Biotek Synergy H4 plate reader. The percent inhibition of rat intestinal alpha-glucosidases was determined in a similar manner as described above.

The compounds of the invention tested at a concentration of 25 M using sucrose as substrate exhibit percent inhibition of rat intestinal alpha-glucosidases of less than 20%.

Representative data from the GBA2 inhibition assay described above are shown in Table 3, where the symbol "*" indicates $IC_{50}<100$ nM; the symbol "" indicates 100 nM$<IC_{50}<1$ μM; and the symbol "*" indicates 1 μM$<IC_{50}<25$ μM. Representative data from the rat intestinal alpha-glucosidase inhibition assay described above, using compound concentrations of 25 μM and sucrose as substrate, are shown in Table 3. For comparison, the first two table entries show data for compounds (2R,3R,4R,5S)-1-butyl-2-(hydroxymethyl)piperidine-3,4,5-triol (NB-DNJ, miglustat) and (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648).

TABLE 3

| Example | Name | GBA2 $IC_{50}$ | rat α-glu. (% inhib.) |
|---|---|---|---|
| — | (2R,3R,4R,5S)-1-butyl-2-(hydroxymethyl)piperidine-3,4,5-triol (NB-DNJ, miglustat) | *** | 98 |
| — | (2R,3R,4R,5S)-1-(5-((3R,5R,7R)-adamantan-1-ylmethoxy)pentyl)-2-(hydroxymethyl)piperidine-3,4,5-triol (AMP-DNM, Genz-529648) | *** | 85 |
| 1 | (3S,4R,5R)-1-(((1r,4R)-4-(trifluoromethyl)cyclohexyl)methyl)piperidine-3,4,5-triol | *** | 0 |
| 2 | (3S,4R,5R)-1-(((1s,4S)-4-(trifluoromethyl)cyclohexyl)methyl)piperidine-3,4,5-triol | *** | 4 |
| 3 | (3S,4R,5R)-1-(((1s,4S)-4-(2-fluoropropan-2-yl)cyclohexyl)methyl)piperidine-3,4,5-triol | *** | 1 |
| 4 | (3S,4r,5R)-1-(2-cyclohexylethyl)piperidine-3,4,5-triol | *** | 14 |
| 5 | (3S,4r,5R)-1-(3-cyclohexylpropyl)piperidine-3,4,5-triol | *** | 10 |
| 6 | (3S,4r,5R)-1-(3-chloro-2-fluorophenethyl)piperidine-3,4,5-triol | *** | 3 |
| 7 | (3S,4r,5R)-1-(3-chloro-2,6-difluorophenethyl)piperidine-3,4,5-triol | *** | 0 |
| 8 | (3S,4r,5R)-1-(3,4-dichlorophenethyl)piperidine-3,4,5-triol | *** | 0 |
| 9 | (3S,4r,5R)-1-(4-(cyclopropylmethoxy)-2,6-difluorophenethyl)piperidine-3,4,5-triol | *** | 0 |
| 10 | (3S,4r,5R)-1-(2,6-difluoro-4-(pyrrolidin-1-yl)phenethyl)piperidine-3,4,5-triol | *** | 7 |
| 11 | (3S,4r,5R)-1-(2,6-difluoro-4-(piperidin-1-yl)phenethyl)piperidine-3,4,5-triol | *** | 10 |
| 12 | (3S,4r,5R)-1-(2,6-difluoro-4-morpholinophenethyl)piperidine-3,4,5-triol | *** | 4 |
| 13 | (3S,4r,5R)-1-(2,6-difluoro-4-(tetrahydro-2H-pyran-4-yl)phenethyl)piperidine-3,4,5-triol | *** | 5 |
| 14 | (3S,4r,5R)-1-(4-(3,5-dimethylisoxazol-4-yl)-2,6-difluorophenethyl)piperidine-3,4,5-triol | *** | 2 |
| 15 | (3S,4r,5R)-1-(4-(3,5-dimethyl-1H-pyrazol-4-yl)-2,6-difluorophenethyl)piperidine-3,4,5-triol | *** | 8 |
| 16 | (3S,4r,5R)-1-(1-(3-chloro-2-fluorophenyl)propan-2-yl)piperidine-3,4,5-triol | ** | 7 |
| 17 | (3S,4r,5R)-1-(4-(3-chloro-2-fluorophenyl)butan-2-yl)piperidine-3,4,5-triol | ** | 0 |
| 18 | (3S,4R,5R)-1-(((R)-1-(o-tolyl)pyrrolidin-3-yl)methyl)piperidine-3,4,5-triol | *** | 0 |
| 19 | (3S,4R,5R)-1-(((R)-1-(3-(trifluoromethyl)pyridin-2-yl)pyrrolidin-3-yl)methyl)piperidine-3,4,5-triol | *** | 6 |
| 20 | (3S,4R,5R)-1-(((R)-1-(4-(trifluoromethyl)pyridin-3-yl)pyrrolidin-3-yl)methyl)piperidine-3,4,5-triol | *** | 4 |
| 21 | (3S,4R,5R)-1-(((R)-1-(4-(trifluoromethyl)thiazol-2-yl)pyrrolidin-3-yl)methyl)piperidine-3,4,5-triol | *** | 6 |
| 22 | (3S,4R,5R)-1-(((R)-1-(benzo[d]oxazol-2-yl)pyrrolidin-3-yl)methyl)piperidine-3,4,5-triol | *** | 4 |
| 23 | (3S,4R,5R)-1-(((R)-1-(benzo[d]thiazol-2-yl)pyrrolidin-3-yl)methyl)piperidine-3,4,5-triol | *** | 5 |
| 24 | (3S,4S,5R)-1-(((S)-1-(3-(trifluoromethyl)pyridin-2-yl)pyrrolidin-3-yl)methyl)piperidine-3,4,5-triol | *** | 3 |

TABLE 3-continued

| Example | Name | GBA2 IC$_{50}$ | rat α-glu. (% inhib.) |
|---|---|---|---|
| 25 | (3S,4S,5R)-1-(((S)-1-(4-(trifluoromethyl)pyridin-3-yl)pyrrolidin-3-yl)methyl)piperidine-3,4,5-triol | *** | 1 |
| 26 | (3S,4S,5R)-1-(((S)-1-(4-(trifluoromethyl)pyrimidin-5-yl)pyrrolidin-3-yl)methyl)piperidine-3,4,5-triol | *** | 0 |
| 27 | (3S,4S,5R)-1-(((S)-1-(4-(trifluoromethyl)thiazol-2-yl)pyrrolidin-3-yl)methyl)piperidine-3,4,5-triol | *** | 2 |
| 28 | (3S,4S,5R)-1-(((S)-1-(benzo[d]thiazol-4-yl)pyrrolidin-3-yl)methyl)piperidine-3,4,5-triol | *** | 11 |
| 29 | (3S,4R,5R)-1-(((R)-1-(3-(trifluoromethyl)pyridin-2-yl)piperidin-3-yl)methyl)piperidine-3,4,5-triol | *** | 4 |
| 30 | (3S,4R,5R)-1-(((R)-1-(6-(trifluoromethyl)pyridin-2-yl)piperidin-3-yl)methyl)piperidine-3,4,5-triol | *** | 6 |
| 31 | (3S,4R,5R)-1-(((R)-1-(2-(trifluoromethyl)pyridin-3-yl)piperidin-3-yl)methyl)piperidine-3,4,5-triol | *** | 0 |
| 32 | (3S,4R,5R)-1-(((R)-1-(5-isopropylthiazol-2-yl)piperidin-3-yl)methyl)piperidine-3,4,5-triol | *** | 2 |
| 33 | (3S,4R,5R)-1-(((R)-1-(4-(trifluoromethyl)thiazol-2-yl)piperidin-3-yl)methyl)piperidine-3,4,5-triol | *** | 9 |
| 34 | (3S,4R,5R)-1-(((R)-1-(benzo[d]thiazol-2-yl)piperidin-3-yl)methyl)piperidine-3,4,5-triol | *** | 2 |
| 35 | (3S,4R,5R)-1-(((R)-1-(benzo[d]thiazol-4-yl)piperidin-3-yl)methyl)piperidine-3,4,5-triol | *** | 7 |
| 36 | (3S,4S,5R)-1-(((S)-1-(3-(trifluoromethyl)pyridin-2-yl)piperidin-3-yl)methyl)piperidine-3,4,5-triol | *** | 0 |
| 37 | (3S,4S,5R)-1-(((S)-1-(6-(trifluoromethyl)pyridin-2-yl)piperidin-3-yl)methyl)piperidine-3,4,5-triol | ** | 0 |
| 38 | (3S,4S,5R)-1-(((S)-1-(4-(trifluoromethyl)pyridin-3-yl)piperidin-3-yl)methyl)piperidine-3,4,5-triol | *** | 0 |
| 39 | (3S,4S,5R)-1-(((S)-1-(4-(trifluoromethyl)thiazol-2-yl)piperidin-3-yl)methyl)piperidine-3,4,5-triol | ** | 0 |
| 62 | (3S,4r,5R)-1-((2,3-dihydro-1H-inden-2-yl)methyl)piperidine-3,4,5-triol | *** | 12 |
| 106 | (3S,4r,5R)-1-((1-phenylpiperidin-4-yl)methyl)piperidine-3,4,5-triol | *** | 9 |
| 142 | (3S,4R,5R)-1-(((R)-1-(6-(trifluoromethyl)pyridin-2-yl)pyrrolidin-3-yl)methyl)piperidine-3,4,5-triol | *** | 0 |
| 146 | (3S,4R,5R)-1-(((R)-1-(5-(trifluoromethyl)pyridin-3-yl)pyrrolidin-3-yl)methyl)piperidine-3,4,5-triol | *** | 0 |
| 149 | (3S,4R,5R)-1-(((R)-1-(6-(trifluoromethyl)pyridin-3-yl)pyrrolidin-3-yl)methyl)piperidine-3,4,5-triol | *** | 0 |
| 161 | (3S,4S,5R)-1-(((S)-1-(5-(trifluoromethyl)pyridin-2-yl)pyrrolidin-3-yl)methyl)piperidine-3,4,5-triol | *** | 0 |
| 162 | (3S,4S,5R)-1-(((S)-1-(6-(trifluoromethyl)pyridin-3-yl)pyrrolidin-3-yl)methyl)piperidine-3,4,5-triol | *** | 0 |
| 167 | (3S,4R,5R)-1-(((R)-1-(4-(trifluoromethyl)pyridin-3-yl)piperidin-3-yl)methyl)piperidine-3,4,5-triol | *** | 4 |
| 168 | (3S,4R,5R)-1-(((R)-1-(5-(trifluoromethyl)pyridin-3-yl)piperidin-3-yl)methyl)piperidine-3,4,5-triol | *** | 7 |
| 169 | (3S,4R,5R)-1-(((R)-1-(4-(trifluoromethyl)pyridin-2-yl)piperidin-3-yl)methyl)piperidine-3,4,5-triol | *** | 13 |
| 170 | (3S,4R,5R)-1-(((R)-1-(5-(trifluoromethyl)pyridin-2-yl)piperidin-3-yl)methyl)piperidine-3,4,5-triol | *** | 14 |
| 171 | (3S,4R,5R)-1-(((R)-1-(6-(trifluoromethyl)pyridin-3-yl)piperidin-3-yl)methyl)piperidine-3,4,5-triol | *** | 1 |
| 172 | (3S,4R,5R)-1-(((R)-1-(3-(trifluoromethyl)pyridin-4-yl)piperidin-3-yl)methyl)piperidine-3,4,5-triol | *** | 15 |
| 173 | (3S,4R,5R)-1-(((R)-1-(2-(trifluoromethyl)pyridin-4-yl)piperidin-3-yl)methyl)piperidine-3,4,5-triol | *** | 3 |
| 174 | (3S,4S,5R)-1-(((S)-1-(2-(trifluoromethyl)pyridin-3-yl)piperidin-3-yl)methyl)piperidine-3,4,5-triol | *** | 3 |
| 175 | (3S,4S,5R)-1-(((S)-1-(5-(trifluoromethyl)pyridin-3-yl)piperidin-3-yl)methyl)piperidine-3,4,5-triol | ** | 3 |
| 176 | (3S,4S,5R)-1-(((S)-1-(4-(trifluoromethyl)pyridin-2-yl)piperidin-3-yl)methyl)piperidine-3,4,5-triol | ** | 0 |
| 177 | (3S,4S,5R)-1-(((S)-1-(5-(trifluoromethyl)pyridin-2-yl)piperidin-3-yl)methyl)piperidine-3,4,5-triol | * | 7 |
| 178 | (3S,4S,5R)-1-(((S)-1-(6-(trifluoromethyl)pyridin-3-yl)piperidin-3-yl)methyl)piperidine-3,4,5-triol | ** | 6 |
| 179 | (3S,4S,5R)-1-(((S)-1-(3-(trifluoromethyl)pyridin-4-yl)piperidin-3-yl)methyl)piperidine-3,4,5-triol | ** | 6 |
| 185 | (3S,4R,5R)-1-(((1r,4R)-4-(difluoromethyl)cyclohexyl)methyl)piperidine-3,4,5-triol | ** | 3 |
| 186 | (3S,4R,5R)-1-(((1s,4S)-4-(difluoromethyl)cyclohexyl)methyl)piperidine-3,4,5-triol | ** | 8 |
| 187 | (3S,4R,5R)-1-(((1s,4S)-4-(1,1-difluoroethyl)cyclohexyl)methyl)piperidine-3,4,5-triol | *** | 0 |
| 188 | (3S,4R,5R)-1-(((1r,4R)-4-(1,1-difluoroethyl)cyclohexyl)methyl)piperidine-3,4,5-triol | *** | 10 |

TABLE 3-continued

| Example | Name | GBA2 IC$_{50}$ | rat α-glu. (% inhib.) |
|---|---|---|---|
| 189 | (3S,4R,5R)-1-(((1r,4R)-4-(trifluoromethoxy)cyclohexyl)methyl)piperidine-3,4,5-triol | *** | 3 |
| 190 | (3S,4r,5R)-1-((4,7-difluoro-2,3-dihydro-1H-inden-2-yl)methyl)piperidine-3,4,5-triol | *** | 4 |
| 191 | cyclohexyl(4-fluoro-4-(((3S,4r,5R)-3,4,5-trihydroxypiperidin-1-yl)methyl)piperidin-1-yl)methanone | ** | 1 |
| 192 | (3S,4r,5R)-1-((4-fluoro-1-(4-fluorophenyl)piperidin-4-yl)methyl)piperidine-3,4,5-triol | ** | 2 |
| 193 | (3S,4r,5R)-1-((4-fluoro-1-(2-(trifluoromethyl)phenyl)piperidin-4-yl)methyl)piperidine-3,4,5-triol | *** | 2 |
| 194 | (3S,4r,5R)-1-((4-fluoro-1-(3-(trifluoromethyl)pyridin-2-yl)piperidin-4-yl)methyl)piperidine-3,4,5-triol | *** | 4 |
| 195 | (3S,4r,5R)-1-((4-fluoro-1-(6-(trifluoromethyl)pyridin-2-yl)piperidin-4-yl)methyl)piperidine-3,4,5-triol | ** | 5 |
| 196 | (3S,4r,5R)-1-((1-(benzo[d]thiazol-2-yl)-4-fluoropiperidin-4-yl)methyl)piperidine-3,4,5-triol | ** | 10 |
| 197 | (3S,4r,5R)-1-(4-butoxybenzyl)piperidine-3,4,5-triol | *** | 5 |
| 198 | (3S,4r,5R)-1-(4-(pentyloxy)benzyl)piperidine-3,4,5-triol | *** | 12 |
| 199 | (3S,4r,5R)-1-(4-butoxy-2,6-difluorobenzyl)piperidine-3,4,5-triol | * | 5 |
| 200 | (3S,4r,5R)-1-(4-(cyclopropylmethoxy)benzyl)piperidine-3,4,5-triol | *** | 7 |
| 201 | (3S,4r,5R)-1-(4-phenoxybenzyl)piperidine-3,4,5-triol | *** | 3 |
| 202 | (3S,4r,5R)-1-([1,1'-biphenyl]-4-ylmethyl)piperidine-3,4,5-triol | *** | 11 |
| 203 | (3S,4r,5R)-1-(4-(pyrrolidin-1-yl)benzyl)piperidine-3,4,5-triol | ** | — |
| 204 | (3S,4r,5R)-1-(4-(piperidin-1-yl)benzyl)piperidine-3,4,5-triol | ** | 4 |
| 205 | (3S,4r,5R)-1-(thiophen-2-ylmethyl)piperidine-3,4,5-triol | * | 4 |

The present invention has been described with regard to one or more embodiments. However, it will be apparent to persons skilled in the art that a number of variations and modifications can be made without departing from the scope of the invention as defined in the claims.

Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. It is to be understood that specific embodiments may be combined in any manner and in any number to create additional embodiments and any permutations and combinations of the embodiments should be considered disclosed by the description of the present application unless the context indicates otherwise. Numeric ranges are inclusive of the numbers defining the range. Recitation of numeric ranges of values herein is merely intended to serve as a shorthand method of referring individually to each separate value falling within the range. Unless otherwise indicated herein, each individual value is incorporated into the specification as if it were individually recited herein. The terms "a" and "an" and "the"" and similar reference used in the context of describing the invention are to be construed to cover both the singular and the plural, unless otherwise indicated herein or clearly contradicted by context. In the description, the word "comprising" is used as an open-ended term, substantially equivalent to the phrase "including, but not limited to," and the word "comprises" has a corresponding meaning. It is to be however understood that, where the words "comprising" or "comprises," or a variation having the same root, are used herein, variation or modification to "consisting" or "consists," which excludes any element, step, or ingredient not specified, or to "consisting essentially of" or "consists essentially of," which limits to the specified materials or recited steps together with those that do not materially affect the basic and novel characteristics of the claimed invention, is also contemplated. Citation of references herein shall not be construed as an admission that such references are prior art to the present invention. All publications are incorporated herein by reference as if each individual publication was specifically and individually indicated to be incorporated by reference herein and as though fully set forth herein. The invention includes all embodiments and variations substantially as hereinbefore described and with reference to the examples.

REFERENCES

1. Grabowski, G. A. *Lancet* 2008, 372, 1263-1271.
2. Massimo, A. et al. *Neurochem Res* 2016, 41, 210-20.
3. Woeste, M. A. et al. *Front Mol Neurosci* 2017, 10, 386.
4. Hayashi, Y. et al. *J Biol Chem* 2007, 282, 30889-30900.
5. Lahiri, S. et al. *Cell Mol Life Sci* 2007, 64, 2270-2284.
6. Mutoh, T. et al. *CNS Neurol Disord Drug Targets* 2006, 5, 375-380.
7. Kim, S. et al. *Proc Natl Acad Sci USA* 2018, 115, 798-803.
8. Halmer, R. et al. *Cell Physiol Biochem* 2014, 34, 111-118.
9. Di Pardo, A. et al. *Front Neurosci* 2017, 11, 698.
10. Dodge, J. C. et al. *Proc Natl Acad Sci USA* 2015, 112, 8100-5.
11. Somogyi, A. et al. *Int J Mol Sci* 2018, 19, 625.
12. Zervas, M. et al. *Curr Biol* 2001, 11, 1283-7.
13. Boudewyn, L. C. et al. *Neurobiol Dis* 2017, 105, 257-270.
14. Ashe, K. M. et al. *PLOS One* 2011, 6, e21758.
15. llan, Y. *Am J Physiol-Gast Liver Physiol* 2016, 310, G1102-G1117.
16. Marques, A. R. et al. *PLOS One* 2015, 10, e0135889.
17. Nietupski, J. B. et al. *Mol Genet Metab* 2012, 105, 621-8.
18. PCT Int. Appl. WO 2017/185010.
19. Mistry, P. K. et al. *Proc Natl Acad Sci USA* 2014, 111, 4934-9.
20. Loberto, N. et al. *PLOS One* 2014, 9, e104763.
21. Margalit, M. et al. *J Pharm Exp Ther* 2006, 319, 105-110.
22. Margalit, M. et al. *Am J Physiol-Gast Liver Physiol* 2005, 289, G917-G925.

23 Zigmond, E. et al. *Gut* 2007, 56, 82-89.
24. Zhang, W. et al. *Clin & Exp Immunol* 2009, 157, 359-364.
25. Mizrahi, M. et al. *J Clin Trans Hepatol* 2018, 6, 127-134.
26 Ghisaidoobe, A. T. et al. *J Med Chem* 2014, 57, 9096-104.
27. Farfel-Becker, T. et al. *Dis Model Mech* 2011, 4, 746-752.

---

What is claimed is:

1. A compound of Formula (I) or a pharmaceutically acceptable salt thereof:

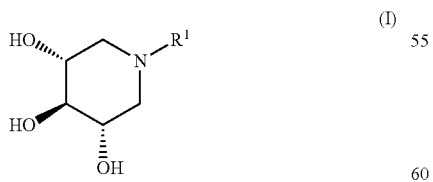

wherein
$R^1$ is $(CH_2)_nR^2$, wherein n is 1, 2, or 3, and $R^2$ is cyclohexyl, phenyl, thiophen-2-yl, thiophen-3-yl, pyridine-2-yl, adamantyl, 2,3-dihydro-1H-inden-2-yl, 1,2,3,4-tetrahydronaphthalen-2-yl, spiro[2.5]octan-6-yl, spiro[3.5]nonan-7-yl, spiro[4.5]decan-8-yl, (5S,8s)-3, 3-dimethyl-2-oxaspiro[4.5]decan-8-yl, (benzo[d][1,3] dioxol-5-yl)methyl, (2,3-dihydrobenzo[b][1,4]dioxin-6-yl)methyl, 1-cyclohexylazetidin-3-yl,

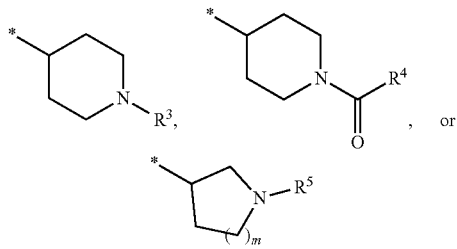

each optionally substituted from one up to the maximum number of substituents with one or more of F, Cl, $C_{1-6}$ alkyl, $C_{2-6}$ alkenyl, cyclopropyl, difluoromethyl, 1,1-difluoroethyl-1-yl, 2-fluoropropan-2-yl, methoxymethyl, OCF$_3$, CF$_3$, phenyl, pyrrolidin-1-yl, piperidin-1-yl, 4-morpholino, C$_{1-6}$ alkoxy, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, and/or 3,5-dimethyl-1H-pyrazol-4-yl;

where R$^3$ is C$_{1-6}$ alkyl, phenyl, pyridine-2-yl, pyridin-3-yl, benzo[d]thiazol-2-yl, cyclohexylcarbamothioyl, or cyclohexylcarbamoyl, each optionally substituted from one up to the maximum number of substituents with one or more of F, Cl, C$_{1-6}$ alkyl, C$_{2-6}$ alkenyl, cyclopropyl, C$_{1-6}$ alkoxy, OCF$_3$, and/or CF$_3$; and where R$^4$ is C$_{1-6}$ alkyl, C$_{3-7}$ cycloalkyl, phenyl, thiophen-3-yl, phenylmethyl, or cyclopentylmethyl, each optionally substituted from one up to the maximum number of substituents with one or more of F, C$_{1-6}$ alkyl, OCH$_3$, and/or CF$_3$; and where m is 1 or 2; and where R$^5$ is phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, or benzo[d]thiazol-2-yl, each optionally substituted from one up to the maximum number of substituents with one or more of F, Cl, C$_{1-6}$ alkyl, C$_{1-6}$ alkoxyl, OCF$_3$, and/or CF$_3$, with the proviso that R$^1$ is not benzyl or 3-phenylpropyl, or with the proviso that when n is 2, R$^2$ is not phenyl or phenylethyl.

2. The compound of claim 1 wherein:

R$^1$ is (CH$_2$)$_n$R$^2$, wherein n is 1 or 2, and R$^2$ is cyclohexyl, cyclohexylmethyl, phenylethyl, 4-phenylcyclohexyl, 4-(trifluoromethoxy)cyclohexyl, spiro[2.5]octan-6-yl, spiro[3.5]nonan-7-yl, spiro[4.5]decan-8-yl, (5S,8s)-3,3-dimethyl-2-oxaspiro[4.5]decan-8-yl, 1,2,3,4-tetrahydronaphthalen-2-yl, 2,3-dihydro-1H-inden-2-yl, (adamantyl)methyl, (pyridine-2-yl)methyl, (benzo[d][1,3]dioxol-5-yl)methyl, (2,3-dihydrobenzo[b][1,4]dioxin-6-yl)methyl, ([1,1'-biphenyl]-4-yl)methyl, 1-(2,2,2-trifluoroethyl)piperidin-4-yl, 1-(pyridin-3-yl)piperidin-4-yl, 1-(pyridin-2-yl)piperidin-4-yl, 1-(benzo[d]thiazol-2-yl)piperidin-4-yl, 1-(cyclohexylcarbamoyl)piperidin-4-yl, 1-(cyclohexylcarbamothioyl)piperidin-4-yl, 1-phenylpiperidin-4-yl, 1-cyclohexylazetidin-3-yl, thiophen-2-yl, 2-(thiophen-2-yl)methyl, or 2-(thiophen-3-yl)methyl, each optionally substituted from one up to the maximum number of substituents with one or more of F, Cl, C$_{1-6}$ alkyl, cyclopropyl, vinyl, difluoromethyl, 1,1-difluoroethyl-1-yl, 2-fluoropropan-2-yl, methoxymethyl, C$_{1-6}$ alkoxy, and/or CF$_3$; or R$^1$ is benzyl, substituted from one up to the maximum number of substituents with one or more of F, Cl, C$_{1-6}$ alkyl, phenyl, pyrrolidin-1-yl, piperidin-1-yl, C$_{1-6}$ alkoxy, cyclopropylmethoxy, phenoxy, and/or CF$_3$; or R$^1$ is phenylethyl, optionally substituted from one up to the maximum number of substituents with one or more of pyrrolidin-1-yl, piperidin-1-yl, 4-morpholino, cyclopropylmethoxy, (tetrahydrofuran-3-yl)oxy, (tetrahydro-2H-pyran-3-yl)oxy, (tetrahydro-2H-pyran-4-yl)oxy, phenoxy, (tetrahydrofuran-3-yl) methoxy, tetrahydro-2H-pyran-4-yl, 3,5-dimethylisoxazol-4-yl, 3,5-dimethyl-1H-pyrazol-4-yl, F, Cl, C$_{1-6}$ alkyl, cyclopropyl, propen-2-yl, OCH$_3$, and/or CF$_3$; or R$^1$ is (1-formylpiperidin-4-yl)methyl, substituted on the formyl group with one of: C$_{1-6}$ alkyl, C$_{3-7}$ cycloalkyl, phenyl, thiophen-3-yl, phenylmethyl, or cyclopentylmethyl, each optionally substituted from one up to the maximum number of substituents with one or more of F, C$_{1-6}$ alkyl, OCH$_3$, and/or CF$_3$; or R$^1$ is

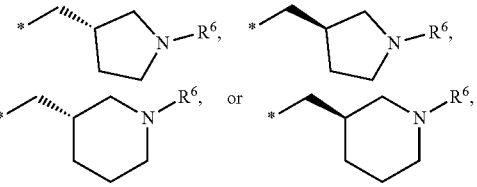

where R$^6$ is selected from the group consisting of: phenyl, pyridin-2-yl, pyridin-3-yl, pyridin-4-yl, pyrimidin-5-yl, thiophen-3-yl, benzo[d]thiazol-4-yl, benzo[d]thiazol-2-yl, phenylcarbonyl, thiazol-2-yl, benzo[d]oxazol-2-yl, and benzo[d]thiazol-2-yl, each optionally substituted from one up to the maximum number of substituents with one or more of F, Cl, C$_{1-6}$ alkyl, C$_{1-6}$ alkoxyl, OCF$_3$, and/or CF$_3$, with the proviso that R$^1$ is not benzyl or 3-phenylpropyl, or with the proviso that when n is 2, R$^2$ is not phenyl or phenylethyl.

3. The compound of claim 1 wherein:

R$^1$ is cyclohexylmethyl, (4,4-dimethylcyclohexyl)methyl, (4,4-difluorocyclohexyl)methyl, (4,4-dichlorocyclohexyl)methyl, (4-ethylcyclohexyl)methyl, ((1s,4S)-4-vinylcyclohexyl)methyl, ((1s,4S)-4-isopropylcyclohexyl)methyl, ((1r,4R)-4-isopropylcyclohexyl)methyl, 4-(tert-butyl)cyclohexyl)methyl, ((1s,4S)-4-(tert-butyl)cyclohexyl)methyl, ((1r,4R)-4-(tert-butyl)cyclohexyl)methyl, ((1s,4S)-4-(trifluoromethyl)cyclohexyl)methyl, ((1r,4R)-4-(trifluoromethyl)cyclohexyl)methyl, ((1s,4S)-4-(2-fluoropropan-2-yl)cyclohexyl)methyl, ((1r,4R)-4-(2-fluoropropan-2-yl)cyclohexyl)methyl, ((1s,4S)-4-methoxycyclohexyl)methyl, ((1r,4R)-4-methoxycyclohexyl)methyl, (4-(methoxymethyl)cyclohexyl)methyl, ((1s,4S)-4-cyclopropylcyclohexyl)methyl, ((1r,4R)-4-cyclopropylcyclohexyl)methyl, (4-phenylcyclohexyl)methyl, (spiro[2.5]octan-6-yl)methyl, (spiro[3.5]nonan-7-yl)methyl, (spiro[4.5]decan-8-yl)methyl, 2-cyclohexylethyl, 2-(4,4-difluorocyclohexyl)ethyl, 2-((1s,4S)-4-(trifluoromethyl)cyclohexyl)ethyl, 2-((1r,4R)-4-(trifluoromethyl)cyclohexyl)ethyl, 2-(adamantan-1-yl)ethyl, 3-cyclohexylpropyl, 2-methylphenethyl, 2-methoxyphenethyl, 2-fluorophenethyl, 2-chlorophenethyl, 2,3-difluorophenethyl, 2,4-difluorophenethyl, 2,5-difluorophenethyl, 3,4-difluorophenethyl, 2-fluoro-4-methoxyphenethyl, 3-chloro-2-fluorophenethyl, 4-chloro-2-fluorophenethyl, 5-chloro-2-fluorophenethyl, 2,6-difluorophenethyl, 3-chloro-2,6-difluorophenethyl, 2,6-difluoro-4-(prop-1-en-2-yl)phenethyl, 2,6-difluoro-4-isopropylphenethyl, 2,6-difluoro-3-isopropylphenethyl, 4-cyclopropyl-2,6-difluorophenethyl, 2,6-difluoro-4-(trifluoromethyl) phenethyl, 2,6-difluoro-4-(pyrrolidin-1-yl) phenethyl, 2,6-difluoro-4-(piperidin-1-yl) phenethyl, 2,6-difluoro-4-morpholinophenethyl, 4-butoxy-2,6-difluorophenethyl, 4-(cyclopropylmethoxy)-2,6-difluorophenethyl, 4-((tetrahydrofuran-3-yl)oxy) phenethyl, 4-((tetrahydro-2H-pyran-3-yl)oxy) phenethyl, 4-((tetrahydro-2H-pyran-4-yl)oxy) phenethyl, 4-phenoxyphenethyl, 4-((tetrahydrofuran-3-yl) methoxy) phenethyl, (R)-2-phenylpropyl, (S)-2-phenylpropyl, 2-([1,1'-biphenyl]-4-yl)ethyl, 2-(3,5-difluoro-[1,1'-biphenyl]-4-yl)ethyl, 2-(benzo[d][1,3]dioxol-5-yl)ethyl, 2-(6-fluorobenzo[d][1,3]dioxol-5-yl)ethyl, 2-(2,2-difluorobenzo[d][1,3]dioxol-5-yl)ethyl, 2-(2,3-dihydrobenzo[b][1,4]dioxin-6-yl)ethyl, 2-(thiophen-2-yl)ethyl, 2-(thiophen-3-yl)ethyl, 2-(pyridine-2-yl)ethyl, 3-(2-fluorophenyl) propyl, 3-(4-fluorophenyl) propyl, 3-(thiophen-2-yl) propyl, 3-(thiophen-3-yl) propyl, (1-phenylpiperidin-4-yl)methyl, (1-(2-fluorophenyl)piperidin-4-yl)methyl, (1-(3-fluorophenyl)piperidin-4-yl)methyl, (1-(4-fluorophenyl)piperidin-4-yl)methyl, (1-(4-(trifluoromethyl)phenyl)piperidin-4-yl)methyl, (4-methyl-1-phenylpiperidin-4-yl)methyl, (4-fluoro-1-phenylpiperidin-4-yl) methyl, 2-(1-phenylpiperidin-4-yl)ethyl, (1-(2,2,2-trifluoroethyl)piperidin-4-yl)methyl, (1-isobutyrylpiperidin-4-yl)methyl, (1-pivaloylpiperidin-4-yl)methyl, (1-butyrylpiperidin-4-yl)methyl, (1-(3-methylbutanoyl)piperidin-4-yl)methyl, (1-(3,3-dimethylbutanoyl)piperidin-4-yl)methyl, (1-(2-cyclopentylacetyl)piperidin-4-yl)methyl, (1-(cyclopropanecarbonyl)piperidin-4-yl)methyl, (1-(cyclobutanecarbonyl)piperidin-4-yl)methyl, (1-(cyclopentanecarbonyl)piperidin-4-yl)methyl, (1-(cyclohexanecarbonyl)piperidin-4-yl)methyl, (1-((1s,4s)-4-(tert-butyl)cyclohexanecarbonyl)piperidin-4-yl) methyl, (1-((1r,4r)-4-(tert-butyl)cyclohexanecarbonyl)piperidin-4-yl)methyl, (1-(4-methoxycyclohexanecarbonyl)piperidin-4-yl)methyl, (1-(4-(trifluoromethyl)cyclohexanecarbonyl)piperidin-4-yl)methyl, (1-benzoylpiperidin-4-yl)methyl, (1-(3-(trifluoromethyl)benzoyl)piperidin-4-yl)methyl, (1-(2-phenylacetyl)piperidin-4-yl)methyl, (1-(thiophene-3-carbonyl)piperidin-4-yl)methyl, ((5S,8s)-3,3-dimethyl-2-oxaspiro[4.5]decan-8-yl)methyl, (1,2,3,4-tetrahydronaphthalen-2-yl)methyl, (2,3-dihydro-1H-inden-2-yl)methyl, 2,6-difluoro-4-(tetrahydro-2H-pyran-4-yl) phenethyl, (1-(pyridin-3-yl)piperidin-4-yl)methyl, (1-(cyclohexylcarbamoyl)piperidin-4-yl) methyl, (1-(cyclohexylcarbamothioyl)piperidin-4-yl) methyl, (1-((1S,2R)-2-(trifluoromethyl)cyclohexyl)azetidin-3-yl)methyl, ((R)-1-phenylpyrrolidin-3-yl) methyl, ((R)-1-(o-tolyl)pyrrolidin-3-yl)methyl, (R)-1-(2-(trifluoromethyl)phenyl)pyrrolidin-3-yl)methyl, ((S)-1-(2-(trifluoromethyl)phenyl)pyrrolidin-3-yl) methyl, (R)-1-(2-fluorophenyl)pyrrolidin-3-yl)methyl, (R)-1-(3-fluorophenyl)pyrrolidin-3-yl)methyl, ((R)-1-(2-(trifluoromethoxy)phenyl)pyrrolidin-3-yl)methyl, ((R)-1-(6-(trifluoromethyl)pyridin-2-yl)pyrrolidin-3-yl)methyl, ((R)-1-(3-(trifluoromethyl)pyridin-2-yl)pyrrolidin-3-yl)methyl, ((R)-1-(4-(trifluoromethyl)pyridin-2-yl)pyrrolidin-3-yl)methyl, ((R)-1-(pyridin-3-yl)pyrrolidin-3-yl)methyl, ((R)-1-(4-methylpyridin-3-yl)pyrrolidin-3-yl)methyl, ((R)-1-(4-(trifluoromethyl)pyridin-3-yl)pyrrolidin-3-yl)methyl, ((R)-1-(5-(trifluoromethyl)pyridin-3-yl)pyrrolidin-3-yl)methyl, ((R)-1-(2-(trifluoromethyl)pyridin-3-yl)pyrrolidin-3-yl)methyl, ((R)-1-(4-(trifluoromethyl)pyrimidin-5-yl)pyrrolidin-3-yl)methyl, ((R)-1-(thiophen-3-yl)pyrrolidin-3-yl)methyl, ((R)-1-(benzo[d]thiazol-4-yl)pyrrolidin-3-yl)methyl, (S)-(1-(4-(trifluoromethyl)benzoyl)pyrrolidin-3-yl)methyl, ((R)-1-(o-tolyl)piperidin-3-yl)methyl, ((R)-1-(2-fluorophenyl)piperidin-3-yl)methyl, ((R)-1-(3-(trifluoromethyl)pyridin-2-yl)piperidin-3-yl)methyl, ((R)-1-(6-(trifluoromethyl)pyridin-2-yl)piperidin-3-yl)methyl, ((R)-1-(4-(trifluoromethyl)pyridin-3-yl)piperidin-3-yl) methyl, 3-fluorophenethyl, 4-fluorophenethyl, 3,4-dichlorophenethyl, 3-(trifluoromethyl) phenethyl, 4-(trifluoromethyl) phenethyl, ((R)-1-(benzo[d]thiazol-2-yl)pyrrolidin-3-yl)methyl, ((R)-1-(2-(trifluoromethyl)pyridin-3-yl)piperidin-3-yl)methyl, 4-(3,5-dimethylisoxazol-4-yl)-2,6-difluorophenethyl, 4-(3,5-dimethyl-1H-pyrazol-4-yl)-2,6-difluorophenethyl, ((R)-1-(4-(trifluoromethyl)thiazol-2-yl)pyrrolidin-3-yl)methyl, ((R)-1-(benzo[d]oxazol-2-yl)pyrrolidin-3-yl)methyl, ((R)-1-(5-isopropylthiazol-2-yl)pyrrolidin-3-yl)methyl, ((R)-1-(4-(trifluoromethyl)thiazol-2-yl)piperidin-3-yl)methyl, ((R)-1-(benzo[d]thiazol-2-yl)piperidin-3-yl)methyl, ((R)-1-(benzo[d]thiazol-4-yl)piperidin-3-yl)methyl, ((S)-1-(3-(trifluoromethyl)pyridin-2-yl)pyrrolidin-3-yl)methyl, ((S)-1-(4-(trifluoromethyl)pyridin-3-yl)pyrrolidin-3-yl)methyl, ((S)-1-(4-(trifluoromethyl)pyrimidin-5-yl)pyrrolidin-3-yl)methyl, ((S)-1-(benzo[d]thiazol-4-yl)pyrrolidin-3-yl)methyl, ((S)-1-(3-(trifluoromethyl)pyridin-2-yl)piperidin-3-yl)methyl, ((S)-1-(4-(trifluoromethyl)pyridin-3-yl)piperidin-3-yl)methyl, ((S)-1-(6-(trifluoromethyl)pyridin-2-yl)piperidin-3-yl)methyl, ((S)-1-(benzo[d]thiazol-4-yl)piperidin-3-yl)methyl, ((R)-1-(5-(trifluoromethyl)pyridin-2-yl)pyrrolidin-3-yl)methyl, ((R)-1-(6-(trifluoromethyl)pyridin-3-yl)pyrrolidin-3-yl)methyl, ((R)-1-(3-(trifluoromethyl)pyridin-4-yl)pyrrolidin-3-yl)methyl, ((R)-1-(2-(trifluoromethyl)pyridin-4-yl)pyrrolidin-3-yl)methyl, ((S)-1-(2-(trifluoromethyl)pyridin-3-yl)pyrrolidin-3-yl)methyl, ((S)-1-(5-(trifluoromethyl)pyridin-3-yl)pyrrolidin-3-yl)methyl, ((S)-1-(4-(trifluoromethyl)pyridin-2-yl)pyrrolidin-3-yl)methyl, ((S)-1-(6-(trifluoromethyl)pyridin-2-yl)pyrrolidin-3-yl)methyl, ((S)-1-(5-(trifluoromethyl)pyridin-2-yl)pyrrolidin-3-yl)methyl, ((S)-1-(6-(trifluoromethyl)pyridin-3-yl)pyrrolidin-3-yl)methyl, ((S)-1-(3-(trifluoromethyl)pyridin-4-yl)pyrrolidin-3-yl)methyl, ((S)-1-(2-(trifluoromethyl)pyridin-4-yl)pyrrolidin-3-yl)methyl, ((R)-1-(5-(trifluoromethyl)pyridin-3-yl)piperidin-3-yl)methyl, ((R)-1-(4-(trifluoromethyl)pyridin-2-yl)piperidin-3-yl) methyl, ((R)-1-(5-(trifluoromethyl)pyridin-2-yl)piperidin-3-yl)methyl, ((R)-1-(6-(trifluoromethyl)pyridin-3-yl)piperidin-3-yl)methyl, ((R)-1-(3-(trifluoromethyl)pyridin-4-yl)piperidin-3-yl)methyl, ((R)-1-(2-(trifluoromethyl)pyridin-4-yl)piperidin-3-yl)methyl, ((S)-1-(2-(trifluoromethyl)pyridin-3-yl)piperidin-3-yl) methyl, ((S)-1-(5-(trifluoromethyl)pyridin-3-yl)piperidin-3-yl)methyl, ((S)-1-(4-(trifluoromethyl)pyridin-2-yl)piperidin-3-yl)methyl, ((S)-1-(5-(trifluoromethyl)pyridin-2-yl)piperidin-3-yl)methyl, ((S)-1-(6-(trifluoromethyl)pyridin-3-yl)piperidin-3-yl)methyl, ((S)-1-(3-(trifluoromethyl)pyridin-4-yl)piperidin-3-yl) methyl, ((S)-1-(2-(trifluoromethyl)pyridin-4-yl)piperidin-3-yl)methyl, 1-(3-chloro-2-fluorophenyl)propan-2-yl, 4-(3-chloro-2-fluorophenyl)butan-2-yl, ((1r,4R)-4-(difluoromethyl)cyclohexyl)methyl, ((1s,4S)-4-(difluoromethyl)cyclohexyl)methyl, ((1s,4S)-4-(1,1-difluoroethyl)cyclohexyl)methyl, ((1r,4R)-4-(1,1-difluoroethyl)cyclohexyl)methyl, ((1r,4R)-4-(trifluoromethoxy)cyclohexyl)methyl, (4,7-difluoro-2,3-dihydro-1H-inden-2-yl)methyl, (1-(cyclohexanecarbonyl)-4-fluoropiperidin-4-yl)methyl, (4-fluoro-1-(4-fluorophenyl)piperidin-4-yl)methyl, (4-fluoro-1-(2-(trifluoromethyl)phenyl)piperidin-4-yl) methyl, (4-fluoro-1-(3-(trifluoromethyl)pyridin-2-yl)piperidin-4-yl)methyl, (4-fluoro-1-(6-(trifluoromethyl)

pyridin-2-yl)piperidin-4-yl)methyl, (1-(benzo[d]
thiazol-2-yl)-4-fluoropiperidin-4-yl)methyl,
4-butoxybenzyl, 4-(pentyloxy)benzyl, 4-butoxy-2,6-difluorobenzyl, 4-(cyclopropylmethoxy)benzyl, 4-phenoxybenzyl, [1,1'-biphenyl]-4-ylmethyl, 4-(pyrrolidin-1-yl)benzyl, 4-(piperidin-1-yl)benzyl, or thiophen-2-ylmethyl.

4. The compound of claim 1 wherein the compound is:
(3S,4R,5R)-1-(((1r,4R)-4-(trifluoromethyl)cyclohexyl)methyl)piperidine-3,4,5-triol;
(3S,4R,5R)-1-(((1s,4S)-4-(trifluoromethyl)cyclohexyl)methyl)piperidine-3,4,5-triol;
(3S,4R,5R)-1-(((1s,4S)-4-(2-fluoropropan-2-yl)cyclohexyl)methyl)piperidine-3,4,5-triol;
(3S,4r,5R)-1-(2-cyclohexylethyl)piperidine-3,4,5-triol;
(3S,4r,5R)-1-(3-cyclohexylpropyl)piperidine-3,4,5-triol;
(3S,4r,5R)-1-(3-chloro-2-fluorophenethyl)piperidine-3,4,5-triol;
(3S,4r,5R)-1-(3-chloro-2,6-difluorophenethyl)piperidine-3,4,5-triol;
(3S,4r,5R)-1-(3,4-dichlorophenethyl)piperidine-3,4,5-triol;
(3S,4r,5R)-1-(4-(cyclopropylmethoxy)-2,6-difluorophenethyl)piperidine-3,4,5-triol;
(3S,4r,5R)-1-(2,6-difluoro-4-(pyrrolidin-1-yl)phenethyl)piperidine-3,4,5-triol;
(3S,4r,5R)-1-(2,6-difluoro-4-(piperidin-1-yl)phenethyl)piperidine-3,4,5-triol;
(3S,4r,5R)-1-(2,6-difluoro-4-morpholinophenethyl)piperidine-3,4,5-triol;
(3S,4r,5R)-1-(2,6-difluoro-4-(tetrahydro-2H-pyran-4-yl)phenethyl)piperidine-3,4,5-triol;
(3S,4r,5R)-1-(4-(3,5-dimethylisoxazol-4-yl)-2,6-difluorophenethyl)piperidine-3,4,5-triol;
(3S,4r,5R)-1-(4-(3,5-dimethyl-1H-pyrazol-4-yl)-2,6-difluorophenethyl)piperidine-3,4,5-triol;
(3S,4r,5R)-1-(1-(3-chloro-2-fluorophenyl)propan-2-yl)piperidine-3,4,5-triol;
(3S,4r,5R)-1-(4-(3-chloro-2-fluorophenyl)butan-2-yl)piperidine-3,4,5-triol;
(3S,4R,5R)-1-(((R)-1-(o-tolyl)pyrrolidin-3-yl)methyl)piperidine-3,4,5-triol;
(3S,4R,5R)-1-(((R)-1-(3-(trifluoromethyl)pyridin-2-yl)pyrrolidin-3-yl)methyl)piperidine-3,4,5-triol;
(3S,4R,5R)-1-(((R)-1-(4-(trifluoromethyl)pyridin-3-yl)pyrrolidin-3-yl)methyl)piperidine-3,4,5-triol;
(3S,4R,5R)-1-(((R)-1-(4-(trifluoromethyl)thiazol-2-yl)pyrrolidin-3-yl)methyl)piperidine-3,4,5-triol;
(3S,4R,5R)-1-(((R)-1-(benzo[d]oxazol-2-yl)pyrrolidin-3-yl)methyl)piperidine-3,4,5-triol;
(3S,4R,5R)-1-(((R)-1-(benzo[d]thiazol-2-yl)pyrrolidin-3-yl)methyl)piperidine-3,4,5-triol;
(3S,4S,5R)-1-(((S)-1-(3-(trifluoromethyl)pyridin-2-yl)pyrrolidin-3-yl)methyl)piperidine-3,4,5-triol;
(3S,4S,5R)-1-(((S)-1-(4-(trifluoromethyl)pyridin-3-yl)pyrrolidin-3-yl)methyl)piperidine-3,4,5-triol;
(3S,4S,5R)-1-(((S)-1-(4-(trifluoromethyl)pyrimidin-5-yl)pyrrolidin-3-yl)methyl)piperidine-3,4,5-triol;
(3S,4S,5R)-1-(((S)-1-(4-(trifluoromethyl)thiazol-2-yl)pyrrolidin-3-yl)methyl)piperidine-3,4,5-triol;
(3S,4S,5R)-1-(((S)-1-(benzo[d]thiazol-4-yl)pyrrolidin-3-yl)methyl)piperidine-3,4,5-triol;
(3S,4R,5R)-1-(((R)-1-(3-(trifluoromethyl)pyridin-2-yl)piperidin-3-yl)methyl)piperidine-3,4,5-triol;
(3S,4R,5R)-1-(((R)-1-(6-(trifluoromethyl)pyridin-2-yl)piperidin-3-yl)methyl)piperidine-3,4,5-triol;
(3S,4R,5R)-1-(((R)-1-(2-(trifluoromethyl)pyridin-3-yl)piperidin-3-yl)methyl)piperidine-3,4,5-triol;
(3S,4R,5R)-1-(((R)-1-(5-isopropylthiazol-2-yl)piperidin-3-yl)methyl)piperidine-3,4,5-triol;
(3S,4R,5R)-1-(((R)-1-(4-(trifluoromethyl)thiazol-2-yl)piperidin-3-yl)methyl)piperidine-3,4,5-triol;
(3S,4R,5R)-1-(((R)-1-(benzo[d]thiazol-2-yl)piperidin-3-yl)methyl)piperidine-3,4,5-triol;
(3S,4R,5R)-1-(((R)-1-(benzo[d]thiazol-4-yl)piperidin-3-yl)methyl)piperidine-3,4,5-triol;
(3S,4S,5R)-1-(((S)-1-(3-(trifluoromethyl)pyridin-2-yl)piperidin-3-yl)methyl)piperidine-3,4,5-triol;
(3S,4S,5R)-1-(((S)-1-(6-(trifluoromethyl)pyridin-2-yl)piperidin-3-yl)methyl)piperidine-3,4,5-triol;
(3S,4S,5R)-1-(((S)-1-(4-(trifluoromethyl)pyridin-3-yl)piperidin-3-yl)methyl)piperidine-3,4,5-triol;
(3S,4S,5R)-1-(((S)-1-(4-(trifluoromethyl)thiazol-2-yl)piperidin-3-yl)methyl)piperidine-3,4,5-triol;
(3S,4r,5R)-1-(cyclohexylmethyl)piperidine-3,4,5-triol;
(3S,4r,5R)-1-((4,4-dimethylcyclohexyl)methyl)piperidine-3,4,5-triol;
(3S,4r,5R)-1-((4,4-difluorocyclohexyl)methyl)piperidine-3,4,5-triol;
(3S,4r,5R)-1-((4,4-dichlorocyclohexyl)methyl)piperidine-3,4,5-triol;
(3S,4r,5R)-1-((4-ethylcyclohexyl)methyl)piperidine-3,4,5-triol;
(3S,4R,5R)-1-(((1s,4S)-4-vinylcyclohexyl)methyl)piperidine-3,4,5-triol;
(3S,4R,5R)-1-(((1s,4S)-4-isopropylcyclohexyl)methyl)piperidine-3,4,5-triol;
(3S,4R,5R)-1-(((1r,4R)-4-isopropylcyclohexyl)methyl)piperidine-3,4,5-triol;
(3S,4R,5R)-1-(((1s,4S)-4-(tert-butyl)cyclohexyl)methyl)piperidine-3,4,5-triol;
(3S,4R,5R)-1-(((1r,4R)-4-(tert-butyl)cyclohexyl)methyl)piperidine-3,4,5-triol;
(3S,4R,5R)-1-(((1r,4R)-4-(2-fluoropropan-2-yl)cyclohexyl)methyl)piperidine-3,4,5-triol;
(3S,4R,5R)-1-(((1s,4S)-4-methoxycyclohexyl)methyl)piperidine-3,4,5-triol;
(3S,4R,5R)-1-(((1r,4R)-4-methoxycyclohexyl)methyl)piperidine-3,4,5-triol;
(3S,4r,5R)-1-((4-(methoxymethyl)cyclohexyl)methyl)piperidine-3,4,5-triol;
(3S,4R,5R)-1-(((1s,4S)-4-cyclopropylcyclohexyl)methyl)piperidine-3,4,5-triol;
(3S,4R,5R)-1-(((1r,4R)-4-cyclopropylcyclohexyl)methyl)piperidine-3,4,5-triol;
(3S,4r,5R)-1-((4-phenylcyclohexyl)methyl)piperidine-3,4,5-triol;
(3S,4r,5R)-1-(spiro[2.5]octan-6-ylmethyl)piperidine-3,4,5-triol;
(3S,4r,5R)-1-(spiro[3.5]nonan-7-ylmethyl)piperidine-3,4,5-triol;
(3S,4r,5R)-1-(spiro[4.5]decan-8-ylmethyl)piperidine-3,4,5-triol;
(3S,4R,5R)-1-(((5S,8s)-3,3-dimethyl-2-oxaspiro[4.5]decan-8-yl)methyl)piperidine-3,4,5-triol;
(3S,4r,5R)-1-((1,2,3,4-tetrahydronaphthalen-2-yl)methyl)piperidine-3,4,5-triol;
(3S,4r,5R)-1-((2,3-dihydro-1H-inden-2-yl)methyl)piperidine-3,4,5-triol;
(3S,4r,5R)-1-(2-(4,4-difluorocyclohexyl)ethyl)piperidine-3,4,5-triol;
(3S,4R,5R)-1-(2-((1s,4S)-4-(trifluoromethyl)cyclohexyl)ethyl)piperidine-3,4,5-triol;

(3S,4R,5R)-1-(2-((1r,4R)-4-(trifluoromethyl)cyclohexyl)ethyl)piperidine-3,4,5-triol;
(3S,4R,5R)-1-(2-((3R,5R,7R)-adamantan-1-yl)ethyl)piperidine-3,4,5-triol;
(3S,4r,5R)-1-(2-methylphenethyl)piperidine-3,4,5-triol;
(3S,4r,5R)-1-(2-methoxyphenethyl)piperidine-3,4,5-triol;
(3S,4r,5R)-1-(2-fluorophenethyl)piperidine-3,4,5-triol;
(3S,4r,5R)-1-(2-chlorophenethyl)piperidine-3,4,5-triol;
(3S,4r,5R)-1-(2,3-difluorophenethyl)piperidine-3,4,5-triol;
(3S,4r,5R)-1-(2,4-difluorophenethyl)piperidine-3,4,5-triol;
(3S,4r,5R)-1-(2,5-difluorophenethyl)piperidine-3,4,5-triol;
(3S,4r,5R)-1-(3,4-difluorophenethyl)piperidine-3,4,5-triol;
(3S,4r,5R)-1-(2-fluoro-4-methoxyphenethyl)piperidine-3,4,5-triol;
(3S,4r,5R)-1-(4-chloro-2-fluorophenethyl)piperidine-3,4,5-triol;
(3S,4r,5R)-1-(5-chloro-2-fluorophenethyl)piperidine-3,4,5-triol;
(3S,4r,5R)-1-(2,6-difluorophenethyl)piperidine-3,4,5-triol;
(3S,4r,5R)-1-(2,6-difluoro-4-(prop-1-en-2-yl)phenethyl)piperidine-3,4,5-triol;
(3S,4r,5R)-1-(2,6-difluoro-4-isopropylphenethyl)piperidine-3,4,5-triol;
(3S,4r,5R)-1-(2,6-difluoro-3-isopropylphenethyl)piperidine-3,4,5-triol;
(3S,4r,5R)-1-(4-cyclopropyl-2,6-difluorophenethyl)piperidine-3,4,5-triol;
(3S,4r,5R)-1-(2,6-difluoro-4-(trifluoromethyl)phenethyl)piperidine-3,4,5-triol;
(3S,4r,5R)-1-(4-butoxy-2,6-difluorophenethyl)piperidine-3,4,5-triol;
(3S,4r,5R)-1-(4-((tetrahydrofuran-3-yl)oxy) phenethyl)piperidine-3,4,5-triol;
(3S,4r,5R)-1-(4-((tetrahydro-2H-pyran-3-yl)oxy) phenethyl)piperidine-3,4,5-triol;
(3S,4r,5R)-1-(4-((tetrahydro-2H-pyran-4-yl)oxy) phenethyl)piperidine-3,4,5-triol;
(3S,4r,5R)-1-(4-phenoxyphenethyl)piperidine-3,4,5-triol;
(3S,4r,5R)-1-(4-((tetrahydrofuran-3-yl) methoxy) phenethyl)piperidine-3,4,5-triol;
(3S,4R,5R)-1-((R)-2-phenylpropyl)piperidine-3,4,5-triol;
(3S,4S,5R)-1-((S)-2-phenylpropyl)piperidine-3,4,5-triol;
(3S,4r,5R)-1-(2-([1,1'-biphenyl]-4-yl)ethyl)piperidine-3,4,5-triol;
(3S,4r,5R)-1-(2-(3,5-difluoro-[1,1'-biphenyl]-4-yl)ethyl)piperidine-3,4,5-triol;
(3S,4r,5R)-1-(2-(benzo[d][1,3]dioxol-5-yl)ethyl)piperidine-3,4,5-triol;
(3S,4r,5R)-1-(2-(6-fluorobenzo[d][1,3]dioxol-5-yl)ethyl)piperidine-3,4,5-triol;
(3S,4r,5R)-1-(2-(2,2-difluorobenzo[d][1,3]dioxol-5-yl)ethyl)piperidine-3,4,5-triol;
(3S,4r,5R)-1-(2-(2,3-dihydrobenzo[b][1,4]dioxin-6-yl)ethyl)piperidine-3,4,5-triol;
(3S,4r,5R)-1-(2-(thiophen-2-yl)ethyl)piperidine-3,4,5-triol;
(3S,4r,5R)-1-(2-(thiophen-3-yl)ethyl)piperidine-3,4,5-triol;
(3S,4r,5R)-1-(2-(pyridin-2-yl)ethyl)piperidine-3,4,5-triol;
(3S,4r,5R)-1-(3-(2-fluorophenyl) propyl)piperidine-3,4,5-triol;
(3S,4r,5R)-1-(3-(4-fluorophenyl) propyl)piperidine-3,4,5-triol;
(3S,4r,5R)-1-(3-(thiophen-2-yl) propyl)piperidine-3,4,5-triol;
(3S,4r,5R)-1-(3-(thiophen-3-yl) propyl)piperidine-3,4,5-triol;
(3S,4r,5R)-1-((1-phenylpiperidin-4-yl)methyl)piperidine-3,4,5-triol;
(3S,4r,5R)-1-((1-(2-fluorophenyl)piperidin-4-yl)methyl)piperidine-3,4,5-triol;
(3S,4r,5R)-1-((1-(3-fluorophenyl)piperidin-4-yl)methyl)piperidine-3,4,5-triol;
(3S,4r,5R)-1-((1-(4-fluorophenyl)piperidin-4-yl)methyl)piperidine-3,4,5-triol;
(3S,4r,5R)-1-((1-(4-(trifluoromethyl)phenyl)piperidin-4-yl)methyl)piperidine-3,4,5-triol;
(3S,4r,5R)-1-((4-methyl-1-phenylpiperidin-4-yl)methyl)piperidine-3,4,5-triol;
(3S,4r,5R)-1-((4-fluoro-1-phenylpiperidin-4-yl)methyl)piperidine-3,4,5-triol;
(3S,4r,5R)-1-(2-(1-phenylpiperidin-4-yl)ethyl)piperidine-3,4,5-triol;
(3S,4r,5R)-1-((1-(pyridin-3-yl)piperidin-4-yl)methyl)piperidine-3,4,5-triol;
(3S,4r,5R)-1-((1-(2,2,2-trifluoroethyl)piperidin-4-yl)methyl)piperidine-3,4,5-triol;
2-methyl-1-(4-(((3S,4r,5R)-3,4,5-trihydroxypiperidin-1-yl)methyl)piperidin-1-yl) propan-1-one;
2,2-dimethyl-1-(4-(((3S,4r,5R)-3,4,5-trihydroxypiperidin-1-yl)methyl)piperidin-1-yl) propan-1-one;
1-(4-(((3S,4r,5R)-3,4,5-trihydroxypiperidin-1-yl)methyl)piperidin-1-yl) butan-1-one;
3-methyl-1-(4-(((3S,4r,5R)-3,4,5-trihydroxypiperidin-1-yl)methyl)piperidin-1-yl) butan-1-one;
3,3-dimethyl-1-(4-(((3S,4r,5R)-3,4,5-trihydroxypiperidin-1-yl)methyl)piperidin-1-yl) butan-1-one;
2-cyclopentyl-1-(4-(((3S,4r,5R)-3,4,5-trihydroxypiperidin-1-yl)methyl)piperidin-1-yl) ethanone;
cyclopropyl(4-(((3S,4r,5R)-3,4,5-trihydroxypiperidin-1-yl)methyl)piperidin-1-yl)methanone;
cyclobutyl(4-(((3S,4r,5R)-3,4,5-trihydroxypiperidin-1-yl)methyl)piperidin-1-yl)methanone;
cyclopentyl(4-(((3S,4r,5R)-3,4,5-trihydroxypiperidin-1-yl)methyl)piperidin-1-yl)methanone;
cyclohexyl(4-(((3S,4r,5R)-3,4,5-trihydroxypiperidin-1-yl)methyl)piperidin-1-yl)methanone;
((1s,4S)-4-(tert-butyl)cyclohexyl) (4-(((3S,4R,5R)-3,4,5-trihydroxypiperidin-1-yl)methyl)piperidin-1-yl)methanone;
((1r,4R)-4-(tert-butyl)cyclohexyl) (4-(((3S,4R,5R)-3,4,5-trihydroxypiperidin-1-yl)methyl)piperidin-1-yl)methanone;
(4-methoxycyclohexyl) (4-(((3S,4r,5R)-3,4,5-trihydroxypiperidin-1-yl)methyl)piperidin-1-yl)methanone;
(4-(trifluoromethyl)cyclohexyl) (4-(((3S,4r,5R)-3,4,5-trihydroxypiperidin-1-yl)methyl)piperidin-1-yl)methanone;
phenyl(4-(((3S,4r,5R)-3,4,5-trihydroxypiperidin-1-yl)methyl)piperidin-1-yl)methanone;
(3-(trifluoromethyl)phenyl) (4-(((3S,4r,5R)-3,4,5-trihydroxypiperidin-1-yl)methyl)piperidin-1-yl)methanone;
2-phenyl-1-(4-(((3S,4r,5R)-3,4,5-trihydroxypiperidin-1-yl)methyl)piperidin-1-yl) ethanone;
thiophen-3-yl(4-(((3S,4r,5R)-3,4,5-trihydroxypiperidin-1-yl)methyl)piperidin-1-yl)methanone;
N-cyclohexyl-4-(((3S,4r,5R)-3,4,5-trihydroxypiperidin-1-yl)methyl)piperidine-1-carboxamide;

N-cyclohexyl-4-(((3S,4r,5R)-3,4,5-trihydroxypiperidin-1-yl)methyl)piperidine-1-carbothioamide;
(3S,4S,5R)-1-((1-((1S,2R)-2-(trifluoromethyl)cyclohexyl) azetidin-3-yl)methyl)piperidine-3,4,5-triol;
(3S,4R,5R)-1-(((R)-1-phenylpyrrolidin-3-yl)methyl)piperidine-3,4,5-triol;
(3S,4R,5R)-1-(((R)-1-(2-(trifluoromethyl)phenyl)pyrrolidin-3-yl)methyl)piperidine-3,4,5-triol;
(3S,4R,5R)-1-(((R)-1-(2-fluorophenyl)pyrrolidin-3-yl)methyl)piperidine-3,4,5-triol;
(3S,4R,5R)-1-(((R)-1-(3-fluorophenyl)pyrrolidin-3-yl)methyl)piperidine-3,4,5-triol;
(3S,4R,5R)-1-(((R)-1-(2-(trifluoromethoxy)phenyl)pyrrolidin-3-yl)methyl)piperidine-3,4,5-triol;
(3S,4R,5R)-1-(((R)-1-(6-(trifluoromethyl)pyridin-2-yl)pyrrolidin-3-yl)methyl)piperidine-3,4,5-triol;
(3S,4R,5R)-1-(((R)-1-(4-(trifluoromethyl)pyridin-2-yl)pyrrolidin-3-yl)methyl)piperidine-3,4,5-triol;
(3S,4R,5R)-1-(((R)-1-(pyridin-3-yl)pyrrolidin-3-yl)methyl)piperidine-3,4,5-triol;
(3S,4R,5R)-1-(((R)-1-(4-methylpyridin-3-yl)pyrrolidin-3-yl)methyl)piperidine-3,4,5-triol;
(3S,4R,5R)-1-(((R)-1-(5-(trifluoromethyl)pyridin-3-yl)pyrrolidin-3-yl)methyl)piperidine-3,4,5-triol;
(3S,4R,5R)-1-(((R)-1-(2-(trifluoromethyl)pyridin-3-yl)pyrrolidin-3-yl)methyl)piperidine-3,4,5-triol;
(3S,4R,5R)-1-(((R)-1-(5-(trifluoromethyl)pyridin-2-yl)pyrrolidin-3-yl)methyl)piperidine-3,4,5-triol;
(3S,4R,5R)-1-(((R)-1-(6-(trifluoromethyl)pyridin-3-yl)pyrrolidin-3-yl)methyl)piperidine-3,4,5-triol;
(3S,4R,5R)-1-(((R)-1-(3-(trifluoromethyl)pyridin-4-yl)pyrrolidin-3-yl)methyl)piperidine-3,4,5-triol;
(3S,4R,5R)-1-(((R)-1-(2-(trifluoromethyl)pyridin-4-yl)pyrrolidin-3-yl)methyl)piperidine-3,4,5-triol;
(3S,4R,5R)-1-(((R)-1-(4-(trifluoromethyl)pyrimidin-5-yl)pyrrolidin-3-yl)methyl)piperidine-3,4,5-triol;
(3R,4R,5S)-1-(((R)-1-(thiophen-3-yl)pyrrolidin-3-yl)methyl)piperidine-3,4,5-triol;
(3S,4R,5R)-1-(((R)-1-(benzo[d]thiazol-4-yl)pyrrolidin-3-yl)methyl)piperidine-3,4,5-triol;
(4-(trifluoromethyl)phenyl)((R)-3-(((3S,4R,5R)-3,4,5-trihydroxypiperidin-1-yl)methyl)pyrrolidin-1-yl)methanone;
(3S,4S,5R)-1-(((S)-1-(2-(trifluoromethyl)phenyl)pyrrolidin-3-yl)methyl)piperidine-3,4,5-triol;
(3S,4S,5R)-1-(((S)-1-(6-(trifluoromethyl)pyridin-2-yl)pyrrolidin-3-yl)methyl)piperidine-3,4,5-triol;
(3S,4S,5R)-1-(((S)-1-(2-(trifluoromethyl)pyridin-3-yl)pyrrolidin-3-yl)methyl)piperidine-3,4,5-triol;
(3S,4S,5R)-1-(((S)-1-(5-(trifluoromethyl)pyridin-3-yl)pyrrolidin-3-yl)methyl)piperidine-3,4,5-triol;
(3S,4S,5R)-1-(((S)-1-(4-(trifluoromethyl)pyridin-2-yl)pyrrolidin-3-yl)methyl)piperidine-3,4,5-triol;
(3S,4S,5R)-1-(((S)-1-(5-(trifluoromethyl)pyridin-2-yl)pyrrolidin-3-yl)methyl)piperidine-3,4,5-triol;
(3S,4S,5R)-1-(((S)-1-(6-(trifluoromethyl)pyridin-3-yl)pyrrolidin-3-yl)methyl)piperidine-3,4,5-triol;
(3S,4S,5R)-1-(((S)-1-(3-(trifluoromethyl)pyridin-4-yl)pyrrolidin-3-yl)methyl)piperidine-3,4,5-triol;
(3S,4S,5R)-1-(((S)-1-(2-(trifluoromethyl)pyridin-4-yl)pyrrolidin-3-yl)methyl)piperidine-3,4,5-triol;
(3S,4R,5R)-1-(((R)-1-(o-tolyl)piperidin-3-yl)methyl)piperidine-3,4,5-triol;
(3S,4R,5R)-1-(((R)-1-(2-fluorophenyl)piperidin-3-yl)methyl)piperidine-3,4,5-triol;
(3S,4R,5R)-1-(((R)-1-(4-(trifluoromethyl)pyridin-3-yl)piperidin-3-yl)methyl)piperidine-3,4,5-triol;
(3S,4R,5R)-1-(((R)-1-(5-(trifluoromethyl)pyridin-3-yl)piperidin-3-yl)methyl)piperidine-3,4,5-triol;
(3S,4R,5R)-1-(((R)-1-(4-(trifluoromethyl)pyridin-2-yl)piperidin-3-yl)methyl)piperidine-3,4,5-triol;
(3S,4R,5R)-1-(((R)-1-(5-(trifluoromethyl)pyridin-2-yl)piperidin-3-yl)methyl)piperidine-3,4,5-triol;
(3S,4R,5R)-1-(((R)-1-(6-(trifluoromethyl)pyridin-3-yl)piperidin-3-yl)methyl)piperidine-3,4,5-triol;
(3S,4R,5R)-1-(((R)-1-(3-(trifluoromethyl)pyridin-4-yl)piperidin-3-yl)methyl)piperidine-3,4,5-triol;
(3S,4R,5R)-1-(((R)-1-(2-(trifluoromethyl)pyridin-4-yl)piperidin-3-yl)methyl)piperidine-3,4,5-triol;
(3S,4S,5R)-1-(((S)-1-(2-(trifluoromethyl)pyridin-3-yl)piperidin-3-yl)methyl)piperidine-3,4,5-triol;
(3S,4S,5R)-1-(((S)-1-(5-(trifluoromethyl)pyridin-3-yl)piperidin-3-yl)methyl)piperidine-3,4,5-triol;
(3S,4S,5R)-1-(((S)-1-(4-(trifluoromethyl)pyridin-2-yl)piperidin-3-yl)methyl)piperidine-3,4,5-triol;
(3S,4S,5R)-1-(((S)-1-(5-(trifluoromethyl)pyridin-2-yl)piperidin-3-yl)methyl)piperidine-3,4,5-triol;
(3S,4S,5R)-1-(((S)-1-(6-(trifluoromethyl)pyridin-3-yl)piperidin-3-yl)methyl)piperidine-3,4,5-triol;
(3S,4S,5R)-1-(((S)-1-(3-(trifluoromethyl)pyridin-4-yl)piperidin-3-yl)methyl)piperidine-3,4,5-triol;
(3S,4S,5R)-1-(((S)-1-(2-(trifluoromethyl)pyridin-4-yl)piperidin-3-yl)methyl)piperidine-3,4,5-triol;
(3S,4r,5R)-1-(3-fluorophenethyl)piperidine-3,4,5-triol;
(3S,4r,5R)-1-(4-fluorophenethyl)piperidine-3,4,5-triol;
(3S,4r,5R)-1-(3-(trifluoromethyl)phenethyl)piperidine-3,4,5-triol;
(3S,4r,5R)-1-(4-(trifluoromethyl)phenethyl)piperidine-3,4,5-triol;
(3S,4R,5R)-1-(((1r,4R)-4-(difluoromethyl)cyclohexyl)methyl)piperidine-3,4,5-triol;
(3S,4R,5R)-1-(((1s,4S)-4-(difluoromethyl)cyclohexyl)methyl)piperidine-3,4,5-triol;
(3S,4R,5R)-1-(((1s,4S)-4-(1,1-difluoroethyl)cyclohexyl)methyl)piperidine-3,4,5-triol;
(3S,4R,5R)-1-(((1r,4R)-4-(1,1-difluoroethyl)cyclohexyl)methyl)piperidine-3,4,5-triol;
(3S,4R,5R)-1-(((1r,4R)-4-(trifluoromethoxy)cyclohexyl)methyl)piperidine-3,4,5-triol;
(3S,4r,5R)-1-((4,7-difluoro-2,3-dihydro-1H-inden-2-yl)methyl)piperidine-3,4,5-triol;
cyclohexyl(4-fluoro-4-(((3S,4r,5R)-3,4,5-trihydroxypiperidin-1-yl)methyl)piperidin-1-yl)methanone;
(3S,4r,5R)-1-((4-fluoro-1-(4-fluorophenyl)piperidin-4-yl)methyl)piperidine-3,4,5-triol;
(3S,4r,5R)-1-((4-fluoro-1-(2-(trifluoromethyl)phenyl)piperidin-4-yl)methyl)piperidine-3,4,5-triol;
(3S,4r,5R)-1-((4-fluoro-1-(3-(trifluoromethyl)pyridin-2-yl)piperidin-4-yl)methyl)piperidine-3,4,5-triol;
(3S,4r,5R)-1-((4-fluoro-1-(6-(trifluoromethyl)pyridin-2-yl)piperidin-4-yl)methyl)piperidine-3,4,5-triol;
(3S,4r,5R)-1-((1-(benzo[d]thiazol-2-yl)-4-fluoropiperidin-4-yl)methyl)piperidine-3,4,5-triol;
(3S,4r,5R)-1-(4-butoxybenzyl)piperidine-3,4,5-triol;
(3S,4r,5R)-1-(4-(pentyloxy)benzyl)piperidine-3,4,5-triol;
(3S,4r,5R)-1-(4-butoxy-2,6-difluorobenzyl)piperidine-3,4,5-triol;
(3S,4r,5R)-1-(4-(cyclopropylmethoxy)benzyl)piperidine-3,4,5-triol;
(3S,4r,5R)-1-(4-phenoxybenzyl)piperidine-3,4,5-triol;
(3S,4r,5R)-1-([1,1'-biphenyl]-4-ylmethyl)piperidine-3,4,5-triol;
(3S,4r,5R)-1-(4-(pyrrolidin-1-yl)benzyl)piperidine-3,4,5-triol;

(3S,4r,5R)-1-(4-(piperidin-1-yl)benzyl)piperidine-3,4,5-triol;

(3S,4r,5R)-1-(thiophen-2-ylmethyl)piperidine-3,4,5-triol;

or a pharmaceutically acceptable salt of any of the foregoing compounds.

5. A pharmaceutical composition comprising an effective amount of the compound of claim 1 or a pharmaceutically acceptable salt thereof in combination with a pharmaceutically acceptable carrier.

6. A pharmaceutical composition comprising an effective amount of the compound of claim 2 or a pharmaceutically acceptable salt thereof in combination with a pharmaceutically acceptable carrier.

7. A pharmaceutical composition comprising an effective amount of the compound of claim 3 or a pharmaceutically acceptable salt thereof in combination with a pharmaceutically acceptable carrier.

8. A pharmaceutical composition comprising an effective amount of the compound of claim 4 or a pharmaceutically acceptable salt thereof in combination with a pharmaceutically acceptable carrier.

* * * * *

SEQUENCE LISTING

<160> NUMBER OF SEQ ID NOS: 3

<210> SEQ ID NO 1
<211> LENGTH: 926
<212> TYPE: PRT
<213> ORGANISM: Homo sapiens

<400> SEQUENCE: 1

```
Met Gly Thr Gln Asp Pro Gly Asn Met Gly Thr Gly Val Pro Ala Ser
1               5                   10                  15

Glu Gln Ile Ser Cys Ala Lys Glu Asp Pro Gln Val Tyr Cys Pro Glu
            20                  25                  30

Glu Thr Gly Gly Thr Lys Asp Val Gln Val Thr Asp Cys Lys Ser Pro
        35                  40                  45

Glu Asp Ser Arg Pro Pro Lys Glu Thr Asp Cys Cys Asn Pro Glu Asp
    50                  55                  60

Ser Gly Gln Leu Met Val Ser Tyr Glu Gly Lys Ala Met Gly Tyr Gln
65                  70                  75                  80

Val Pro Pro Phe Gly Trp Arg Ile Cys Leu Ala His Glu Phe Thr Glu
                85                  90                  95

Lys Arg Lys Pro Phe Gln Ala Asn Val Ser Leu Ser Asn Met Ile
            100                 105                 110

Lys His Ile Gly Met Gly Leu Arg Tyr Leu Gln Trp Trp Tyr Arg Lys
        115                 120                 125

Thr His Val Glu Lys Lys Thr Pro Phe Ile Asp Met Ile Asn Ser Val
    130                 135                 140

Pro Leu Arg Gln Ile Tyr Gly Cys Pro Leu Gly Gly Ile Gly Gly
145                 150                 155                 160

Thr Ile Thr Arg Gly Trp Arg Gly Gln Phe Cys Arg Trp Gln Leu Asn
                165                 170                 175

Pro Gly Met Tyr Gln His Arg Thr Val Ile Ala Asp Gln Phe Thr Val
            180                 185                 190

Cys Leu Arg Arg Glu Gly Gln Thr Val Tyr Gln Gln Val Leu Ser Leu
        195                 200                 205

Glu Arg Pro Ser Val Leu Arg Ser Trp Asn Trp Gly Leu Cys Gly Tyr
    210                 215                 220

Phe Ala Phe Tyr His Ala Leu Tyr Pro Arg Ala Trp Thr Val Tyr Gln
225                 230                 235                 240

Leu Pro Gly Gln Asn Val Thr Leu Thr Cys Arg Gln Ile Thr Pro Ile
                245                 250                 255

Leu Pro His Asp Tyr Gln Asp Ser Ser Leu Pro Val Gly Val Phe Val
            260                 265                 270

Trp Asp Val Glu Asn Glu Gly Asp Glu Ala Leu Asp Val Ser Ile Met
        275                 280                 285

Phe Ser Met Arg Asn Gly Leu Gly Gly Asp Asp Ala Pro Gly Gly
    290                 295                 300

Leu Trp Asn Glu Pro Phe Cys Leu Glu Arg Ser Gly Glu Thr Val Arg
305                 310                 315                 320

Gly Leu Leu Leu His His Pro Thr Leu Pro Asn Pro Tyr Thr Met Ala
                325                 330                 335
```

```
Val Ala Ala Arg Val Thr Ala Ala Thr Thr Val Thr His Ile Thr Ala
            340                 345                 350

Phe Asp Pro Asp Ser Thr Gly Gln Gln Val Trp Gln Asp Leu Leu Gln
        355                 360                 365

Asp Gly Gln Leu Asp Ser Pro Thr Gly Gln Ser Thr Pro Thr Gln Lys
        370                 375                 380

Gly Val Gly Ile Ala Gly Ala Val Cys Val Ser Ser Lys Leu Arg Pro
385                 390                 395                 400

Arg Gly Gln Cys Arg Leu Glu Phe Ser Leu Ala Trp Asp Met Pro Arg
                405                 410                 415

Ile Met Phe Ala Lys Gly Gln Val His Tyr Arg Arg Tyr Thr Arg Phe
                420                 425                 430

Phe Gly Gln Asp Gly Asp Ala Ala Pro Ala Leu Ser His Tyr Ala Leu
            435                 440                 445

Cys Arg Tyr Ala Glu Trp Glu Glu Arg Ile Ser Ala Trp Gln Ser Pro
            450                 455                 460

Val Leu Asp Asp Arg Ser Leu Pro Ala Trp Tyr Lys Ser Ala Leu Phe
465                 470                 475                 480

Asn Glu Leu Tyr Phe Leu Ala Asp Gly Gly Thr Val Trp Leu Glu Val
                485                 490                 495

Leu Glu Asp Ser Leu Pro Glu Glu Leu Gly Arg Asn Met Cys His Leu
            500                 505                 510

Arg Pro Thr Leu Arg Asp Tyr Gly Arg Phe Gly Tyr Leu Glu Gly Gln
            515                 520                 525

Glu Tyr Arg Met Tyr Asn Thr Tyr Asp Val His Phe Tyr Ala Ser Phe
        530                 535                 540

Ala Leu Ile Met Leu Trp Pro Lys Leu Glu Leu Ser Leu Gln Tyr Asp
545                 550                 555                 560

Met Ala Leu Ala Thr Leu Arg Glu Asp Leu Thr Arg Arg Tyr Leu
                565                 570                 575

Met Ser Gly Val Met Ala Pro Val Lys Arg Arg Asn Val Ile Pro His
            580                 585                 590

Asp Ile Gly Asp Pro Asp Asp Glu Pro Trp Leu Arg Val Asn Ala Tyr
            595                 600                 605

Leu Ile His Asp Thr Ala Asp Trp Lys Asp Leu Asn Leu Lys Phe Val
            610                 615                 620

Leu Gln Val Tyr Arg Asp Tyr Tyr Leu Thr Gly Asp Gln Asn Phe Leu
625                 630                 635                 640

Lys Asp Met Trp Pro Val Cys Leu Ala Val Met Glu Ser Glu Met Lys
                645                 650                 655

Phe Asp Lys Asp His Asp Gly Leu Ile Glu Asn Gly Gly Tyr Ala Asp
                660                 665                 670

Gln Thr Tyr Asp Gly Trp Val Thr Thr Gly Pro Ser Ala Tyr Cys Gly
            675                 680                 685

Gly Leu Trp Leu Ala Ala Val Ala Val Met Val Gln Met Ala Ala Leu
            690                 695                 700

Cys Gly Ala Gln Asp Ile Gln Asp Lys Phe Ser Ser Ile Leu Ser Arg
705                 710                 715                 720

Gly Gln Glu Ala Tyr Glu Arg Leu Leu Trp Asn Gly Arg Tyr Tyr Asn
                725                 730                 735

Tyr Asp Ser Ser Ser Arg Pro Gln Ser Arg Ser Val Met Ser Asp Gln
                740                 745                 750

Cys Ala Gly Gln Trp Phe Leu Lys Ala Cys Gly Leu Gly Glu Gly Asp
```

|     |     |     |     | 755 |     |     |     |     | 760 |     |     |     |     | 765 |     |     |     |
| --- | --- | --- | --- | --- | --- | --- | --- | --- | --- | --- | --- | --- | --- | --- | --- | --- | --- |
| Thr | Glu | Val | Phe | Pro | Thr | Gln | His | Val | Val | Arg | Ala | Leu | Gln | Thr | Ile |     |     |
|     |     |     |     | 770 |     |     |     |     | 775 |     |     |     |     | 780 |     |     |     |
| Phe | Glu | Leu | Asn | Val | Gln | Ala | Phe | Ala | Gly | Gly | Ala | Met | Gly | Ala | Val |     |     |
| 785 |     |     |     |     | 790 |     |     |     |     | 795 |     |     |     |     | 800 |     |     |
| Asn | Gly | Met | Gln | Pro | His | Gly | Val | Pro | Asp | Lys | Ser | Ser | Val | Gln | Ser |     |     |
|     |     |     |     | 805 |     |     |     |     | 810 |     |     |     |     | 815 |     |     |     |
| Asp | Glu | Val | Trp | Val | Gly | Val | Val | Tyr | Gly | Leu | Ala | Ala | Thr | Met | Ile |     |     |
|     |     |     | 820 |     |     |     |     | 825 |     |     |     |     | 830 |     |     |     |     |
| Gln | Glu | Gly | Leu | Thr | Trp | Glu | Gly | Phe | Gln | Thr | Ala | Glu | Gly | Cys | Tyr |     |     |
|     |     |     |     | 835 |     |     |     |     | 840 |     |     |     |     | 845 |     |     |     |
| Arg | Thr | Val | Trp | Glu | Arg | Leu | Gly | Leu | Ala | Phe | Gln | Thr | Pro | Glu | Ala |     |     |
|     |     |     |     | 850 |     |     |     |     | 855 |     |     |     |     | 860 |     |     |     |
| Tyr | Cys | Gln | Gln | Arg | Val | Phe | Arg | Ser | Leu | Ala | Tyr | Met | Arg | Pro | Leu |     |     |
| 865 |     |     |     |     | 870 |     |     |     |     | 875 |     |     |     |     | 880 |     |     |
| Ser | Ile | Trp | Ala | Met | Gln | Leu | Ala | Leu | Gln | Gln | Gln | Gln | His | Lys | Lys |     |     |
|     |     |     |     | 885 |     |     |     |     | 890 |     |     |     |     | 895 |     |     |     |
| Ala | Ser | Trp | Pro | Lys | Val | Lys | Gln | Gly | Thr | Gly | Leu | Arg | Thr | Gly | Pro |     |     |
|     |     |     |     | 900 |     |     |     |     | 905 |     |     |     |     | 910 |     |     |     |
| Met | Phe | Gly | Pro | Lys | Glu | Ala | Met | Ala | Asn | Leu | Ser | Pro | Glu |     |     |     |     |
|     |     |     |     | 915 |     |     |     |     | 920 |     |     |     |     | 925 |     |     |     |

```
<210> SEQ ID NO 2
<211> LENGTH: 21
<212> TYPE: DNA
<213> ORGANISM: Artificial Sequence
<220> FEATURE:
<223> OTHER INFORMATION: Primer

<400> SEQUENCE: 2
cgcaaatggg cggtaggcgt g                                             21

<210> SEQ ID NO 3
<211> LENGTH: 21
<212> TYPE: DNA
<213> ORGANISM: Artificial Sequence
<220> FEATURE:
<223> OTHER INFORMATION: Primer

<400> SEQUENCE: 3
tagtcagcca tggggcggag a                                             21
```